March 31, 1970 A. R. BURCH ET AL 3,503,530
TRANSFER CART FOR TRANSFERRING AN ARTICLE HANDLING
VEHICLE BETWEEN AISLES OF A WAREHOUSE
Filed April 18, 1966 77 Sheets-Sheet 15
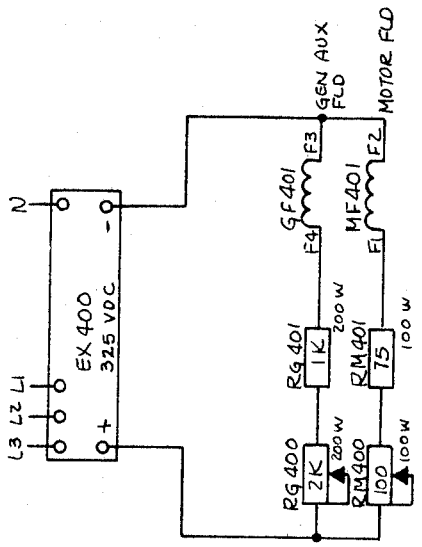
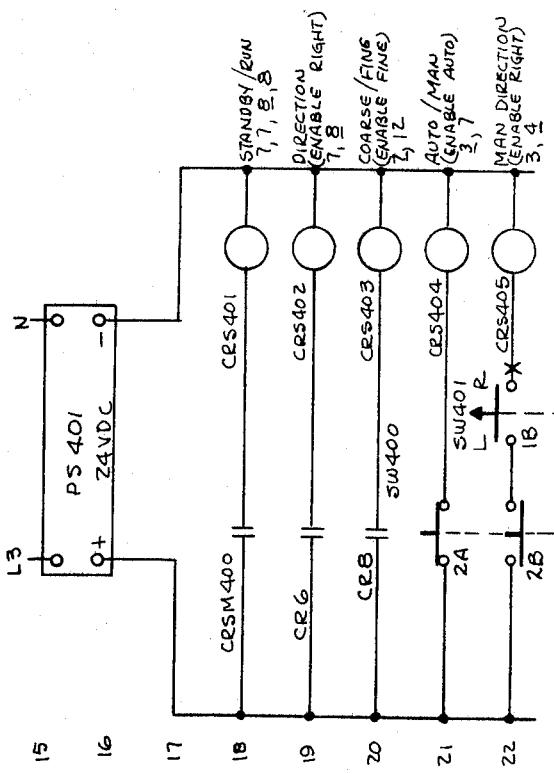
INVENTORS.
ARTHUR R. BURCH &
CHARLES E. BATES
BY
SCHROEDER, SIEGFRIED &
RYAN
ATTORNEYS

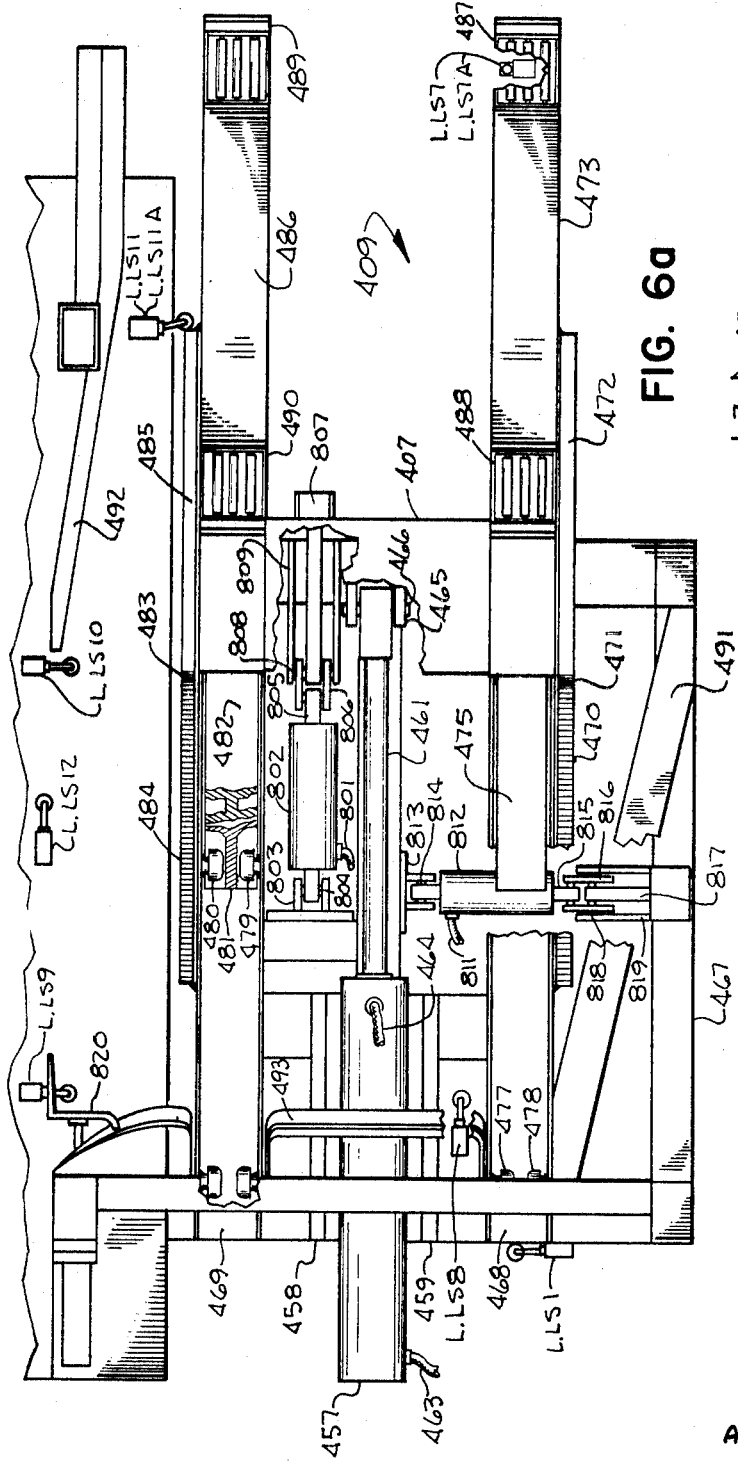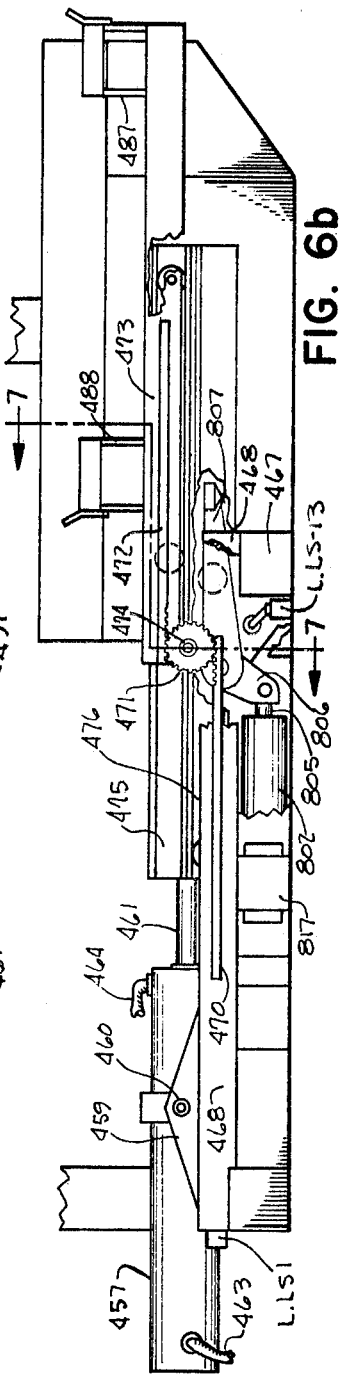

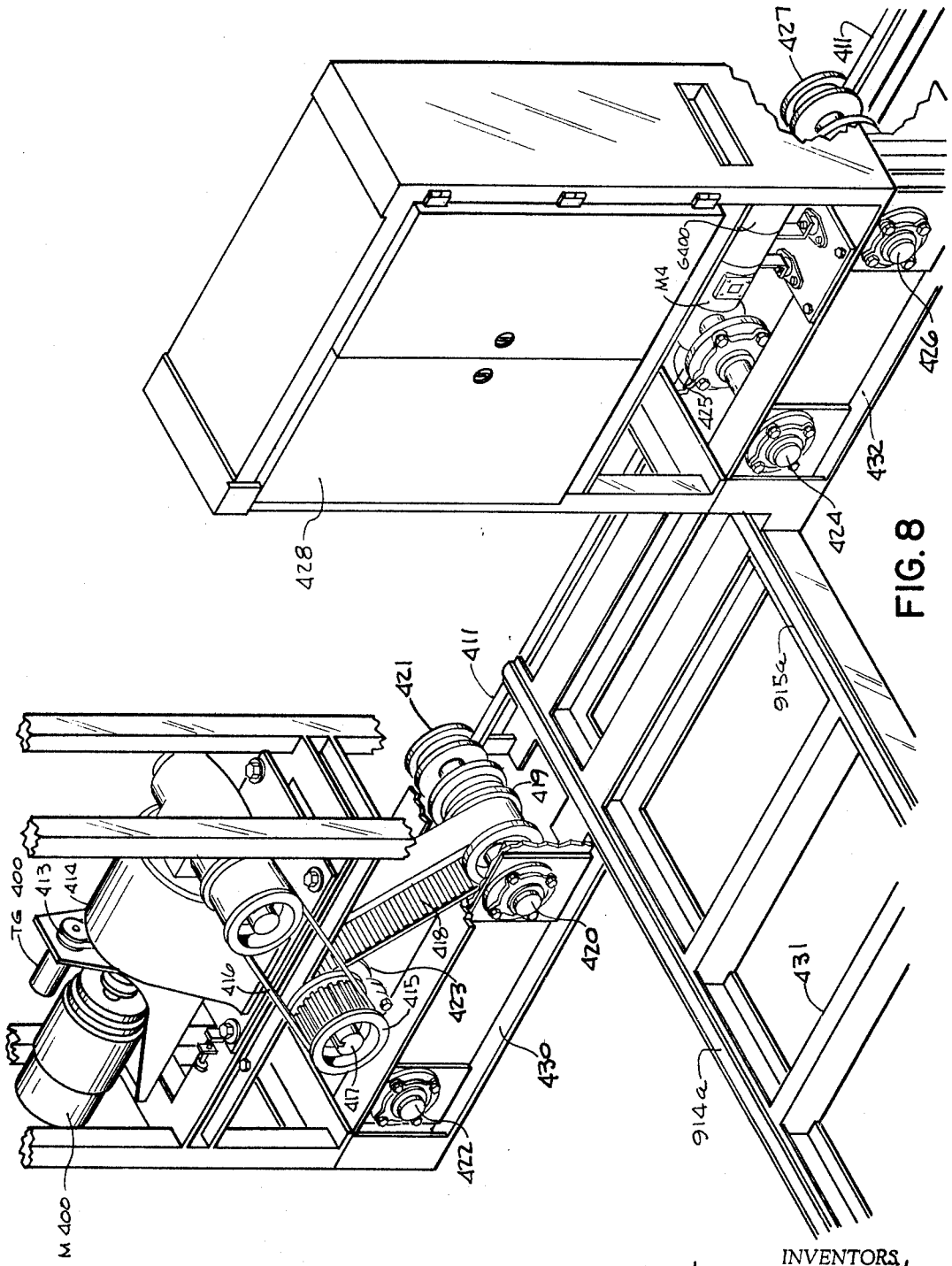

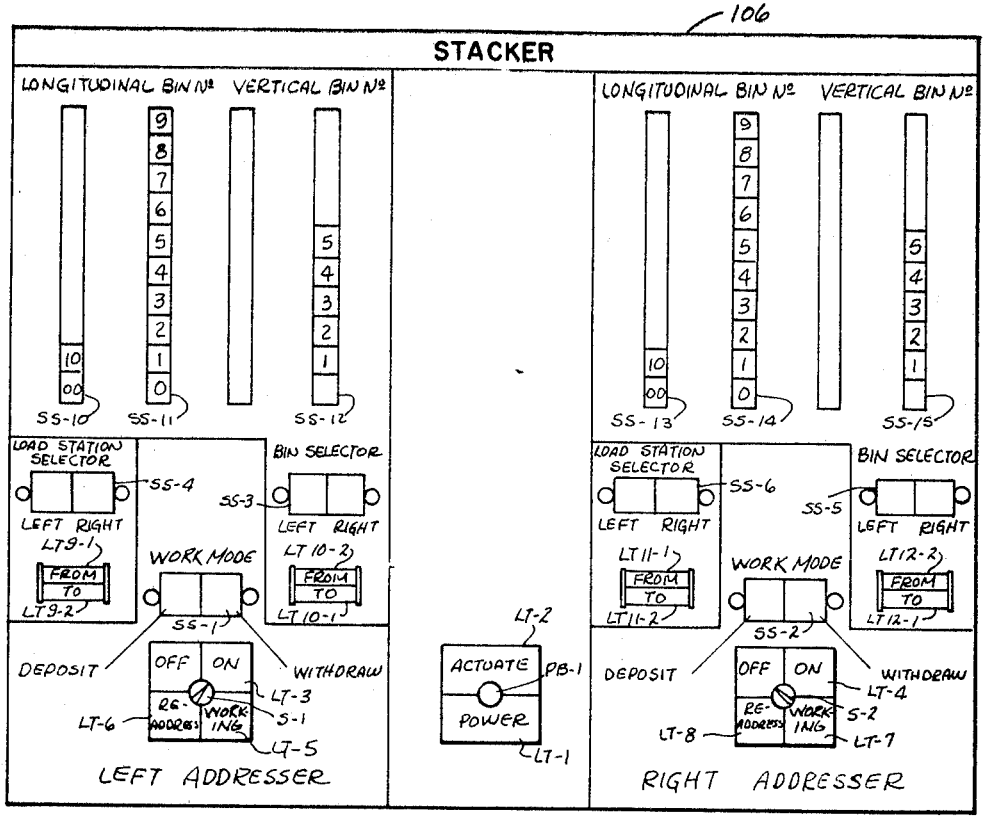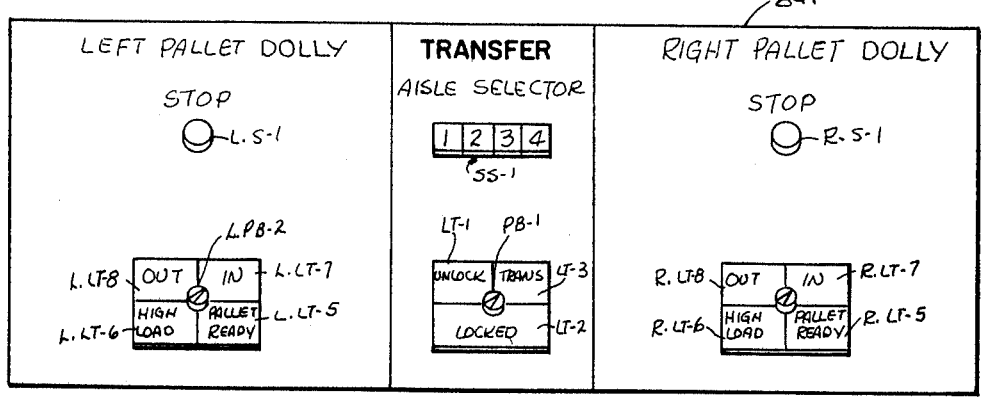
FIG. 10

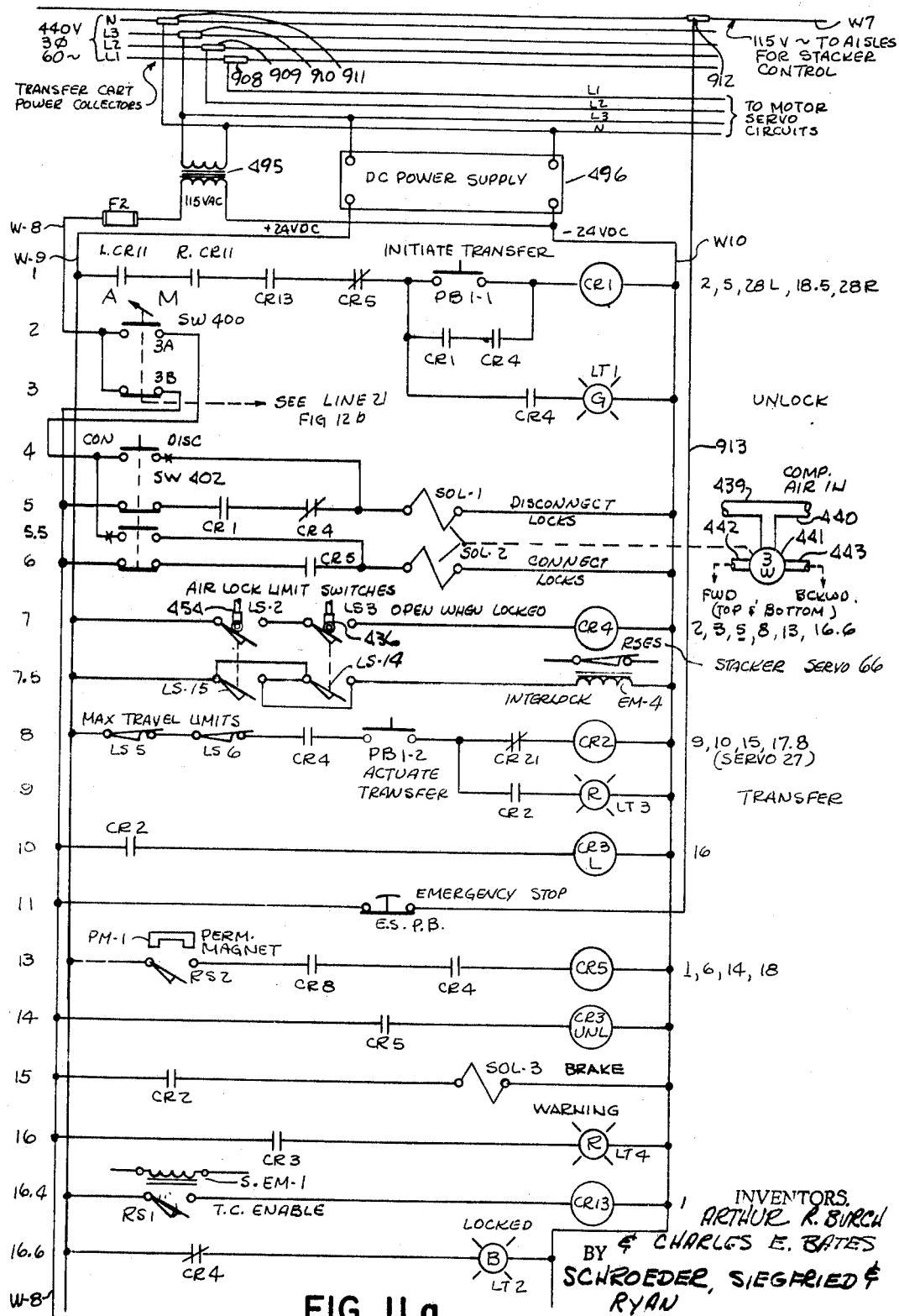

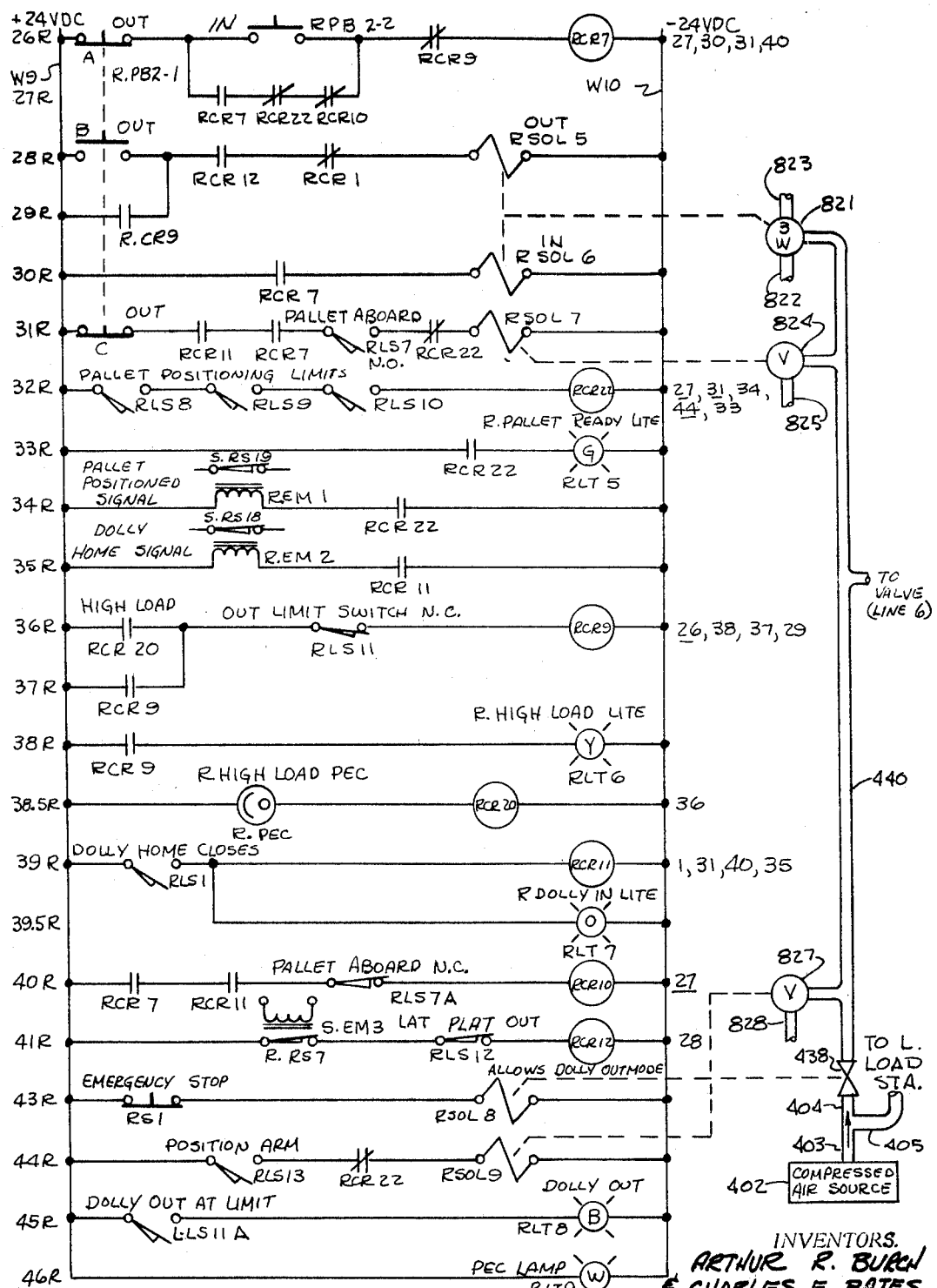
FIG. IId

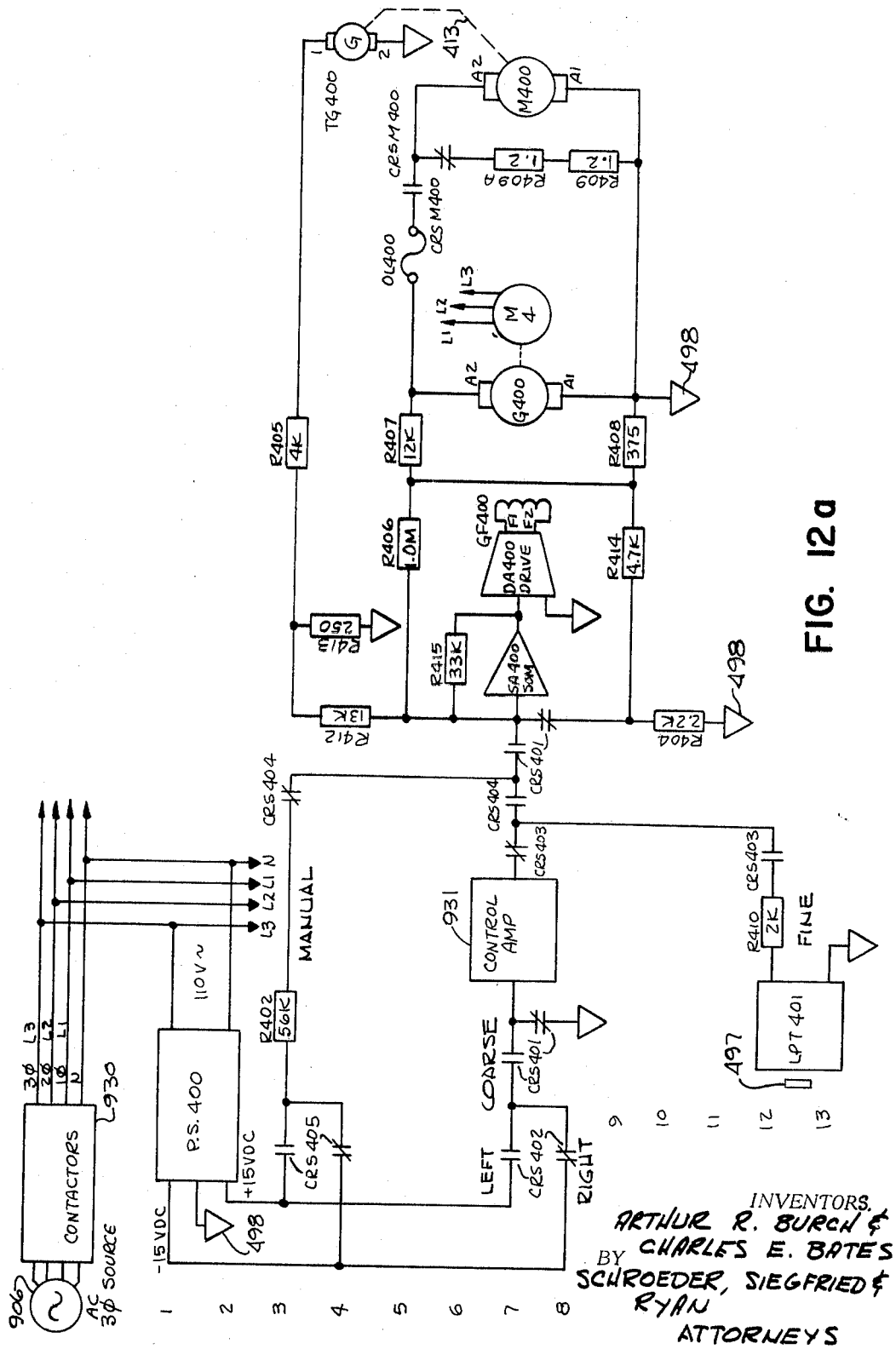

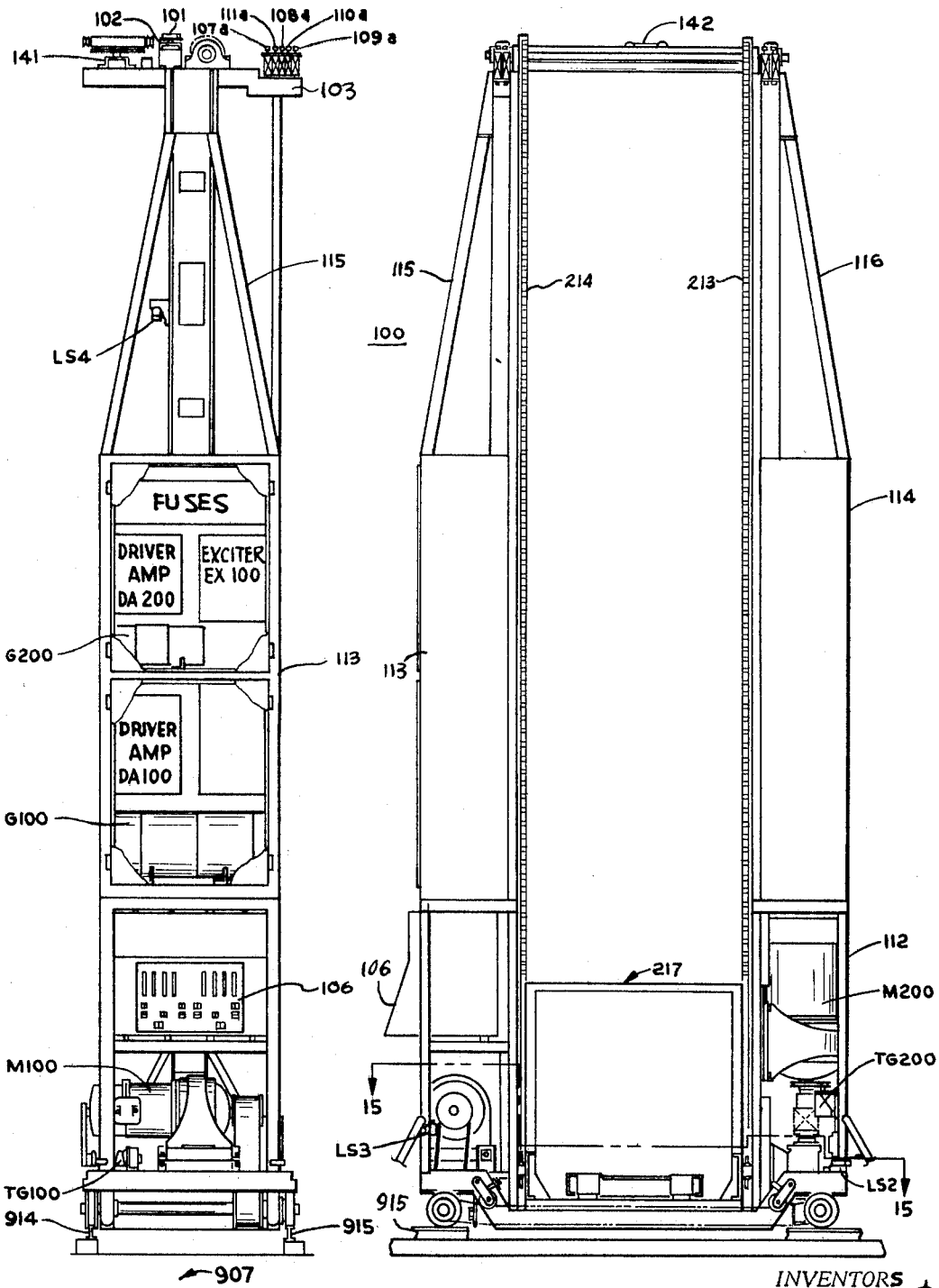

INVENTORS
ARTHUR R. BURCH &
CHARLES E. BATES
BY
SCHROEDER, SIEGFRIED &
RYAN
ATTORNEYS

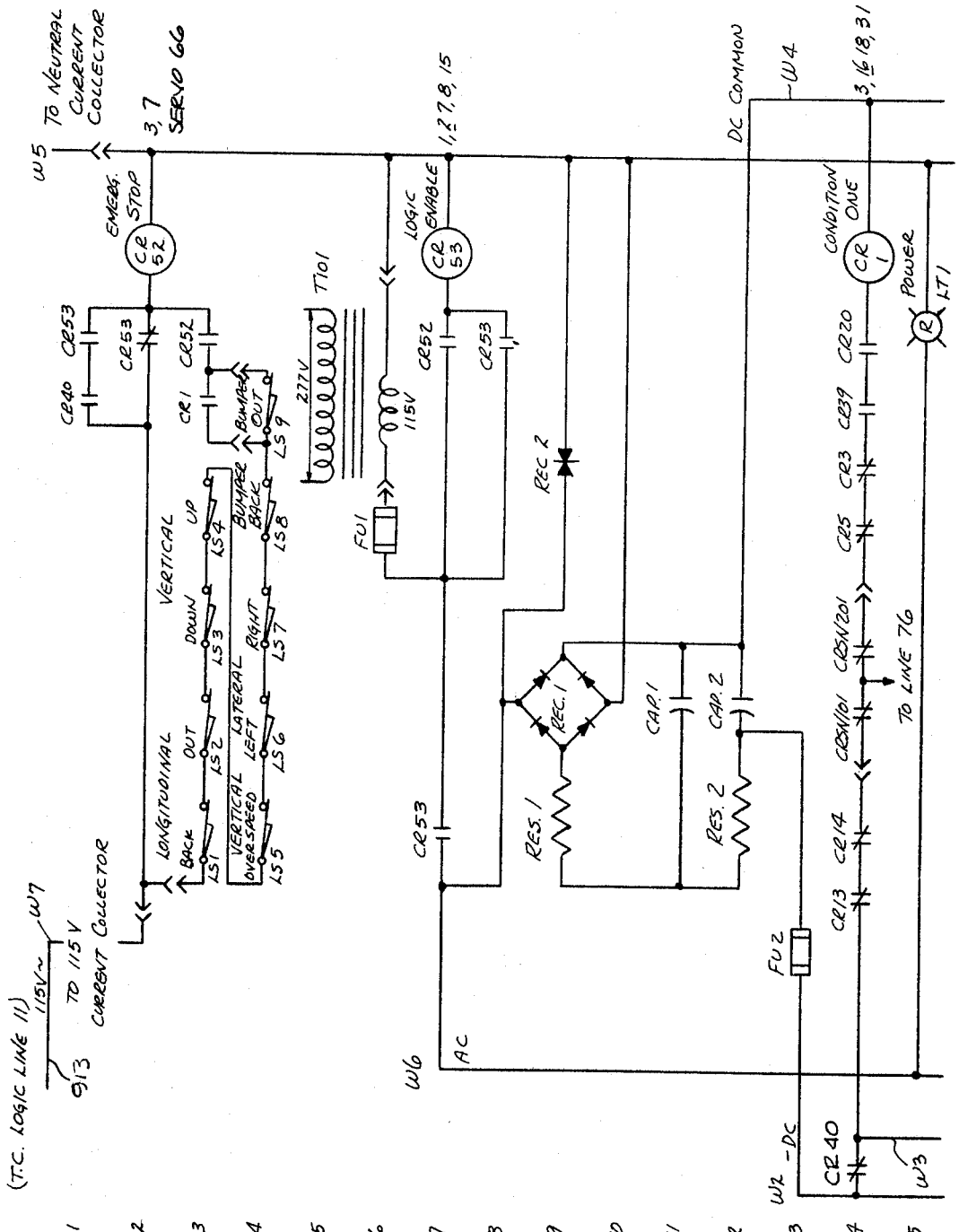

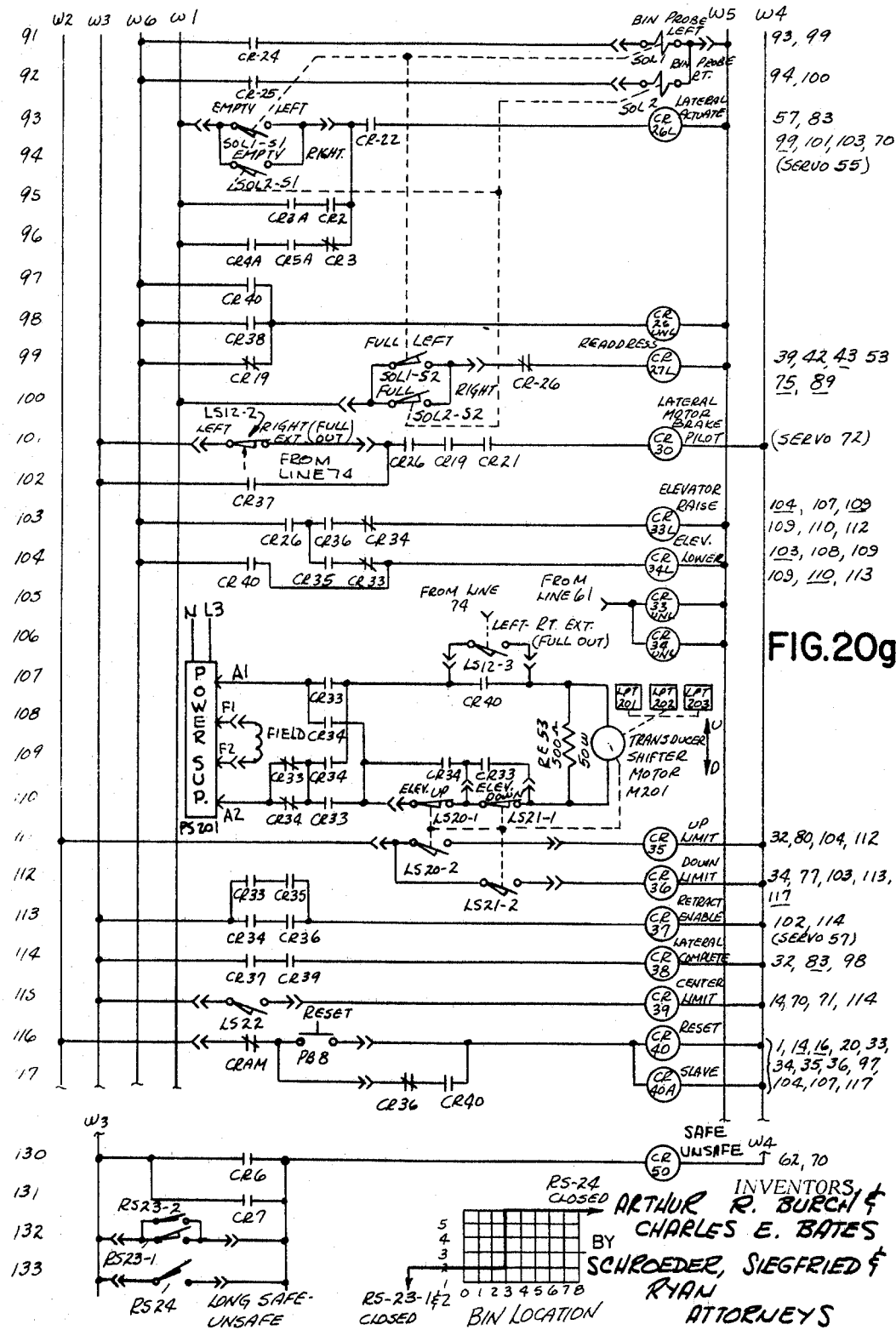

March 31, 1970 A. R. BURCH ET AL 3,503,530
TRANSFER CART FOR TRANSFERRING AN ARTICLE HANDLING
VEHICLE BETWEEN AISLES OF A WAREHOUSE
Filed April 18, 1966 77 Sheets-Sheet 31

INVENTORS
ARTHUR R. BURCH &
CHARLES E. BATES
BY SCHROEDER, SIEGFRIED &
RYAN
ATTORNEYS

INVENTORS.
ARTHUR R. BURCH &
  CHARLES E. BATES
BY
SCHROEDER, SIEGFRIED &
  RYAN
        ATTORNEYS

INVENTORS.
ARTHUR R. BURCH &
CHARLES E. BATES
BY SCHROEDER, SIEGFRIED &
RYAN
ATTORNEYS

FIG. 23a

| MODE | SW-AM TO AUTO LINE | LSOL 5 | LCR 7 | LSOL 6 | LCR 11 | EM 2 | LSOL 7 | LSOL 9 | LCR 22 | EM 1 | LLT 5 | LCR 20 | EM 4 |
|---|---|---|---|---|---|---|---|---|---|---|---|---|---|
| POWER "ON" TO TRANSFER CART LOGIC CIRCUIT SW-400 "AUTO" STACKER CENTERED ON TRANSFER CART AND LATERAL PLAT CENTERED | 43L | | | | | | | | | | | | |
| RS1 CLOSED | 16.4 | | | | | | | | | | | | |
| LLS1 CLOSED | 39L | | | | e | | | | | | | | |
| | 39.5L | | | | | | | | | | | | |
| | 35L | | | | e | | | | | | | | |
| RLS1 CLOSED | 39R | | | | | | | | | | | | |
| LRS7 & LLS12 CLOSED | 41L | | | | | | | | | | | | |
| TRANSFER CART LOCKED | | | | | | | | | | | | | |
| | 16.6 | | | | | | | | | | | | |
| L DOLLY OUT | | | | | | | | | | | | | |
| SW PRESSED | 28L | e | | | | | | | | | | | |
| SW RELEASED | 28L | d | | | | | | | | | | | |
| LLS1 OPEN | 39L | | | | d | d | | | | | | | |
| | 35L | | | | | | | | | | | | |
| | 39.5L | | | | | | | | | | | | |
| LLS11(A) CLOSED | 45L | | | | | | | | | | | | |
| LOAD POSITIONED | | | | | | | | | | | | | |
| L DOLLY IN | | | | | | | | | | | | | |
| SW LPB2 PRESSED | 26L | e | | | | | | | | | | | |
| SW LPB2 RELEASED | 30L | | e | | | | | | | | | | |
| | 46L | | | | | | | | | | | | |
| LLS7 CLOSED | 31L | | | | | | | | | | | | |
| LLS7(A) OPEN | 40L | | | | e | | | | | | | | |
| LLS1 CLOSED | 39L | | | | e | | | | | | | | |
| | 36L | | | | | e | | | | | | | |
| | 39.5L | | | | | | | | | | | | |
| | 31L | | | | | | e | | | | | | |
| LLS15 CLOSED | 44L | | | | | | | | | | | | |
| LLS 8,9 & 10 CLOSED | 32L | | | | | | | | e | | | | |
| | 27L | | d | | | | | | | | | | |
| | 31L | | | | | | d | | d | | | | |
| | 44L | | | | | | | | | | | | |
| | 30L | | | d | | | | | | | | | |
| | 34L | | | | | | | | | | e | | |
| | 33L | | | | | | | | | | | e | |
| LOAD TOO HIGH | | | | | | | | | | | | | |
| PEC CLOSED | 38.5L | | | | | | | | | | | e | |
| | 36L | | | | | | | | | | | | |
| | 26L | | d | | | | | | | | | | |
| | 38L | | | | d | | | | | | | | |
| | 30L | | | | | | | | | | | | |
| | 29L | e | | | | | | | | | | | |
| LLS11 OPEN | 36L | | | | | | | | | | | | |
| | 38L | | | | | | | | | | | | |
| | 29L | d | | | | | | | | | | | |
| LLS11(A) CLOSED | 45L | | | | | | | | | | | | |
| LPEC OPEN | 38.5L | | | | | | | | | | | d | |
| NO LOAD | | | | | | | | | | | | | |
| L DOLLY IN | | | | | | | | | | | | | |
| SW LPB2 PRESSED | 26L | e | | | | | | | | | | | |
| SW LPB2 RELEASED | 30L | | e | | | | | | | | | | |
| LLS11(A) | 45L | | | | | | | | | | | | |
| LLS1 CLOSED | 39L | | | | e | | | | | | | | |
| | 39.5L | | | | | | | | | | | | |
| | 40L | | | | | | | | | | | | |
| | 26L | d | | | | | | | | | | | |
| | 30L | | d | | | | | | | | | | |
| | 40L | | | | | | | | | | | | |

| MODE OF OPERATION | | EMER. STOP | LOGIC ENABLE | UNLATCH | UNLATCH | POWER ON | DOWN LIMIT | CNTR. LIMIT |
|---|---|---|---|---|---|---|---|---|
| | | CR 52 | CR 53 | CR 12 UNL | CR 8&9 UUL | LT 1 | CR 36 | CR 39 |
| INTIAL COND.-AUTO MAN.SW-"AUTO" Logic Line | | | | | | | | |
| SS10-10, SS11-0, SS12-2 | | | | | | | | |
| SS13-00, SS14-9, SS15-4 | | | | | | | | |
| LEFT DEP-WITH SW | S1-2, SS-1 DEPOSIT 47 | 47 | | | | | | 47 |
| | RS28-00 CLOSED 210 | | | | | | | |
| | SS13-00 CLOSED 238 | | | | | | | |
| | RS28-0 CLOSED 209 | | | | | | | |
| | RS29-1 189 | | | | | | | |
| | SS10 THRU SS15 CLOSED 234 | | | | | | | |
| | 2 | e | | | | | | |
| | 7 | | e | e | | | | |
| | 60 | | | | | | | |
| | 52 | | | | e | | | |
| | 15 | | | | | e | | |
| | 105 | | | | | | | |
| | 98 | | | | | | | |
| POWER SUPPLIES (ON) | | | | | | | | |
| ELEVATOR DOWN | | | | | | | | |
| | LS21-2 CLOSED 112 | | | | | | e | |
| | RS23-1 CLOSED 132 | | | | | | | |
| ELEVATOR CENTERED | | | | | | | | |
| | LS22 CLOSED 115 | | | | | | | e |
| ELEVATOR EMPTY | | | | | | | | |
| | LS13, LS14, LS15 CLOSED 77 | | | | | | | |
| | 14 | | | | | | | |
| | 16 | | | | | | | |
| | 31 | | | | | | | |
| STANDBY | | | | | | | | |
| LEFT ADD SW ON | | | | | | | | |
| | S1-1 17 | | | | | | | |
| LEFT LOAD STA. ADD. | | | | | | | | |
| | SS-4 CLOSED (LEFT) 58 | | | | | | | |
| LEFT BIN ADD. | | | | | | | | |
| | SS-3 CLOSED (LEFT) 57 | | | | | | | |
| LEFT ADDRESSER | | | | | | | | |
| SS10-10, SS11-2, SS12-2 | | | | | | | | |
| PRESS ACTUATE SW PB1 & RELEASE | | | | | | | | |
| | PB1-1 CLOSED 18 | 18 | | | | | | 18 |
| | 21 | | | | | | | |
| | 18 | | | | | | | |

INVENTOR.
ARTHUR R. BURCH &
CHARLES E. BATES
BY
SCHROEDER, SIEGFRIED &
RYAN
ATTORNEYS

March 31, 1970    A. R. BURCH ET AL    3,503,530
TRANSFER CART FOR TRANSFERRING AN ARTICLE HANDLING
VEHICLE BETWEEN AISLES OF A WAREHOUSE
Filed April 18, 1966                              77 Sheets-Sheet 45

| TRANS. SHIFT | VER. MOTOR | UP LIMIT | RETRACT | LAT. COMP. | UNLATCH | UNLATCH | LEFT ADD. | LONG. DIR. | VER. COPR. FINE | SAFE | LON. COAR. FINE | UNLATCH | LONG. MOTOR | BY PASS | L. VER. BIN | L. LONG. BIN | L. LONG. BIN | L. FLIPPER | L. FLIP. SOL. | ELE. DOWN | READDRESS | UNLATCH | UNLATCH |
|---|---|---|---|---|---|---|---|---|---|---|---|---|---|---|---|---|---|---|---|---|---|---|---|
| M | CR | CR | CR | CR | CR 2 | CR 26 | CR | CR | CR | CR | CR | CR 33 & 34 | CR | CR | CR | CR | CR | CR | SOL | CR | CR | CR 3 | CR 5 |
| 201 | 18 | 35 | 37 | 38 | UNL | UNL | 6 | 10 | 14 | 50 | 13 | UNL | 16 | 23 | 42 | 44 | 43 | 24 | 1 | 34L | 27L | UNL | UNL |

FIG. 24c

INVENTOR.
ARTHUR R. BURCH &
BY CHARLES E. BATES
SCHROEDER, SIEGFRIED &
RYAN
ATTORNEYS

A. R. BURCH ET AL 3,503,530

TRANSFER CART FOR TRANSFERRING AN ARTICLE HANDLING
VEHICLE BETWEEN AISLES OF A WAREHOUSE

Filed April 18, 1966

INVENTORS.
ARTHUR R. BURCH &
CHARLES E. BATES
BY
SCHROEDER, SIEGFRIED &
RYAN
ATTORNEYS

FIG. 24i

| Label | Code | Value |
|---|---|---|
| FLIPPER OUT (LEFT) EMPTY | | 91 |
| | SOL1-S1 CLOSED | 93 |
| | | 57 |
| | | 59 |
| | | 91 |
| | | 105 |
| | | 83 |
| | | 93 |
| | | 101 |
| | | 103 |
| PALLET DEPOSIT LATERAL PLATFORM OUT | | |
| | LS12-2 OPEN | 101 |
| | LS12-1 CLOSED | 74 |
| | LS12-3 CLOSED | 106 |
| | LS 22 OPEN | 115 |
| LATERAL PLATFORM LOWERED | | |
| | LS 21-1 OPEN | 110 |
| | LS 21-2 CLOSED | 112 |
| | LS 20-2 OPEN | 111 |
| | | 104 |
| | | 113 |
| | | 102 |
| LATERAL PLATFORM RETRACT | | 80 |
| | LS 12-1 OPEN | 74 |
| LATERAL PLATFORM CENTERED | | |
| | LS 22 CLOSED | 115 |
| | | 114 |
| | | 32 |
| | | 36 |
| | | 21 |
| | | 98 |
| | | 93 |
| | | 22 |
| | | 77 |
| | | 14 |
| | | 16 |
| | | 31 |
| | | 29 |
| | | 38 |
| | | 43 |
| | | 53 |
| | | 62 |
| | | 14 |
| | | 16 |
| | | 31 |
| | | 101 |
| | | 70 |
| | | 67 |
| | | 71 |
| | | 87 |
| | | 57 |
| | | 57 |
| | | 105 |
| | | 103 |
| | | 75 |
| | | 113 |
| | | 114 |
| | | 32 |
| | | 32 |
| STACKER MOVING LONG. & VERTICAL COARSE | | 98 |
| | RS 28-2 OPEN | 206 |
| | RS 28-10 OPEN | 203 |
| | RS 29-2 OPEN | 184 |
| | RS 29-1 CLOSED | 185 |
| | | 67 |
| PLATFORM DOWN | CRSN 201 (FINE NULL) | 72 |
| | RS 28-00 CLOSED | 210 |
| | RS 28-00 CLOSED | 238 |
| | RS 28-0 CLOSED | 201 |
| | | 62 |
| | CRSN 101 (FINE NULL) | 69 |
| STACKER HOME | | 14 |
| | | 16 |
| | | 31 |
| RIGHT WITHDRAWAL STACKER LONG. & VERT. COARSE | | |
| | RS 28-2 OPEN | 206 |
| | RS 28-10 OPEN | 203 |

INVENTORS.
ARTHUR R. BURCH &
CHARLES E. BATES
BY
SCHROEDER, SIEGFRIED &
RYAN
ATTORNEYS

A. R. BURCH ET AL  3,503,530
TRANSFER CART FOR TRANSFERRING AN ARTICLE HANDLING
VEHICLE BETWEEN AISLES OF A WAREHOUSE

Filed April 18, 1966  77 Sheets-Sheet 59

CRSN 202 (SUP FINE SIG & NULL) AT NULL
STACKER HOME  RS-18 CLOSED

SOL2-S1 CLOSED

PALLET DEPOSIT AT LOAD STATION
LATERAL PLATFORM OUT
  LS12-2 OPEN
  LS22    OPEN
  LS12-3 CLOSED
  LS12-1 CLOSED

PLATFORM LOWERED
  LS21-1 OPEN
  LS21-2 CLOSED

LS20-2 OPEN

PLATFORM RETRACT
  LS12-1 OPEN

PLATFORM CENTERED
  LS22 CLOSED

FLIPPER OUT (LEFT) FULL
  SOL1-S2 CLOSED

SOL1-S2 OPEN

FIG. 24q

INVENTORS.
ARTHUR R. BURCH &
BY  CHARLES E. BATES
SCHROEDER, SIEGFRIED &
RYAN
ATTORNEYS

INVENTORS.
ARTHUR R. BURCH &
CHARLES E. BATES
BY SCHROEDER, SIEGFRIED &
RYAN
ATTORNEYS

MODE OF OPERATION

| Mode of Operation | L. READDRESS | UNLATCH | R. ADD. ON | R. BIN TOOLS | ADD. RIGHT | ⅙ SLAVE | R. ACTUATE | ⅙ SLAVE | WORK RT. | ADD. RIGHT | LONG. BIN R. | LONG. MEMORY | VER. BIN RT. | VER. MEMORY | UNLATCH | R. FLIPPER | R. FLIP. SOL. | R.L.S. WARNING | R. READDRESS |
|---|---|---|---|---|---|---|---|---|---|---|---|---|---|---|---|---|---|---|---|
| Logic Line | LT 6 | CR 27 UNL | LT 4 | LT122 LT11-2 | CR 4L | CR 4A | CR 5L | CR 5A | LT 7 | CR 7 | CR 48 | CR 8L | CR 47 | CR 9L | CR UNL | CR 4 | SOL 25 | S EM 2 | LT 3 8 |
| RIGHT DEP-WITH SW S2-3 CLOSED SS2-2(WITH) SS2-2 (WITH) 49 | | | | e | | | | | | | | | | | | | | | |
| STANDBY RIGHT ADD SW ON S2-1 CLOSED 24 | | | e | | | | | | | | | | | | | | | | |
| RIGHT LOAD ST. ADD. SS-6 OPEN RIGHT 60 | | | | | | | | | | | | | | | | | | | |
| RIGHT BIN ADD SS-5 OPEN (RIGHT) 59 | | | | | | | | | | | | | | | | | | | |
| RIGHT ADDRESSER SS13-00, SS14-9, SS15-2 | | | | | | | | | | | | | | | | | | | |
| PRESS ACUATE SW & RELEASE PB1-2 CLOSED 19 OPENED 19 PB1-1 CLOSED | e d | | | | | | | | | | | | | | | | | | |

FIG. 24u

INVENTORS,
ARTHUR R. BURCH &
BY CHARLES E. BATES
SCHROEDER, SIEGFRIED &
RYAN
ATTORNEYS

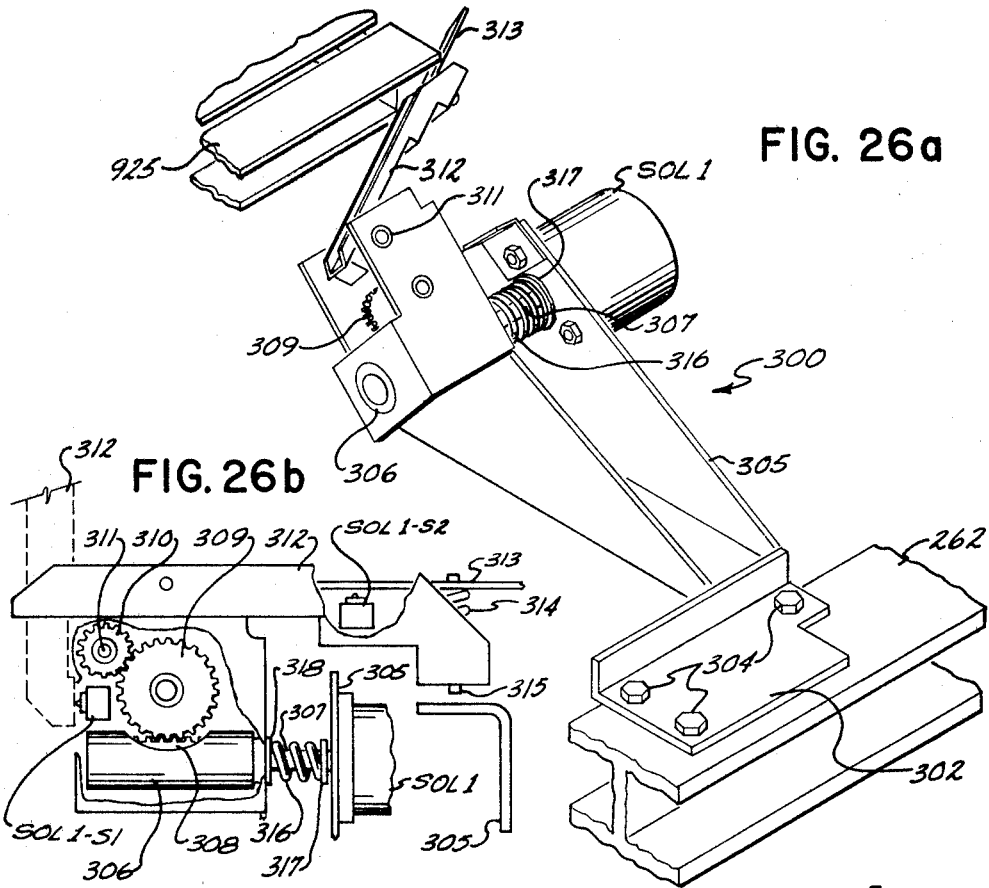
FIG. 26a
FIG. 26b
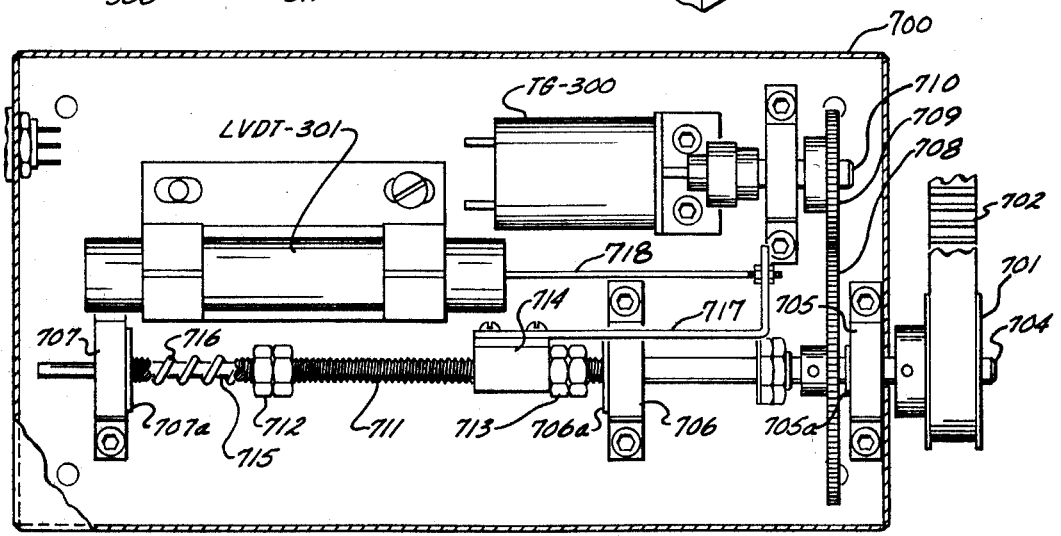
FIG. 37

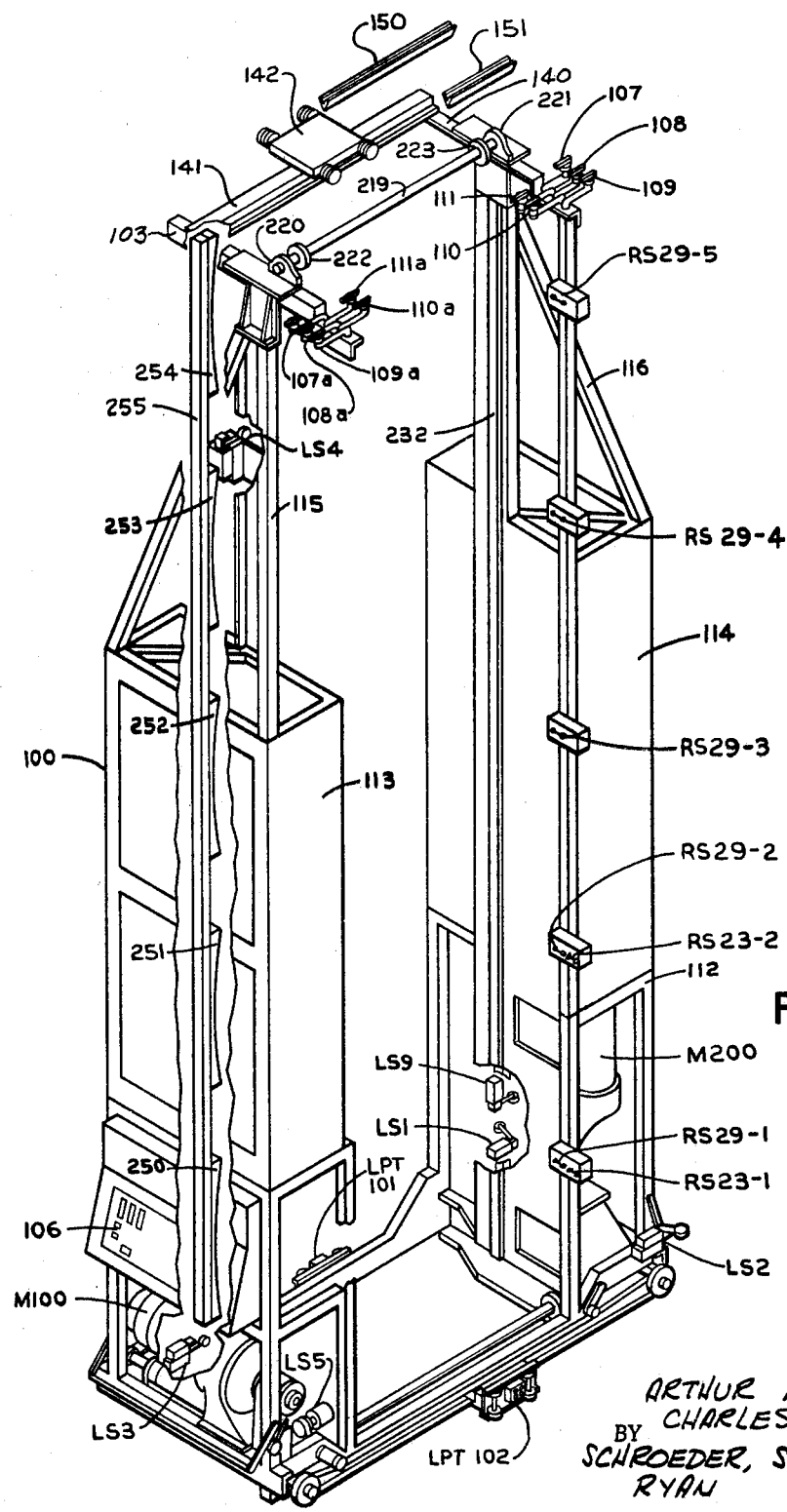

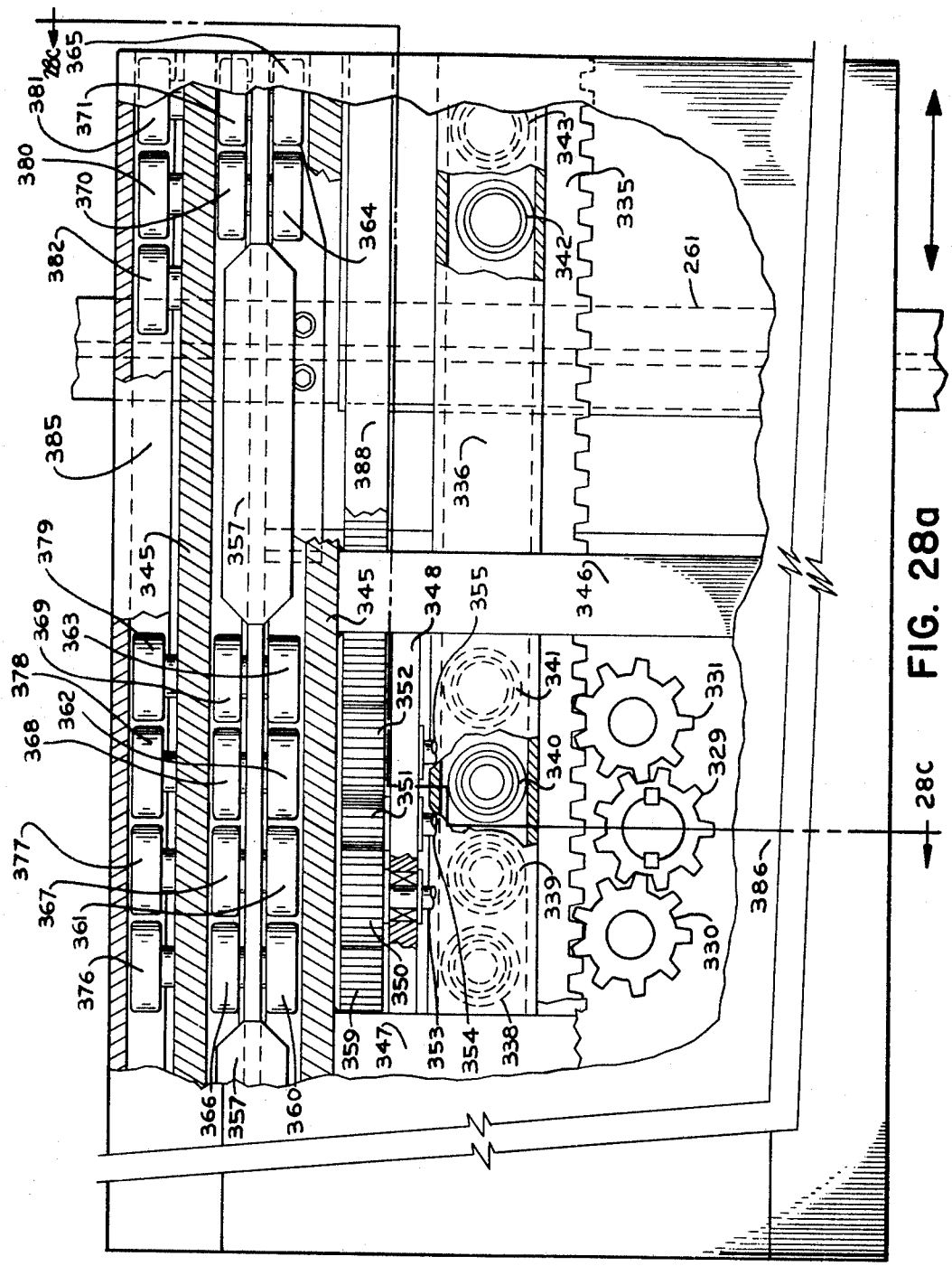

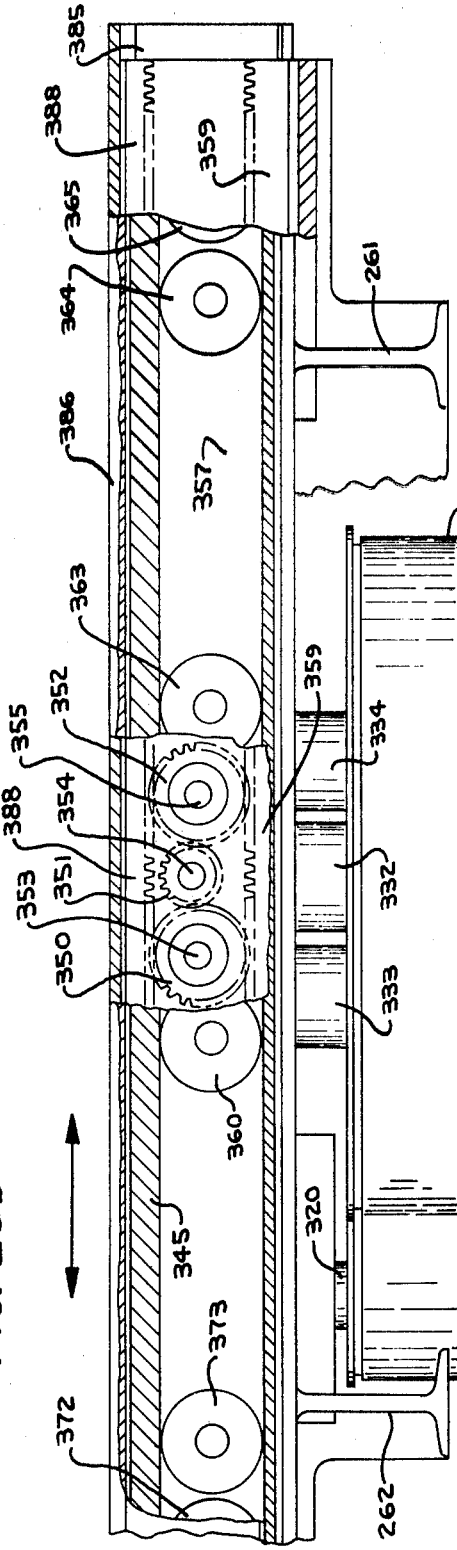
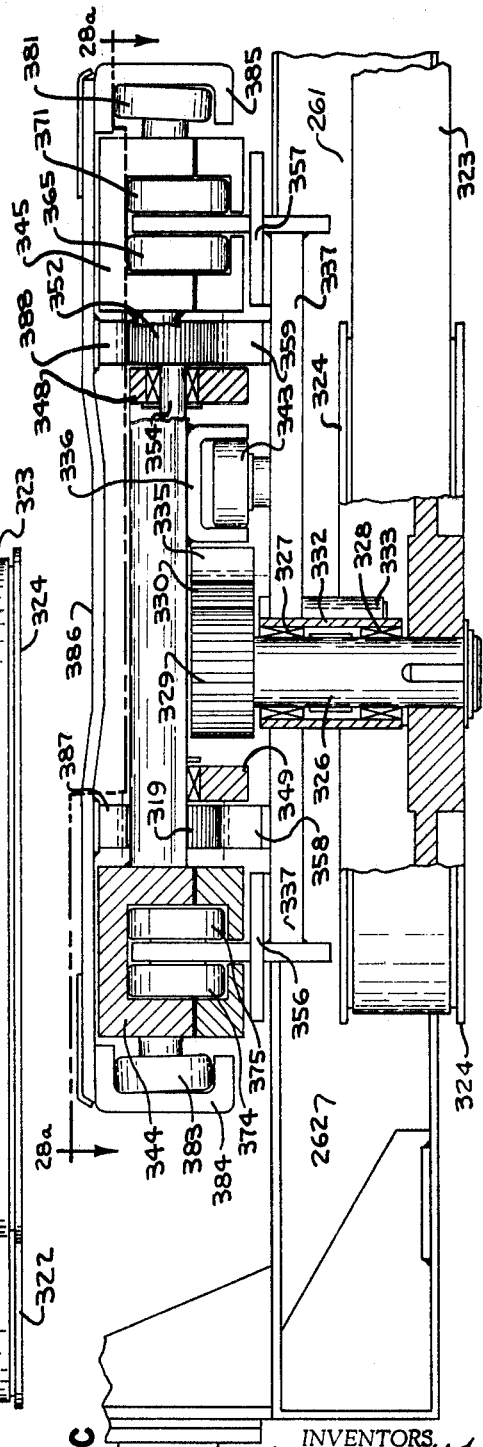
FIG. 28b
FIG. 28c
INVENTORS.
ARTHUR R. BURCH &
CHARLES E. BATES
BY SCHROEDER, SIEGFRIED &
RYAN
ATTORNEYS

SHOWN AT AISLE NO. 1

SHOWN IN HOME POSITION

March 31, 1970    A. R. BURCH ET AL    3,503,530
TRANSFER CART FOR TRANSFERRING AN ARTICLE HANDLING
VEHICLE BETWEEN AISLES OF A WAREHOUSE
Filed April 18, 1966    77 Sheets-Sheet 76

| FIG.24-a | FIG.24-b | FIG.24-c | FIG.24-d |
|---|---|---|---|
| FIG.24-e | FIG.24-f | FIG.24-g | FIG.24-h |
| FIG.24-i | FIG.24-j | FIG.24-k | FIG.24-l |

RELAY CHART ARRANGEMENT FOR
DEPOSIT MODE - LEFT LOAD
STATION TO LEFT BIN (H12, V2)

FIG. 34a

| FIG.24-a | FIG.24-b | FIG.24-c | FIG.24-d |
|---|---|---|---|
| FIG.24-e | FIG.24-f | FIG.24-g | FIG.24-h |
| FIG.24-q | FIG.24-r | FIG.24-s | FIG.24-t |

(FIG. 24y)

RELAY CHART ARRANGEMENT FOR
DEPOSIT-REJECT MODE L.LOAD
STATION TO LEFT BIN (FULL)(H12-V2)

FIG. 34b

| FIG.24-a | FIG.24-b | FIG.24-c | FIG.24-u | FIG.24-d |
|---|---|---|---|---|
| FIG.24-e | FIG.24-f | FIG.24-g | FIG.24-v | FIG.24-h |
| FIG.24-i | FIG.24-j | FIG.24-k | FIG.24-w | FIG.24-l |
| FIG.24-m | FIG.24-n | FIG.24-o | FIG.24-x | FIG.24-p |
| FIG.24-q | FIG.24-r | FIG.24-s | FIG.24-y | FIG.24-t |

RELAY CHART ARRANGEMENT FOR
DEPOSIT-WITHDRAWAL MODE - LEFT LOAD
STATION TO LEFT BIN (H12, V2) AND
RIGHT BIN (H9, V4) TO RIGHT LOAD STATION

FIG. 34c

| FIG.23-a | FIG.23-b | FIG.23-c |
|---|---|---|
| FIG.23-d | FIG.23-e | FIG.23-f |

RELAY CHART ARRANGEMENT
FOR TRANSFER FROM
AISLE NO. 1 TO AISLE
NO. 2 FOR TRANSFER CART
AND STACKER

FIG. 34d

INVENTORS.
ARTHUR R. BURCH &
CHARLES E. BATES
BY SCHROEDER, SIEGFRIED &
RYAN
ATTORNEYS

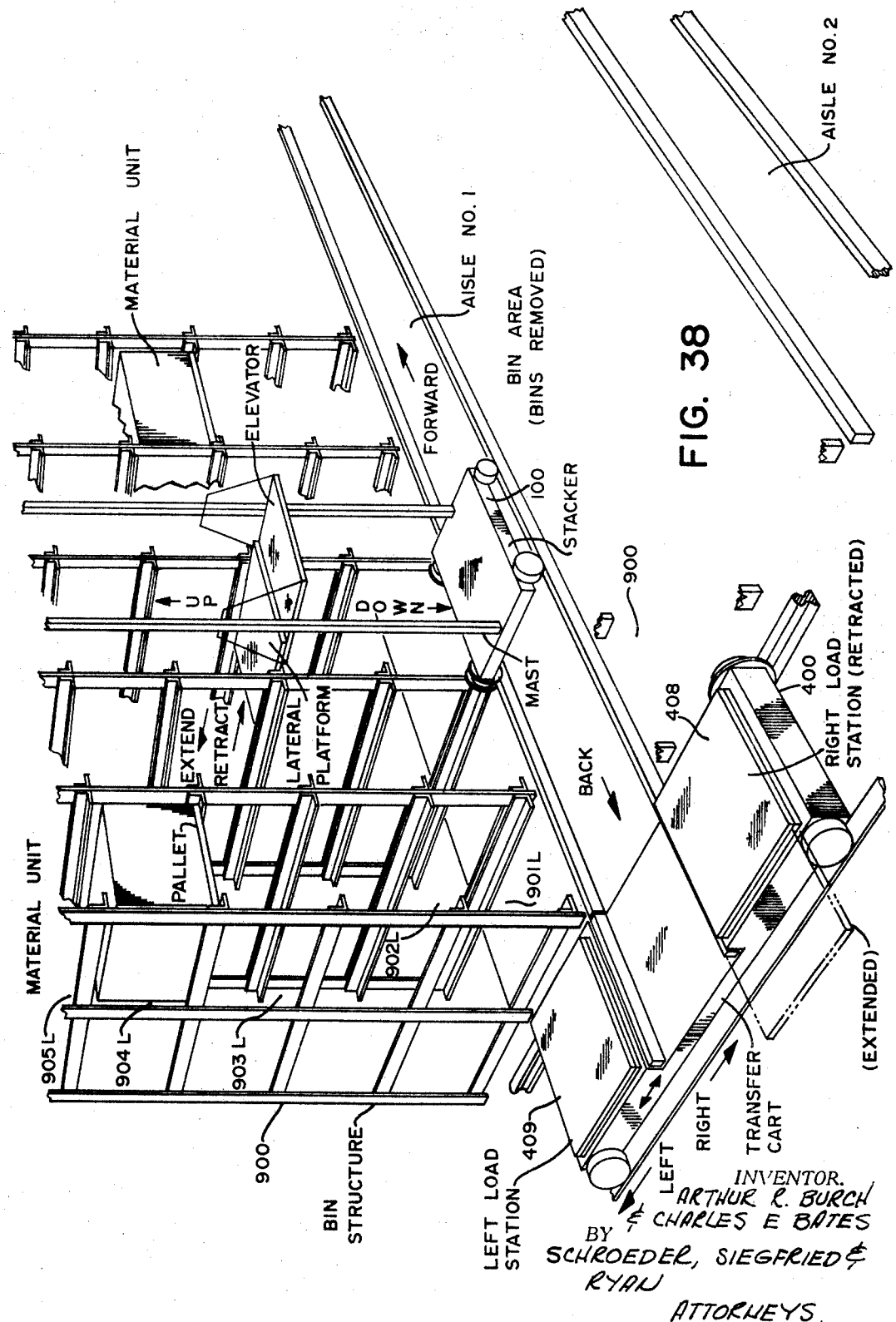

United States Patent Office 3,503,530
Patented Mar. 31, 1970

3,503,530
TRANSFER CART FOR TRANSFERRING AN ARTICLE HANDLING VEHICLE BETWEEN AISLES OF A WAREHOUSE
Arthur R. Burch, Wayzata, and Charles E. Bates, Minneapolis, Minn., assignors to Clark Equipment Company, a corporation of Michigan
Filed Apr. 18, 1966, Ser. No. 543,224
Int. Cl. B65g 35/00
U.S. Cl. 214—16.4     13 Claims

ABSTRACT OF THE DISCLOSURE

A material storage and handling system has a transfer vehicle and a stacker vehicle. The transfer vehicle is adapted to receive and carry the stacker vehicle and the stacker vehicle is adapted to carry and transfer material between the stacker vehicle and selected bins in a multi-aisle, multi-bin storage structure. The transfer cart has two receiving stations for receiving material for pickup by the stacker vehicle. The stacker vehicle operates to pick up and deposit material to both the right and left sides within the aisles and at the transfer vehicle.

---

This invention relates to the field of automatic warehousing equipment, and more particularly to the field of apparatus for automatically depositing and withdrawing loads from warehouse bins.

GENERAL DESCRIPTION

The embodiment disclosed comprises an automatic warehousing system consisting of two vehicles, referred to as a Stacker and a Transfer Cart. Both units are controlled by programmed command signals which are initiated by means of operator actuated push buttons at an operator console. To aid in the disclosure of the invention, reference may be had to FIG. 38, which shows the basic components that make up the system.

Bins formed in vertical columns and horizontal rows are arranged in a warehouse with aisles extending between the bins, and with an aisle or access area maintained across the ends of the aisles. That is, the bins may extend up to one side of the building at one end of each aisle, but on the opposite end of the aisles there is an access space for the Transfer Cart which runs perpendicular to the direction of the aisles. The bin arrays are arranged along the aisles, and in this embodiment all the bins are the same width, and height. The loads to be handled may take on many forms such as pallet supported loads, cartons, boxes, and crates to name a few and will be referred to generally as material-units. In the particular embodiment shown and described herein, pallets will be used which are approximately 48 inches long, 42 inches wide to support the individual loads, and will accommodate a load approximately 44 inches high. The pallets form the support in the bin areas for their loads.

The Stacker operates in the aisles between two racks of bins and moves longitudinally forward and backward in the storage aisles. The Stacker also has an elevator situated thereon which moves vertically up and down past the face of the bins or racks. The pallet loads are moved laterally in and out of the storage area or bins by a lateral platform mechanism which forms the base or support on the elevator for the pallets. For this particular embodiment, the Stacker will be used in conjunction with a Transfer Cart which carries with it, its own load stations, but the Stacker is fully capable of receiving or delivering loads from a load station at the end of the aisle, without a Transfer Cart.

The Stacker is a multi-wheeled vehicle driven by a direct current motor coupled to a gear reducer. The gear reducer drives one of the axles with a timing belt, and the other axle is driven through a chain and sprocket linkage secured to each axle. The Stacker moves over a regular crane rail, which is mounted on the floor in each of the aisles. The drive wheels on one side of the vehicle contains flanges to guide the vehicle along the track.

The elevator, forming a part of the Stacker, is also driven by a direct current motor and gear reducer. The motor shaft is perpendicular to the floor and coupled to a gear reducer which provides a right-angled drive to the main vertical lifting shaft, which is parallel to the floor. The elevator is raised and lowered through a pair of lifting chains which are driven by sprockets secured to the main lifting shaft. One end of each of the chains is attached to the underside of the elevator frame and is passed around the drive sprocket to the top of the mast, and over an idler sprocket at the top of the mast where the other ends of the chain are secured to the top of the elevator assembly. The elevator assembly is guided by rollers which run on a track attached to the Stacker masts.

The Stacker will provide two different types of operation. In the "Deposit" mode of operation, a load of material will be picked up from either load station and deposited in any bin, and the vehicle will then return to the home station. In a "Withdrawal" mode of operation, a load of material will be picked up from any bin and deposited at either load station. The Stacker will also be capable of performing a dual command of any combination of the two modes of operation just described. All of these combinations are essentially two single commands, with one being carried out after the other, except the "Deposit-Withdrawal" combination, which requires the cycle to be altered and allow travel of the Stacker directly from the deposit bin to the withdrawal bin.

The lateral platform mechanism which forms the base of the elevator is also driven by a direct current motor and gear reducer, both of which are mounted on the elevator frame. A pulley mounted to the drive shaft with a gear reducer drives a timing belt which is linked to a lateral platform mechanism. The pulley is connected directly to a main drive pinion which drives the lateral mechanism through a rack and pinion arrangement to cause the platform of the elevator to extend its complete length into the left or right bin area.

Speed control is provided for all three motors on the Stacker. One motor-generator set supplies power to the longitudinal drive or the lateral platform mechanism since the lateral platform mechanism is never operated when the longitudinal drive is energized and vice versa. However, in normal operation, the longitudinal drive and vertical drive mechanism operate simultaneously.

A shifting bar mechanism is located on the elevator and contains three transducers which transmit signals to the elevator servo to raise and lower the elevator and provide a lifting or depositing motion for the lateral platform mechanism while operating in the bin area in its extended position.

The Transfer Cart operates across the ends of the aisles and perpendicular to the main storage aisles. The Transfer Cart permits the Stacker to be moved from one aisle to another, and thus service a number of aisles with only one Stacker. Pallet dollies are provided on both sides of the Transfer Cart for picking up a load from a depositing vehicle such as a fork lift or industrial truck and positioning the load at the load station on the Transfer Cart for a pick-up by the Stacker.

The Transfer Cart is a vehicle driven by a direct current motor coupled through a gear reducer. A timing belt and pulley drive is used to drive the wheels on the Transfer Cart. Generally, a track is formed across the outside of the ends of the aisles, and the wheels on the Transfer Cart contain flanges to guide the Transfer Cart along the track. A servo-loop similar to the servo-loops on the Stacker is used to operate and control the destination and speed of the Transfer Cart. After the Transfer Cart is programmed for a selected aisle, compressed air operated position locks are actuated to release the Transfer Cart and allow it to transfer from one aisle to another at which time the air locks again lock the Transfer Cart to the end of the aisle. In other words, the Stacker, while being upon the Transfer Cart, is transferred from one aisle to another.

It is a general object of this invention to provide material handling apparatus using only a single material-unit stacker which may be transferred by a transfer cart from one aisle to another of a load support having a number of bins contained therein.

It is another object of the present invention to make use of a transfer cart device as a longitudinal and vertical home station reference for the stacking device.

It is still another object of this invention to provide load station apparatus carried with the transfer cart from one aisle to another.

It is a further object of this invention to provide means for locking the transfer cart mechanism to the bin structure at an aisle where the stacker device is to operate.

It is still another object of this invention to provide a transfer cart and stacker mechanism which causes said devices to move to the destination determined by an operator through a coincidence circuit.

It is another object of the present invention to provide interlock means preventing the stacker from moving while being transferred from one aisle to another on the transfer cart.

It is still a further object of this invention to protect a load station from receiving or discharging a material-unit when the stacker is about to receive or discharge a material-unit to that load station.

It is a further object of this invention to provide means for determining when a bin is obstructed and thereby prevent deposit of a material-unit in the bin structure.

It is yet another object of this invention to provide a method of controlling the motions and destinations of the stacker and transfer cart.

It is still a further object of the present invention to provide a pallet dolly at each load station to receive and discharge a material-unit from the transfer cart.

It is still another object of this invention to provide a transfer cart with a load station positioning device to properly orient any material-units which are to be picked up by the stacker.

It is another object of the present invention to provide means for locking the transfer cart control means when the transfer is in progress.

It is yet another object of this invention to provide direction control means for the transfer cart and stacker irrespective of their positions during travel.

It is a further object of this invention to provide actuation elements on the bin stucture for controlling the sensing means of the transfer cart and stacker mechanism.

It is still another object of this invention to provide a stacker mechanism having an elevator thereon which moves vertically as the stacker carriage moves longitudinally with respect to the bin structure openings.

It is yet another object of this invention to provide means for vertically shifting the bin sensors to provide the necessary vertical platform movement for depositing and withdrawing a material-unit in the bin structure.

It is still another object of the present invention to align the elevator platform vertically with a reference on the stacker carriage and then align the platform bearing the material-unit with the bin support structure.

It is still another object of this invention to provide a stacker mechanism which can travel towards the transfer cart only upon satisfying certain predetermined safety conditions.

These and other objects and advantages of our invention will more fully appear from the following description, made in connection with the accompanying drawings, wherein like reference characters refer to the same or similar parts throughout the several views, and in which:

FIG. 6a is a plan view of the left pallet dolly extended;

FIG. 6b is a side elevational view of the left pallet dolly as shown in FIG. 6a;

FIG. 8 is a partial isometric view of the transfer cart structural mechanism showing the longitudinal driving mechanism;

FIG. 10 is a front view of the stacker and transfer cart control panels as seen by an operator;

FIGS. 11a, 11b, 11c and 11d are schematic diagrams of the logic control circuit for the transfer cart;

FIGS. 12a, 12b and 12c are schematic block diagrams of the transfer cart electrical servo and driving mechanism;

FIG. 13 is an aisle elevational view of the stacker;

FIG. 14 is a side elevational view of the stacker;

FIGS. 20a through 20i are schematic diagrams of the stacker logic and control circuits;

Figure 35:
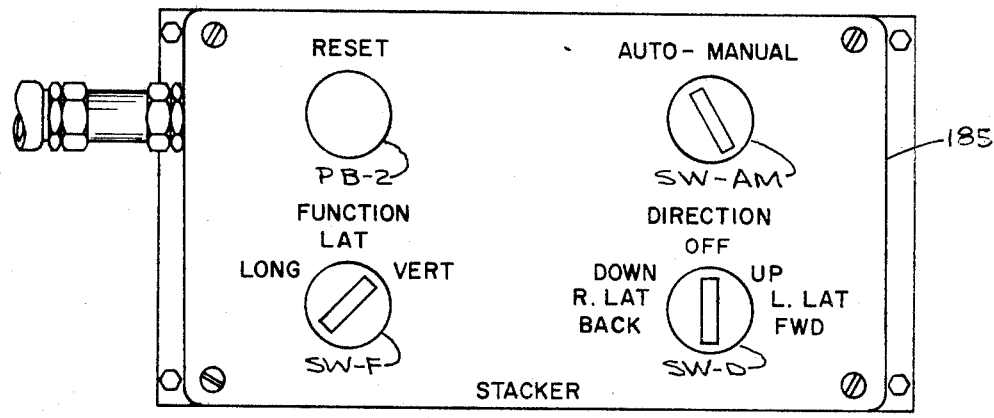
Figure 36:
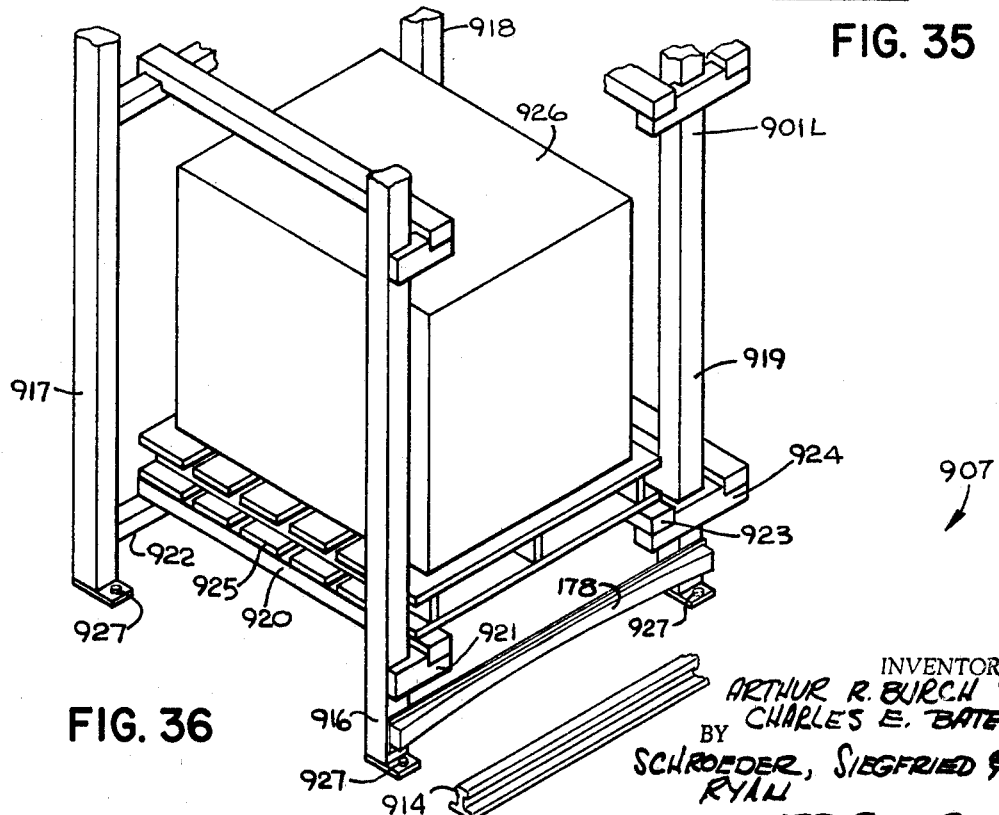
Figure 24B:
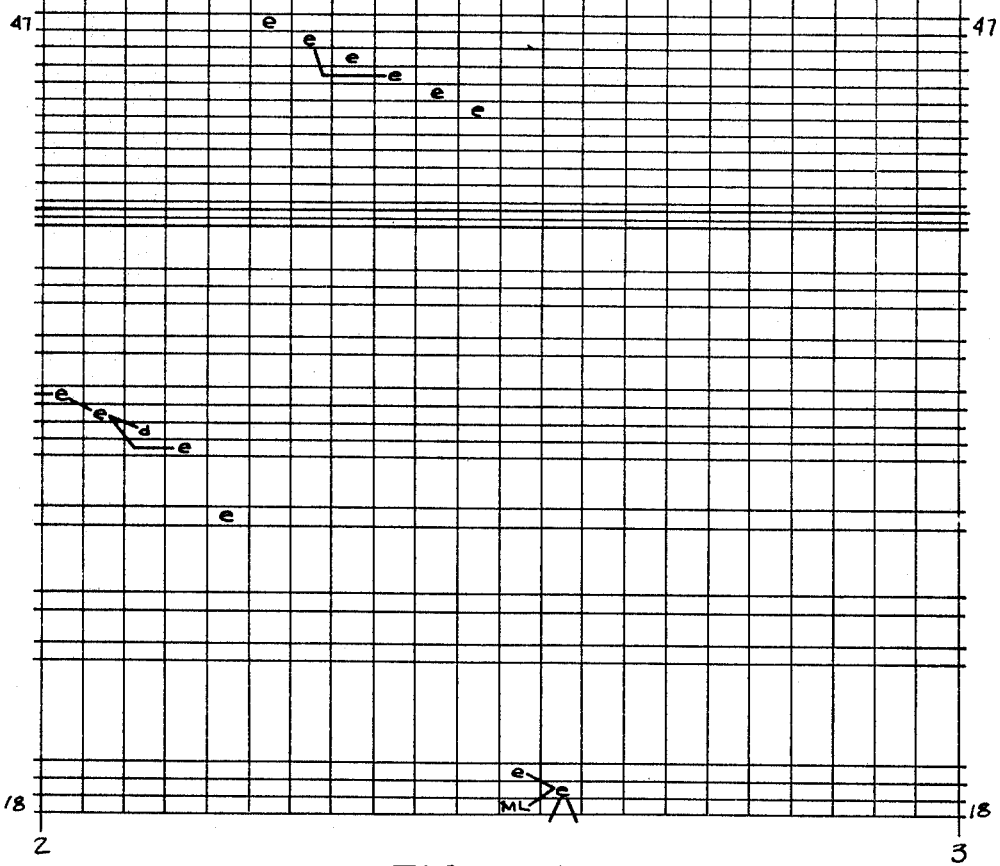
Figure 24D:
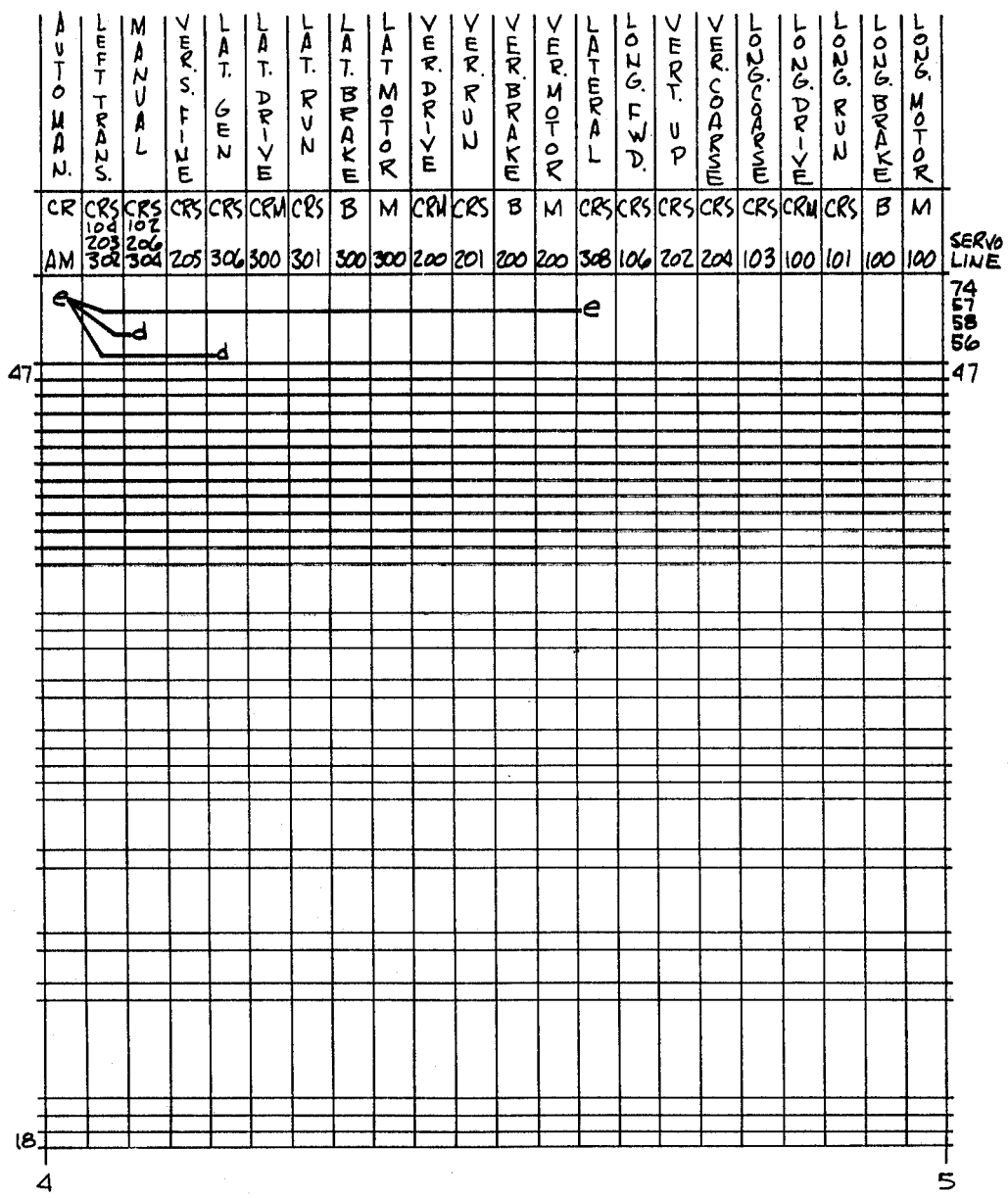
Figure 24F:
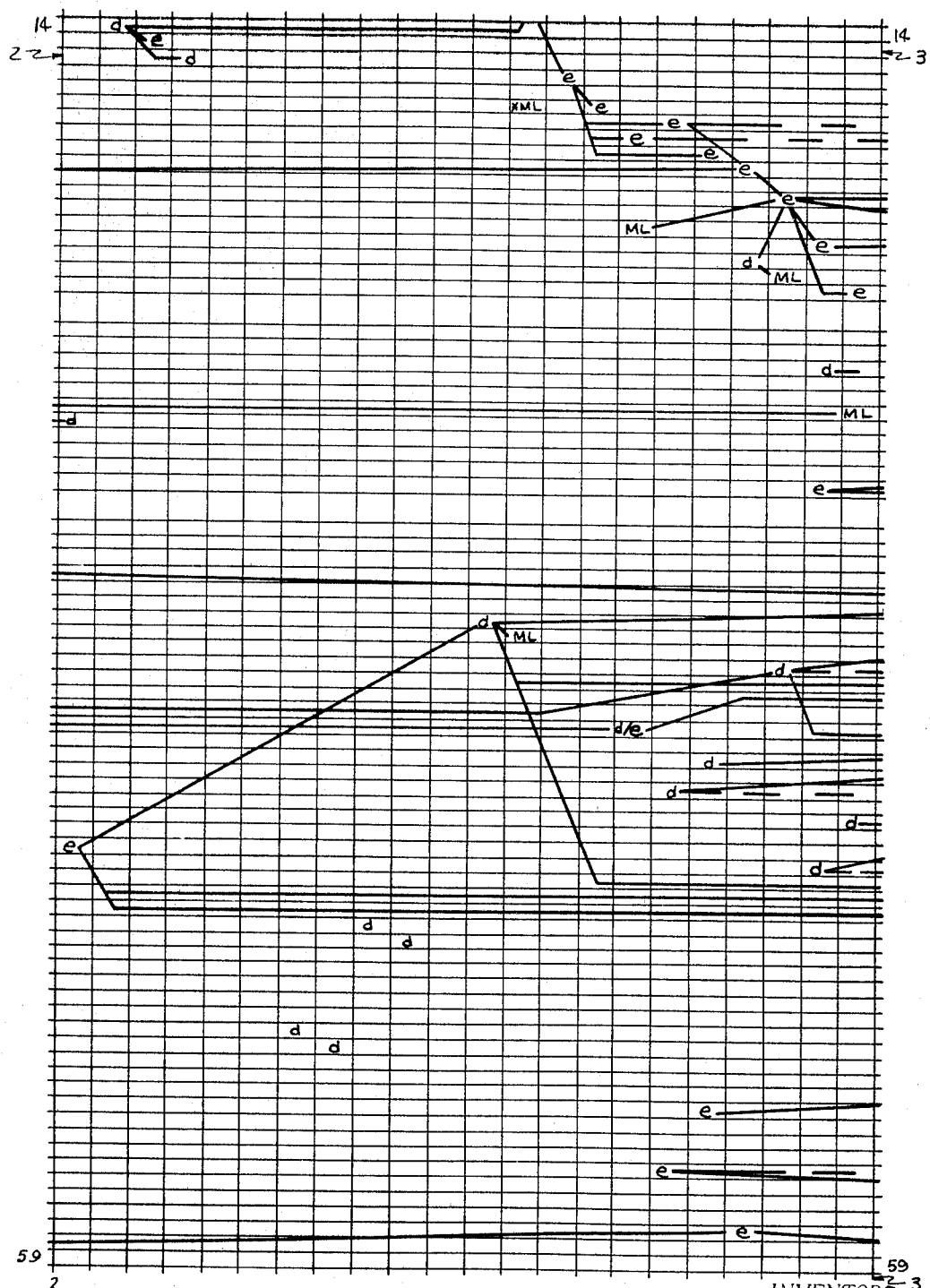
Figure 24G:
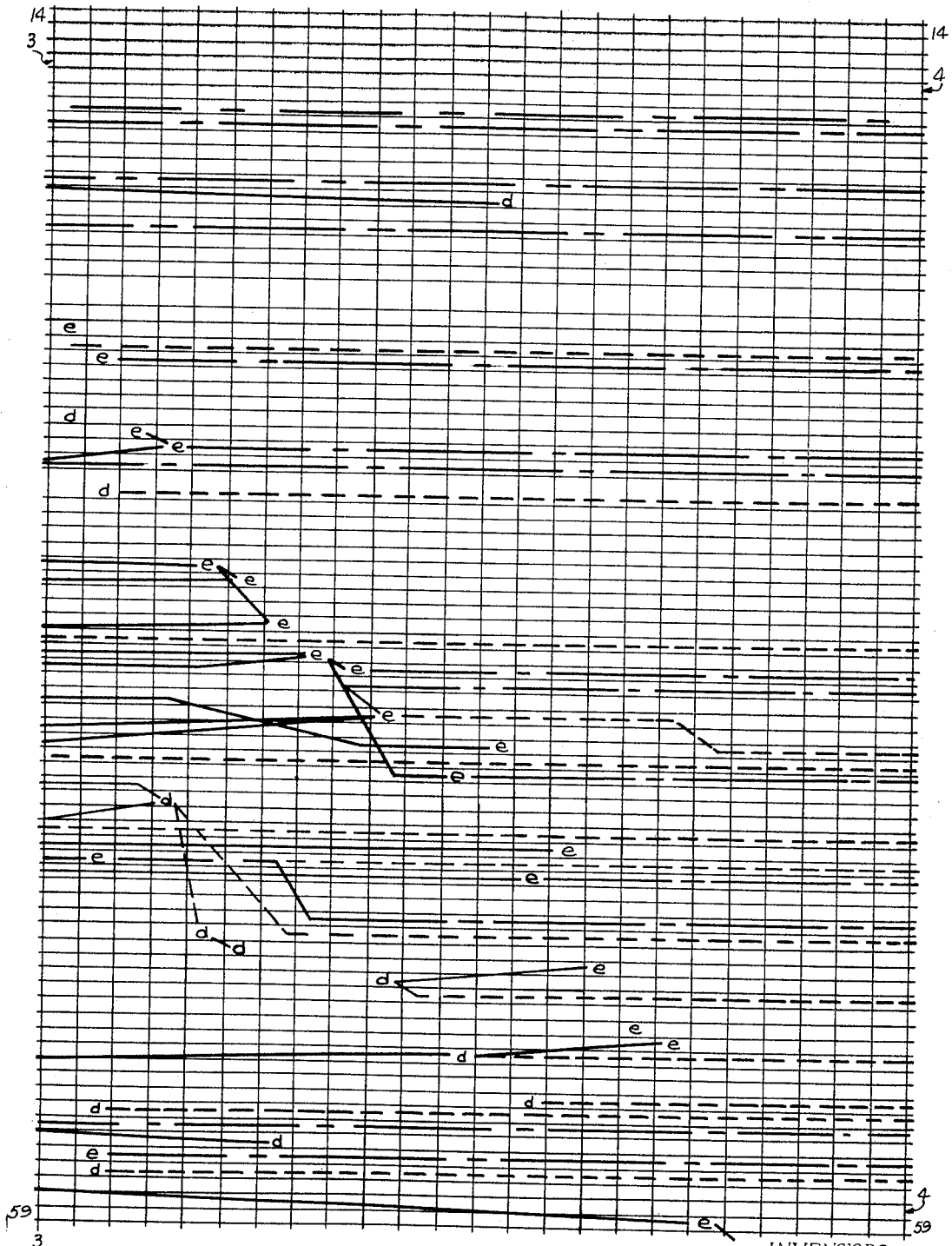
Figure 24H:
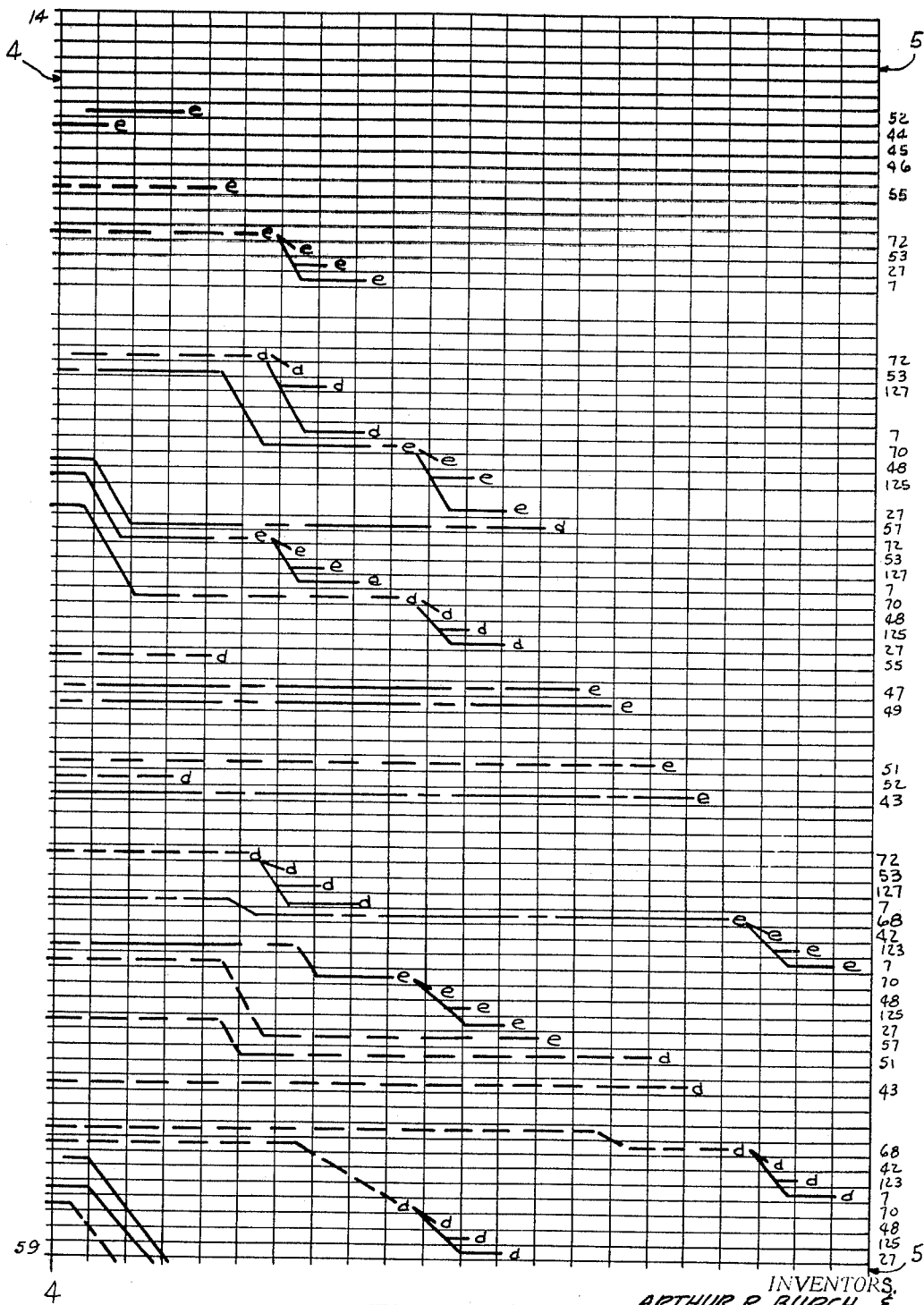
Figure 24J:
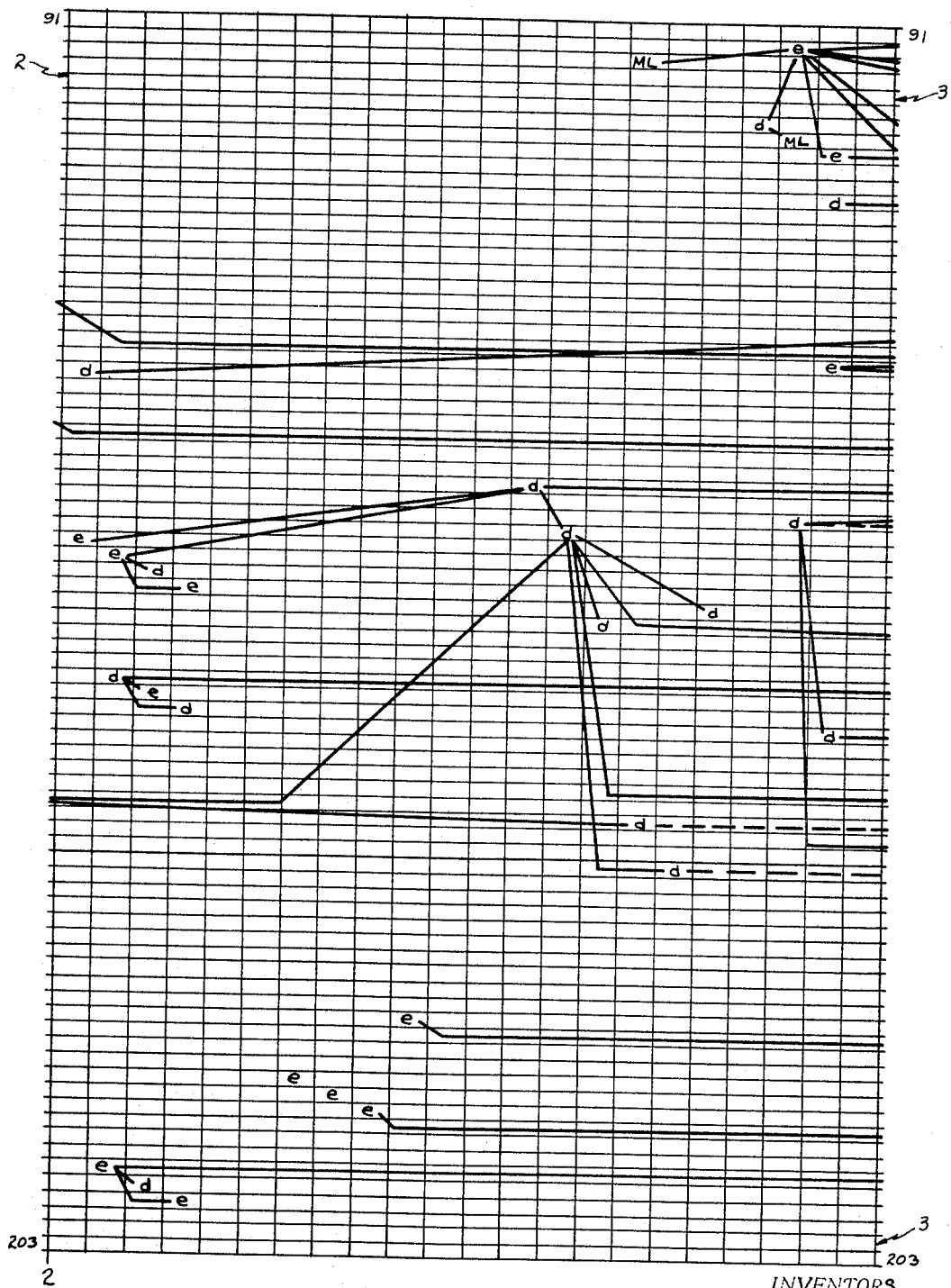
Figure 24K:
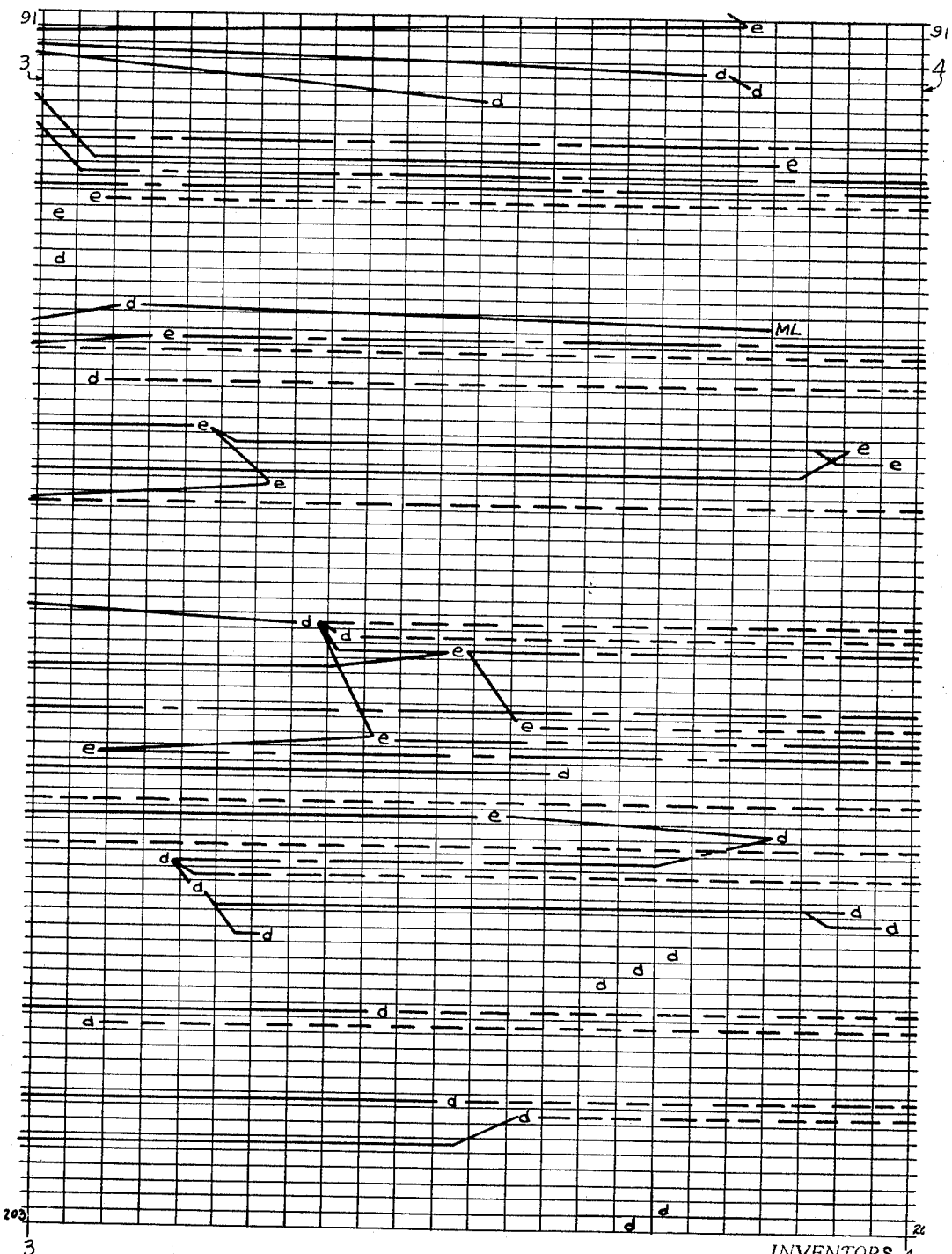
Figure 241:
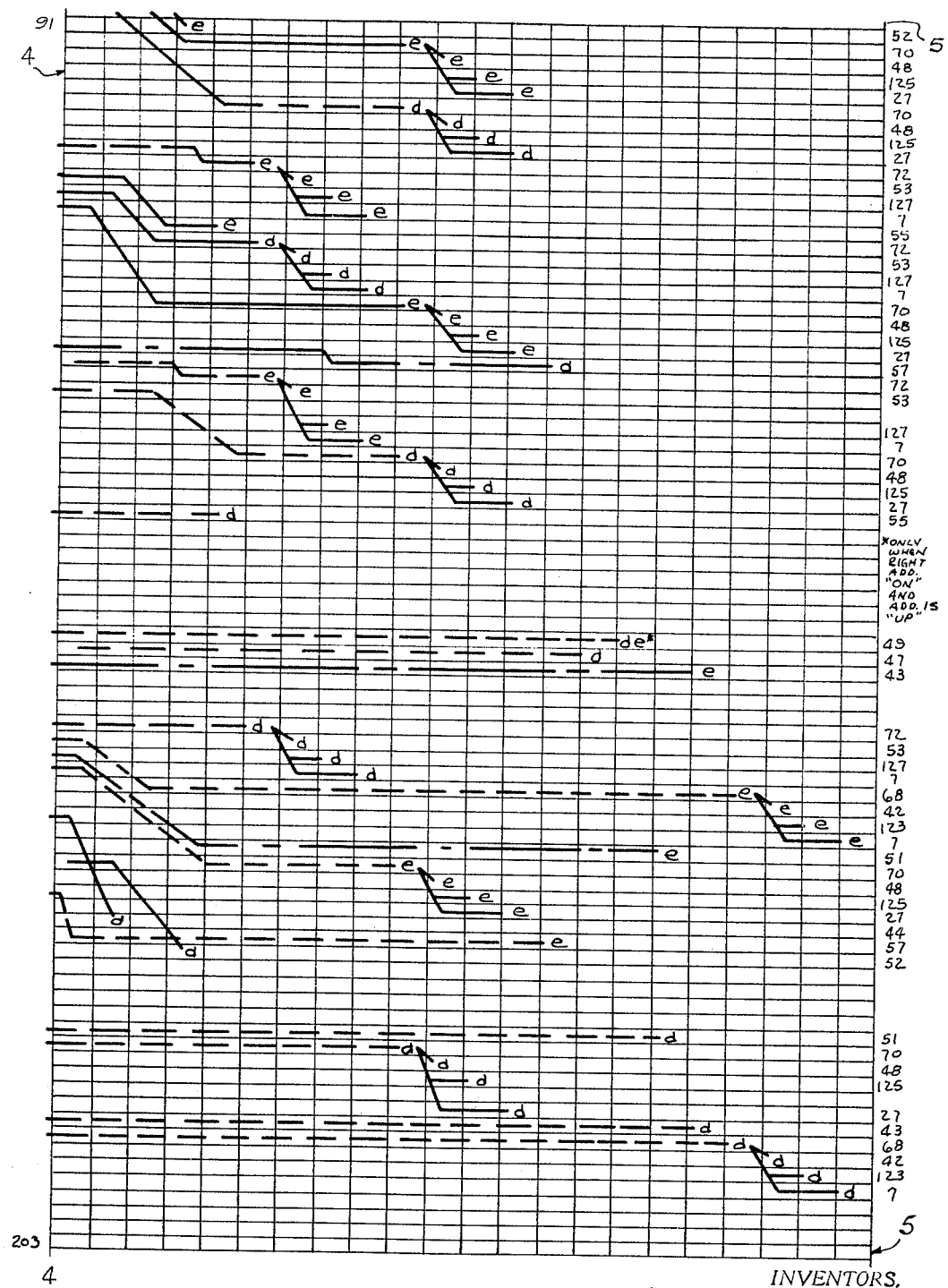
Figure 24N:
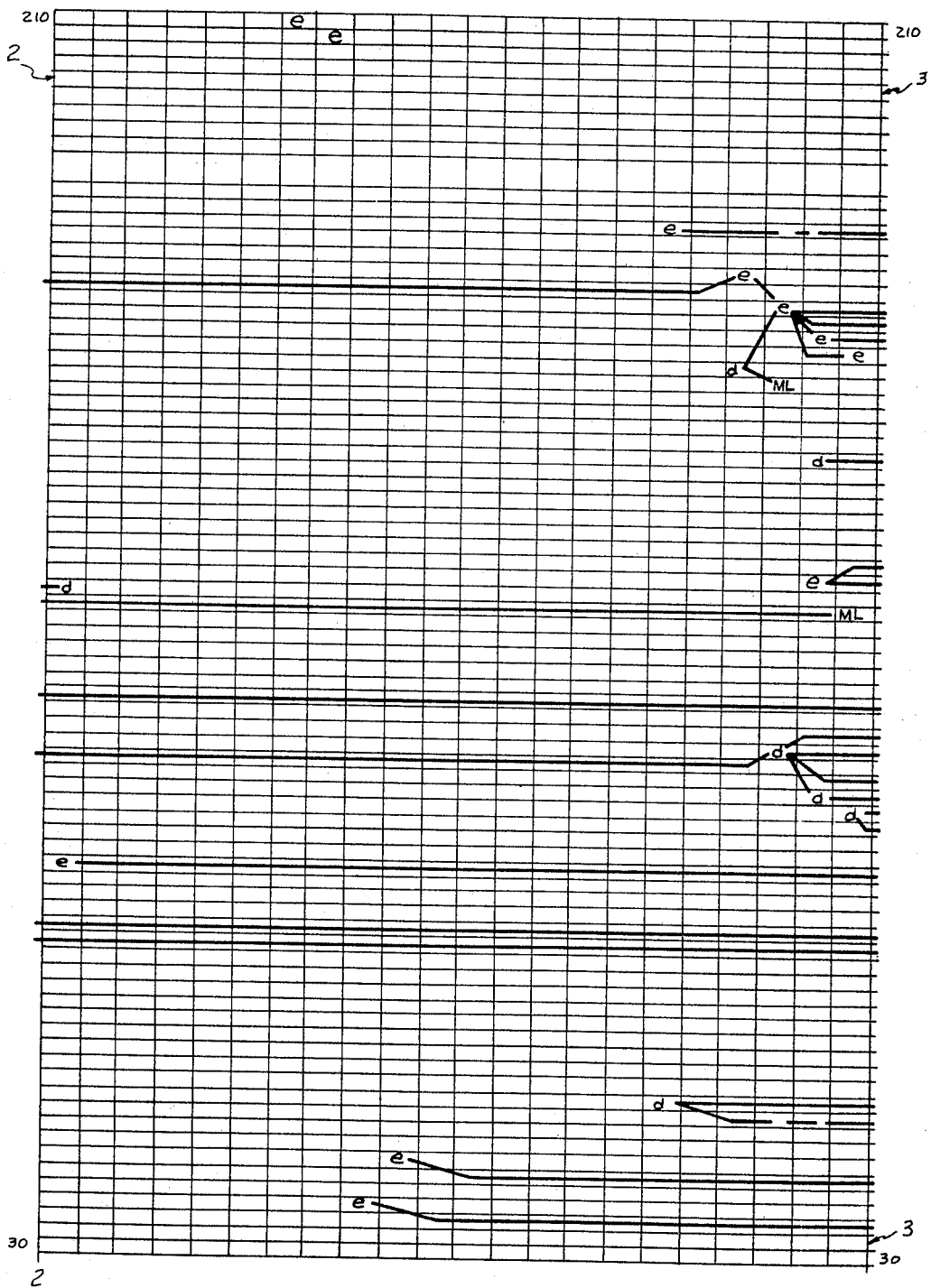
Figure 24O:
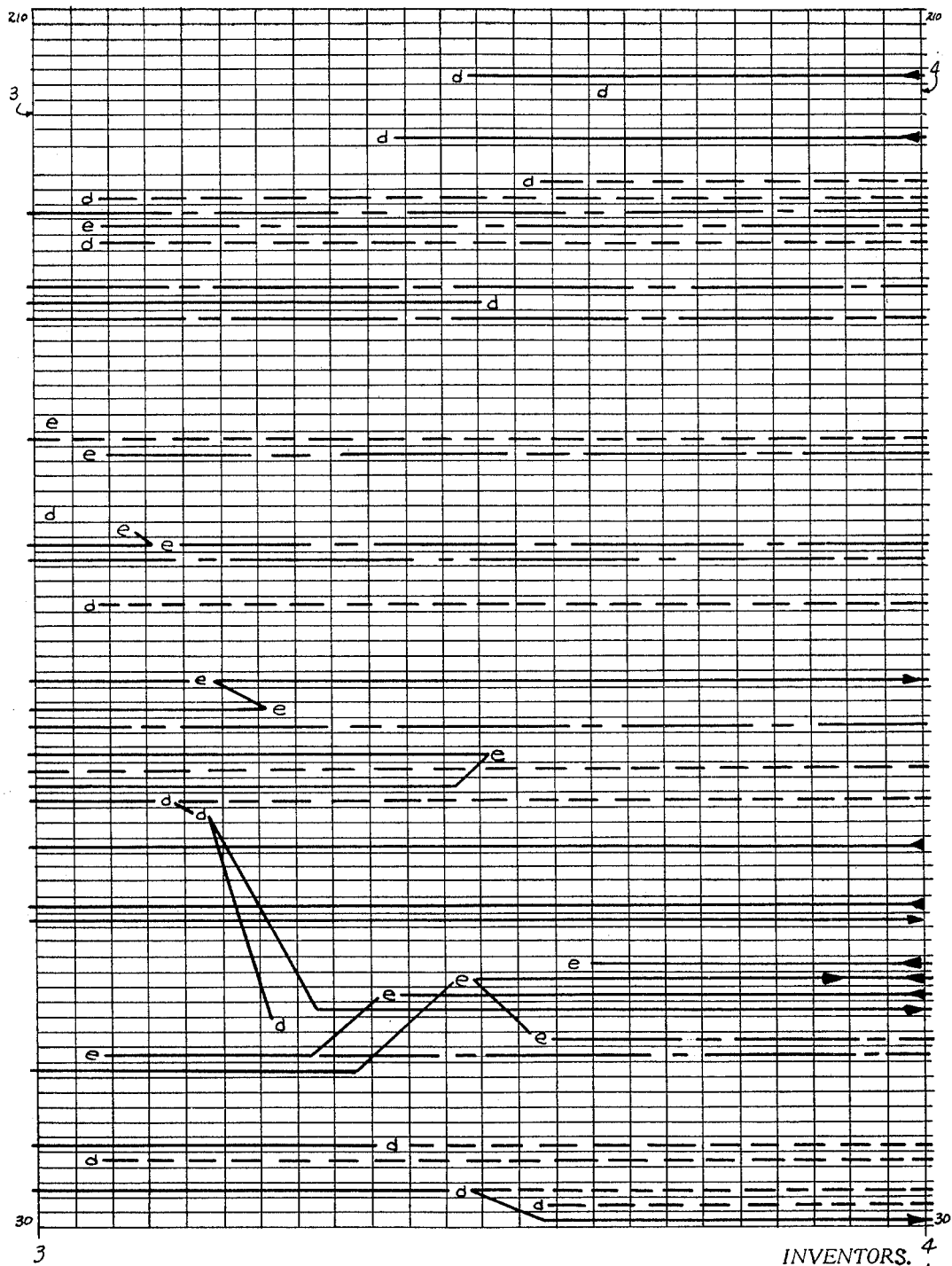
Figure 24P:
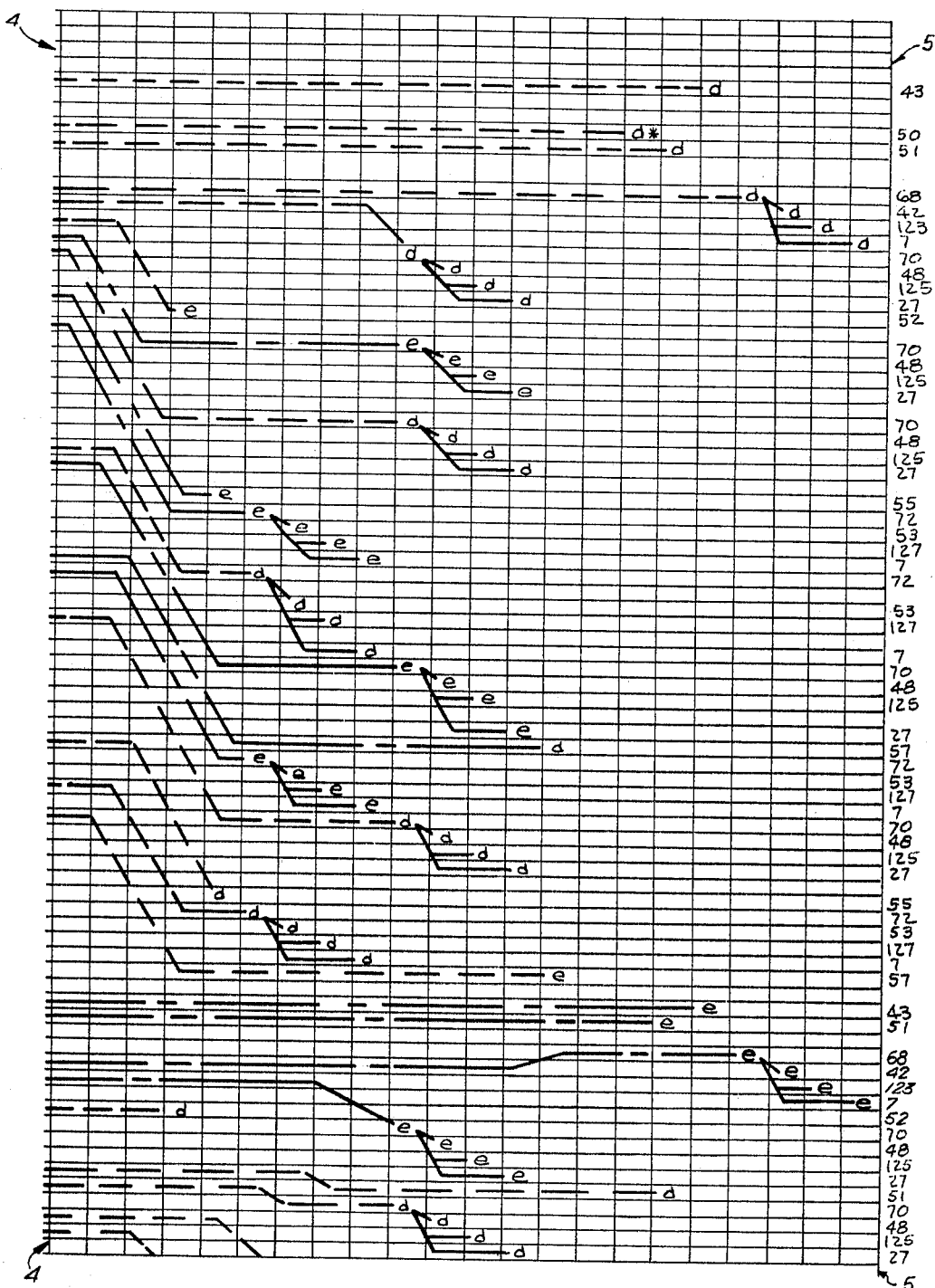
Figure 24R:
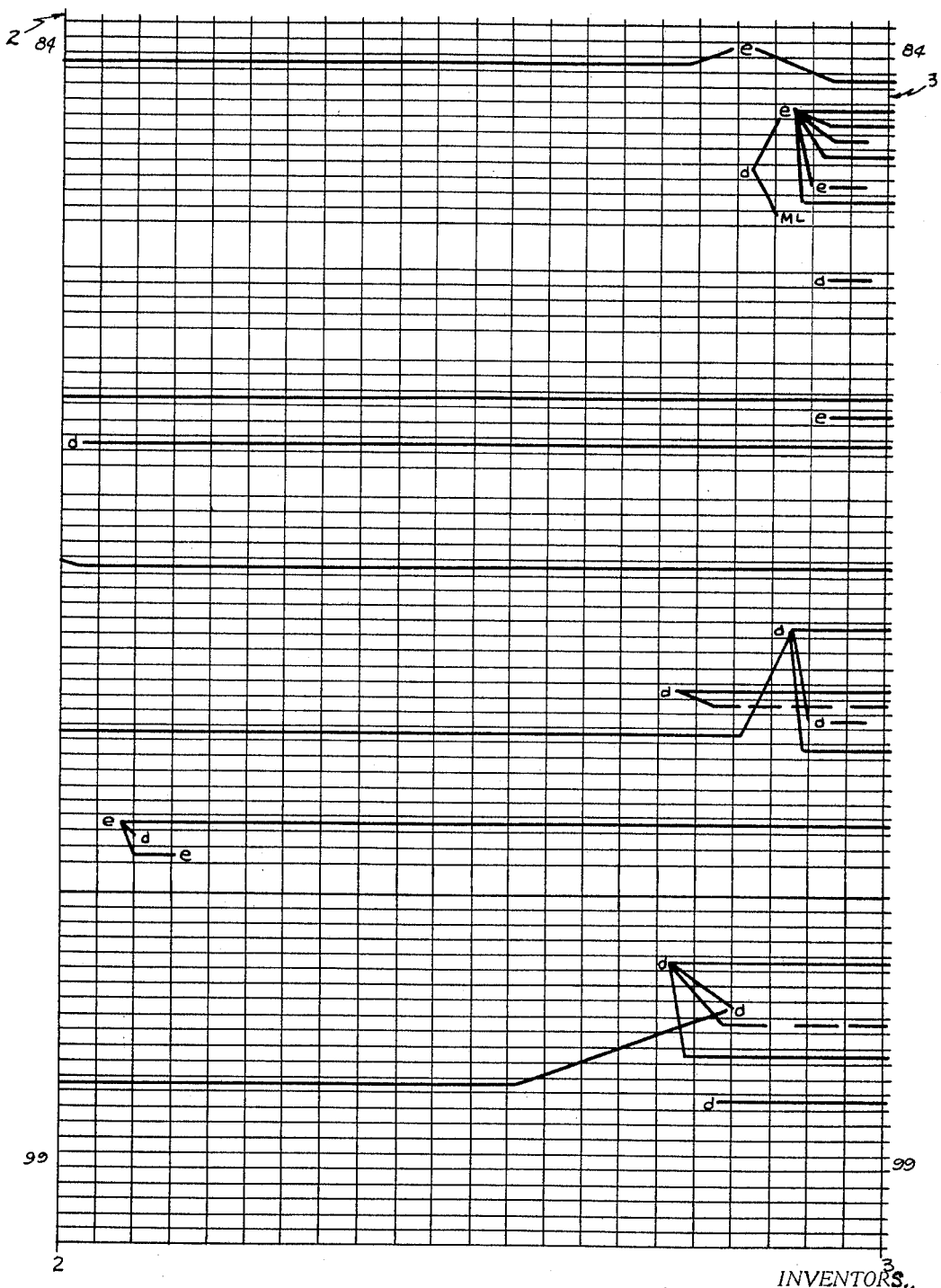
Figure 24S:
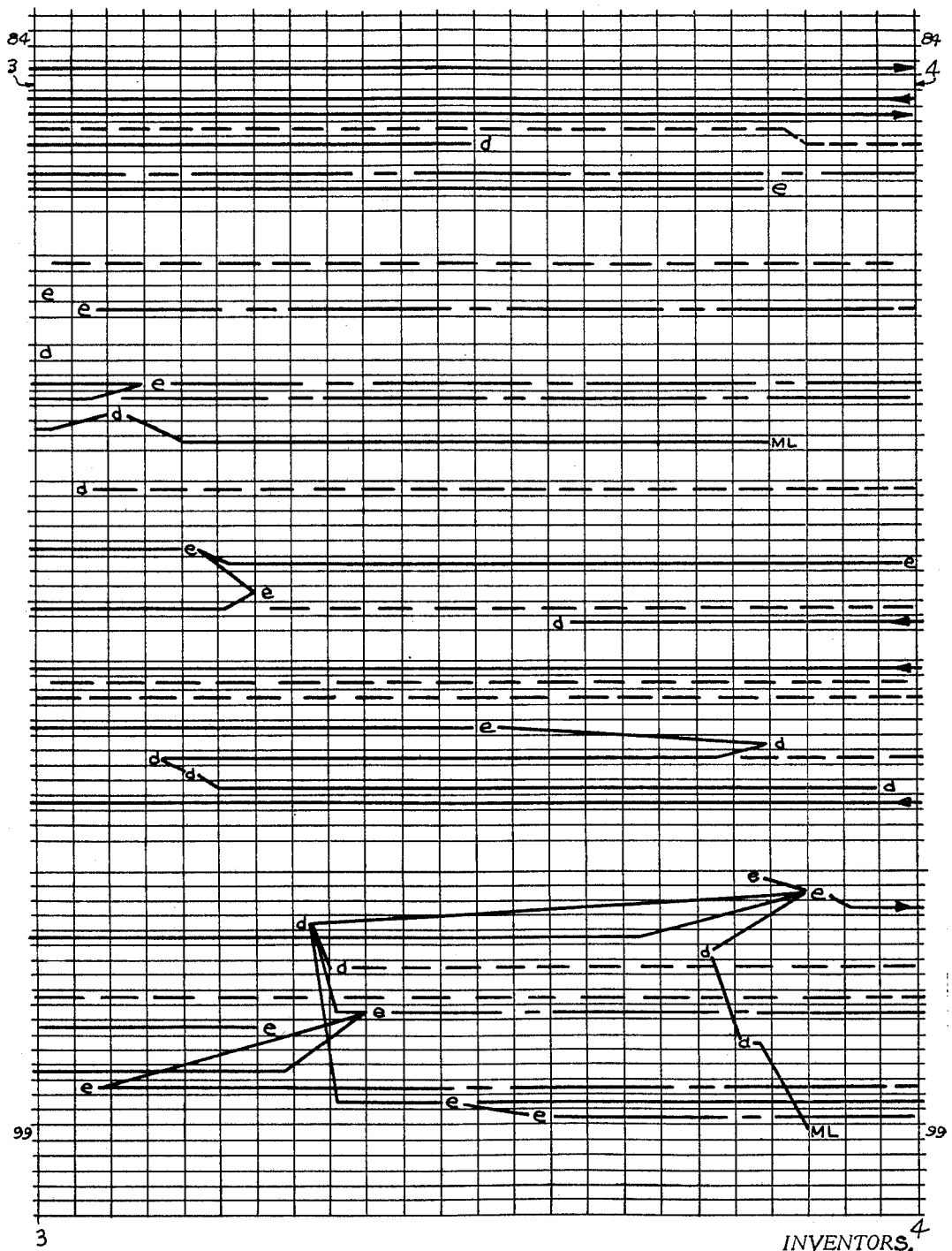
Figure 24T:
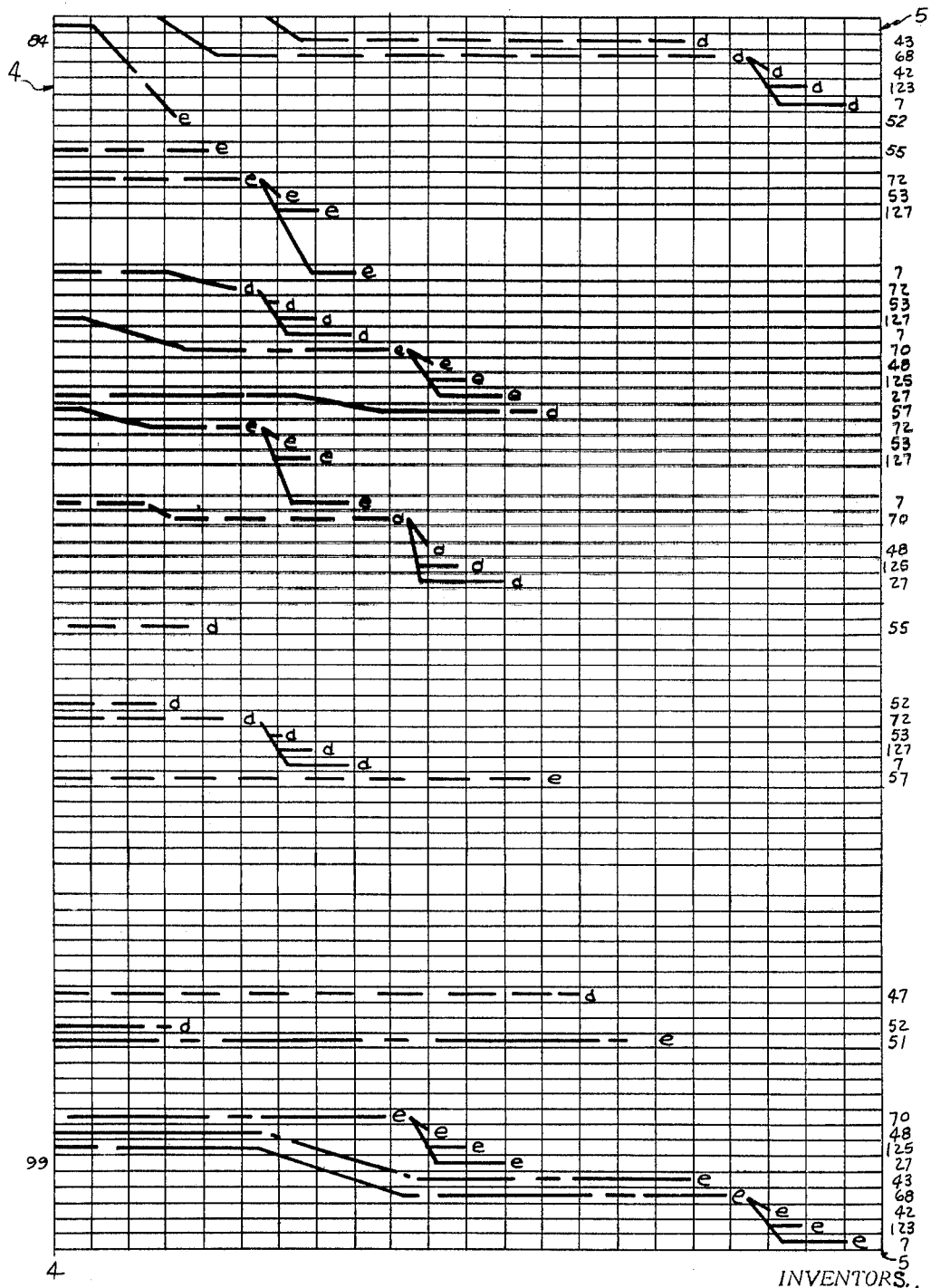
Figure 24V:
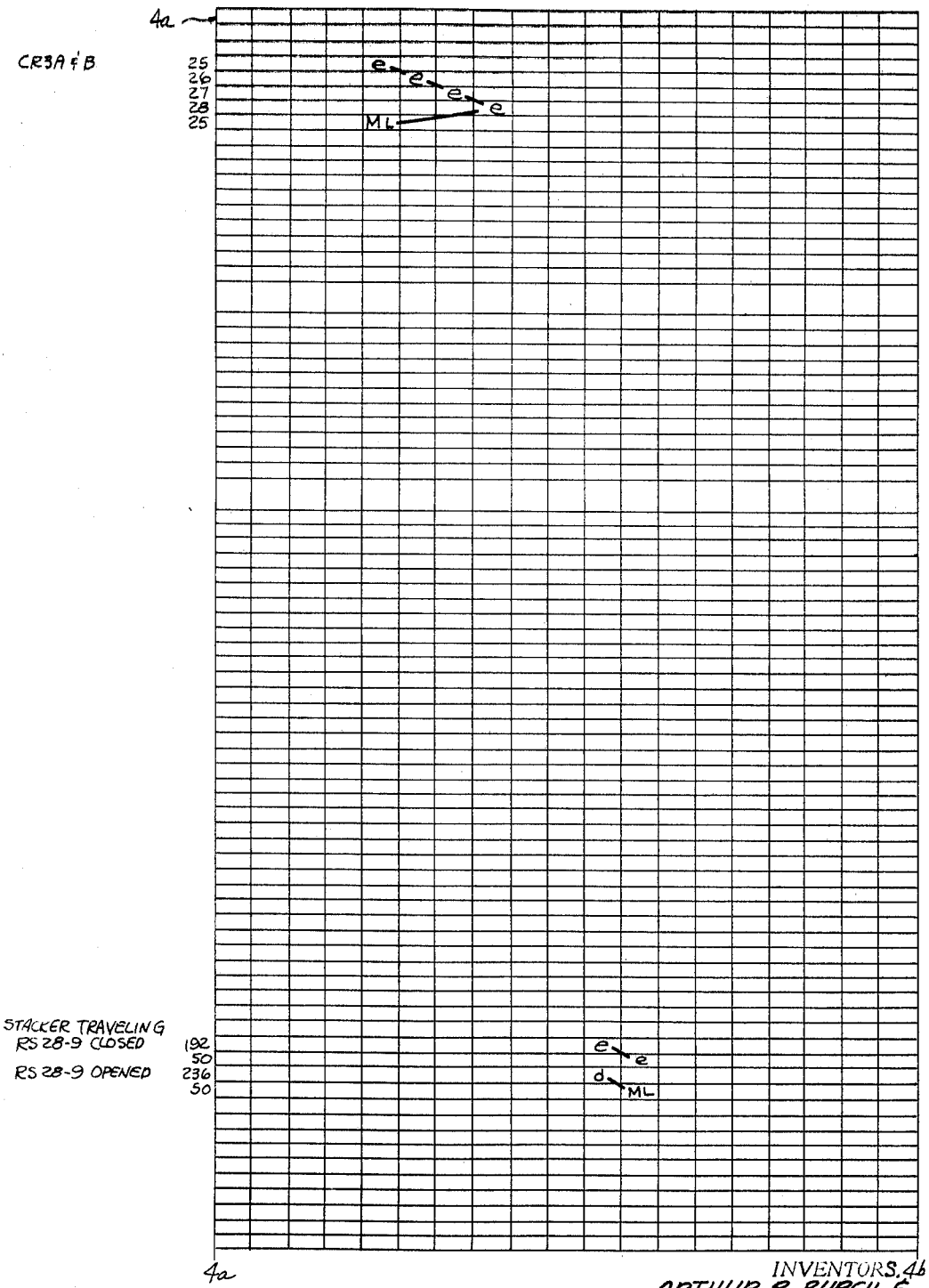
Figure 24W:
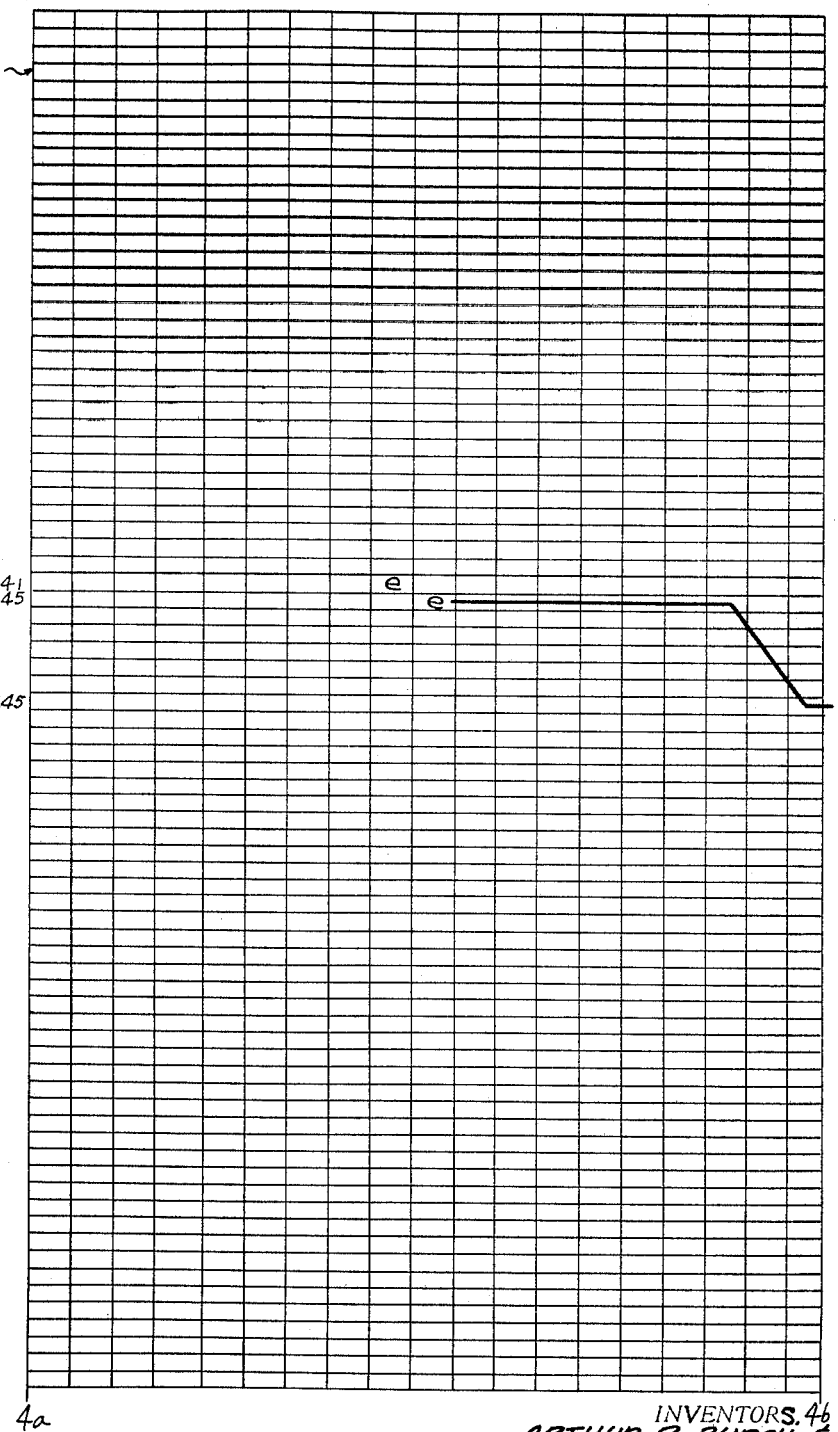
Figure 24X:
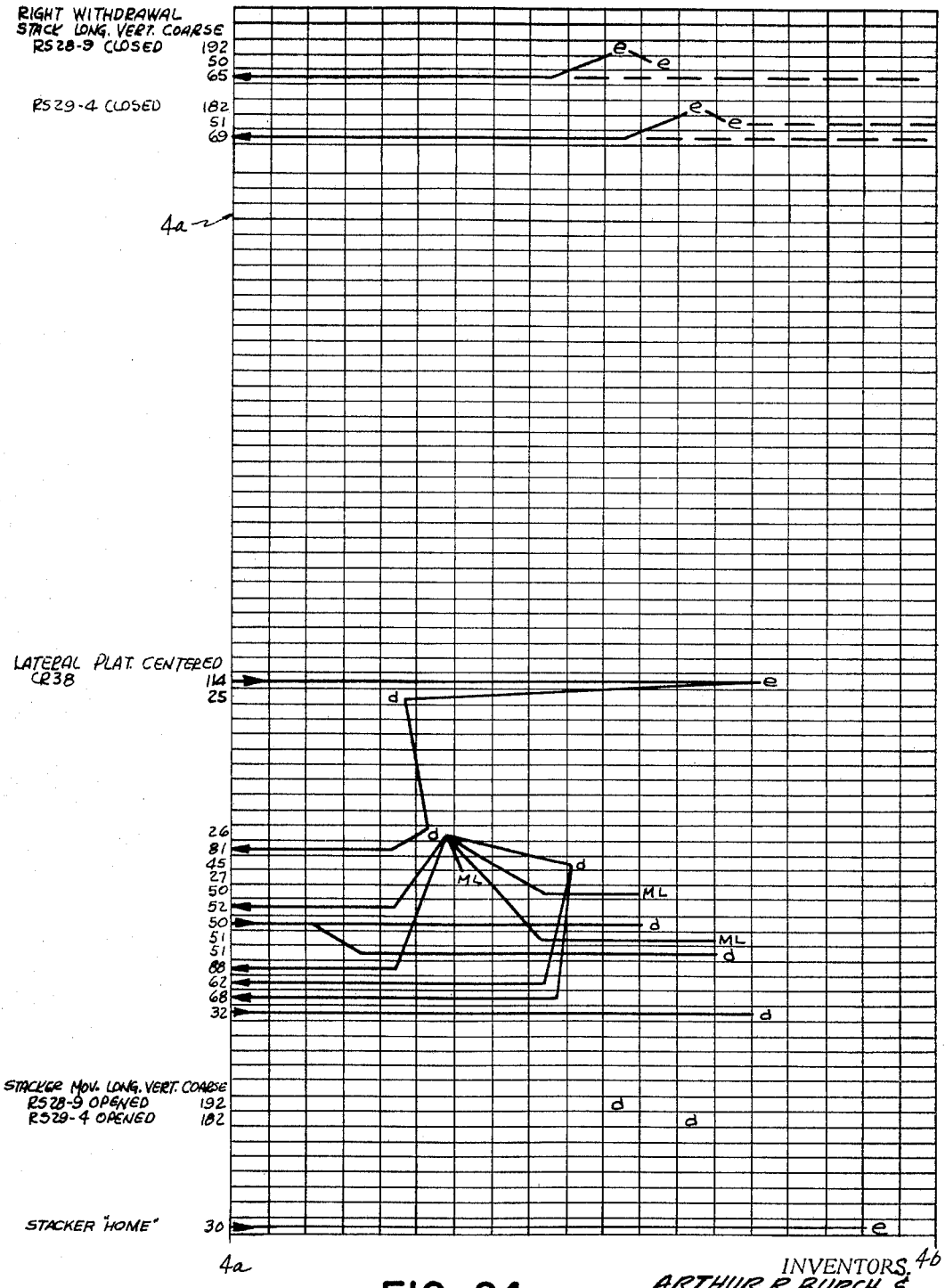
Figure 24Y:
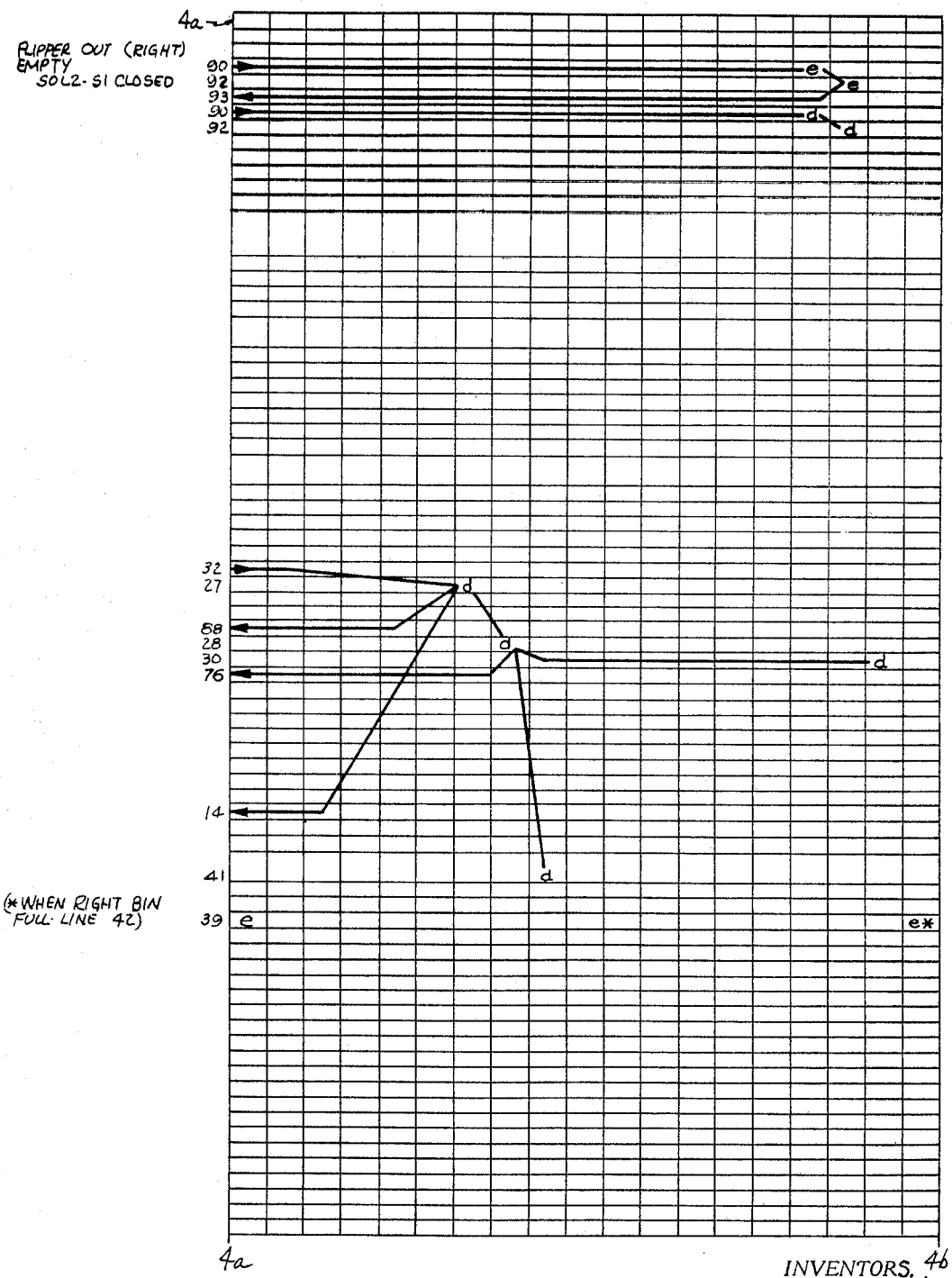
Figure 25:
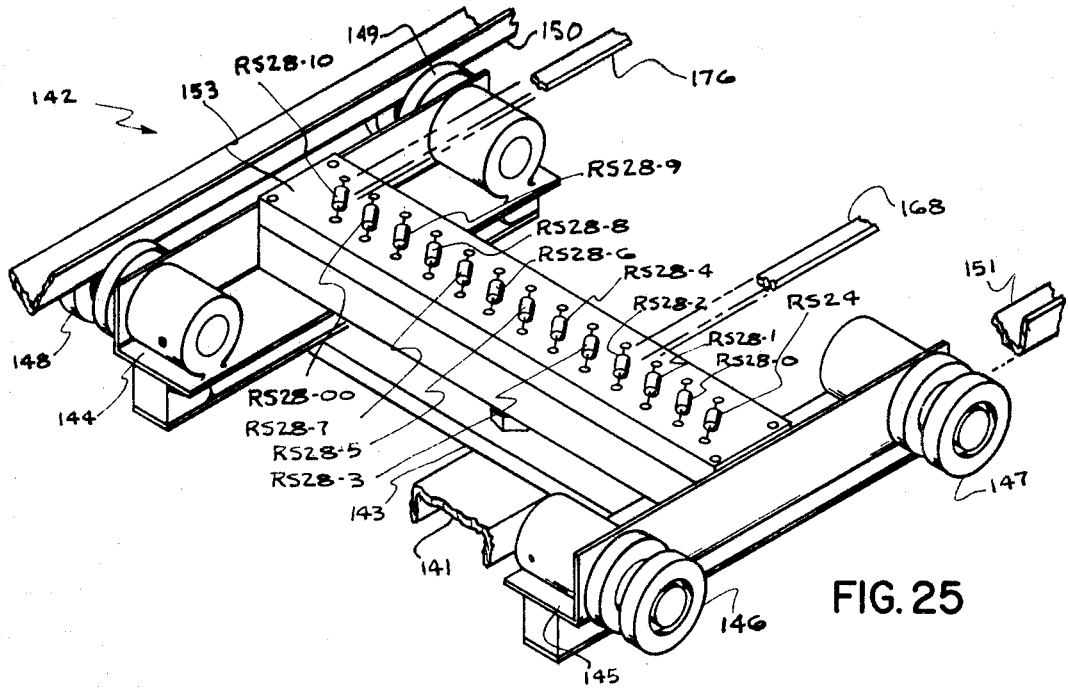
Figure 31:
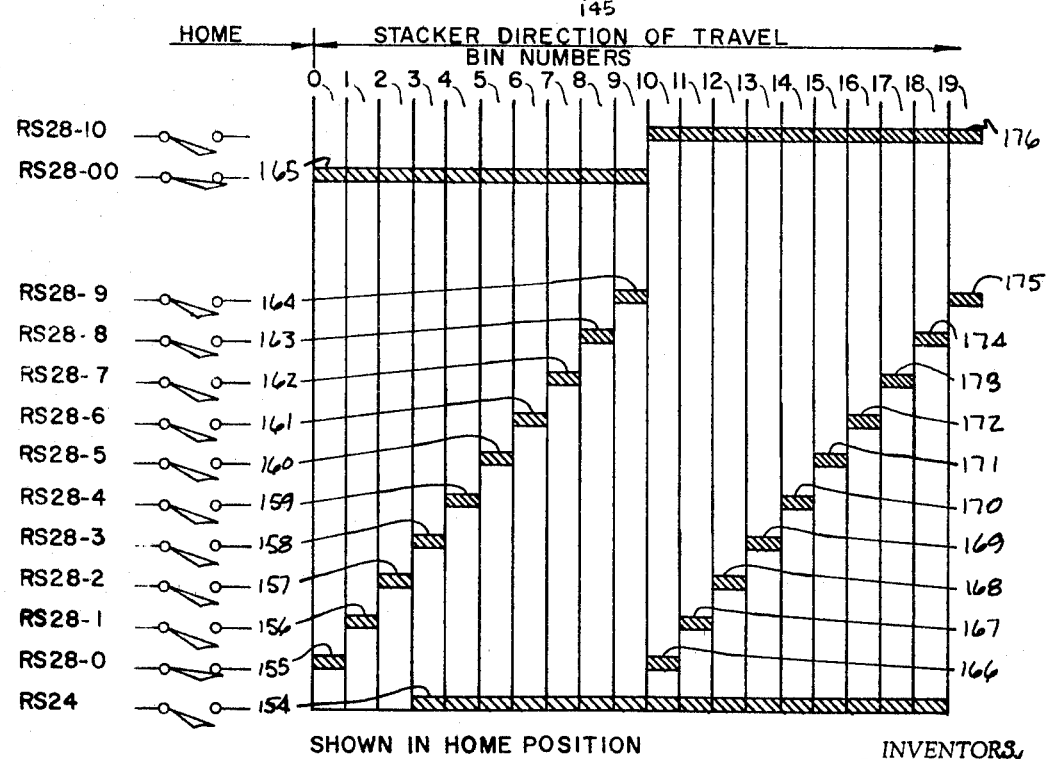
Figure 29:
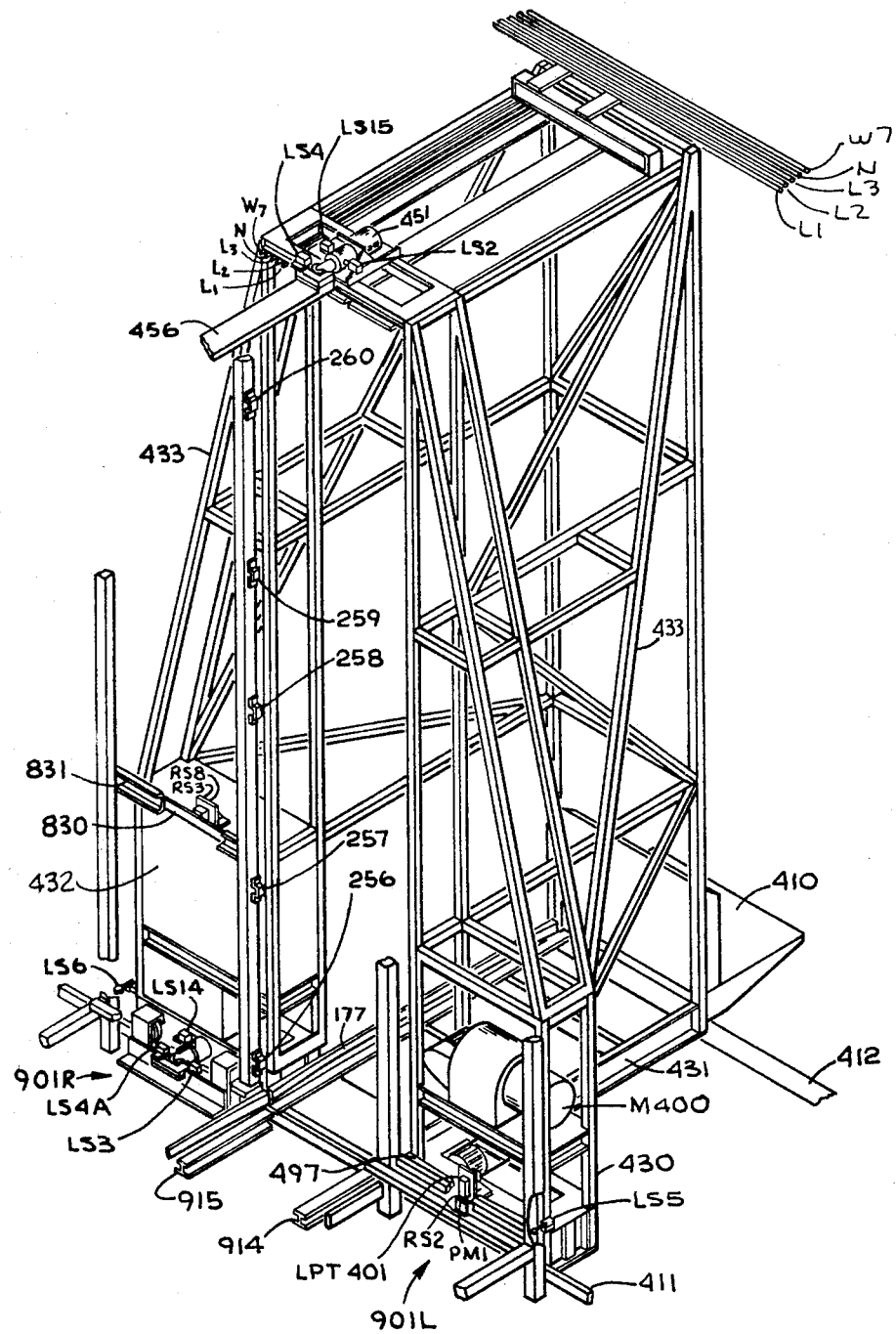
Figure 30A:
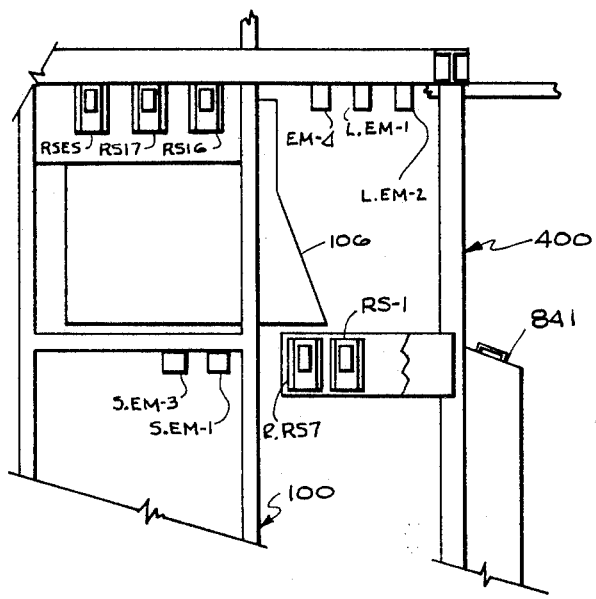
Figure 30B:
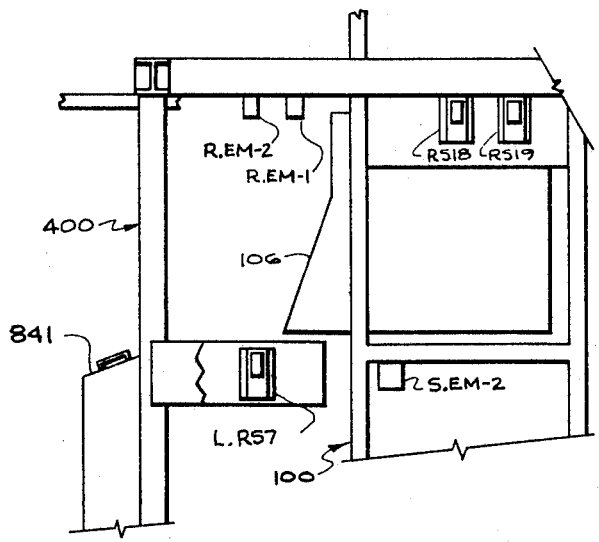
Figure 32:
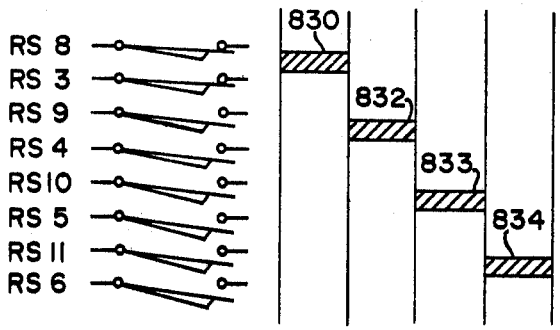
Figure 33:
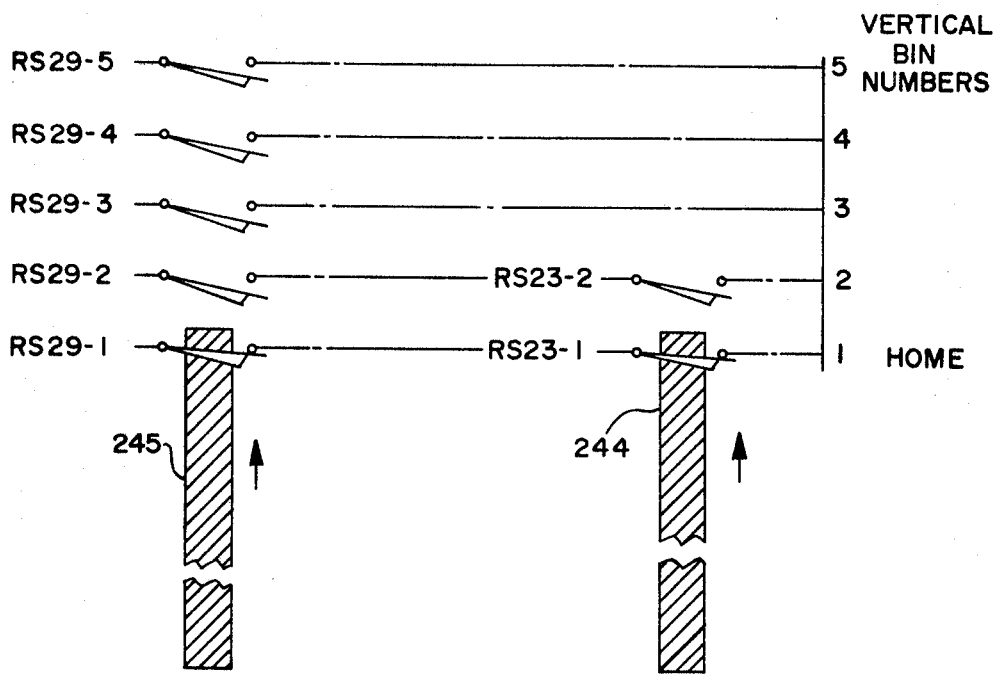

FIGS. 23a through 23f form a logic circuit chart showing the elements which are actuated in the logic circuit of FIGS. 11a through 11d and FIGS. 12a through 12c during different modes of operation of the transfer cart;

Figure 24E:
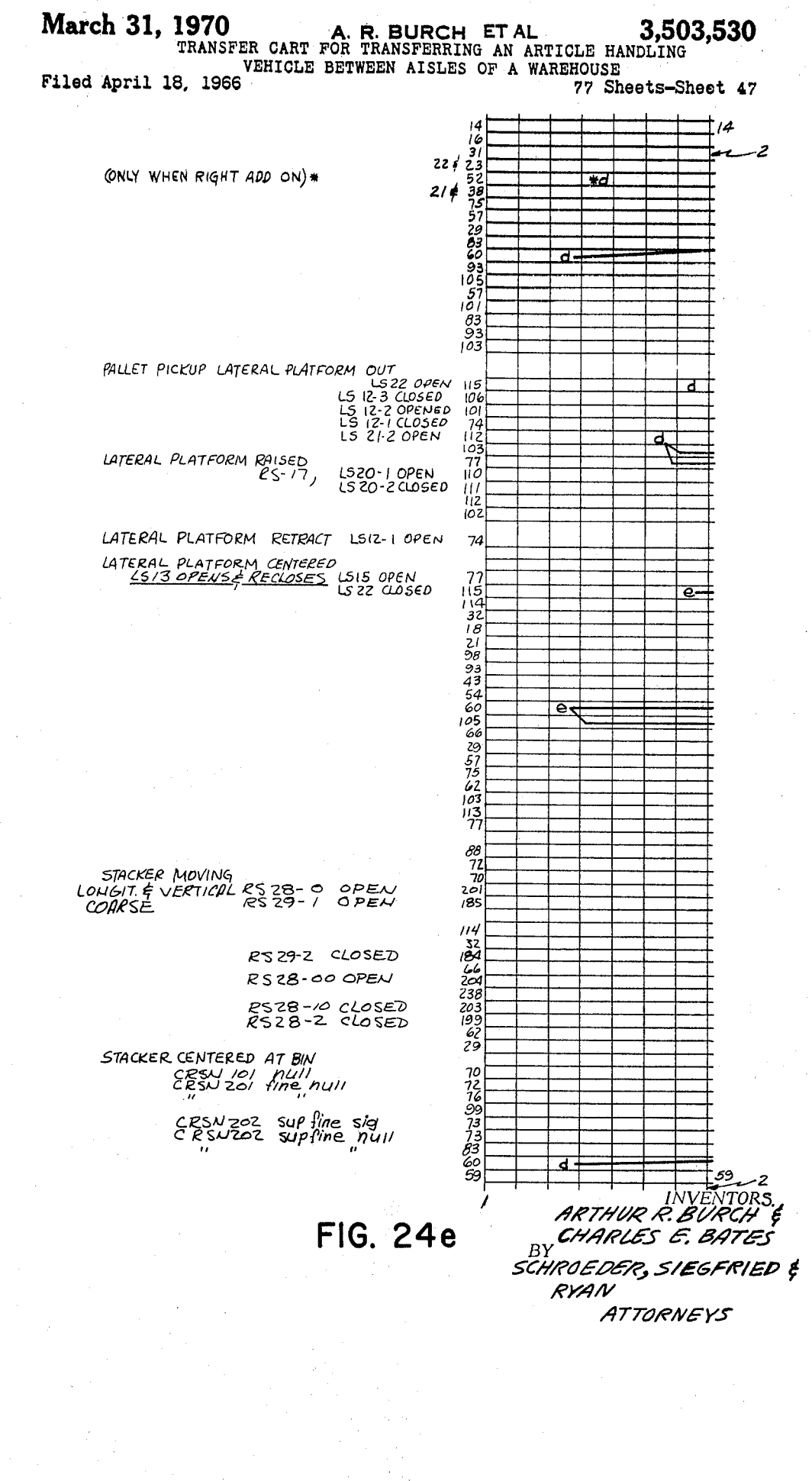
Figure 24M:
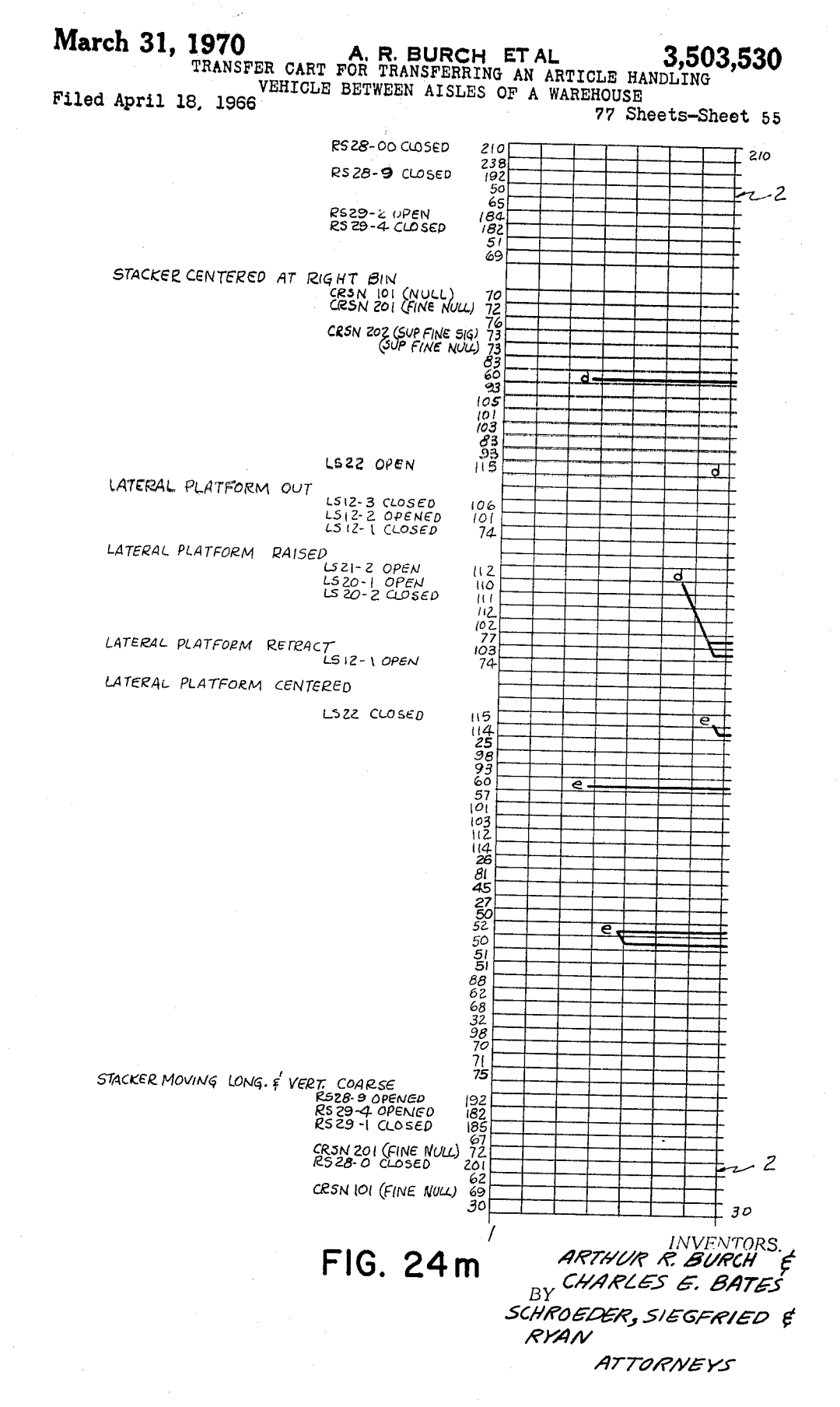

FIGS. 24a through 24y form a logic circuit chart showing the elements which are actuated in the logic circuit of FIGS. 20a through 20i and FIGS. 21a through 21f during different modes of operation of the stacker;

FIG. 25 is an isometric view of the reed switch array for longitudinal destination control of the stacker;

FIG. 26a is an isometric view of a transducer having an element shown striking an obstruction in a bin support area;

FIG. 26b is an isometric view of the same element as shown in FIG. 26a in its de-energized condition;

FIG. 27 is an isometric view of the stacker with the elevator removed having portions broken away to show the placement of its control switches and transducers;

FIG. 28a is a sectional plan view of the elevator platform;

FIG. 28b is a sectional side view of the elevator platform taken along lines 28b—28b as found in FIG. 28a;

FIG. 28c is a sectional end elevational view of the platform driving mechanism;

FIG. 29 is an isometric view of the tarnsfer cart with the pallet dollies removed and certain portions broken away to show the placement of its control switches and transducers;

FIGS. 30a and 30b are diagrammatical views of the stacker approaching the transfer cart showing the placement of interlock electromagnets and switches as seen from the left and right pallet dolly positions respectively;

FIG. 31 is a schematic diagram of the stacker longitudinal destination reed switch and magnetic strip arrangement;

FIG. 32 is a schematic diagram of the transfer cart reed switch and magnetic strip arrangement for aisle transfer control;

FIG. 33 is a schematic diagram of the stacker reed switch and magnetic strip arrangement for vertical control;

FIG. 34a shows the logic chart arrangement of FIG. 24 for the deposit mode of operation;

FIG. 34b shows the logic circuit arrangement of FIG. 24 for the deposit-reject mode of opeartion;

FIG. 34c shows the logic circuit arrangement of FIG. 24 for the deposit-withdrawal mode of operation;

FIG. 34d shows the logic chart arrangement of FIG. 23 for the transfer mode of operation of the transfer cart;

FIG. 35 shows the switches contained on the stacker manual control panel;

FIG. 36 is an isometric view of a typical bin structure used to support a pallet load;

FIG. 37 is a plan view of the lateral drive transducers; and

FIG. 38 is an isometric schematic diagram of the transfer cart located in front of aisle No. 1 with the stacker operating in the aisle in front of a bin structure.

Figure 1:
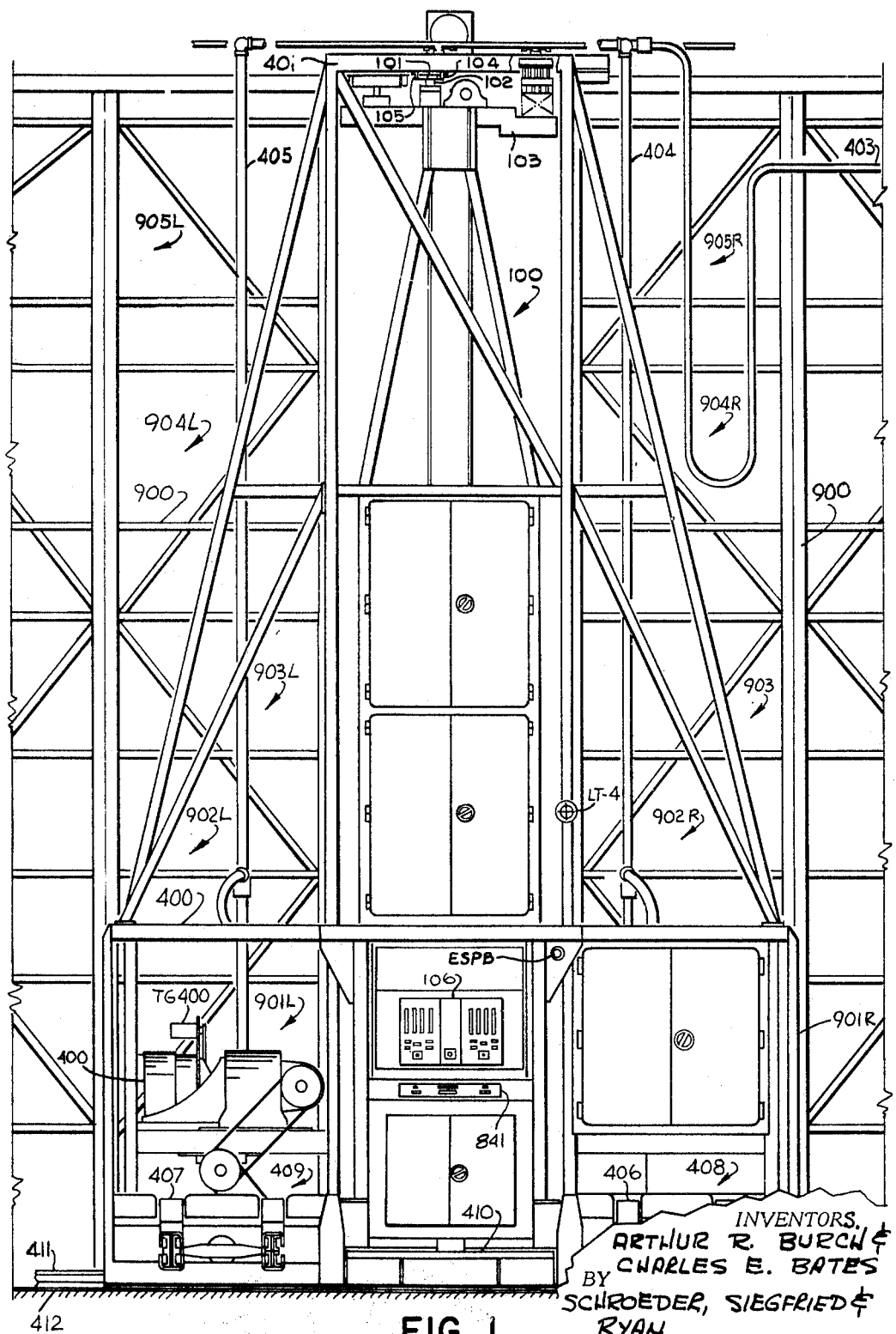
FIG. 1 is an aisle view of the transfer cart with the stacker riding on the transfer cart and locked in front of the bin structure.

In FIG. 1, a material-unit Stacker 100 is shown resting on a transfer cart 400 which is shown at rest in front of a bin structure 900. As mentioned previously, the transfer cart 400 moves across the end of the aisles and the Stacker moves in the aisles between the bins. A compresser air source 402 (FIGS. 11c and 11d) supplies compressed air through a hose 403 which is connected to a pair of pipes 404 and 405 which form a parallel arrangement to drive a pair of pallet dollies 406 and 407 which are respectively a part of a right load station 408 and a left load station 409. A platform 410 is provided in the front central part of the Transfer Cart in front of a control panel 106 for the Stacker and a control panel 411 for the Transfer Cart so that an operator may stand in front of the panels which controlling the operation of the Transfer Cart and Stacker.

THE BINS

Bin structure 900 is sub-divided into a plurality of bins and for this embodiment is shown to be five bins high where bins 901L and 901R are at the first level or lowermost level and are situated to the left and right of the Stacker. Bins in the next level or second level are designated 902L and 902R, bins in the third level or row being designated 903L and 903R respectively. The fourth row contains a pair of bins on the left and right sides designated 904L and 904R with the uppermost or top bins being designated 905L and 905R.

Figure 2:
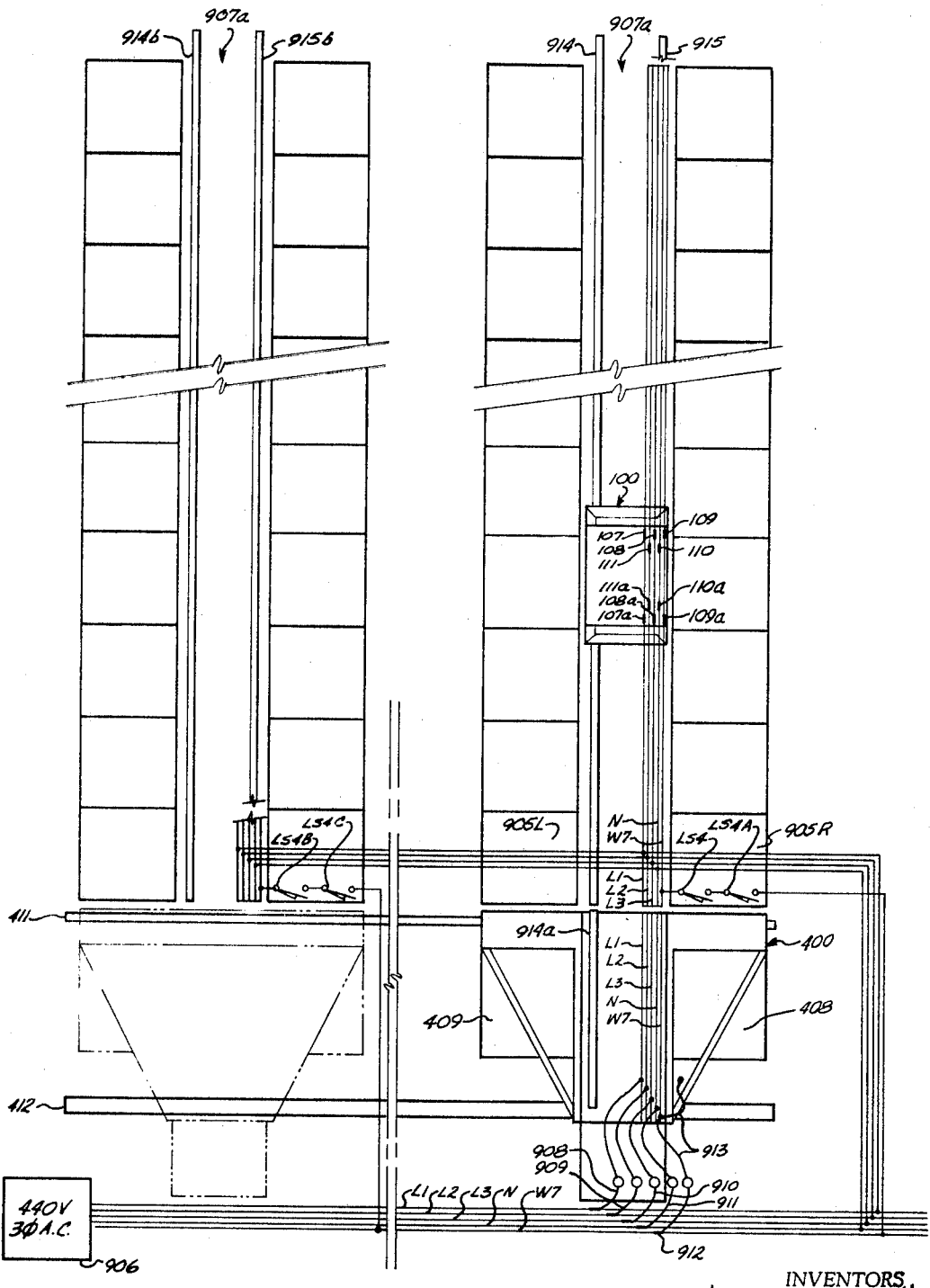
FIG. 2 is a diagrammatic plan view showing the transfer cart, stacker and bin structure with power connections.

In FIG. 2, there is shown an alternating current source of power 906 which is connected to a plurality of lines $L_1$, $L_2$, $L_3$, and N to provide a three phase 440 volt power system to the Transfer Cart and to the Stacker. These lines supply power to the lines which extend down the aisles between the bins, such as an aisle designated 907 which extends between a plurality of bins arranged in columns and rows and terminating in a manner such as just described with bins 901L through 905L on the left side of the aisle and bins 901R and 905R on the right side of the aisle. The power lines extend down the aisle and as shown, Stacker 100 is approximately four bins longitudinally down the aisle. In order to supply power to the Transfer Cart, power is picked up through four collectors 908, 909, 910 and 911. These collectors are respectively connected to stub-lines $L_1$, $L_2$, $L_3$ and N on the Transfer Cart to supply power for the Stacker. The logic circuit of the Transfer Cart in turn supplies 115 volts alternating current to a fifth collector 912 through a lead 913. The 115 volt alternating current is supplied to a line W7 which is connected overhead on the Tranfer Cart and also forms a fifth line down aisle 907. In order to supply the 115 volt signal to line W7 in the aisles, LS–4A which are connected in series. Switches LS–4 and LS–4A are closed by the locking means for locking the Transfer Cart to the bins which will be described in more detail later. At the bottom of the aisle there is located a pair of rails 914 and 915 over which Stacker 100 travels. The Transfer Cart 400 has a pair of rails 914a and 915a (FIG. 9b) which are extensions of rails 914 and 915 which are contained on Transfer Cart 400 and travel with the Transfer Cart to support the Stacker. Shown immediately to the left in FIG. 2 is a representation of another bin structure in which a pair of rails 914b and 915b are situated and in which wire W7 is connected to a pair of series connected switches LS–4B and LS–4C to complete the current on the fifth wire down the aisle. It will also be observed that there are a pair of rails 411 and 412 secured to the warehouse floor over which the Transfer Cart travels across the ends of the aisles. Bin 901L is typical of all the bins and is shown in more detail in FIG. 36. Bin 901L has four vertical corner channel members or posts 916, 917, 918, and 919. Vertical posts 916 and 919 are adjacent aisle 907 which has rail 914 contained therein. A load support member 920 is secured to posts 916 and 917 by a bracket 921 at post 916 and a horizontal member 922 extending between posts 917 and 918 by welding, bolting, or other suitable means and another lead support member 923 is secured to posts 919 and 918 by a bracket 924 and member 922 respectively in the same manner as just described for brackets 921 and 922. A pallet 925 is shown supporting a load 926 in bin 901L. The load supports immediately above and down the asile from load 926 are secured to posts 916 through 919 in the same manner just described and all other bins are formed in the same manner. Posts 916, 917, 918, and 919 are secured to the warehouse floor by suitable means such as lag screws or bolts 927.

THE TRANSFER CART

Figure 3:
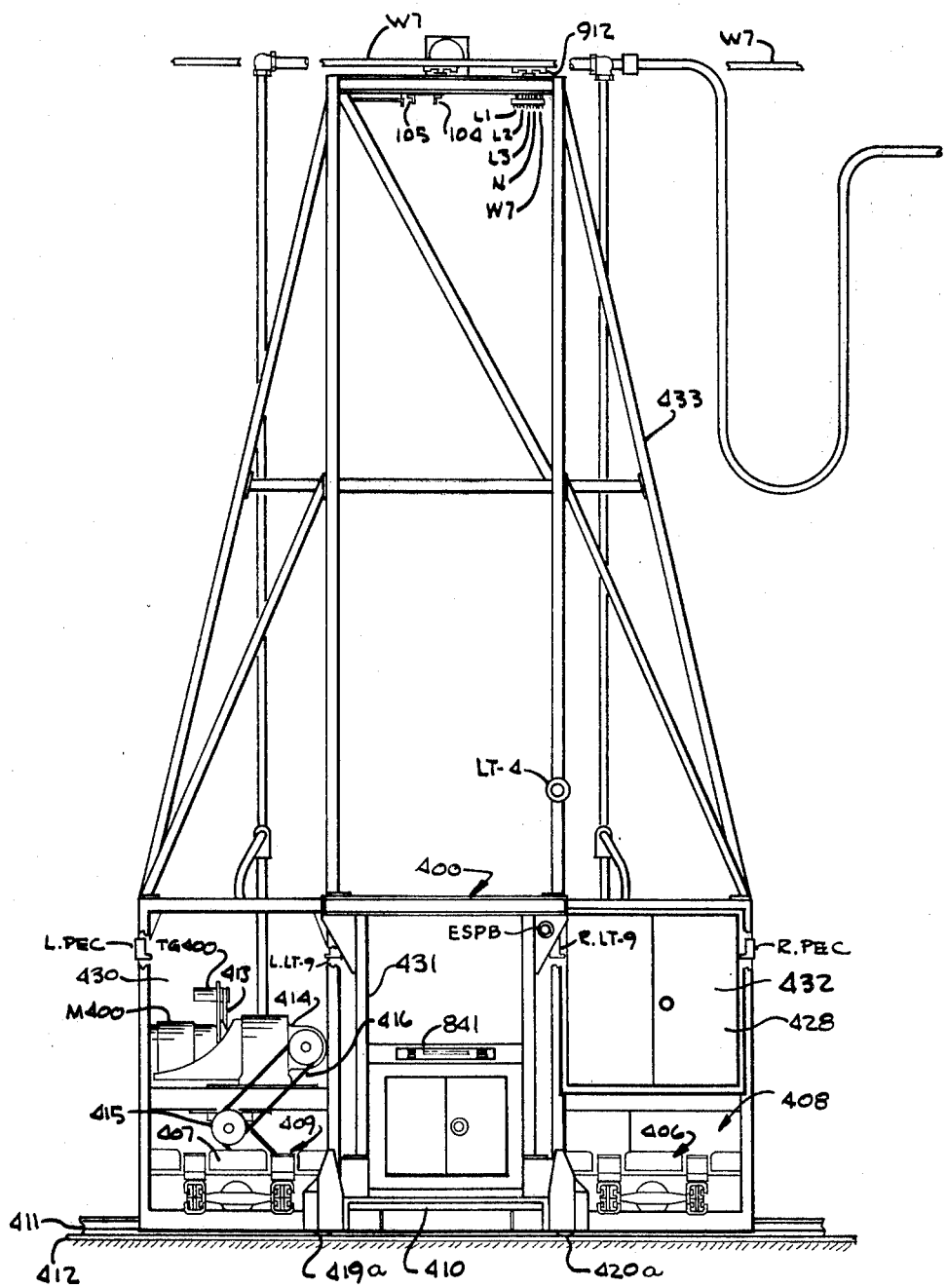
FIG. 3 is an aisle elevational view of the transfer cart.

FIG. 3 shows the the superstructure of the Transfer Cart which when seen from above is of a T shape. To further aid in identifying the Transfer Cart structural parts, the left rear structural section is designated structural section 430, the center portion thereof forming the stem of the T-shaped structural section is designated 431 and the rear right hand structural section is designated 432. The upper pyramid shaped structural members are designated 433. It will be observed (FIG. 1) that the Stacker 100 is supported against a lateral or transverse tipping motion by having a roller 101 supported for rotation about a vertical shaft 102 which is secured to a cross-arm 103 at the top of the Stacker super-structure. Roller 101 operates between a pair of guides 104 and 105 which are secured to the top of the bin structure or warehouse ceiling and extend longitudinally down the aisles and have stub sections which extend onto the Transfer Cart where they are secured to the uppermost part thereof, one member 401 being at the front thereof. The lower left rear portion 430 (FIG. 3) of the Transfer Cart structure, a Transfer Cart drive motor M400 is secured to the framework and a tachometer generator TG400 is driven by motor M400 through a belt 413. Motor M400 drives a gear train 414 which in turn drives a pulley 415 through a timing belt 416. A more detailed view of the driving mechanism is shown in FIG. 8. The pulley 415 is secured to a shaft 417 which in turn drives another timing belt 418 and a pulley 419 which is secured to a shaft 420, that is journalled in a pair of bearings and rotates a flanged driving wheel 421 which is in driving relationship with rail 411. Another shaft 422 is journalled in a pair of bearings at the extreme left side of Transfer Cart structure 430 and is secured to a flanged wheel 423.

Another shaft 424 is journalled in a pair of bearings on the right hand rear portion 432 of the Transfer Cart structural mechanism and is secured to another flanged wheel 425 which rides on rail 411. At the extreme right hand rear portion 432 of the Transfer Cart structural mechanism, another shaft 426 is journalled by a pair of bearings and has secured thereto, a flanged wheel 427 which engages rail 411. Since the driving prime mover is a motor generator set, motor M400 is driven by a generator G400 which is powered by a motor M4, the combination being secured to the Transfer Cart structural members at the lower right rear portion 432 thereof. The electrical details of this arrangement are more clearly shown in FIG. 12a and will be described more completely in describing the complete servo system. The servo control elements and circuit are housed in a cabinet 428 which is directly above motor generator set M4–G400.

The front part of the Transfer Cart structural mechanism is carried by a pair of wheels 419a and 420a which roll on top of rail 412 which in this case is a flat strip.

Figures 9A, 9B:
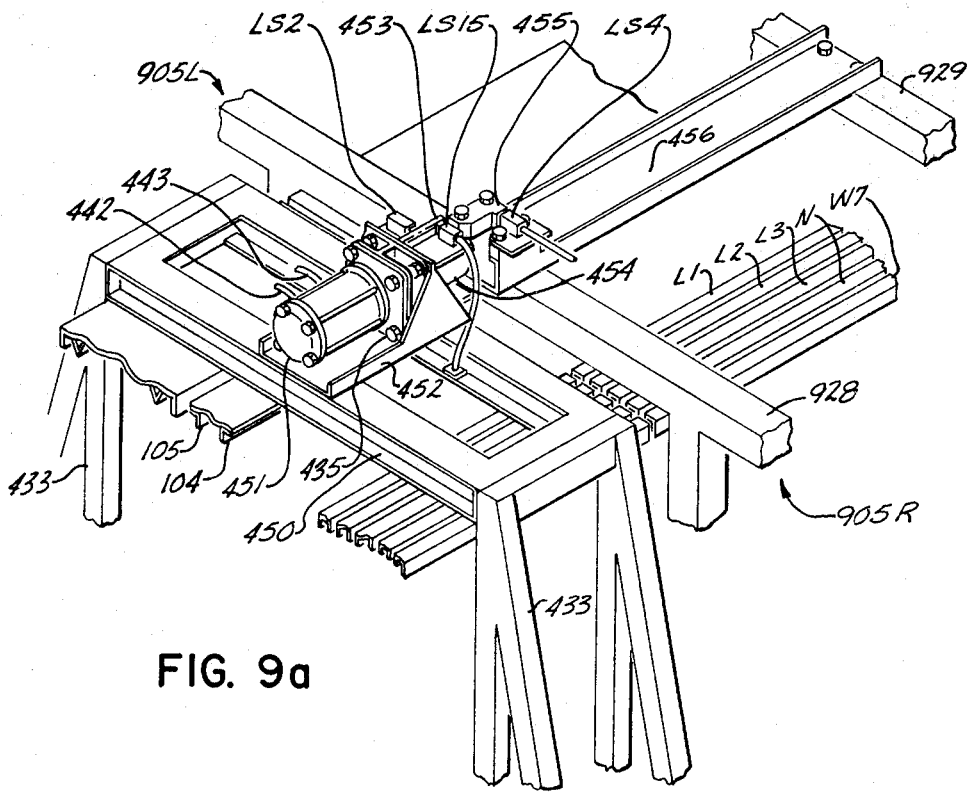
FIGS. 9a and 9b are respectively isometric views of the of the transfer cart electrical servo and driving mechanisms.

FIG. 9b, shows the right rear structural section 432 broken away in which there is secured thereto a position lock 434 by suitable means such as bolts 435. Position lock 434 extends through the face of structural section 432 that faces the bin section 901R as shown in FIG. 1. Position lock 434 has plunger 436 which is moved forwardly and away from the Transfer Cart and rearwardly towards the Transfer Cart by a piston contained in position lock 434. Compressed air is sent through line 403 (FIG. 11c) from compressed air source 402 and through a pair of pallet dolly emergency stop valves 437 for the left pallet dolly and 438 (FIG. 11d) for the right pallet dolly. As long as valves 437 and 438 are held open by their respective solenoid control coils, compressed air is passed through the lines. After leaving valve 437, (FIG. 11c) compressed air is passed through a line 439 and in like manner, compressed air is passed through a line 440 after leaving control valve 438 (FIG. 11d). Lines 439 and 440 are combined at a three way valve 441 (FIG. 11a) which causes the compressed air to flow through a hose 442 or a hose 443. Valve 441 is a mechanically latched valve in which the valve spool remains in one position upon receiving an electrical pulse or signal and does not change until the other coil is energized. One such valve as this is the "EJV" type manufactured by Bellows Valvair of Akron, Ohio. Hose 442 is connected to lower piston lock 434 in such a manner as to cause the piston to move forwardly and when air is introduced into hose 443, the piston is moved rearwardly to withdraw plunger 436. As shown in FIG. 9b, plunger 436 is in locking engagement with a U-shaped striker plate 444 which is secured to a reinforced bar 445 that is secured to the floor of the warehouse by suitable means such as bolts 446. A small bar 447 is secured to plunger 436 and in the locked position, causes switches LS–3 and LS–14 to be opened when position lock 434 is locked to the striker plate 444. Switch LS–4A also is closed partially completing the 115 volt circuit to wire $W_7$ (FIG. 2) when plunger 436 is extended. Secured to plate 445 by suitable means such as welding, are a pair of inverted J shaped members 448 and 449 which have the "hook" portion overlying the upper radius of flanged wheels 425 and 427 (FIG. 8) so that in the event Stacker 100 is driven onto Transfer Cart 400 at an excessive speed with a load which is elevated, the Transfer Cart is prevented from pivoting about the front wheels 419a and 420a and thus is prevented from tipping.

Figure 4:
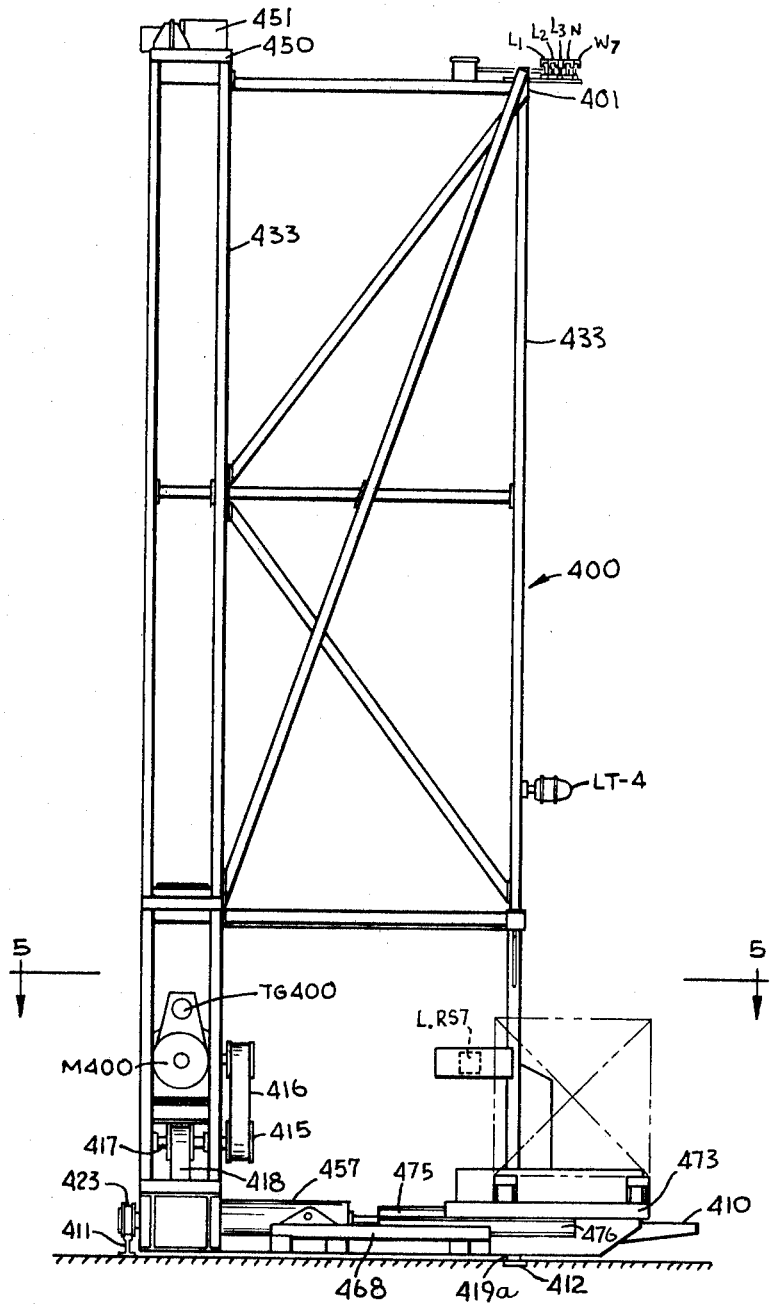
FIG. 4 is a side elevational view of the transfer cart.

The upper portion of the Transfer Cart superstructure 433 is connected to a rectangular frame 450 (FIG. 4) that is secured to the superstructure and has another position lock 451 secured to frame member 450 by a bracket 452 (FIG. 9a) and suitable fastening means such as bolts 435. It will be observed that the compressed air hose connections 442 and 443 are also the same as those for the lower lock assembly and in fact the position locks operate in the same manner. The top lock 451 shown in FIG. 9a has its plunger 454 retracted. In the retracted position, a bar 453 which is carried on plunger 454 engages limit switches LS–2 and LS–15 and closes them in the position shown. Also, limit switch LS–4 (which is also found in FIG. 2) is opened and is only closed when the top position lock 451 is engaged with a striker plate 455 that is secured to a top brace member 456. Brace 456 is bolted to a structural member 928 which bridges aisle 907 (FIG. 2) between bins 905L and 905R on the side facing the Transfer Cart. At a position "down" the aisle, bracket 456 is connected to another bridging member 929 which is connected across aisle 907 and along with member 928 is used to support the power lines or rails and guide bars 104 and 105.

Figure 5:
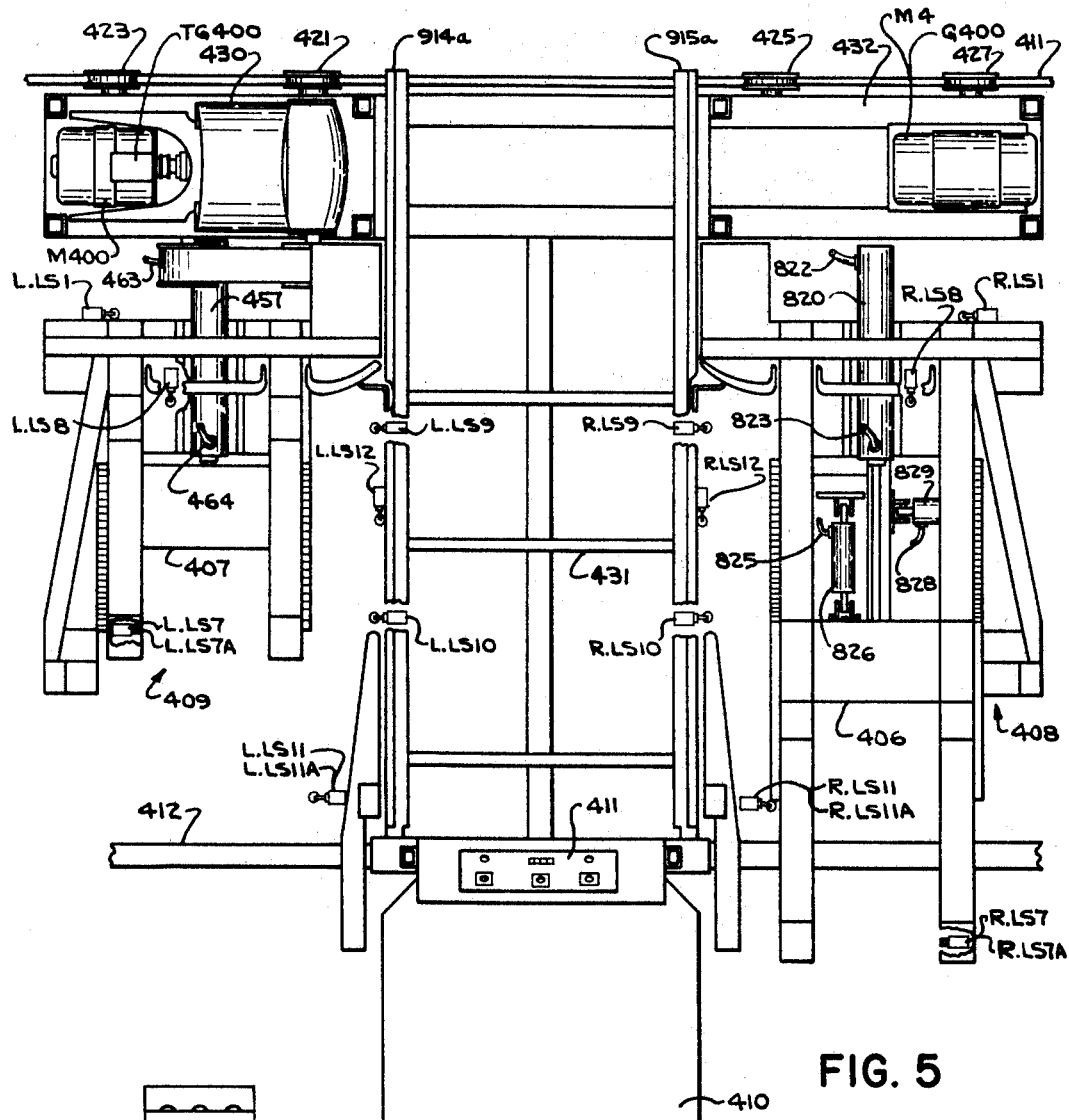
FIG. 5 is a plan view of the transfer cart taken along section line 5—5 of FIG. 4 above the drive motor showing the left pallet dolly retracted and the right pallet dolly extended.
Figure 7:
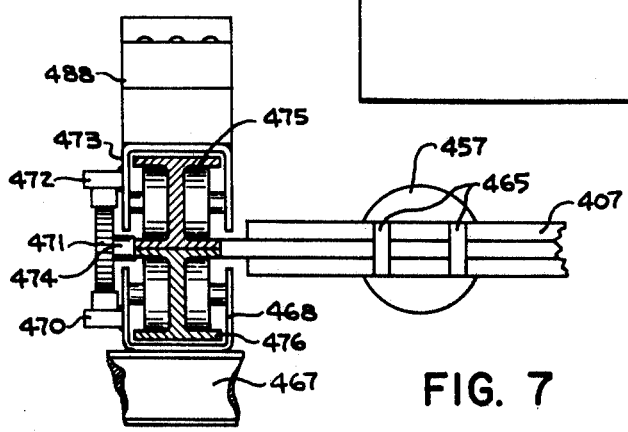
FIG. 7 is a partial sectional view of the rack and pinion drive mechanism for the pallet dollies.

FIG. 5 shows the left pallet dolly 407 (FIGS. 1 and 3) and retracted and right pallet dolly 406 extended. An air cylinder 457 is pivotally s ecured to a pair of brackets 458 and 459 by a pin 460 (FIGS. 6a and 6b). Situated within the cylinder, is a piston which drives a plunger 461 forwardly and rearwardly. Compressed air line 439 is connected to a three way valve 462 (FIG. 11c) that is controlled by a pair of solenoid coils which will be explained more fully later. The three way valve has one output connected to a compressed air line 463 which causes the piston to move forwardly and another compressed air line 464, which when compressed air is passed therethrough, causes the piston to retract or move rearwardly. The end of plunger 461 is pivotally connected to a clevis 465 by a pin 466, the clevis being connected to pallet dolly 407 to cause it to move in an extending and retracting mode of operation. Brackets 458 and 459 and a pair of U-shaped channel members 468 and 468 are secured to an outer box frame 467. The U-shaped channel members 468 and 469 form the lower part of the pallet dolly which moves outwardly and rearwardly to handle the load, and both extend parallel to each other and parallel to tracks 914 and 915 carried by the Transfer Cart. A section of the left member of pallet dolly 407 using U-shaped channel member 468 is shown in FIG. 7 to give more clarity to the operation of the pallet dolly. Secured to the side of U-shaped channel member 468 by suitable means such as welding, is a rack 470. Rack 470 is in communication with a pinion gear 471 which engages another rack 472 that is secured to an inverted U-shaped channel member 473 that overlies lower channel member 468. It will be seen that gear 471 is journalled on a shaft 474 which is secured to a pair of I-beams 475 and 476 by suitable means such as welding. I-beam 475 is stacked on top of I-beam 476 and welded where the two join each other, the edge being the part welded to shaft 474. On the side opposite shaft 474, pallet dolly member 407 is secured by suitable means such as welding. It will thus be seen that as plunger 461 is moved outwardly, gear 471 is subjected to the translational movement and is rotated because of its engagement with rack 470 thus causing the upper U-shaped member 473 to be projected outwardly twice the length of the stroke of plunger 461. The lower I-beam portion 476 is secured in place by a pair of rollers 477 and 478 which engage the outer lip portion of lower I-beam 476 and as the I-beams move outwardly due to movement of plunger 461, another pair of rollers engage the roller I-beam 476. A pair of rollers 479 and 480 are shown in communication with the lower I-beam member 481 on the right member of the left pallet dolly, to illustrate this movement. Secured to I-beam 481 is another I-beam 482 and a pinion gear 483 is secured to the edge portions thereof by a shaft as just described. Connected to the outside of U-shaped channel member 469 is a rack 484 which communicates with pinion gear 483 which in turn communicates with another rack 485. Another inverted U-shaped channel member 486 overlies channel 469 and is secured by rollers to the I-beam structure 481 and 482 in the manner just described for the other extension member. Rack 485 is welded or secured by other suitable means to channel member 486 and rack 484 is welded to channel member 469.

Secured to the extreme end of inverted channel member 473 is a pallet dolly load pad 487 and secured near the other end of channel 473 is another load pad 488. Secured to inverted channel member 486, is a pair of load pads 489 and 490. Each of the load pads have three rollers which aid in moving the pallet across the pallet dolly and also each pad contains a guide bracket to aid in securing the pallet properly on the pallet dolly. The pallet overhangs the outside edges of channel members 473 and 486 and when retracted, strikes the edge of a first guide rail 491 which causes the pallet to be moved laterally towards the center section of the Transfer Cart and another guide 492 helps position the pallet. A back stop 493 prevents the pallet from moving rearwardly beyond that point of travel.

A pneumatic valve 800 (FIG. 11c) is connected to compressed air line 439 and is controlled by a solenoid coil. The output of valve 800 is directed to a compressed air line 801 which supplies compressed air to the end of a positioning cylinder 802 (FIG. 6a). Positioning cylinder 802 is secured to a cross-brace of the frame structure 467 by a U-shaped clevis 803 secured by a pin 804. On the other end of positioning cylinder 802, there is a plunger 805 which drives a U-shaped link 806 outwardly to cause an arm 807 to pivot upwardly about a pin 808 which is secured to a bracket 809. As arm 807 moves upwardly and engages the pallet, the pallet is forced rearward and against rear guide 493 of the load station 409. Plunger 805 engages limit switch L.LS–13 which energizes a solenoid coil of a valve 810 (FIG. 11c) which is also connected to compressed air line 439. Upon valve 810 opening, compressed air is passed through a line 811 to another positioning cylinder 812. Positioning cylinder 812 is oriented at right angles to positioning cylinder 802 and has a piston contained therein which is driven outwardly upon beng driven by compressed air through line 811. The end of cylinder 812 nearest compressed air line 811 is secured to an inner beam of frame 467 by a U-shaped clevis 813 which secured cylinder 812 thereto through a pin 814. The other end of cylinder 812 has a plunger 815 extending therefrom which engages a link 816 that is secured to an arm 817 and pivotally connected by a pin 818 to a bracket 819. The end of arm 817 contains a pressure pad as does the end of arm 807 and is moved in the same manner as just described for positioning cylinder 802 and its plunger so that upon moving upwardly and engaging the pallet is forced towards a corner guide bracket 820 and eventually the pallet engages limit switches L.LS–8, L.LS–9, and L.LS–10. Upon the pallet being placed aboard the pallet pads, limit switches L.LS–7 and L.LS–7A are actuated.

Inasmuch as the right load station 408 is the same as left load station 407 and symmetrical about the center section of the Transfer Cart, it will not be necessary to describe the right pallet dolly in great detail. The different actuating mechanisms will be described and it will of course be understood that they operate in the same manner as those just previously described. An air cylinder 820 is connected to a three way valve 821 (FIG. 11d) which is connected at its input to compressed air line 440. Three way valve 821 is controlled by a pair of solenoid coils and has a pair of compressed air output lines 822 and 823. Line 822 is connected to the rearward end of air cylinder 820 and when air is introduced into the cylinder, the pallet dolly is extended outwardly. When compressed air is passed through line 823, the pallet dolly is retracted. Another valve 824 is connected to compressed air line 440 and is controlled by a solenoid coil with an output line 825 being connected to a positioning cylinder 826. Positioning cylinder 826 operates in the same manner as positioning cylinder 802. Another valve 827 is also connected to compressed air line 440 and is controlled by a solenoid coil. The output of valve 827 is connected to a compressed air line 828 which is connected to another positioning cylinder 829 that is located perpendicular to positioning cylinder 826 in the same manner as positioning cylinder 812. It will thus be seen that the left and right pallet dollies, are both structurally and operationally, identical to each other.

Reference is now made in general to the logic circuits for controlling the Transfer Cart operations, not only as to moving a pallet on the pallet dolly but also transferring the Transfer Cart from one aisle to another. As shown in all the logic circuits, the line number is indicated on the left hand side of the circuit drawng and makes reference to that particular line containing a number of elements. On the right hand side of the circuit diagram is indicated the different circuits indicated by lines for which a relay wil have contacts, and where the number is underlined it indicates the contacts are normally closed. The contacts are normally open when the number is not underlined and are closed upon energizing the control relay. Certain alternating current relays, while having one set of contacts, have two different coils, one being known as a "latching" coil and the other as an "unlatching" coil. When voltage is applied to a latching coil with the unlatching coil energized, the relay operates like a single coil type relay and is "pulled in." When the unlatching coil is de-energized, and the latching coil is energized and then de-energized, the relay is in a mechanically latched state and remains "pulled in." When the relay is mechanically latched with the latching coil de-energized, energizing the unlatching coil causes the relay to mechanically unlatch and "drop out." As shown in the logic circuits, the latching coils are associated with control relays and the unlatching coils are associated with unlatching relays although they are generally a single relay having dual coils and mechanically connected so as to perform the functions just described.

The Transfer Cart logic circuit is shown in FIG. 11a where the power lines supply power to the Transfer Cart through the collectors as previously described. A transformer 495 is connected between the neutral line N and line L3 to produce a 115 volt output which is connected to a common wire W10 and through a fuse F–2 to a line W8. A direct current power supply 496 is also connected to lines N and L3 to supply an output voltage of 24 volts which is connected to a wire W9 and common wire W10. Line 1 is connected between wire W9 and W10 and includes a control relay CR–1 connected in series with a push button switch PB1–1, normally closed relay contacts CR–5 and three open relay contacts L.CR–11, R.CR–11 and CR–13. Connected in parallel with push button switch PB1–1, line 2, are a pair of series connected relay contacts CR–1 and CR–4 which are normally open. Connected in parallel with push button switch PB1–1 and control relay CR–1, on line 3, is a series circuit having a lamp LT–1 connected with normally open relay contacts CR–4. An Auto-Manual switch SW–400 has its contacts in section 3A connected to another switch SW–402 which is designated a Connection-Disconnect-Manual switch. The contacts of another section 3B of SW–400 are connected in line W8. Switch SW–402 in line 4 is connected to a solenoid coil SOL–1 which disconnects the aisle position locks (line 5). Connected between solenoid coil SOL–1 and Line W9, is a second section of switch SW–402 which is normally closed and a pair of series connected relay contacts CR–1 and CR–4 which are normally open. Connected to the input side of switch SW–402 in line 4, is a third section of the switch which is normally open (line 5.5) and is connected to a solenoid coil SOL–2 that causes the aisle position locks to be engaged (line 6). Solenoid coils SOL–1 and SOL–2 are mechanically connected to three way valve 441 to control its operation. In line 7, control relay CR–4 is connected between wire W10 and W9 through a pair of series connected air lock limit switches LS–2 and LS–3 which are open when the aisle position locks are locked. An interlock electromagnet EM–4 is connected between wire W10 and W9 on line 7.5 by a pair of parallel connected limit switches LS–15 and LS–14 which are respectively controlled by air lock plungers 454 and 436. Interlock electromagnet EM–4, when energized, opens emergency reed switch RS–ES in the Stacker servo circuit line 66. In line 8, between wire W9 and W10 there is connected in series, a control relay CR–2, a pair of normally closed relay contacts CR–21, a push button switch PB1–2, normally open relay contacts CR–4 and a pair of limit switches LS–5 and LS–6. Limit switches LS–5 and LS–6 are located respectively on the left and right sides of Transfer Cart 400 and control the maximum travel in each direction of the Transfer Cart, being opened at maximum travel. Connected in parallel with control relay CR–2 and normally closed contacts CR–21, is a normally open relay contact CR–2 and a lamp LT–3. In line 10, connected between wire W10 and W9, is a control relay CR–3L and a normally open relay contact CR–2. In line 11, an emergency stop switch ESPB is connected between line W8 and the fifth wire W7 overhead in the aisles, through lead 913. In line 13, connected between line W9 and W10, is a control relay CR–5, a pair of normally open relay contacts CR–4 and CR–8 connected in series, and a reed switch RS–2 which is closed by a permanent magnet PM–1 that is shown in FIG. 29, located at the null position of a magnetic strip 497 which is used with a linear position transducer LPT–401 shown directly above the permanent magnet PM–1. Connected between lines W8 and W10, at line 14, are an unlatching relay CR–3UNL connected in series with a normally open relay contact CR–5. In line 15, a brake solenoid coil SOL–3 is connected in series with a normally open relay contact CR–2 and on line 16, a lamp LT–4 is connected in series with a normally open relay contact CR–3.

Connected between wire W10 and W9, at line 16.4 is a control relay CR–13 connected in series with a reed switch RS–1 and at line 16.6 a lamp LT–2 is connected in series with a normally closed relay contact CR–4. Reed switch RS–1 is closed by a Stacker electromagnet S.EM–1 which allows the Transfer Cart logic circuit to be enabled.

Figure 11B:
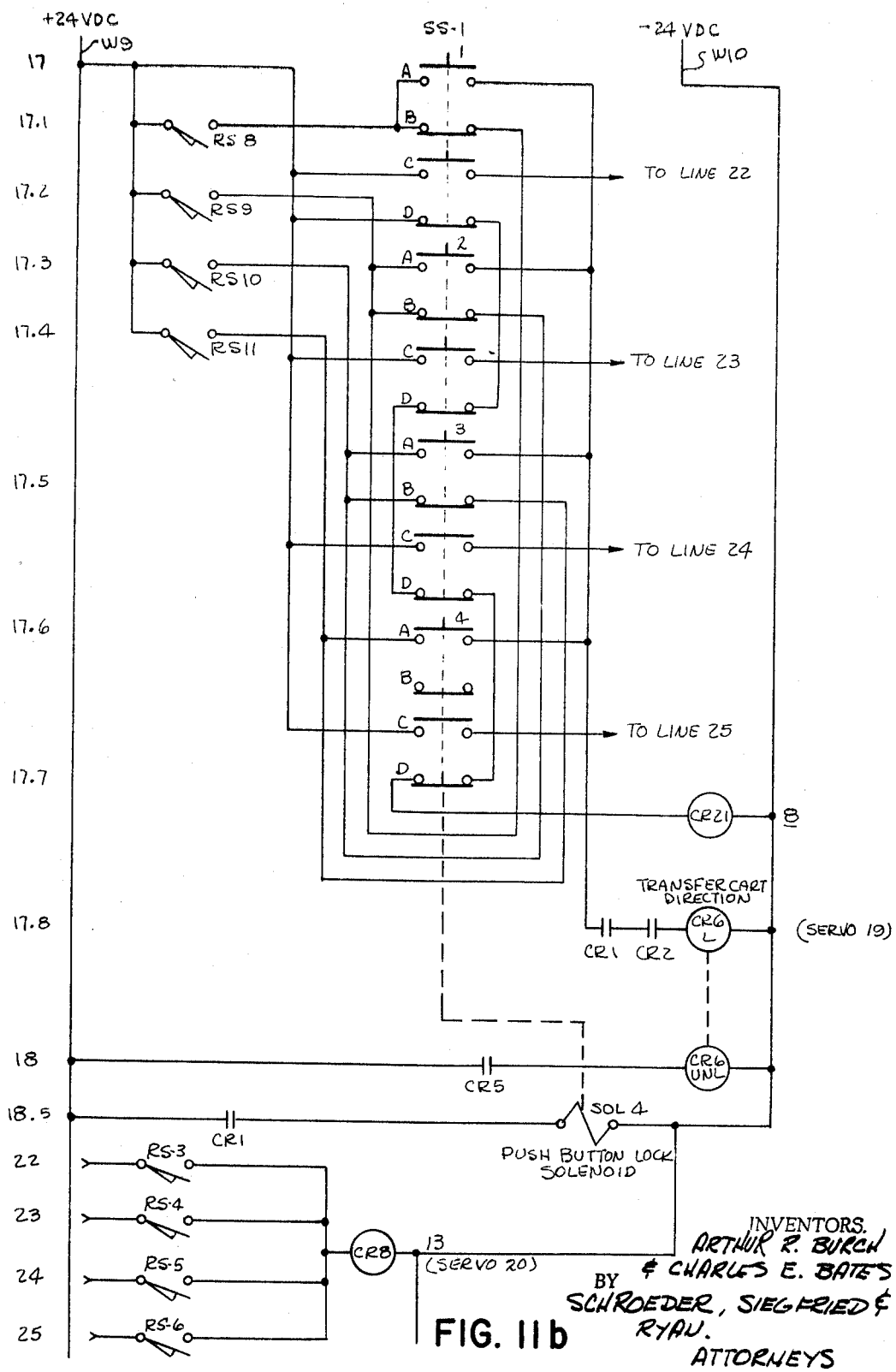

In FIG. 11b, all connections are made between wires W9 and W10. Situated in the center of the figure, is a selector switch SS–1 having sections 1, 2, 3 and 4 with push button contacts A, B, C, and D in each section. It should be understood that normally one section will be depressed indicating a transfer of the Transfer Cart to that particular aisle and for this particular embodiment, aisle 907 corresponds to number 1 on switch SS–1. Switch SS–1 is of the type that is mechanically coupled between sections so that only one section may be depressed at a time and upon pressing a new section, the previously pressed section is de-activated. Starting with line 17, connection is made with contacts C of each switch section. Contacts C of section 1 are connected to a reed switch RS–3 on line 22, which is connected in series with a control relay CR–8. Contacts C of section 2 are connected to a reed switch RS–4 which is also connected to control relay CR–8. Switch contacts C of section 3 are connected to a reed switch RS–5 in line 24 and are connected to control relay CR–8. Contacts C of switch section 4 are connected to a reed switch RS–6 in line 25 which is also connected to control relay CR–8. All of the switch contacts marked D of all sections are connected in series with a control relay CR–21 between wires W9 and W10, on line 17.7. A reed switch RS–8 is connected in series with contacts A of switch section 1, a pair of normally open relay contacts CR–1 and CR–2, and a control relay CR–6L, between lines W9 and W10 (line 17.8). Another reed switch RS–9 and switch contacts A of section 2 are connected in series with each other and in parallel with contacts A of switch section 1 and reed switch RS–8. A reed switch RS–10 and switch contacts A of section 3 are connected in parallel with contacts A of sections 1 and 2 and the respective reed switches. Another reed switch RS–11 and switch contacts A of section 4 are also connected in parallel with contacts A of sections 3, 2, and 1 and the respective reed switches. Switch contacts B of section 1 are connected to reed switch RS–8 and are connected in series with switch contacts B of section 2 and connected in series with switch contacts B of section 3 which are then connected between reed switch RS–11 and its connection to contact A of section 4. The switching circuit is completed by connecting switch contacts A and B of section 2 with reed switch RS–9, and connecting contacts A and B of section 3 with reed switch RS–10.

Completing the circuit of FIG. 11b, at line 18 is an unlatch control relay CR–6UNL connected in series with a normally open relay contact CR–5. In line 18.5, a push button lock solenoid SOL–4 is connected in series with the normally open relay contact CR–1. Push button lock solenoid SOL–4 is mechanically connected to the push button arrangement of switch SS–1 to insure that once one of the sections has been depressed and the solenoid energized, it is locked in that position.

Reed switches RS–3 through RS–6 and RS–8 through RS–11 are controlled by magnetic strips which are fastened to the bin faces as the Transfer Cart passes the ends of the aisles between the bins. As shown in FIG. 32, a magnetic strip 830 is used to control reed switches RS–8 and RS–3 and the physical placement of the magnetic strip is shown in FIG. 29 where the strip is fastened to a bracket 831 that is fastened in front of the Transfer Cart on the outside edge of the bins. In like manner, three other magnetic strips 832, 833 and 834 are spacially displaced from each other to control respectively, reed switches RS–9, and RS–4, RS–10 and RS–5, and RS–11 and RS–6. In other words, one magnetic strip controls the two reed switches adjacent the magnetic strips when they are properly aligned and of course are used to control the destination of the Transfer Cart.

Figure 11C:
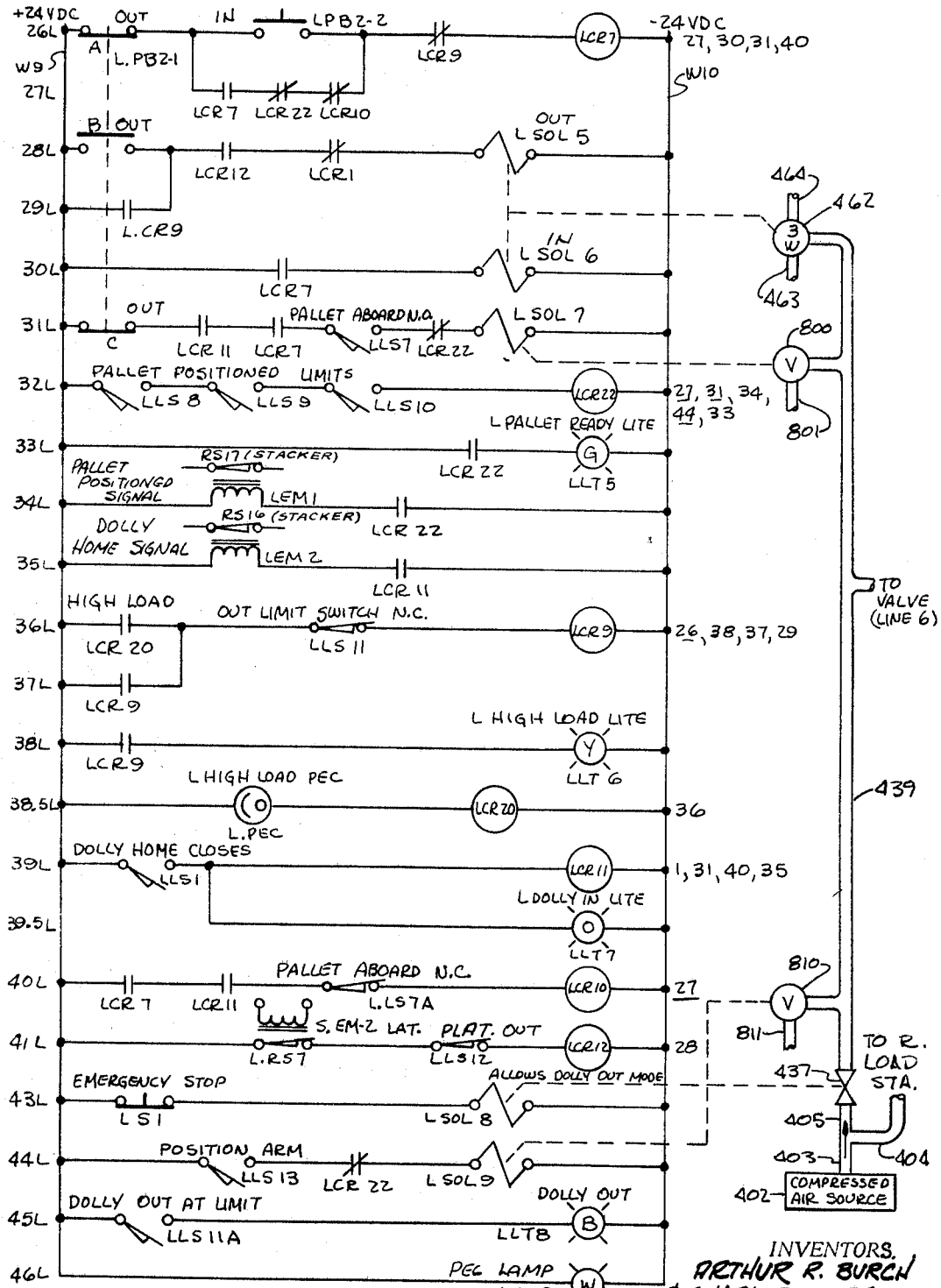

FIG. 11c also has all electrical connections made between wires W9 and W10 and all lines referred to are designated by a number and the letter L indicating the logic circuit for the left pallet dolly is the same as that for the right pallet dolly (FIG. 11d) where the line numbers are designated with the letter R. Because the electrical circuits are identical, for FIGS. 11c and 11d with the exception of different designations for the components thereof, only the left pallet dolly logic circuit in FIG. 11c will be described. On line 26, there is connected in series, a push button switch L.PB2–1 which is normally closed, a normally open push button switch L.PB2–2, a normally closed switch contact L.CR–9 and a control relay L.CR–7. In line 27, there is connected in parallel with switch L.PB2–2, the series connection of normally open relay contacts L.CR–7, and normally closed relay contacts L.CR–22 and L.CR–10 which form a holding circuit. Connected in series in line 28, is a solenoid coil L.SOL–5, a normally closed relay contact L.CR–1 and a normally open relay contact L.CR–12 and a normally open switch contact, section B of switch L.PB2–1. In line 29, a normally open relay contact L.CR–9 is connected in parallel with section B of switch L.PB2–1. In line 30, there is connected in series a solenoid coil L.SOL–6 and a normally open relay contact L.CR–7. Solenoid coils L.SOL–5 and L.SOL–6 control the mechanical position of three way valve 462 (like three way valve 441 described previously) and thus control the direction of movement of the left pallet dolly. In line 31, there is connected in series, a solenoid coil L.SOL–7, a normally closed relay contact L.CR–22, a limit switch L.LS–7 which is normally open, and closing when a pallet is aboard, two normally open relay contacts L.CR–11 and L.CR–7 and a normally closed switch section C of switch L.PB2–1. The physical placement of limit switch L.LS–7 in line 31 and L.LS–7A in line 40 is shown in detail in FIGS. 5 and 6a. Solenoid L.SOL–7 controls position cylinder 802 of FIG. 6a. In line 32, control relay L.CR–22 is connected in series with three switches L.LS–8, L.LS–9 and L.LS–10. These switches indicate that the pallet has been positioned and are set at the limits of the pallet position just prior to being picked up by he Stacker, the physical placement of the switches being clearly shown in FIGS. 5 and 6a. In line 33, a lamp L.LT–5 is connected in series with a normally open relay contact L.CR–22. In line 34, an electromagnet L.EM–1 is connected in series with a normally open relay contact L.CR–22. Electromagnet L.EM–1 closes Stacker reed switch RS–17 when the pallet is positioned after closing the limit switches in line 32 above. In line 35, an electromagnet L.EM–2 is connected in series with a normally open relay contact L.CR–11. Electromagnet L.EM–2 closes reed switch RS–16 on the Stacker when the pallet dolly is "HOME" or in the completely retracted position. As will be shown more clearly later, FIGS. 30a and 30b show the relative position of the electromagnets and their corresponding reed switches for controlling the interconnecting logic circuits between the Transfer Cart and the Stacker. In line 36, a control relay L.CR–9 is connected in series with a normally closed limit switch L.LS–11 which is opened when the pallet dolly is fully extended and the placement of the switch is shown in FIGS. 5 and 6a, the circuit being completed by a normally open relay contract L.CR–20. Connected in parallel with contact L.CR–20, is another relay contact L.CR–9 that is normally open, (line 37). In line 38, lamp L.LT–6, indicating a high load is aboard the pallet dolly, is connected in series with a normally open relay contact L.CR–9. In line 38.5, a control relay L.CR–20 is connected in series with a high load photoelectric cell L.PEC. In line 39, a control relay L.CR–11 and in line 39.5, a lamp L.LT–7 indicating the left dolly is "IN" are connected in parallel and energized through a series connected limit switch L.LS–1 indicating pallet dolly is "HOME." Line 40 includes a control relay L.CR–10 connected in series with a normally closed limit switch L.LS–7A (described previously) and a pair of normally open relay contacts L.CR–7 and L.CR–11. Line 41 has a control relay L.CR–12 connected in series with a limit switch L.LS–12 which is tripped by the lateral platform of the Stacker (see FIGS. 5 and 6a for placement), and the circuit is completed by a reed switch L.RS–7. Reed switch L.RS–7 is controlled by a stacker electromagnet S.EM–2 which prevents the pallet dollys from moving outwardly if the stacker program calls for a deposit mode with a pick-up from the left. Line 43 contains a solenoid coil L.SOL–8 which has connected in series with it, an emergency stop switch LS–1 which is normally closed and upon opening, de-energizes the coil of solenoid L.SOL–8. The solenoid coil mechanically opens valve 437 when energized and closes valve 437 when de-energized to shut off the compressed air. Line 44 also contains a solenoid coil L.SOL–9 which is connected in series with a normally closed relay contact L.CR–22 and a normally open limit switch L.LS–13 that is closed by positioning arm 806 (FIG. 6b). Solenoid coil SOL–9 controls valve 810 to allow compressed air to reach positioning cylinder 812 through line 811. Line 45 contains a lamp L.LT–8 indicating the pallet dolly is "OUT," connected in series with a limit which L.LS–11A and the position of this switch was described previously. The circuit is completed by having a lamp L.LT–9 connected in line 46 to provide light for the photoelectric cell in detecting pallet loads which are higher than a predetermined height. Reference may be made to FIG. 3, for the placement of the photoelectric cells and their controlling lamps.

TRANSFER CART SERVO AND DRIVING CONTROL CIRCUIT

In FIG. 12a will be found the Transfer Cart Servo drive circuit. The circuit has power applied from the three phase source 906 which passes through a set of contactors 930 and is applied to a driving motor M–4. A power supply PS–400 is connected to lines L3 and N and the output is a direct current voltage of −15 volts on line 1 and a +15 volts on line 2, both voltages being with respect to a ground reference 498. Line 2 is connected to a control amplifier 931 through a pair of series connested normally open relay contacts CRS–402 and CRS–401 (line 7). Connected between the two contacts just mentioned is a normally closed relay contact CRS–402 (line 8) which is connected to line 1 of power supply PS–400. Connected between the input to control amplifier 931 and ground is a normally closed relay contact CRS–401. A summing amplifier SA–400 has its input connected to the output of control amplifier 931 through a normally closed relay contact CRS–403 and a pair of series connected contacts CRS–404 and CRS–401 which are normally open. The circuit just described is the "Coarse" control circuit and the signals are taken from power supply PS–400 and amplified by control amplifier 931 to provide a controlled voltage for summing amplifier SA–400. Control amplifier 931 is of a common type in which a signal is amplified and may be adjusted so that the magnitude thereof may be changed. Connected between contacts CRS–404 and CRS–401 in line 7, is another circuit connected to the +15 volt output of power supply 400 at line 3 by a series circuit having a normally open relay contact CRS–405 connected thereto, a resistor R–402 connected in series, and a normally closed relay contact CRS–404 completing the circuit. Another normally closed relay contact CRS–405 in line 4 is connected between the relay contact CRS–405 and resistor 402 in line 3. This circuit lines (3 and 4) provide a manual signal for driving summing amplifier SA–400 when the system is operated in a "Manual" mode of operation rather than an "Automatic" mode of operation. The "Fine" control is provided by a transducer LPT–401 which is connected between relay contacts CRS–403 and CRS–404 in line 7 by a series circuit having a resistor R–410 connected to a normally open relay contact CRS–403. Linear position transducer LPT–401 is shown in a typical mode of operation sensing magnetic strip 497 (FIG. 29). Linear position transducer LPT–401 is of the type that makes use of the "Hall effect" in detecting magnetic material and a more complete description may be had of this transducer by reference to a co-pending application entitled "Transducer" filed in the name of William B. Walton, Ser. No. 514,556, filed on Dec. 17, 1965 and now U.S. Patent No. 3,419,798, and assigned to the same assignee.

The output of summing amplifier SA–400 is connected to a driving amplifier DA–400 which controls the excitation to a generator field GF–400 of a generator G–400. Armature A–1 of generator G–400 is connected to ground and a voltage divider is formed between armature A–1 and A–2 by a pair of resistors R–408 and R–407 connected in series. Connected between resistors R–407 and R–408 are a pair of circuits, the first of which is connected to the input of summing amplifier SA–400 through a resistor R–406 and the second of which is connected to the input of summing amplifier SA–400 through a resistor 414 and a normally closed relay contact CRS–401. Connected to the junction of resistor R–414 and relay contacts CRS–401 is a resistor R–404. A feedback circuit is also connected from the output to the input of summing amplifier SA–400 through a resistor R–415 in line 6. A tachometer generator TG–400 has one of its terminals connected to ground and the other terminal is connected to the input of summing amplifier SA–400 through a circuit formed from a pair of resistors R–405 and R–412 connected to each other in series on line 3 with another resistor R–413 connected to ground at the junction of the two resistors just mentioned. This circuit forms a rate feedback circuit to provide a positive control for generator G–400 in driving a motor M–400 that is coupled to a tachometer generator TG–400 in driving relationship by belt 413 as previously described. The circuit is completed by connecting one of the armature terminals of motor M–400 A–1 to ground and having a series circuit connected to the other armature A–2 formed of a resistor R–409, another resistor R–409A and normally closed relay contacts CRSM–400. Connected between armature A–2 of generator G–400 and armature A–2 of motor M–400, is an overload device OL–400 and a normally open relay contact CRSM–400.

FIG. 12c shows the excitation circuits in which an exciter power supply EX–400 is connected to lines L1, L2, L3 and N to provide a direct current voltage of 325 volts which is connected to a generator series circuit formed by a variable resistor RG–400, a fixed resistor RG–401 and a generator field GF–401. Connected in parallel therewith, is a motor excitation circuit (line 20) formed of the series connections of a variable resistor RM–400, a fixed resistor RM–401 and a motor field MF–401.

FIG. 12b shows the servo control elements in which a power supply PS–401 is connected to input lines L3 and N to provide a 24 volt direct current output. Connected between the output terminals, at line 18, is a normally open relay contact CRSM–400 connected in series with a standby-run control relay CRS–401. In line 19, control relay CR–6 has a normally open contact connected in series with a direction control relay CRS–402. Control relay CRS–402 is enabled to move the Transfer Cart to the right. In line 20, control relay CR–8 has a normally open contact connected in series with a coarse-fine control relay CRS–403 which is enabled in the "Fine" mode of operation. In line 21, a pair of switch contacts 2A of switch SW–400 are normally closed (in the Automatic mode of operation) and are connected to an automatic-manual control relay CRS–404. Relay CRS–404 is enabled in the automatic position as shown. Line 22 has another section 2B of switch SW–400 having a pair of contacts normally open connected in series with a direction switch SW–401 which has a pair of contacts in section 1B that are normally open in the automatic mode and the circuit is completed by having a manual direction control relay CRS–405 connected thereto. In the Manual mode of operation, switch SW–400 has section 2B closed and thus when switch SW–401 is in the "Right" position, the relay is enabled causing the Transfer Cart to move to the right.

A transformer 499 is connected to lines L3 and N to provide an alternating voltage at the transformer output. In line 26, a pair of normally open contacts of switch section 1A of switch SW–400 is connected to a pair of normally open contacts 1A of switch SW–401 which is connected in series with a normally closed contact of overload OL–400 and the series circuit is completed upon being connected to a motor control contactor relay CRSM–400. Connected across relay CRSM–400, is a back to back diode VS–400 to control current surges. Line 27 is a series circuit in parallel with sections 1A of switches SW–400 and SW–401 in line 26 and includes a pair of normally closed contacts of a switch section 1B of switch SW–400 connected to a normally open contact of control relay CR–2. It will be noted that switch SW–400 has a switch section in line 2 of FIG. 11A. As shown in line 26, when switch SW–401 is closed, in either the left or right direction, switch section 1A is closed. Also, the normally closed contact for overload OL–400 in line 26 is controlled by the thermal overload in line 5 of FIG. 12A.

Figure 19:
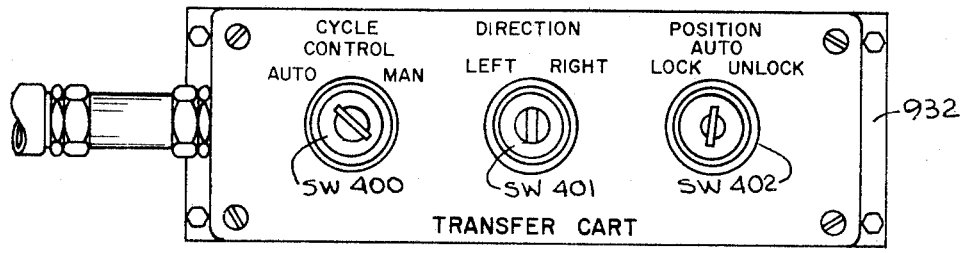
FIG. 19 is a front view of the transfer cart manual drive control plane.

FIG. 19 shows a control box 932 which houses switches SW–400, SW–401, and SW–402 to provide the proper manual mode of operation by the operator from the platform 410 (FIG. 1).

TRANSFER CART LOGIC CHART

Figure 23B:
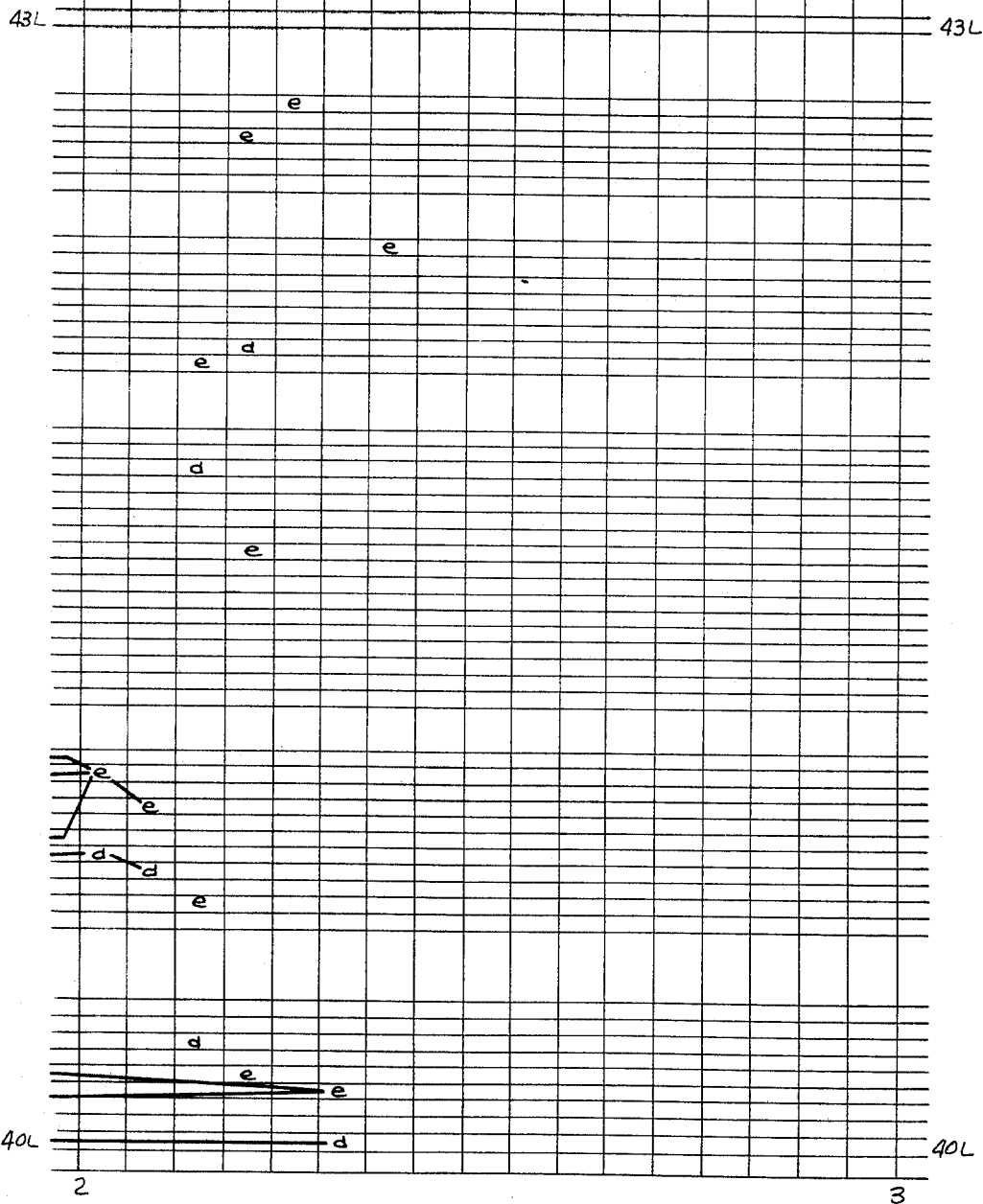
Figure 23C:
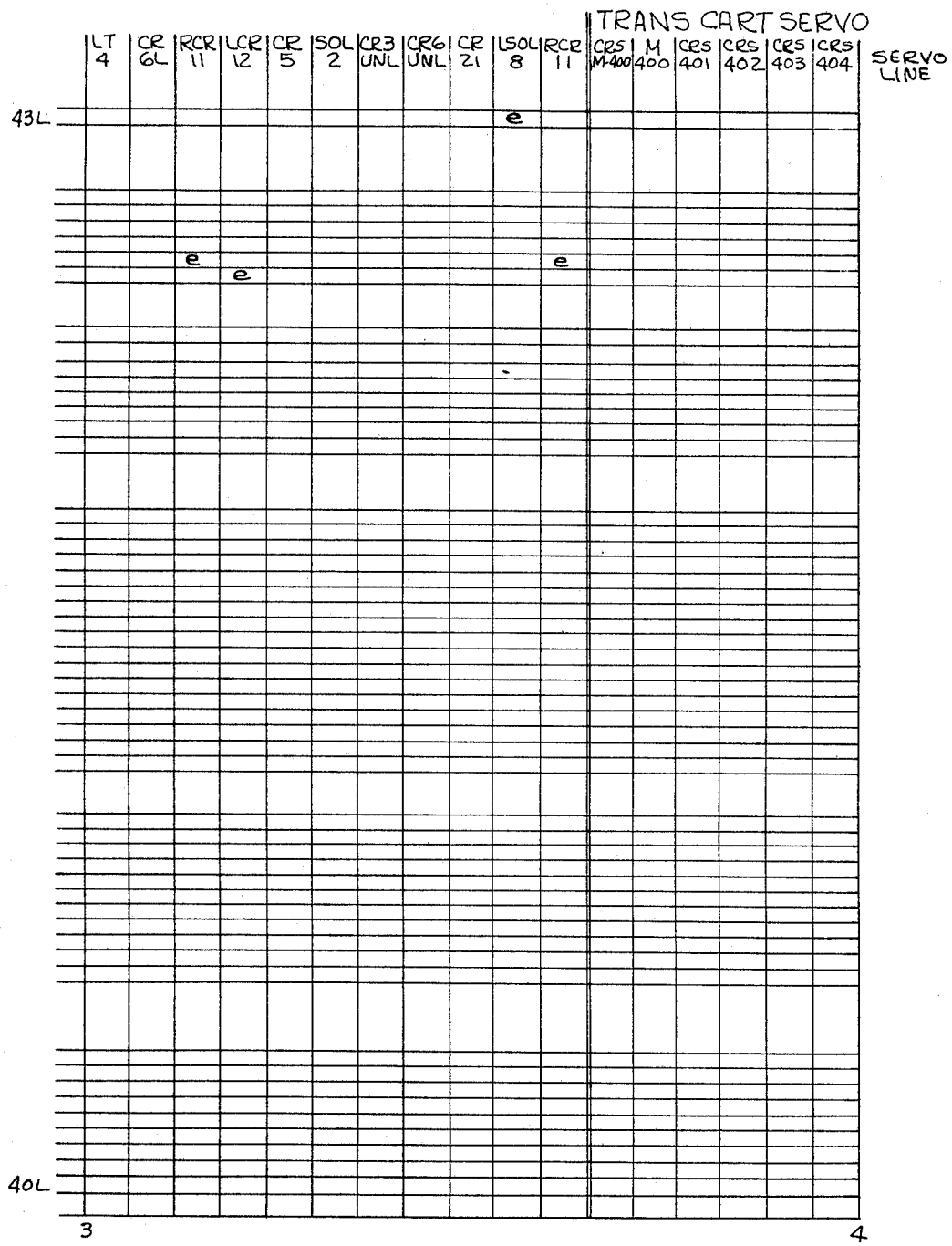
Figure 23D:
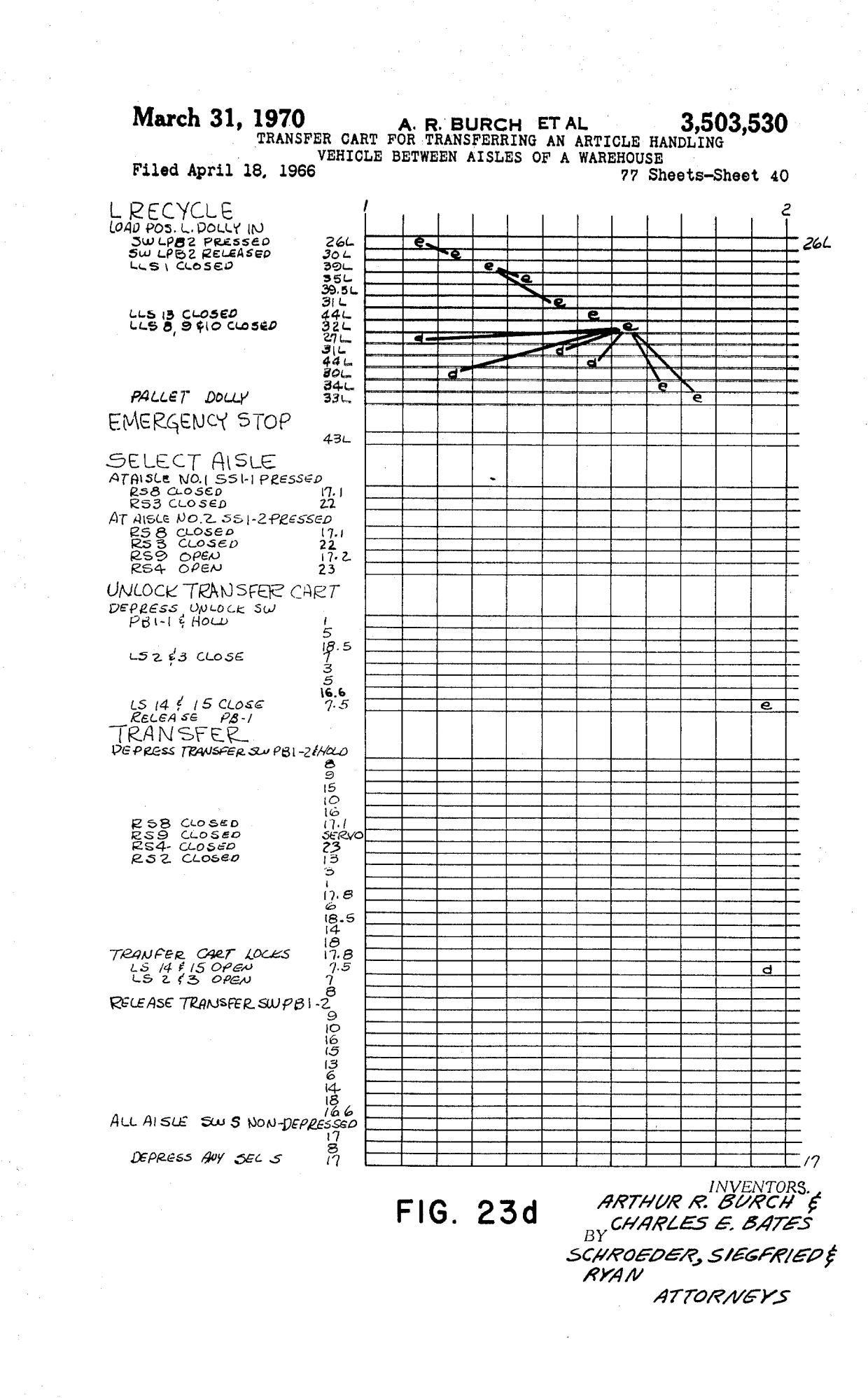
Figure 23E:
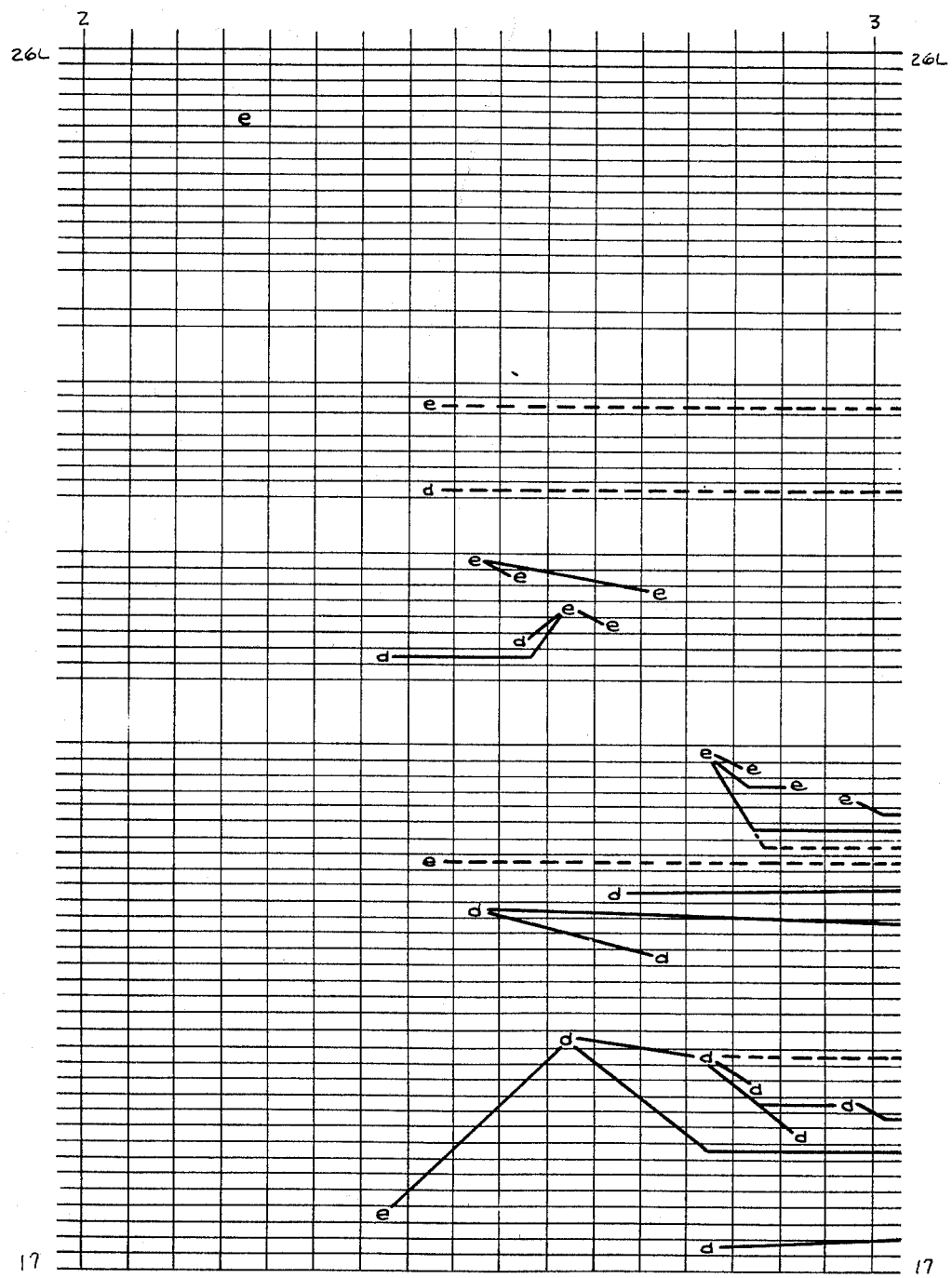
Figure 23F:
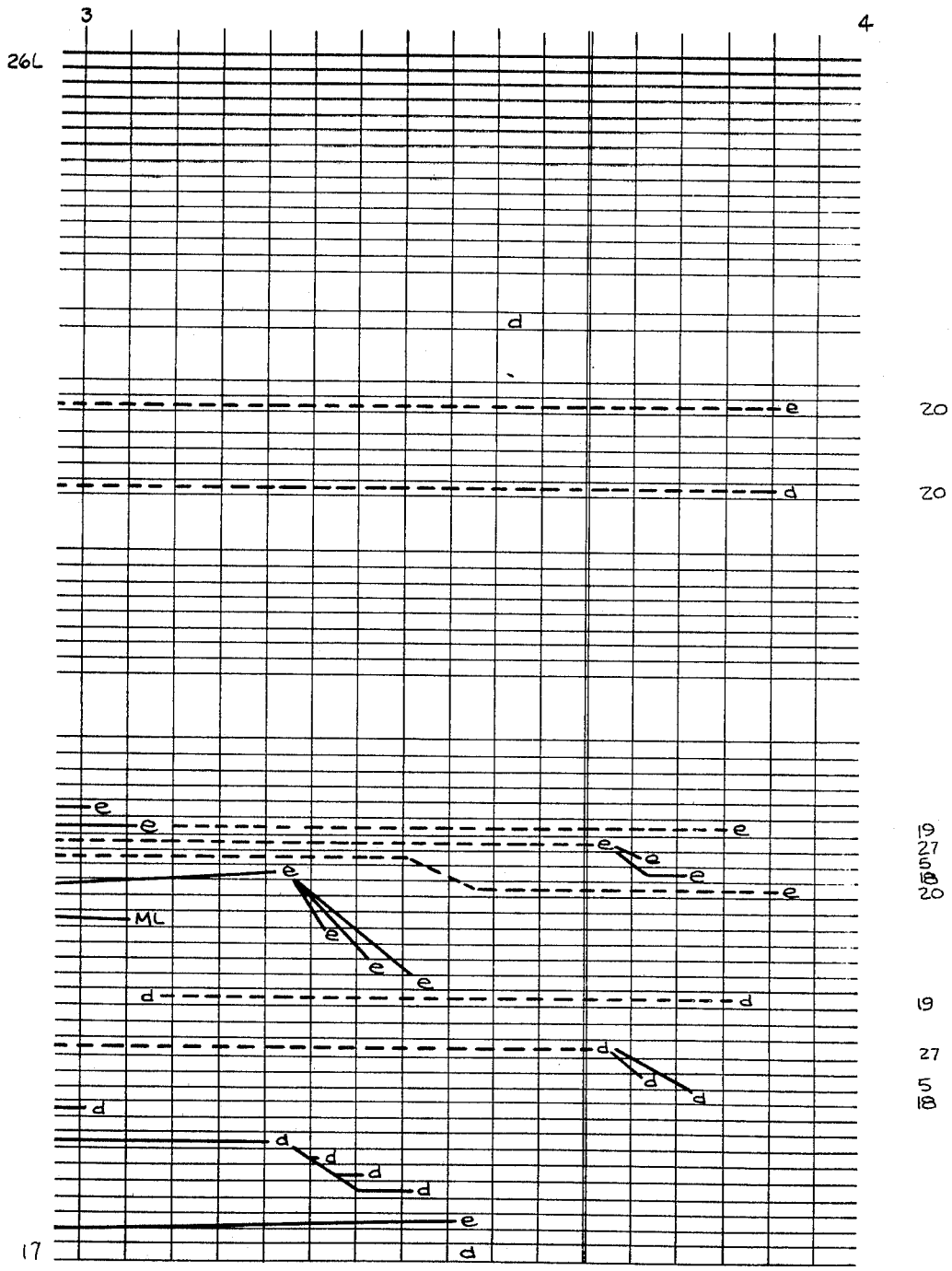

In FIG. 23a through 23f there is shown a logic chart for the Transfer Cart and the arrangement of FIGS. 23a through 23f is shown in FIG. 34d. The column on the left hand side indicates the mode of operation taking place and the heading at the top of the chart shows the different elements which are energized or de-energized in the circuit. The letter "e" is used to designate an energized condition, the letter "d" is used to designate a de-energized condition, and the letters "ML" are used to designate a mechanically latched condition of the relays. Since the "MODE" of operation is on the left hand side of the chart extending downwardly, and since the events which take place occur in a sequence, the vertical ordinate is also a time ordinate. FIG. 23a shows the mode of operation in which a pallet is picked up and the pallet dolly retracts bringing the load to the correct position on the load station where the positioning cylinders position the pallet for a pickup by the Stacker.

FIG. 23a also shows what takes place when a load is too high and that mode of operation takes place after the left limit switch L.LS–7A is opened.

Another mode of operation entitled "NO LOAD" is shown where for some reason it is not desirable to deposit a load on the pallet dolly after being extended and it is withdrawn.

At the top of FIG. 23d, a "Recycle" mode is shown where it may be found that the pallet dolly is not properly positioned and it is desirable to re-position the pallet dolly at the load station.

Immediately below the Recycle mode of operation there is the Emergency Stop mode of operation which is a relatively simple mode.

The next part of the chart is directed to the "Transfer" mode of operation and is concerned with properly selecting an aisle for transfer and transferring the transfer cart. The example given is a transfer from aisle No. 1 to aisle No. 2.

The last four lines of the chart are devoted to the situation where the aisle transfer switches SS–1 are prevented from being in an undepressed state and thus setting up an ambiguous Transfer Cart destination.

The numbers on the left side of the chart indicate the particular lines referred to in the Transfer Cart logic as found in FIGS. 11a through 11d and 12a through 12c.

A thorough explanation of the operation of the logic circuits using the chart just described is to be found later herein under a section entitled TRANSFER CART OPERATION.

THE STACKER

The Stacker 100 is shown in FIGS. 13 and 14 in more detail than previously described. To make identification of the parts easier, the Stacker 100 will be divided into a lower U-shaped section 112 with an intermediate section 113 lying immediately above control panel 106 and another cabinet portion 114 to the front (looking down the aisle) of intermediate section 113 and a rear upper section 115 and a front upper section 116.

Figure 16:
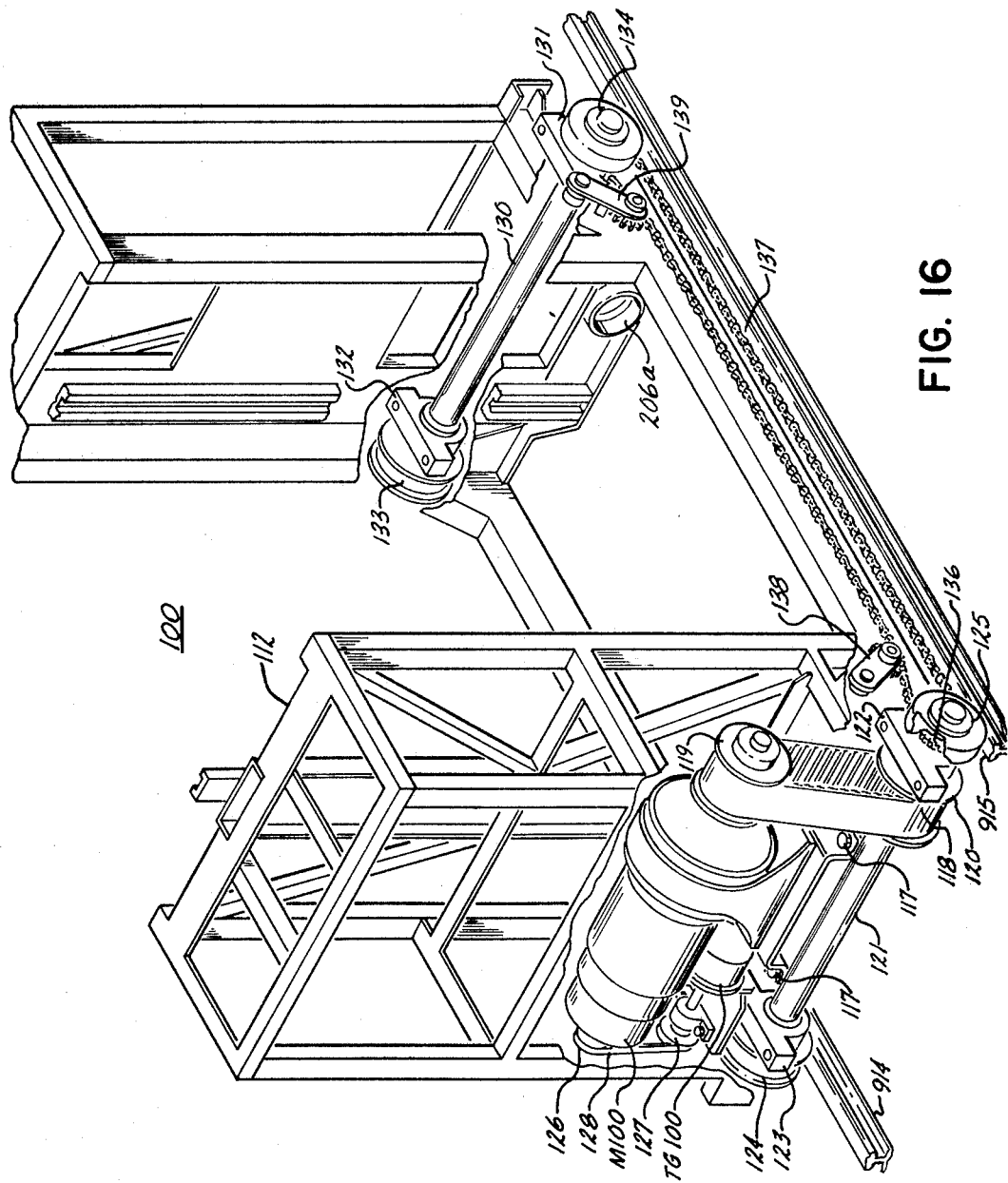
FIG. 16 is a partial isometric view of the stacker longitudinal drive mechanism.

The lower U-shaped section contains the driving mechanisms and reference is made particularly to FIG. 16 which shows the lower structural U-shaped section 112 with portions broken away to show the longitudinal drive mechanism. For purposes of clarity, reference to the Stacker will include references to a forward and rearward section wherein the rearward section is the one closest to the operator and the forward section is the one most forward or furtherest from the operator when looking down aisle 907 (aisle No. 1 as determined by the Transfer Cart). A longitudinal drive motor M-100 is secured by suitable means such as bolts 117 to the rearward and lowermost section of structural member 112. The output of motor M-100 is transferred to a timing belt 118 through a pulley 119 connected to the motor shaft. Timing belt 118 engages another pulley 120 which is secured to a shaft 121 journalled in a pair of bearings 122 and 123 at the right and left side respectively of structural section 112. A flanged driving wheel 124 is connected to shaft 121 on the left side and engages rail 914 while on the right hand side, a wheel 125 engages rail 915. A tachometer generator TG-100 is secured to the structural mechanism 112 under motor M-100 and is connected to motor M-100 through a pulley 126 on the end of the motor shaft and another pulley 127 on the tachometer generator shaft through a belt 128.

On the forward end of structural member 112, is a shaft 130 journalled in a pair of bearings 131 and 132 which are connected respectively to the right and left portions of structural frame 112. Shaft 130 is connected to a flanged driving wheel 133 on the left side and to another wheel 134 on the right side. Flanged wheel 133 engages rail 914 and wheel 134 engages rail 915. Shaft 130 is drivingly connected to shaft 121 through a pair of sprockets 135 and 136 respectively, having a driving chain 137 engaging the sprockets (see FIG. 15). A pair of chain idlers 138 and 139 engage chain 137 to keep the chain tight and in a driving relationship.

In order to control the position of the Stacker longitudinally, a coincidence circuit is established which will be described in more detail later in a circuit using reed switches and transducers to determine the destination of the Stacker. Situated at the top of the Stacker (see FIGS. 27 and 25), is a crossbar 140 which is connected to the forward upper structural section 116 of the Stacker. A channel member 141 is secured to cross members 103 and 140 to provide a mounting member for a longitudinal reed switch assembly 142. Reed switch assembly 142 comprises a cross member 143 which is bolted to channel 141 and has a pair of channel members 144 and 145 secured thereto which are parallel to the channel 141, that is, they extend longitudinally with respect to the Stacker. Channel 145 carries a pair of wheels 146 and 147 having a V-shaped groove formed therein and which are rotatably secured to channel member 145, the wheels being mounted on the outside edges of the channel member 145. Secured to the outside portion of channel member 144, are another pair of wheels 148 and 149 having a V-shaped groove formed therein which are mounted in the same manner as wheels 146 and 147 just described. A pair of V-shaped rails 150 and 151 form a guide for reed switch assembly 142 so that the reed switch assembly is properly aligned as it is moved longitudinally down the aisle by Stacker 100. Secured between channel members 144 and 145, is an insulated member 153 carried above crossbar 143 to which is secured the longitudinal reed switches. The reed switches described herein are of the type having normally open contacts and when brought into a magnetic field, the contacts close. Upon reaching a predetermined distance between the switches and magnetic elements the spring tension in the switches overcomes the magnetic field and the switches open. As seen in FIG. 25, and starting on the right hand side, there are secured thereto thirteen reed switches laterally spaced from each other and identified as read switches RS-24, RS28-0, RS28-1, RS28-2, RS28-3, RS28-4, RS28-5, RS28-6, RS28-7, RS28-8, RS28-9, RS28-00, and RS28-10.

The switches just described are shown schematically in FIG. 31 where their accompanying magnetic actuation elements or magnetic strips are shown, the magnetic strips being of the same type as described previously for cooperation with the Transfer Cart reed switches. The bin number designations are shown in FIG. 31 with the appropriate magnetic element associated therewith which designates a particular bin number and controls a particular reed switch associated with that bin number. A magnetic strip 154 extends the length of bins numbered 3 through 19 and is used to actuate reed switch RS-24. A more detailed explanation of this switch will be given later but it is used in a safety circuit for the longitudinal drive mechanism. Another magnetic strip 155 extends across the top of the Transfer Cart to designate the "HOME" station or zero bin position. Nine magnetic strips identifying bins 1 through 9 are secured overhead in aisle 907 and are identified as magnetic strips 156 through 164 respectively. Magnetic strips 156 through 164 actuate reed switches RS28-1 through RS28-9 respectively. To remove ambiguity in the switching circuits, another strip 165 extends between bins 1 through 9 and a portion extends overhead in the Transfer Cart to actuate reed switch RS28-00, and when used with the "units" switches, identifies longitudinal stations 0 through 9. As shown in FIG. 31, reed switches RS28-00 and RS28-0 are closed thus indicating that the Stacker is in the "HOME" position, that is, on the Transfer Cart. Ten other magnetic strips 166 through 175 identify bins 10 through 19 respectively and cause switches RS28-0 through RS28-9 to be closed when the reed switches pass adjacent to the magnetic strips. In order to prevent ambiguity with bins 0 through 9, another magnetic strip 176 lies in front of bins 10 through 19 and actuates reed switch RS28-10 to indicate that the bins being detected are "tens" numbers 10 through 19 rather than 0 through 9.

Upon the reed switches detecting one of the magnetic strips, the longitudinal control of the Stacker is changed from a Coarse mode of operation to a Fine mode of operation and upon doing so, the sensing device is also changed. A pair of transducers, similar to LPT-401, described previously, are found on the left and right sides of the Stacker as the operator views control panel 106 and they are designated LPT-101 and LPT-102. A magnetic strip 177 (FIG. 29) is shown secured to the right side of the Transfer Cart central section 431 and with its concave shape extending longitudinally down the aisle, the null occurs in the center thereof and will be sensed by Transducer LPT-102. On the other side of Stacker 100, Transducer LPT-101 will sense a similar concave magnetic shaped strip, one of which designated 178 is shown in FIG. 36 at the base of each of the bin columns. It will of course be understood that there is such a magnetic strip for which both transducers LPT-101 and LPT-102 may sense a null at each bin column on both the left and right side of the aisles.

Figure 17:
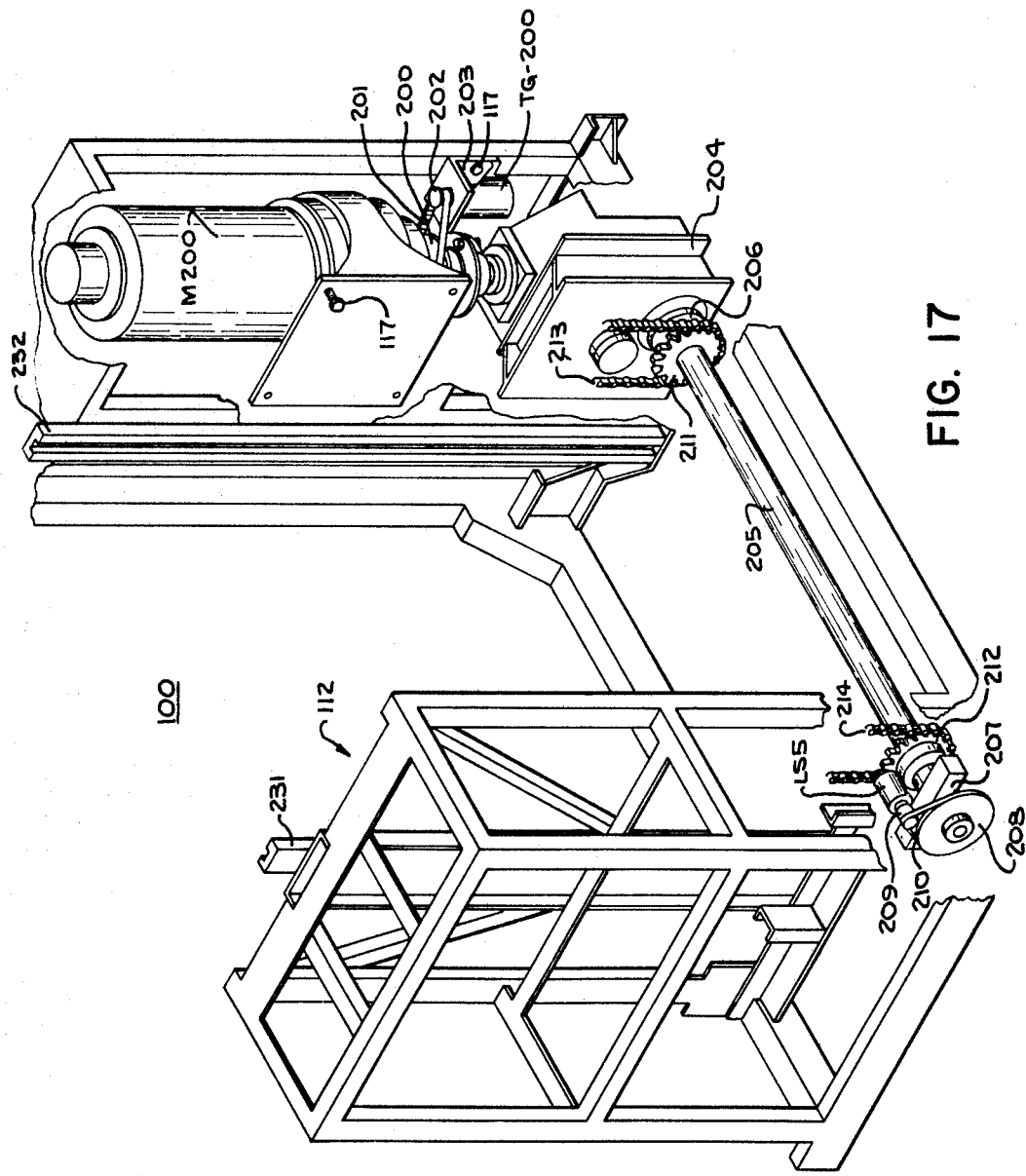
FIG. 17 is a partial isometric view of the stacker ver- drive control panel.

FIG. 17 discloses the vertical drive mechanism in which there is located a vertical drive motor M-200 in the forward uppermost portion of structural section 112, the motor being secured to the frame by suitable means such as bolts 117. Motor M-200 is coupled through its shaft to a pulley 200 which drives a tachometer generator TG-200 through a belt 201 and pulley 202 connected to the tachometer generator shaft. Tachometer generator TG-200 is secured to structural frame member 112 by a bracket 203 and suitable means such as bolts 117. The shaft of vertical drive motor M-200 is connected to a right angled gear box 204 which has a shaft 205 connected thereto which is journalled in a pair of bearings 206 and 207. Bearing 206 fits in a bearing bore 206a as found in FIG. 16. Secured to the end of shaft 205 is a pulley 208 which drives a centrifical overspeed switch LS-5 that has a pulley 209 connected thereto over which a belt 210 passes that also engages pulley 208 to provide a rotational motion to the shaft of overspeed switch LS-5.

The centrifical switch LS–5 has a circuit breaking element which opens when the switch reaches a predetermined speed, and may be of the type manufactured by Synchro-Start Products, Inc., Skokie, Ill., one such device being model No. GSAN. Secured to shaft 205, is a pair of sprockets 211 and 212 over which pass a pair of chains 213 and 214 respectively. Chain 214 is fastened to a lug 215 (FIG. 18) forming a part of a rearward side channel 216 of an elevator 217, by suitable means such as a nut and bolt 218. The most inward portion of chain 214 then passes upwardly from under sprocket 212 where it extends to the uppermost portion of the Stacker.

At the top of the Stacker (FIG. 27) channel 103 is connected across upper section 115 of the Stacker and channel member 140 is connected to upper structural frame 116. Secured to cross member 140 are current collectors 107 through 111 and secured to cross member 103 are current collectors 107A through 111A. A shaft 219 is journalled in a pair of bearings 220 and 221 that are secured to cross members 103 and 140 respectively. Secured on shaft 219, adjacent cross member 103, is a sprocket 222, and another sprocket 223 is secured to shaft 219 adjacent cross member 140. Chain 214 is passed over the top of sprocket 222 and downwardly along the center line of the Stacker (FIG. 15) and is connected to another lug 224 secured to an upper plate 225 above rearward side channel 216, by suitable means such as a nut and bolt 226. In a similar manner, chain 213 is secured to a lug 227 which is secured to a forward side channel 228 by suitable means such as welding in the manner of securing lug 215 to rearward side channel 216 (see FIG. 15). Chain 213 is passed over the top of sprocket 223 and downwardly along the center line of the Stacker and is connected to another lug 229 secured to an upper plate 230 of elevator 217 above forward side channel 228, by suitable means such as a nut and bolt 226 A pair of steel rails 231 and 232 are secured vertically by suitable means such as welding or bolts to the rearward and forward sections respectively of the U-shaped frame member 112. Channels 231 and 232 are aligned vertically along a longitudinal center line of the Stacker and extend from the bottom of the Stacker to the top. To keep the elevator 217 properly aligned while moving vertically, four rollers 233, 234, 235 and 236 (FIG. 18) are rotatably secured to plate 225 to engage channel 231. Another plate 237 is secured to side channel 216 by suitable means such as welding and contains four rollers 238, 239, 240 and 241 rotatably secured thereto which also engage channel 231. The forward end of elevator 217 has four rollers, secured to a plate at the top portion in the same manner as rollers 233 through 236 are secured to plate 225, and a bottom plate like p'ate 237 that has four rollers like rollers 238 through 241 secured thereto. The latter mentioned eight rollers work in cooperation with channel 232.

Secured to the forward side channel 228 and a bracket 242 above channel 228, is a vertical channel like member 243 which has secured therein, two magnetic strips 244 and 245 (see FIG. 33). Magnetic strip 244 cooperates with a pair of reed switches RS23–1 and RS23–2 located in a position to provide a means of indicating that the elevator is vertically aligned with rows or bins at levels No. 1 and No. 2 respectively. Magnetic strip 245 cooperates with five reed switches RS29–1 through RS29–5, for properly locating the elevator opposite bin level No. 1 through 5. In like manner, magnetic elements 246, 247, and 248 cooperate with three reed switches RS29–3, RS29–4 and RS29–5 to properly align the elevator at the third, fourth and fifth rows or levels respectively.

Figure 18:
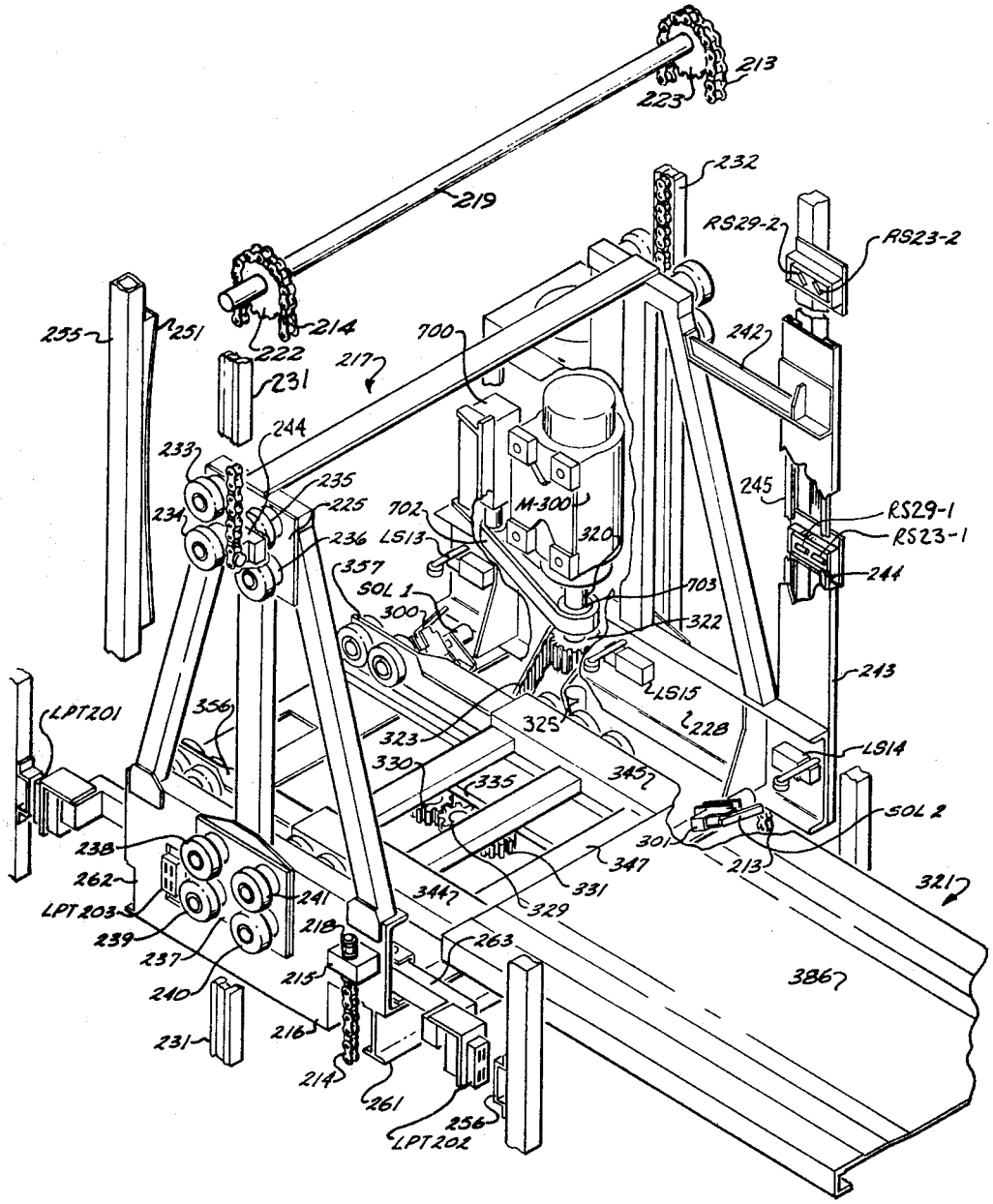
FIG. 18 is an isometric view of the elevator platform showing the lateral drive mechanism.

Once one of the vertical reed switches RS29–1 through RS29–5 is closed, the control of the elevator is changed to a "Fine" mode of operation. The fine mode of operation is accomplished by using a linear position transducer LPT–203 which is similar to the linear position transducers described previously and works in communication with five magnetic strips 250, 251, 252, 253, and 254 aligned vertically one above the other, which are shown diagrammatically in FIG. 27 to indicate the different bin levels which correspond respectively with bins 1 through 5. The magnetic elements are secured to a vertical mast 255 on the Stacker (as shown in FIG. 18). Once vertical and longitudinal linear position transducers LPT–203 and LPT–102 reach a null, the control of elevator 217 is shifted to a "Superfine" mode of operation in which a pair of transducers LPT–201 and LPT–202 are used. As shown in FIG. 29, five magnetic elements 256, 257, 258, 259 and 260 are shown which are located respectively on the corner post for bins 901R through 905R and are also aligned vertically one above the other. That is, the magnetic elements face inwardly towards aisle 907 so that they are detectable by linear position transducer LPT–202. In a similar manner, magnetic elements are located at each bin on both the left and right hand side to indicate the vertical position of each bin with respect to the elevator.

Figure 22:
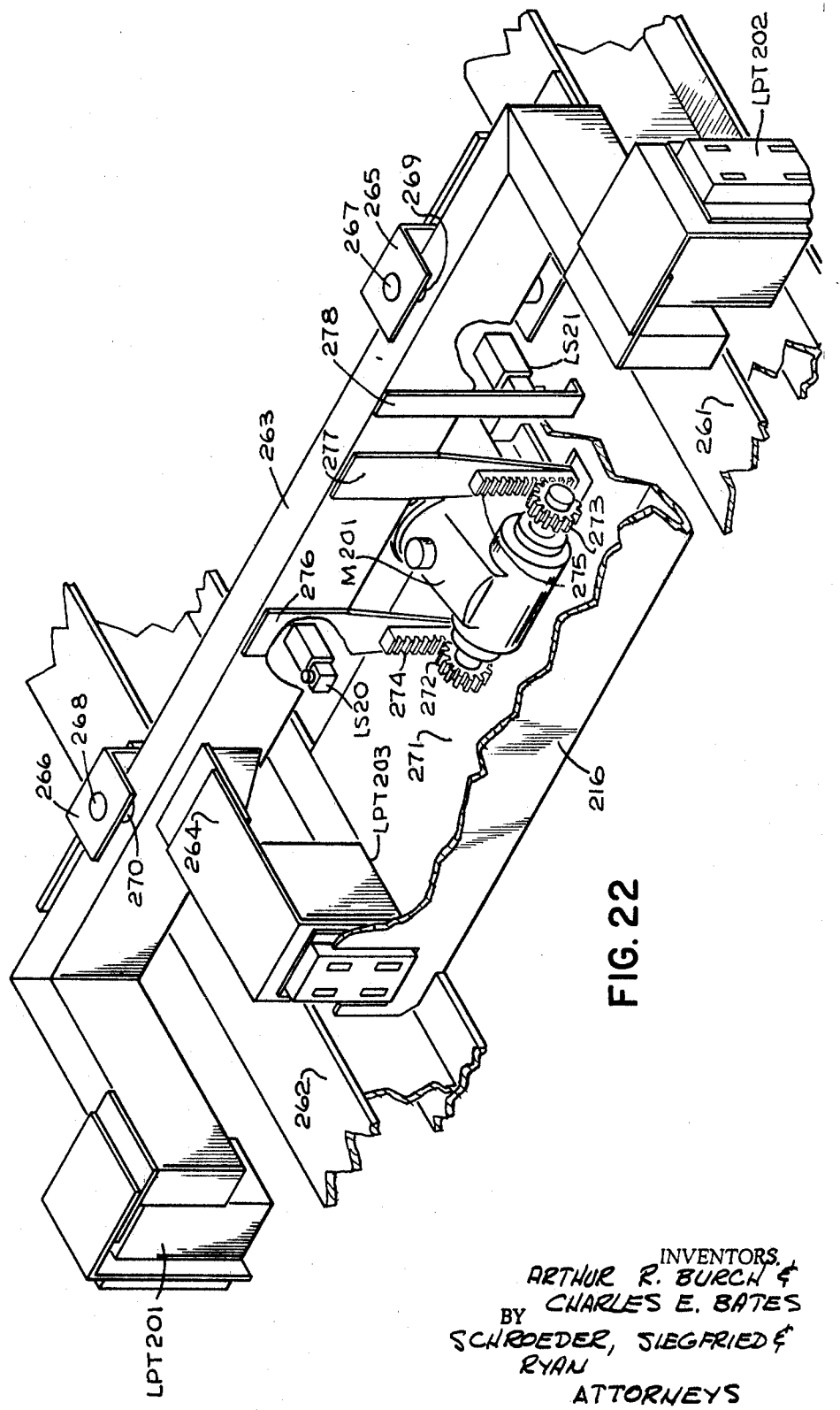
FIG. 22 is a partial isometric view of the transducer shifter bar showing the transducers and driving motor.

Secured to the lower right side of channels 216 and 228 is an I-beam 261 and secured to the lower left side of channel members 216 and 228 is another I-beam 262 (FIGS. 18 and 22). Situated above the two I-beams 261 and 262, is a transducer shifter bar 263 that has a pair of right angle projections projecting rearwardly which hold in place, linear position transducers LPT–201 and LPT–202. Secured to transducer shifter bar 263, is a bracket 264 which holds in place a linear position transducer LPT–203 that projects through an opening in channel 216. Transducer shifter bar 263 is secured to I-beams 261 and 262 by a pair of C shaped brackets 265 and 266 which have a pair of vertically oriented pins 267 and 268 passing through a pair of holes 269 and 270 that are formed in transducer shifter member 263. A bottom panel member 271 is secured between I-beams 261 and 262 and the edge of channel member 216 to form a "floor" beneath the transducer shifter bar 263. Secured to bottom panel member 271 is a transducer shifter bar motor M–201 which has a pair of gears 272 and 273 secured to an output shaft which extends to the left and right. A pair of racks 274 and 275 engage gears 272 and 273 respectively. Rack 274 is secured to an elongated plate 276 which is secured to transducer bar 263 by suitable means such as welding and another elongated plate 277 is secured to transducer shifter bar 263 by suitable means such as welding which has rack 275 secured thereto. Thus it will be seen that upon rotation of gears 272 and 273, transducer shifter bar 263 and the transducers secured thereto will be moved in a vertical direction depending upon the direction of rotation of gears 272 and 273. A limit switch LS–20 is positioned below transducer shifter bar 263 and comprises two sections forming limit switches LS20–1 and LS20–2 where limit switch LS20–1 is normally closed and limit switch LS20–2 is normally open. When the transducer shifter bar moves downwardly, limit switch LS20–1 is opened and limit switch LS20–2 is closed. Another limit switch LS–21 has two sections, LS21–1 which is normally closed and LS21–2 which is normally opened. A bracket 278 is secured to transducer shifter bar 263 and extends downwardly with a right angle end which engages limit switch LS–21 when the transducer shifter bar 263 is moved upwardly. The two limit switches, LS–20 and LS–21 form the lower and the upper limit switches which limit the travel of the transducer shifter bar 263. As will be seen later, the transducer shifter bar is moved vertically a sufficient amount to allow a pallet to be deposited in a bin or withdrawn from a bin by causing elevator drive motor M–200 to move the elevator the same distance the vertical transducer shifter bar moves, but in the opposite direction.

Once the elevator is raised to the proper bin height to deposit the pallet or is at the "HOME" station ready to deposit a pallet on one of the load stations on the Transfer Cart, it is desirable, for obvious reasons, to probe or somehow make certain that the bin is unobstructed before attempting to deposit the load. A pair of obstruction sensing devices 300 and 301 (FIGS. 15, 26a and 26b) are provided and may be referred to as a left and right bin flipper respectively. Since bin flipper 301 is similar to bin flipper 300, with the exception of reversing the arrangement of the parts, it will not be necessary to describe the obstruction sensor 301 but only that of the left hand side will be explained. Reference is made to the left sensing unit 300 in FIG. 26a where a bracket 302 is secured to I-beam 262 by suitable means such as bolts 304 which pass through a bracket 305 that is formed as an extended arm having a U-shaped cross section. The principal driving element of sensor 300 is a solenoid SOL–1 and the principal driving element of sensor 301 is a solenoid SOL–2 (FIG. 20g). Bracket 305 has another portion formed therewith which has a depending part that secures a sleeve 306 in alignment with a plunger 307 of solenoid SOL–1. Secured to the end of plunger 307, is a rack 308 that engages a pinion gear 309. As plunger 307 and rack 308 move outwardly away from solenoid SOL–1, pinion gear 309 is rotated which in turn drives a secondary gear 310 and a channel like arm 312 which is of U-shaped cross section, both being secured to a shaft 311. Secured at one end and lying longitudinally within arm 312, is a leaf spring 313 which is held a fixed distance away from the base of member 312 by a spring 314 that is held in place by a pin 315 passing through the base of the U-shaped member 312 and leaf spring 313. As plunger 307 moves outwardly and causes arm 312 and leaf spring 313 to move counterclockwise about shaft 311, it will rotate through a 90° arc unless leaf spring 313 strikes a pallet or obstruction such as shown in FIG. 26a. Where an obstruction is encountered, leaf spring 313 depresses a switch arm of a switch SOL1–S2 indicating the bin is obstructed in some manner, If the bin is not obstructed, arm 312 and leaf spring 313 continue to rotate until the lower portion of member 312 engages a second switch SOL1–S1 indicating that the bin is empty. Once the solenoid SOL–1 is deenergized, a spring 316 bears against a washer 317 which is secured to shaft 307 and presses against another washer or bracket hub 318 on the side of bracket member 305. In other words, spring 316 is compressed when plunger 307 is moved outwardly and upon the solenoid coil being de-energized, the spring tension moves arm 312 and spring leaf 313 back to the position as shown in FIG. 26b and as found in FIG. 18. As mentioned previously, the right bin flipper 301 operates in identically the same manner as that for left flipper 300 and in place of switch SOL1–S2, flipper 301 has a switch SOL2–S2. In place of switch SOL1–S1, the right bin flipper has a switch SOL2–S1. The switches just described are found in the electrical circuit of FIG. 20g which will be described in more detail later.

LATERAL PLATFORM MECHANISM

Referring to FIGS. 18 and 28a through 28c, a motor M–300 having a shaft 320 provides the driving power for a lateral platform 321. Secured to shaft 320 is a pulley 322 that has a timing belt 323 engaged therewith that engages a driving pulley 324 and an idler pulley 325 keeps belt 323 under the proper tension. Rotating pulley 324 causes a shaft 326 secured thereto and journalled in a pair of bearings 327 and 328, to rotate a pinion gear 329. Pinion gear 329 engages a pair of driving gears 330 and 331. Bearings 327 and 328 are mounted in a hub 332. The shaft for gear 330 passes through a hub 333 and the shaft for gear 331 passes through a hub 334. As gears 330 and 331 are rotated, they engage a rack 335 which is secured to an inverted U-shaped channel member 336 which guides rack 335 so that it moves laterally without binding. Forming a reinforced floor, is a member 337 that is secured to I-beams 262 and 261 through suitable means such as welding and rotatably secured to member 337 are eight rollers, six of which are shown and designated 338, 339, 340, 341, 342 and 343 (FIG. 28a). It will be seen that rollers 338 through 343 engage the side of inverted U-shaped channel member 336 to properly guide it in a lateral motion. A pair of inverted U-shaped heavy duty channel members 344 and 345 have secured thereto a pair of laterally extending cross members 346 and 347. A pair of bearing blocks 348 and 349 are secured to cross members 346 and 347 on the right and left sides respectively as seen in FIG. 28a. Bearing block 348 is shown in more detail in FIG. 28a in which three gears 350, 351, and 352 are shown secured to three shafts 353, 354 and 355 respectively. Gears 352 and 350 are larger than gear 351 communicating therebetween to insure that both gears rotate at the same speed and to help prevent binding. In a similar manner, there are three gears on the left side of the platform which are secured to shafts 353, 354, and 355 and journalled in bearing block 349. Secured to reinforced panel 337, are a pair of I-beams 356 and 357 which are located on the left and right sides respectively as found in FIG. 28c. Also secured to member 337, is a pair of racks 358 and 359 which extend parallel and adjacent to I-beams 356 and 357 respectively. Rack 359 engages pinion gears 350 and 352 and on the left side, rack 358 engages the two corresponding pinion gears on the right side with gear 319 being shown engaging rack 358. Secured to I-beam 357, are sixteen rollers, eight on each side thereof, twelve of which are shown in FIG. 28a where four rollers 360, 361, 362, and 363 are rotatably secured on the inward side of I-beam 357 where the upper flanged portion is cut away and with two other rollers 364 and 365 being secured on the inward side of I-beam 357 at its right end. Opposite rollers 360 through 365 on the outward side of I-beam 357 are six rollers 366 through 371 which are rotatably secured to the I-beam. Two other rollers, 372 and 373 are shown in FIG. 28b at the end of I-beam 357 opposite that having roller 365. I-beam 356 has sixteen rollers secured thereto in the same manner just described for I-beam 357, two of such rollers 374 and 375 are shown secured on the outside and inside of I-beam 356 as found in FIG. 28c. Right angled sections are shown attached to channel members 344 and 345 which depend downwardly and under the rollers secured to the two I-beams but of course it will be understood that the channel members may be made in a single piece. Attached to the outside of channel member 345, are ten rollers, seven of which are shown in FIG. 28a where four rollers 376 through 379 are found opposite rollers 366 through 369 and two rollers 380 and 381 opposite rollers 370 and 371. Another roller 382 is secured to the outside of channel member 345 and is located towards the center of the elevator. In a similar manner, ten rollers are located on the outside of channel 344, a roller 383 being shown in FIG. 28c in the same manner as roller 381. Another pair of C shaped channels 384 and 385 engage the rollers on the outside of channel members 344 and 345 respectively. Secured to the top of channels 385 and 384, is a metal plate 386 which forms the load platform. Secured to platform 386 are a pair of racks 387 and 388 which engage pinion gears 319 and 352 respectively. It will be noted that channels 344 and 345 are not in communication or secured to plate 386 but are allowed to move freely with respect to platform 386. Therefore, as rack 335 is driven outwardly, channel member 336 is moved with the rack and causes the frame formed of cross members 346 and 347 which are connected to channel members 344 and 345 to also move outwardly. Since rack 359 is secured to the base or floor member 337, as bearing member 348 moves outwardly, pinion gears 352 and 350 engage rack 359 and thus transfer the translational and rotational motion to rack 388 thus causing the rack 388 and platform 386 which is carried therewith, to move twice the distance of the movement of members 345 and 344. It will of course be understood that racks 358 and 387 operate in the same manner with the pinion gears such as gear 319 to aid in moving platform 386 outwardly. By reversing the direction of rotation of shaft 326, the platform may be moved in the opposite direction.

FIG. 37 discloses a lateral drive transducer 700 which is connected to shaft 320 by a pulley 701 engaging a belt 702 that engages another pulley 703 secured to lateral motor drive shaft 320 (FIG. 18). The pulley 701 is secured to a shaft 704, the shaft being journalled in three bearings 705a, 706a and 707a of bearing blocks 705, 706, and 707 respectively. Secured to shaft 704, is a gear 708 which is in communication with another gear 709. Gear 709 is secured to a shaft 710 of a tachometer generator TG–300.

That portion of shaft 704 which lies between bearing blocks 706 and 707 has lead screw threads 711 formed thereon with a stop 712 connected towards bearing block 707 and another stop 713 fastened to threads 711 near bearing block 706. A lead screw follower 714 rides back and forth over lead screw 711 between stops 712 and 713. To prevent any backlash in the lead screw arrangement, a shaft 715 is slidably secured in bearing block 707 and fixed to lead screw follower 714 below lead screw 711. Encompassing shaft 715, is a spring 716 that keeps a compression force on lead screw follower 714 as the lead screw follower moves back and forth between stops 712 and 713. Secured to lead screw follower 714, is an arm 717 which has a right angle portion formed at the end thereof. A linear voltage differential transformer LVDT–301 is mounted adjacent and parallel to lead screw 711. The transducer may be of the type known as a Sanborn 7DCDT transducer manufactured by the Sanborn Company. The linear voltage differential transformer LVDT–301 works much like a variable resistor, providing a d.c. voltage output which is variable with a movable member (not shown) that is connected to arm 717 by a shaft 718. The voltage output of LVDT–301 varies with the lateral position of platform 386 as it is moved laterally.

Figure 15:
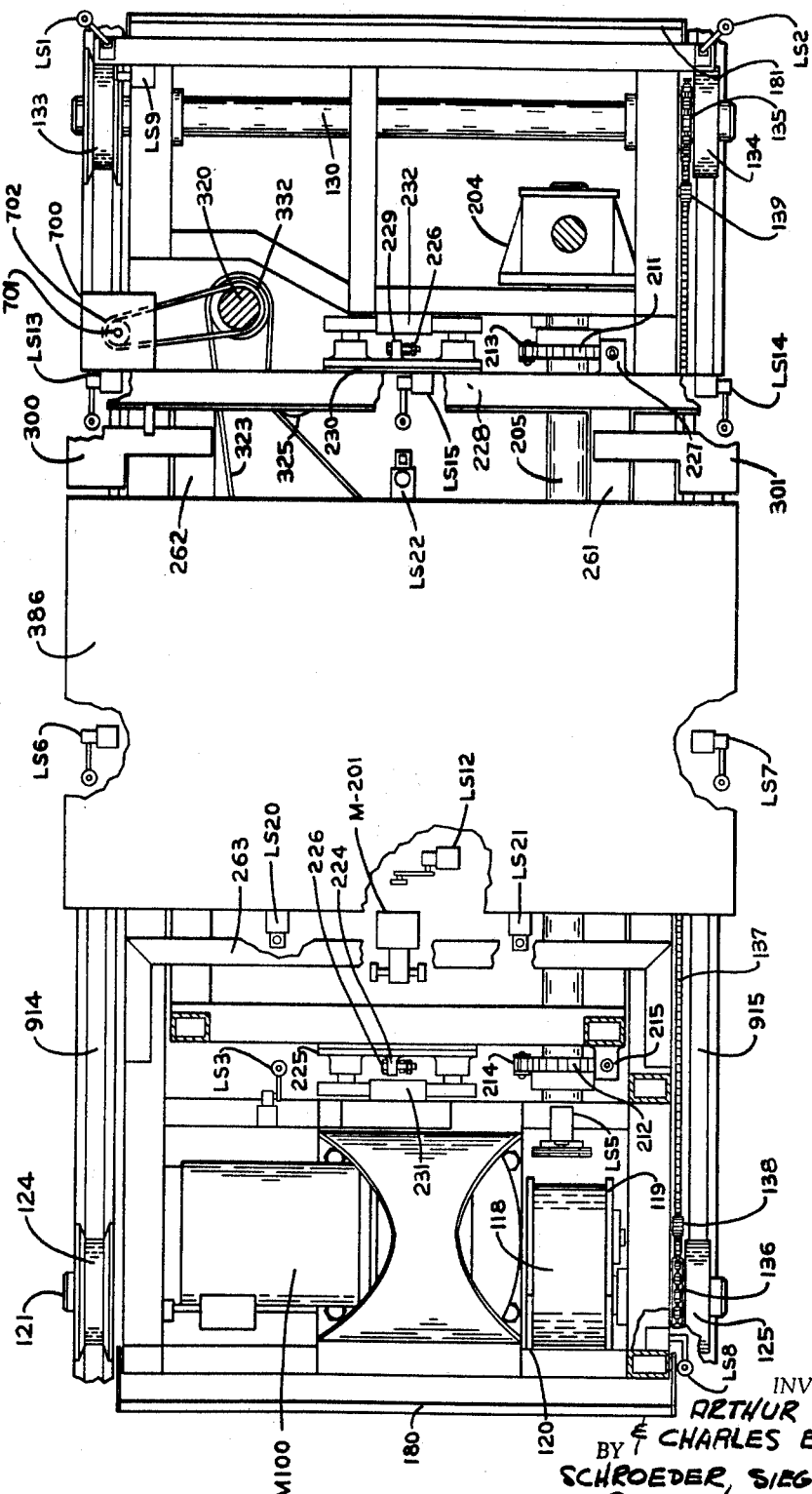
FIG. 15 is a sectional plan view of the stacker taken along lines 15—15 as seen in FIG. 14.

FIGS. 15 and 27 disclose a limit switch LS–1 that is secured to the left side of Stacker 100 and is used as a limit switch to stop the rearward motion of the Stacker if it attempts to travel beyond the "HOME" position on the Transfer Cart. Limit switch LS–2 is found on the right side of the Stacker and is a limit switch which is actuated when the Stacker attempts to travel beyond the forward end of the aisle. Limit switch LS–3 is located at the bottom of the Stacker and prevents downward overtravel of the elevator platform. Limit switch LS–4 is located at the upper part of the Stacker and prevents upward vertical overtravel of the elevator. Limit switch LS–6 is positioned below platform 386 and is tripped when platform 386 is driven in a manner which would attempt to place the platform beyond its normally extended position. In like manner, a limit switch LS–7 protects the platform 386 from extending too far to the right by actuating the limit switch. Limit switch LS–8 is connected to a rearward bumper bar 180 and is actuated by pushing bumper bar 180 while the Stacker is moving in the aisle. A forward bumper bar 181 controls a limit switch LS–9 and it works in the same manner as that described for limit switch LS–8 to protect personnel in the aisles while the Stacker is moving. The limit switches just mentioned along with overspeed limit switch LS–5 are connected in a safety circuit and should any of the switches which are connected in series, be opened, the Stacker will be stopped immediately. This will be more apparent from an examination of the circuit shown in FIG. 20a.

A limit switch LS–12 is located under the center portion of platform 386 and is actuated when lateral platform 386 is fully extended in either direction. Limit switch LS–12 has three sections, LS12–1 and LS12–3 being normally open with LS12–2 being normally closed (FIGS. 20e and 20g). Situated near bin obstruction transducer 300 (FIG. 26a), is a limit switch LS–13 which is normally closed and is located on the Stacker elevator in such a position that a pallet load of material in normal position will not actuate it. However, if the pallet is off center laterally or overhanging the edge of the elevator, the switch will be actuated and open the circuit. In a similar manner, a limit switch LS–14 is located adjacent obstruction transducer 301 and this switch is used in the same manner as that just described for limit switch LS–13. Another limit switch LS–15 is located near the forward center part of the elevator and is normally closed but located in such a position that a pallet load of material in normal position on the elevator will open the switch. In other words, when the platform 386 is empty, limit switch LS–15 should be closed. Another limit switch LS–22 is located near the center of platform 386 and the switch is normally open except when the platform is centered on the elevator.

Additionally, there are eight reed switches which are interconnected between the Transfer Cart 400 and Stacker 100 to provide the proper electrical interlocks between the two pieces of equipment. In FIGS. 30a and 30b, there are shown three reed switches RSES, RS–17 and RS–16 which are located on the upper left side of Stacker 100 and on Transfer Cart 400, there are located three electromagnets EM–4, L.EM–1, L.EM–2 on the upper left side which energize respectively the three reed switches. Reed switch RSES is located in line 66 of the Stacker servo control circuit (FIG. 21d) and serves to prevent any movement of the driving motors on the Stacker when the position lock plungers 436 and 454 (FIGS. 9a and 9b) are withdrawn from engagement with the bins. Reed switch RS–17 is controlled by electromagnet L.EM–1 where the reed switch is normally open and is operated when a pallet on the left pallet dolly is in the proper position to be picked up by the Stacker. At all other times, the electromagnet is de-energized and the switch remains open. Reed switch RS–16 is closed by electromagnet L.EM–2 and is a normally open reed switch which is actuated to a closed position by a magnetic field from the electromagnet indicating that the left pallet dolly is in the "HOME" position. In a similar manner, a pair of reed switches RS–18 and RS–19 are located on the upper right side of Stacker 100 and the controlling electromagnets R.EM–2 and R.EM–1 are located in an opposed position on Transfer Cart 400. Reed switch RS–19 is closed by electromagnet R.EM–1 and is operated in the same manner as reed switch RS–17 with the exception being that it pertains to the right pallet dolly rather than the left pallet dolly. Reed switch RS–18 which is closed by electromagnet R.EM–2 is a reed switch operated by the right electromagnet when the right pallet dolly is in the "HOME" position and this switch is similar to reed switch RS–16. Additionally, there are three reed switches located on the Transfer Cart where a reed switch R.RS–7 is located on the central right side thereof along with another reed switch RS–1. On the left central part of the Transfer Cart, is another reed switch L.RS–7. These last three mentioned reed switches are controlled by electromagnets in the Stacker logic circuit and reed switch R.RS–7 is controlled by an electromagnet S.EM–3 and reed switch RS–1 is controlled by an electromagnet S.EM–1, both of which are on the right central part of Stacker 100. On the left central part of Stacker 100, is another electromagnet S.EM–2 which is used to control reed switch L.RS–7. Reed switch R.RS–7 must be closed to allow the right pallet dolly to move outwardly and this can only be accomplished in the automatic mode of operation at any time, except when the Stacker platform is to be extended. Reed switch L.RS–7 is actuated in the same manner. Reed switch RS–1 must be closed in order to allow the Transfer Cart to assume a standby condition and this can only occur when the Stacker is in the "HOME" position on the Transfer Cart.

STACKER LOGIC CIRCUIT

The Stacker logic circuit is shown in FIGS. 20a through 20i. As described previously, the numbers on the left hand side of the circuit designate the line between the conductors on the left and right side of the circuit and the numbers on the right side of the circuit designate the lines in which a particular relay has contacts, those numbers being underlined indicating that the contacts are normally closed whereas the other numbers indicate the relay contacts are normally opened. The 115 volt alternating voltage is applied to an emergency control circuit through wire W7 and lead 913 from the Transfer Cart. Wire W5 acts as the common lead for all of the alternating current relays and wire W4 acts as the common lead for all of the direct current operated relays. In line 2, the alternating voltage is applied to an emergency stop control relay CR–52 through a normally closed relay contact CR–53. Connected in parallel with contacts CR–53 are a pair of normally open relay contacts CR–40 and CR–53. Also connected in parallel with normally closed contacts CR–53 is a series circuit formed from limit switches LS–1, LS–2, LS–3, LS–4, LS–5, LS–6, LS–7, LS–8, and LS–9, all of which are normally closed, and a normally open relay contact CR–52 (line 3). Another normally open relay contact CR–1 is connected in parallel with limit switch LS–9. Control relay CR–52 acts as an emergency stop relay. In line 5, a transformer T–101 has power applied to its input and produces a 115 volt output voltage which has one lead connected to wire W5 and the other lead connected to a fuse FU–1. Fuse FU–1 is connected to a series circuit having a pair of normally open relay contacts CR–52 and CR–53 connected in parallel (line 7 and 8) which are connected to a control relay CR–53 that is connected to common lead W5. Control relay CR–53 is a logic enable relay and applies power for the alternating current line of the logic circuit. This is accomplished by having a pair of normally open relay contacts CR–53 connected in series with line W6 and fuse FU–1. Since the logic circuit employs both alternating current and direct current relays, a power supply is formed by connecting a bridge circuit formed of copper oxide rectifiers between wires W6 and W5 in the normal manner and taking the output from the other two terminals of the rectifier which has one terminal connected to common lead W4 with a pair of capacitors and a resistor forming a Pi filter circuit connected to the other terminal that has its output connected through a fuse FU–2 and applied to wire W2. Connected between wire W2 and W4 is a series circuit comprising nine relay contacts and a relay CR–1 (line 14). The series circuit comprises three normally closed relay contacts CR–40, CR–13 and CR–14 connected to a pair of normally closed null detector contacts CRSN–101 and CRSN–201 which are connected in series with a pair of normally closed relay contacts CR–5 and CR–3 that are connected in series with a pair of normally open relay contacts CR–39 and CR–20 all of which are connected to control relay CR–1. A lamp LT–1 indicating the power is "on," in line 15, is connected between leads W6 and W5 and power is applied through control relay contact CR–53 in line 7.

Figure 20B:
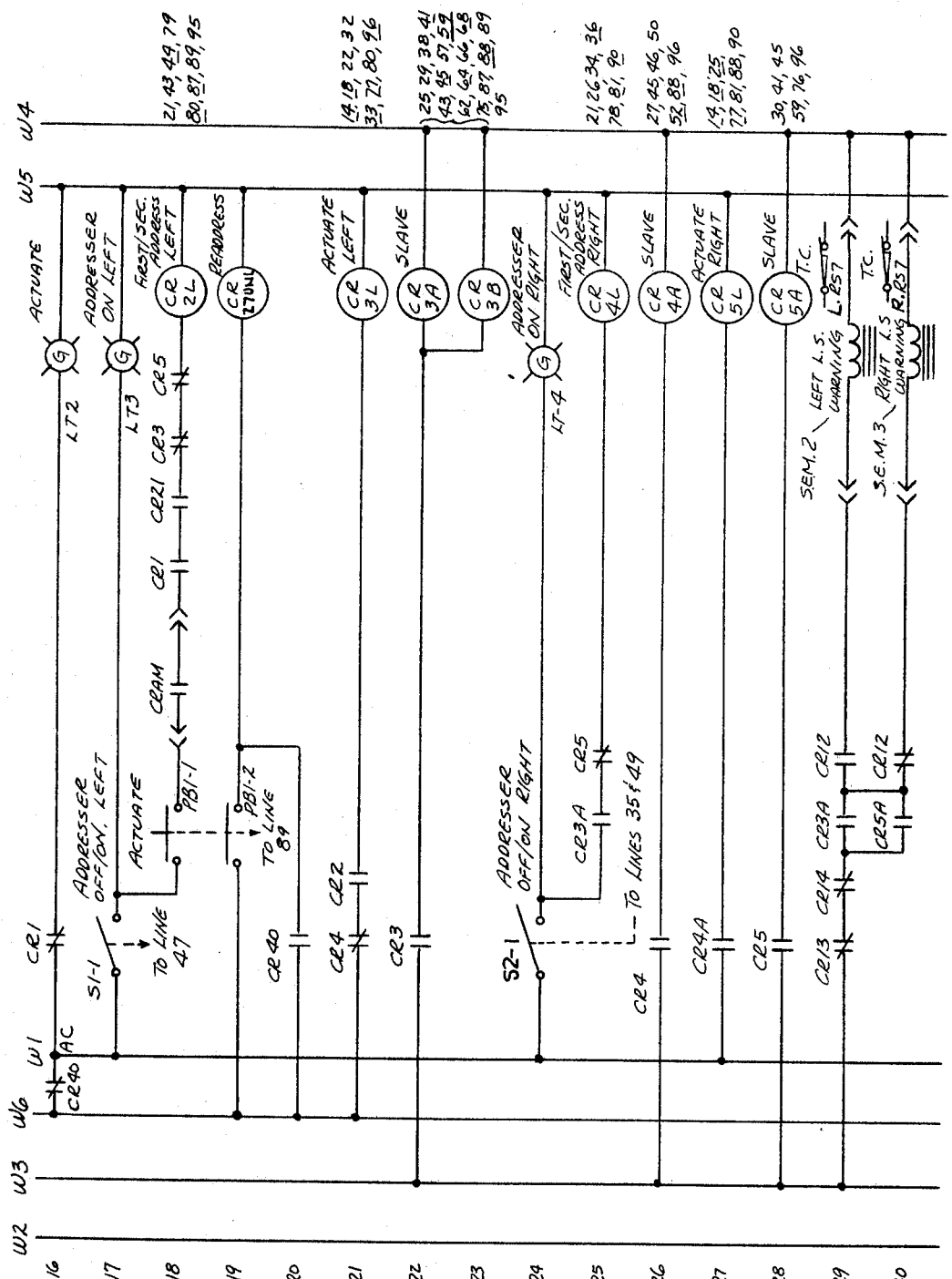

FIG. 20b shows a continuation of the circuit wherein a line W3 is connected between the normally closed relay contacts of control relay CR–40 and CR–13. In line 16, a pair of normally closed relay contacts CR–40 and CR–1 are connected in series with a lamp LT–2 which indicates that the Stacker is actuated. Connected between relay contacts CR–40 and CR–1 is another input line W1. In line 17, connected between lines W1 and W5, is a lamp LT–3 indicating the left addresser is "on" which is actuated by a switch S1–1 connected in series therewith. Closing switch S1–1 applies power to another circuit in line 18 which terminates with a control relay CR–2L being connected to line W5 by a series circuit connected thereto. The series circuit is formed from an actuate push button switch PB1–1, three normally open relay contacts CRAM, CR–1 and CR–21 which are connected to a pair of normally closed relay contacts CR–3 and CR–5. Control relay CR–2 is energized by the actuation of push button switch PB1–1. Connected between wire W6 and W5 is another series circuit having another section of the actuate switch PB1–2 connected thereto which energizes a re-address unlatch control relay CR–27UNL. Connected between push button switch PB1–2 and unlatch control relay CR–27UNL, is a pair of normally open relay contacts CR–40 which are connected to wire W6 in line 20. In line 21, connected between wire W6 and wire W5 is a series circuit having a normally closed relay contact CR–4 and a normally open relay contact CR–2 connected to a left actuate relay CR–3L. A pair of slave relays CR–3A and CR–3B (lines 22 and 23) are connected between wires W4 and W3 through a relay contact CR–3. In line 24, a right addresser switch S2–1 is connected between wires W1 and W5 through a lamp LT–4 indicating the right addresser is energized. Closing switch S2–1 completes a circuit in line 25 to a control relay CR–4L connected to wire W5 through normally open relay contacts CR–3A and normally closed contacts CR–5. Control relay CR–4L is not energized if the right addressed is not energized. Line 26 is a series circuit connected between wires W3 and W4 having a normally open relay contact CR–4 connected to a slave relay CR–4A. In line 27, a series circuit is formed between wire W1 and W5 by a pair of normally open relay contacts CR–4 connected to a control relay CR–5L which is also actuated when the right addresser is used. In line 28, a series circuit is formed between wires W3 and W4 by a pair of normally open relay contacts CR–5 connected to a slave control relay CR–5A. Line 29 is completed between wires W3 and W4 with a series circuit in which a pair of normally closed relay contacts CR–13 and CR–14 are connected to a pair of normally open relay contacts CR–3A and CR–12, the circuit being completed by an electromagnet S.EM–2 which serves as a left load station warning electromagnet to open Transfer Cart reed switch L.RS–7. Connected in parallel with control relay contacts CR–3A in line 29, is another pair of normally open relay contacts CR–5A (line 30) and connected between the junction of normally open relay contacts CR–3A and CR–12 of line 29, is a series circuit having normally closed relay contacts CR–12 connected to a right load station warning electromagnet S.EM–3 which terminates at wire W4. Electromagnet S.EM–3 controls Transfer Cart reed switch R.RS–7 in the same manner as just described for the left load station.

Figure 20C:
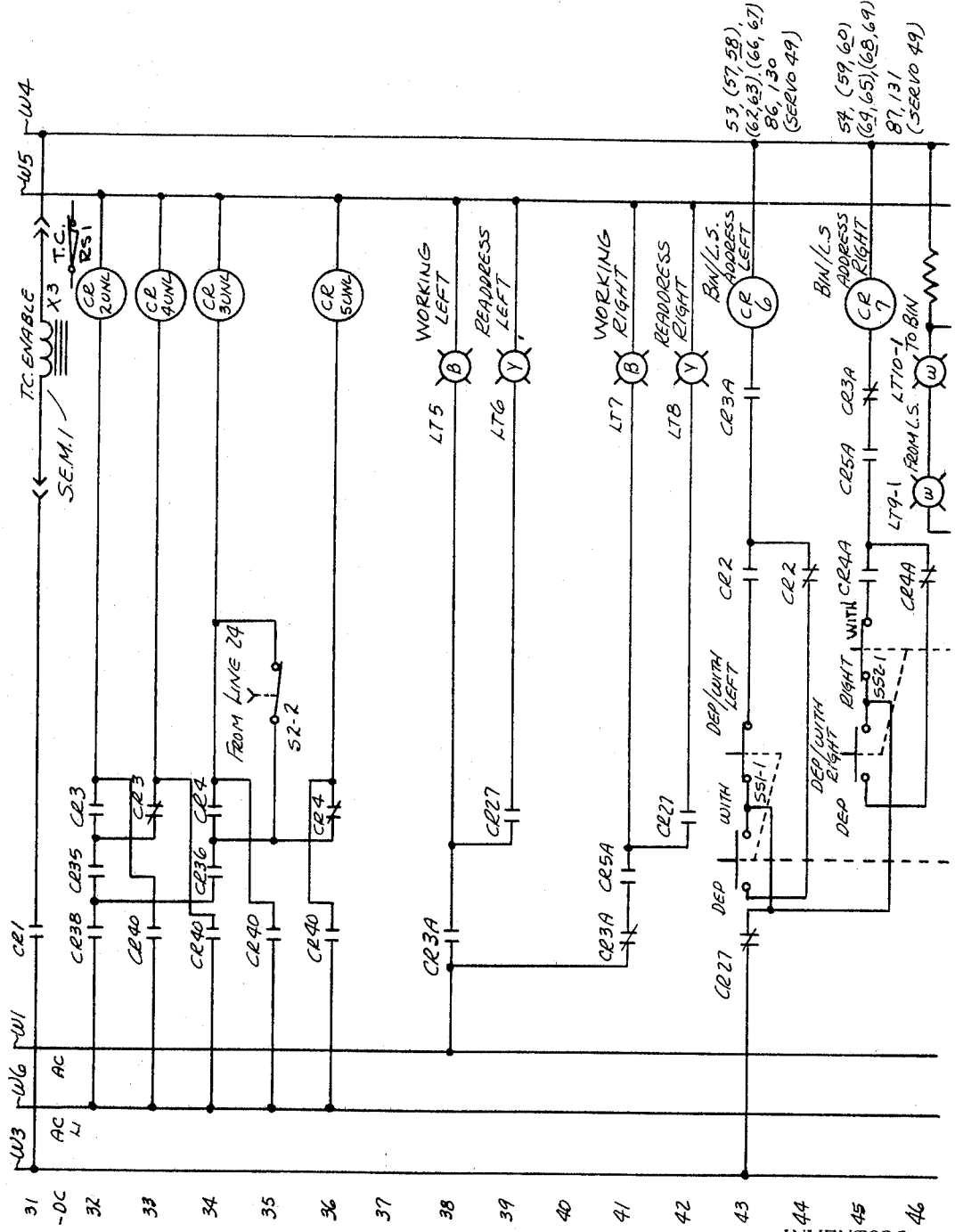

FIG. 20c is a continuation of the logic circuit and in line 31, connected between lines W3 and W4 is a series circuit having normally open relay contacts CR–1 connected to an electromagnet S.EM–1 which enables the Transfer Cart by closing Transfer Cart reed switch RS–1. Line 32 is completed by a series circuit between wires W6 and W5 wherein three normally open relay contacts CR–38, CR–35 and CR–3 are connected to an unlatch control relay CR–2UNL. In line 33, another series circuit is formed with an unlatch control relay CR–4UNL connected between wire W5 and the junction between normally open relay contacts CR–35 and CR–3 of line 32 by normally closed relay contacts CR–3. In line 33 a pair of normally open relay contacts CR–40 is connected between wire W6 and the junction of contacts CR–3 and relay CR–2UNL on line 32. In line 34, connected between normally closed relay contacts CR–3 and unlatch control relay CR–4UNL, and line W6, is a pair of normally open relay contacts CR–40. Also found in line 34, is a series circuit formed between wire W5 and a connection between normally open relay contacts CR–38 and CR–35 (line 32), formed from a pair of normally open relay contacts CR–36 and CR–4 connected to another unlatch control relay CR–3UNL. Line 35 has a pair of normally open relay contacts CR–40 connected between wire W6 and normally open relay contacts CR–4 and unlatch control relay CR–3UNL. Also in line 35 there is found connected in parallel with the normally open contacts of control relay CR–4 (line 34), a second section of the right addresser switch S2–2 which is open when the right addresser switch is "on." Also connected between relay contacts CR–36 and CR–4 of line 34, is a pair of normally closed relay contacts CR–4 connected to an unlatch control relay CR–5UNL which terminates at wire W5 (line 36). Also in line 36, and connected between wire W6 and the relay contacts and relay just mentioned, is a pair of normally open relay contacts CR–40. In line 38, connected between wires W1 and W5, is a series circuit having a pair of normally open relay contacts CR–3A connected to a lamp LT–5 indicating that the Stacker is working on a left addresser pickup or deposit mode. Connected between relay contacts CR–3A and lamp LT–5, is another series circuit in line 39, having a pair of normally open relay contacts CR–27 connected to a lamp LT–6 indicating to the operator that a left re-address is required. In line 41, connected between wire W1 and W5 is a series circuit in which a pair of normally closed relay contacts CR–3A are connected to a pair of normally open relay contacts CR–5A, the circuit being completed with a lamp LT–7 indicating the Stacker is working in a right addresser deposit or withdrawal mode. Connected between relay contacts CR–5A and lamp LT–7 of line 41, is another series circuit in which a pair of normally open relay contacts CR–27 are connected to a lamp LT–8 indicating that a right re-address is required. In line 43, a series circuit is formed between wires W3 and W4 by a pair of normally closed relay contacts CR–27 connected to a withdrawal section of a left deposit-withdrawal switch SS1–1, a pair of normally open relay contacts CR–2 and CR–3A, and a left address bin-load station control relay CR–6. Connected in parallel with the withdrawal section of switch SS1–1 and normally open relay contacts CR–2 of line 43, is a deposit section of switch SS1–1 which is open when the withdrawal section is closed and vice versa that is connected to a pair of normally closed relay contacts CR–2. Connected between the normally closed contacts of control relay CR–27 and switch SS1–1 in line 43, is a series circuit in line 45 in which a right deposit withdrawal switch SS2–1 has the withdrawal section closed and is connected to a pair of normally open relay contacts CR–4A and CR–5A which are connected to a pair of normally closed relay contacts CR–3A and a right address bin-load station control relay CR–7. In line 46, another series circuit is completed by having a deposit section of a deposit-withdrawal switch SS2–1 which is open when the withdrawal section is closed and vice versa, connected to normally closed relay contacts CR–4A, the combination being in parallel with the withdrawal section of switch SS2–1 and normally open relay contacts CR–4A of line 45.

Figure 20D:
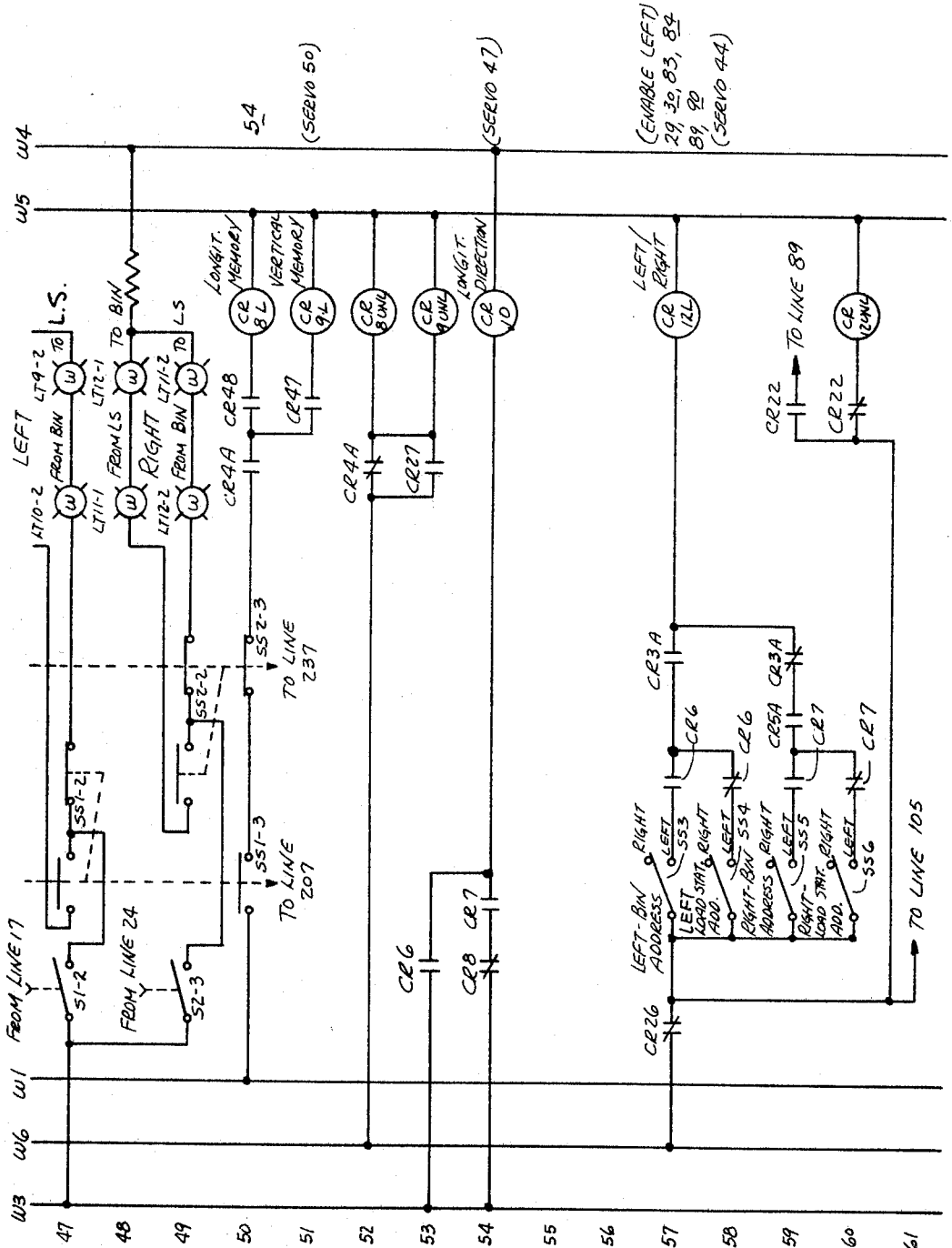
Figure 20E:
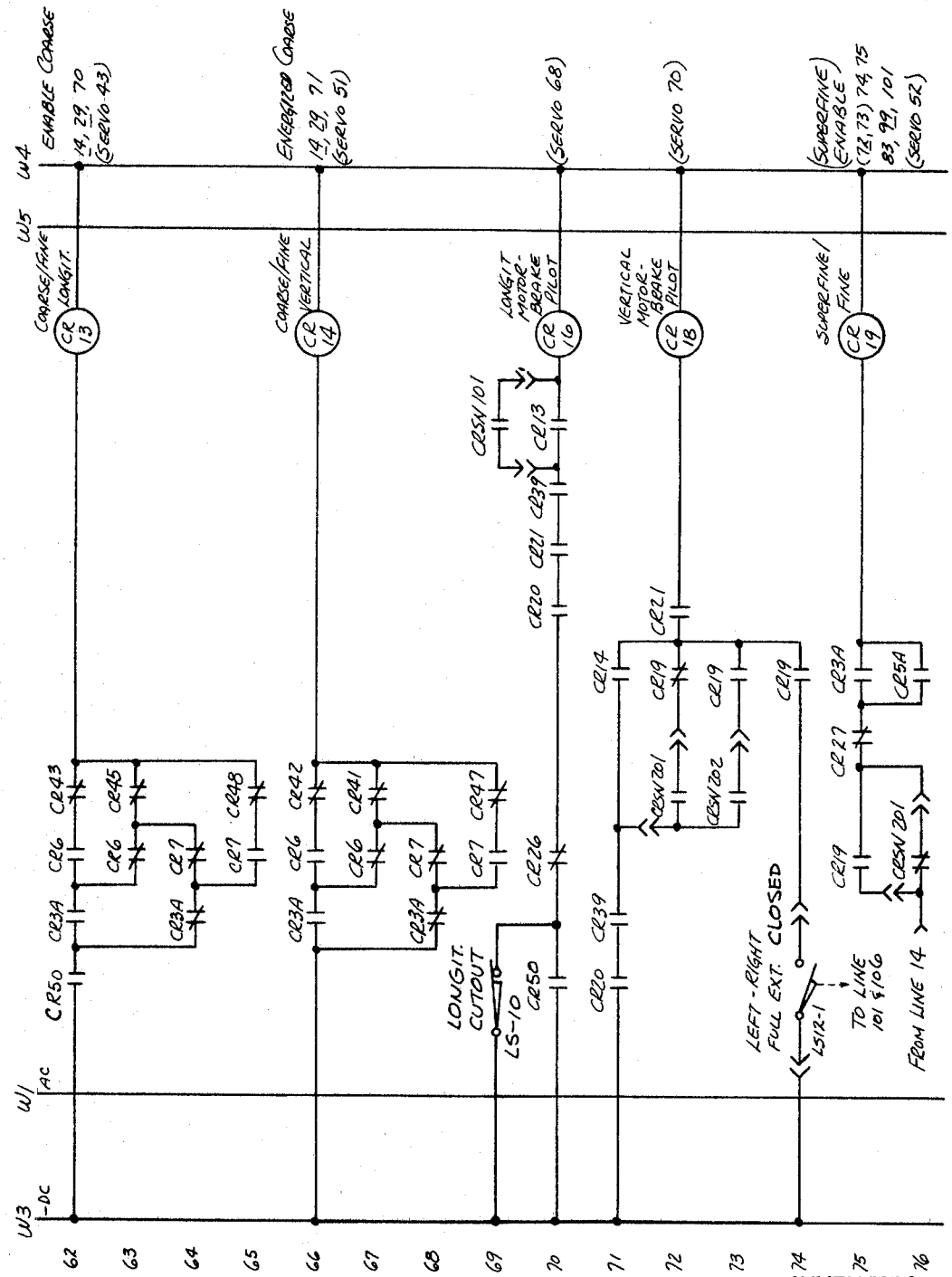

FIG. 20d continues with the Stacker logic circuit and has a series circuit formed between wires W3 and W4 through a second section S1–2 of the left addresser on-off switch that is connected to a withdrawal section of a second section SS1–2 of left deposit-withdrawal switch, the circuit being completed by having a pair of lamps LT11–1 and LT12–1 connected through a resistor. When lamps LT11–1 and LT12–1 are lighted, the mode of operation indicated is one in which the left addresser command is to move a pallet from a bin to a load station. Connected in parallel with the second withdrawal section of switch SS1–2 and lamps LT11–1 and LT12–1 is a deposit section of the switch which is connected in series with a lamp LT9–1 and LT10–1 (line 46). When lamps LT9–1 and LT10–1 are lighted, a mode of operation for the left addresser is indicated where a pallet is taken from a load station and deposited in a bin. In line 49, connected between wires W3 and W4 is a series circuit having a third section S2–3 of the right addresser off-on switch connected to a withdraw section of a second section SS2–2 of the right deposit-withdrawal switch, the circuit being completed by a series connection of a pair of lamps LT12–2 and LT11–2 and a resistor. When lamps LT12–2 and LT11–2 are lighted, the right addresser will be performing a mode of operation in which the pallet is taken from a bin and deposited at a load station. Connected in parallel with the withdrawal section of switch SS2–2 and lamps LT12–2 and LT11–2, is a deposit section of switch SS2–2 connected in series with a pair of lamps LT11–1 and LT12–1 indicating the right addresser command will deposit a pallet from a load station into a bin when the lamps are lighted. In line 50, connected between wires W1 and W5 is a deposit section of a switch section SS1–3 and a withdrawal section of a third switch section SS2–3, is a pair of normally open relay contacts CR–4A and CR–48, and a longitudinal memory control relay CR–8L. Control relay CR–8L is enabled only during a dual command deposit-withdrawal cycle and is energized only if the second bin address destination in longitudinal direction is passed or beyond that of the first command. Connected between normally open relay contacts CR–4A and CR–48, and wire W5, is a pair of normally open relay contacts CR–47 and a vertical memory control relay CR–9L (line 51). Connected between wires W6 and W5 in line 52, is a pair of normally closed relay contacts CR–4A and an unlatch control relay CR–8UNL. In line 53, a pair of normally open relay contacts CR–27 are connected in parallel with relay contacts CR–4A of line 52 and an unlatch control relay CR–9UNL is connected in parallel with unlatch control relay CR–8UNL. Connected between wires W3 and W4 of line 54, is a pair of normally closed relay contacts CR–8 and a pair of normally open relay contacts CR–7 connected to a longitudinal direction control relay CR–10. Connected in parallel with control relay contacts CR–8 and CR–7 of line 54, is a pair of normally open relay contacts CR–6 in line 53. Control relay CR–9 has an action similar to that for the longitudinal control relay CR–8 except it is used in the vertical axis. Control relay CR–10 determines the longitudinal direction of the Stacker. Where the relay is energized, the Stacker is directed away from the operator on the Transfer Cart and if the relay is de-energized, the Stacker is moved towards the "HOME" station. In line 57, a series circuit is connected between wires W6 and W5 by a pair of normally closed relay contacts CR–26, a left bin address switch SS–3, a pair of normally open relay contacts CR–6 and CR–3A, and a left-right control relay CR–12L. Connected in parallel with switch SS–3 and relay contacts CR–6 in line 57, is a left load station address switch SS–4 which is connected to a pair of normally closed relay contacts CR–6. Connected in parallel with switch SS–3, relay contacts CR–6 and CR–3A, are a right bin address switch SS–5, a pair of normally open relay contacts CR–7 and CR–5A and normally closed contacts CR–3A. Connected in parallel with switch SS–5 and relay contacts CR–7, are a right load station addresser switch SS–6 and a pair of normally closed relay contacts CR–7. Connected between the normally closed contacts of relay CR–26 and switch SS–3, is a pair of normally closed contacts CR–22 which is connected to an unlatch control relay CR–12UNL which terminates at wire W5. Control relay CR–12 makes the proper selection of the left or right longitudinal fine transducer, vertical superfine transducer, and direction of the lateral platform extension of the Stacker.

Referring to FIG. 20e, in line 62, a series circuit is formed between wires W3 and W4 by normally open relay contacts CR–50, CR–3A, CR–6, normally closed relay contacts CR–43 and a longitudinal coarse-fine control relay CR–13. In line 63, normally closed relay contacts CR–6 and CR–45 are connected in series with each other and in parallel with control relay contacts CR–6 and CR–43 of line 62. Connected in parallel with control relay contacts CR–3A of line 62 and CR–6 of line 63, are normally closed relay contacts CR–3A and CR–7 (line 64). In line 65, a pair of normally open relay contacts CR–7 are conected in series with a pair of normally closed relay contacts CR–48, the circuit being in parallel with relay contacts CR–7 of line 64 and CR–45 of line 63. In line 66, between wires W3 and W4, is a series circuit including normally open relay contacts CR–3A, CR–6, normally closed relay contacts CR–42 and a coarse-fine vertical control relay CR–14. Control relay CR–14 like CR–13 determines whether the vertical system is in fine or coarse control. In line 67, normally closed relay contacts CR–6 and CR–41 are series connected and in parallel with relay contacts CR–6 and CR–42 of line 66. In line 68, normally closed relay contacts CR–3A and CR–7 are in series with each other and connected in parallel with relay contacts CR–3A of line 66 and CR–6 of line 67. In line 69 a pair of normally open relay contacts GR–7 connected in series with a pair of normally closed relay contacts CR–47, are connected in parallel with relay contacts CR–7 of line 68 and relay contacts CR–41 of line 67. In line 70, a series circuit is connected between wires W3 and W4 through normally open relay contacts CR–50, normally closed relay contacts CR–26, normally open relay contacts CR–20, CR–21, CR–39 and CR–13, and a longitudinal motor control relay CR–16. Connected in parallel with relay contacts CR–13 in line 70, is a pair of normally open null detector contacts CRSN–101, and connected in parallel with normally open relay contacts CR–50, is a limit switch LS–10. Limit switch LS–10 may be of the "proximity" type or tripped by a cam arrangement on a forward member of the Transfer Cart when the switch comes abreast of this longitudinal position. In line 71, a series circuit is formed between wires W3 and W4, which include normally open relay contacts CR–20, CR–39, CR–14, CR–21, and a vertical motor control relay CR–18. In line 72, connected in parallel with control relay contacts CR–14 of line 71 are normally open null detector contacts CRSN–201 and normally closed relay contacts CR–19. In line 73, another circuit is formed in parallel with relay contact CR–14 of line 71 in which normally open null detector contacts CRSN–202 are connected to normally open relay contacts CR–19. Connected in parallel with normally open relay contacts CR–39 and CR–14 of line 71, is limit switch LS12–1 and normally open relay contacts CR–19. In line 75, a series circuit is formed starting with a connection between null detector contacts CRSN–101 and CRSN–201 of line 14 and wire W4, comprising normally open relay contacts CR–19, normally closed relay contacts CR–27, normally open relay contacts CR–3A, and a superfine-fine control relay CR–19. Control relay CR–19 is used with the vertical control system for switching from control on the stacker mast to the bins. Connected in parallel with control relay contacts CR–19 in line 75, are normally closed null detector contacts CRSN–201 and connected in parallel with control relay contacts CR–3A is a pair of normally open relay contacts CR–5A.

Figure 20F:
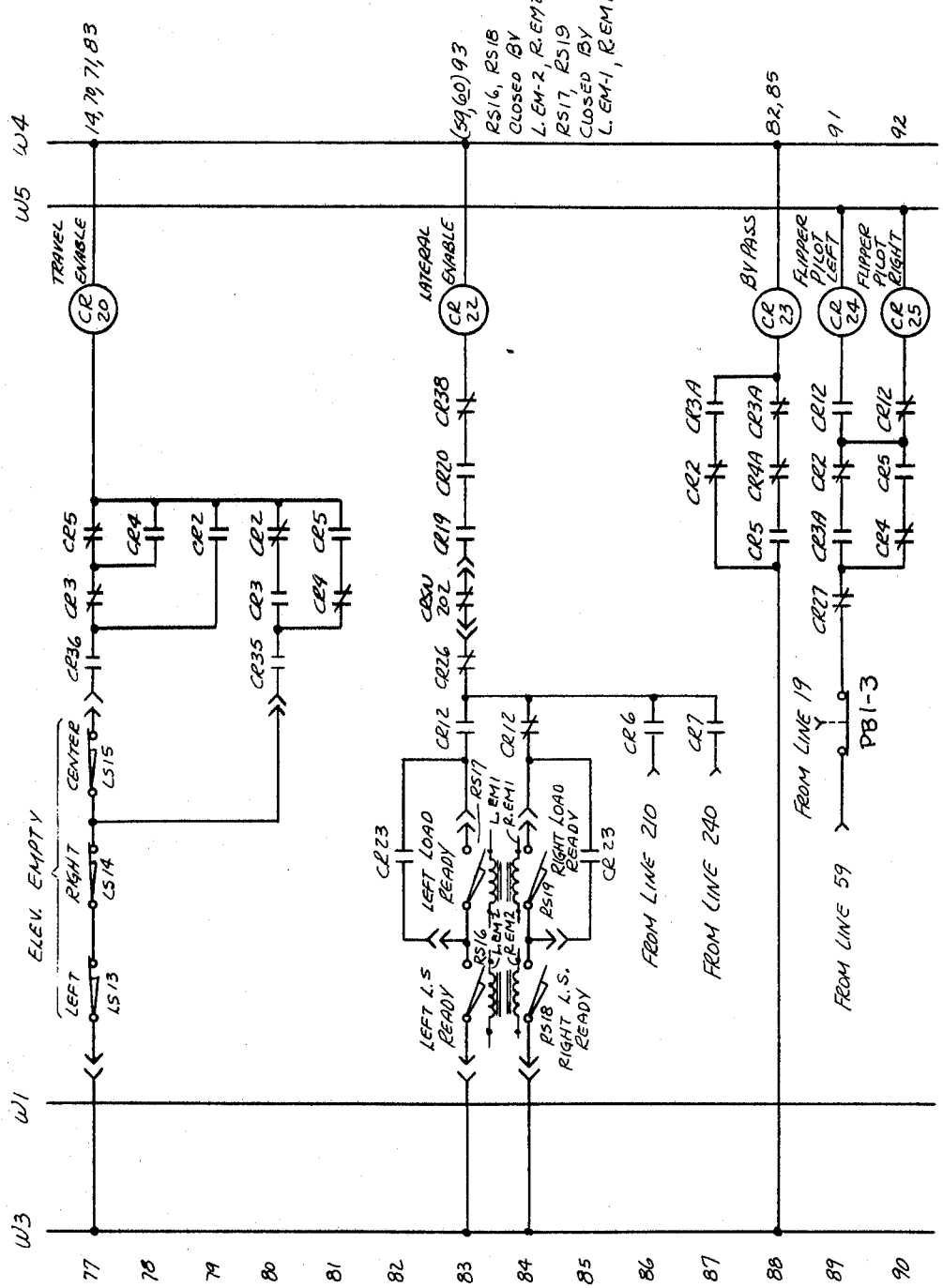

In FIG. 20f, a series circuit is formed between wires W3 and W4 in line 77 comprising limit switches LS–13, LS–14, LS–15, normally open relay contacts CR–36, normally closed relay contacts CR–3 and CR–5, and a travel enable control relay CR–20. The primary function of control relay CR–20 is to shut down the vertical and longitudinal drive systems under potentially unsafe conditions. Connected in parallel with control relay CR–5 in line 77, is a pair of normally open relay contacts CR–4. In line 79, a pair of normally open relay contacts CR–2 are connected in parallel with the contacts of control relays CR–3 and CR–5 of line 77. Connected in parallel with limit switch LS–15, relay contacts CR–36, CR–3 and CR–5, is a series circuit comprising normally open relay contacts CR–35, CR–3, and normally closed relay contacts CR–2. In line 81, a pair of normally closed relay contacts CR–44 and normally open relay contacts CR–5 are connected in series with each other and in parallel with relay contacts CR–3 and CR–2 in line 80. Another series circuit is formed in line 83 between wires W3 and W4 in which are connected reed switches RS–16 and RS–17, normally open relay contacts CR–12, normally closed relay contacts CR–26, normally closed null detector contacts CRSN–202, normally open relay contacts CR–19 and CR–20, normally closed relay contacts CR–38 and a lateral enable control relay CR–22. Unless control relay CR–22 is enabled, the lateral subcycle cannot be initiated. Connected in parallel with reed switches RS–16, RS–17 and relay contacts CR–12 of line 83, are reed switches RS–18, RS–19, and normally closed relay contacts CR–12. Connected in parallel with reed switch RS–17, is a pair of normally open relay contacts CR–23 in line 82, and connected in parallel with reed switch RS–19 is another pair of normally open relay contacts CR–23 in line 85. In line 88, connected between wires W3 and W4 is a series circuit comprising normally open relay contacts CR–5, normally closed relay contacts CR–4A and CR–3A, and a by-pass control relay CR–23. Connected in parallel with relay contacts CR–5, CR–4A, and CR–3A are normally closed relay contacts CR–2 and normally open relay contacts CR–3A (line 87). A series circuit is connected in parallel with normally closed contacts CR–22 and unlatch control relay CR–12UNL (FIG. 20d) in line 60 and completed in FIG. 20f, line 89, comprising a normally open relay contact CR–22, a normally closed push button switch PB1–3 which is part of the actuate switch, normally closed relay contacts CR–27, normally open relay contacts CR–3A, normally closed relay contacts CR–2, normally open relay contacts CR–12, and a left bin flipper control relay CR–24. Control relay CR–24 is used to control the left bin flipper. Connected in parallel with control relay contacts CR–3A and CR–2, is a series circuit formed of normally closed relay contacts CR–4, and normally open relay contacts CR–5, connected in parallel with normally open relay contacts CR–12 and control relay CR–24 are normally closed relay contacts CR–12, and a right bin flipper control relay CR–25. Control relay CR–25 is used for the same purpose as CR–24 except it is used to control the right bin flipper.

FIG. 20g has connected between wires W6 and W5, normally open relay contacts CR–24 and solenoid SOL–1 used in the left bin probe. Line 92 has a series circuit formed between wires W6 and W5 in which normally open relay contacts CR–25 are connected to solenoid SOL–2 of the right bin probe. In line 93, a series circuit is formed between wire W1 and W5 by left bin empty switch SOL1–S1, normally open relay contacts CR–22 and a lateral actuate control relay CR–26L. In line 94, a right bin empty switch SOL2–S1 is connected in parallel with switch SOL1–S1 of line 93. Connected in parallel with both switches just described, are normally open relay contacts CR–3A and CR–2 in line 95 and connected in parallel with the contacts of the two relays just mentioned, are normally open relay contacts CR–4A and CR–5A and normally closed relay contacts CR–3 (line 96). Line 98 has a series circuit formed between wires W6 and W5 in which a normally open pair of relay contacts CR–38 is connected to unlatch control relay CR–26UNL. In line 97, a pair of normally open relay contacts CR–40 is connected in parallel with relay contacts CR–38 in line 98 and another pair of normally closed relay contacts CR–19 in line 99 is connected in parallel with the contacts of relay CR–38 in line 98. Connected between lines W1 and W5 is a series circuit in line 100 having left bin full switch SOL1–S2, a pair of normally closed relay contacts CR–26, and a re-address control relay CR–27L. Control relay CR–27 is energized only under the conditions where the bin flippers establish that a bin is obstructed. The right full bin switch SOL2–S2 is connected in parallel with switch SOL1–S2. In line 101, connected between lines W3 and W4 is a series circuit formed of limit switch LS12–2 which is opened when the lateral platform is fully extended, normally open relay contacts CR–26, CR–19, CR–21 and a lateral motor control relay CR–30. Connected in parallel with limit switch LS12–2, is a pair of normally open relay contacts CR–37

(line 102). Connected between wires W6 and W5, is a series circuit formed by normally open relay contacts CR-26, CR-36, and normally closed relay contacts CR-34, and an elevator control relay CR-33L. Control relay CR-33 causes the elevator to rise after a lateral extension is complete causing the transducers to be shifted. Connected in parallel with relay contacts CR-36 and CR-34 and control relay CR-33L, is a series circuit formed by normally open relay contacts CR-35, normally closed relay contacts CR-33 and an elevator control relay CR-34L. Control relay CR-34L is used in a manner similar to that of control relay CR-33 except it is used to lower the elevator. In line 104, another circuit is completed between control relay contact CR-33 and control relay CR-34L by connecting a pair of normally open relay contacts CR-40 thereto and to wire W6. In lines 105 and 106, a pair of unlatch control relays CR-33UNL and CR-34UNL respectively are controlled by connecting one of their terminals to wire W5 and their other terminals to the junction of the two pairs of contacts which are normally open and normally closed of control relay CR-22 (line 61). In line 107, a circuit is formed from the power supply PS-201 to an armature of motor M-201 through normally open relay contacts CR-33 and CR-40. Connected in parallel with relay contacts CR-40, is limit switch LS12-3 which is closed when the lateral platform is fully extended. The other armature terminal of motor M-201 is connected to power supply PS-201, in line 110, through normally closed relay contacts CR-34, normally open relay contacts CR-33, limit switch LS20-1, and limit switch LS21-1. Connected across the armature of motor M-201 is a resistor RE-53 and the motor field is connected to power supply PS-201 on lines 108 and 109. Connected in parallel with limit switch LS20-1 is a pair of normally open relay contacts CR-34 and connected in parallel with limit switch LS21-1, is a pair of normally open relay contacts CR-33. Connected in parallel with normally closed relay contacts CR-34, are normally closed relay contacts CR-33 (line 109) and connected between relay contacts CR-34 and CR-33 in line 110, is a pair of normally open relay contacts CR-34 which terminate between relay contacts CR-33 and CR-40 in line 107. Another pair of normally open relay contacts CR-34 is connected to line 107 and to a point on line 110 between relay contacts CR-33 and limit switch LS20-1. In line 111, a series circuit is formed between wire W2 and W4 by limit switch LS20-2 and a vertical limit control relay CR-35. Connected in parallel with limit switch LS20-2 and control relay CR-35, are limit switch LS21-2 and another vertical control relay CR-36. Connected between wires W3 and W4 in line 113, is a series circuit comprising normally open relay contacts CR-34 and CR-36, and a lateral retract control relay CR-37. Control relay CR-37 is energized by the completion of either the elevator rise or lower operation and causes the platform to retract. Connected in parallel with normally open relay contacts CR-34 and CR-36, is a pair of normally open relay contacts CR-33 and CR-35 in line 112. Connected between wires W3 and W4 is another series circuit formed by normally open relay contacts CR-37 and CR-39, and a lateral complete control relay CR-38. Control relay CR-38 causes the logic to advance to the next address and reset the lateral axis logic circuit. Connected in line 115, between wires W3 and W4 is a series circuit which has limit switch LS-22 connected to a center limit control relay CR-39.

On occasion it may be desirable to reset all the control relays such as the condition where the power has been turned off and the Stacker is some place in the aisle and this is accomplished by the reset circuit in line 116 which is a series circuit formed of normally closed relay contacts CRAM, a reset push button switch PB-8 and a reset control relay CR-40. A slave relay CR-40A is connected in parallel with control relay CR-40. In line 117, normally closed relay contacts CR-36 and normally open relay contacts CR-40 are connected in series and the series circuit is connected in parallel with push button switch PB-8 in line 116.

In line 130, connected between wires W3 and W4 are a pair of normally open relay contacts CR-6 and a safe-unsafe control relay CR-50 which is enabled in the safe condition of an operation. Connected in parallel with relay contact CR-6 in line 130, are normally open relay contacts CR-7 in line 131. Connected in parallel with normally open relay contacts CR-6 are reed switches RS23-2, RS23-1, and RS-24. In other words, the three reed switches are connected in parallel with each other and the contacts of the last two mentioned control relays.

Figure 20H:
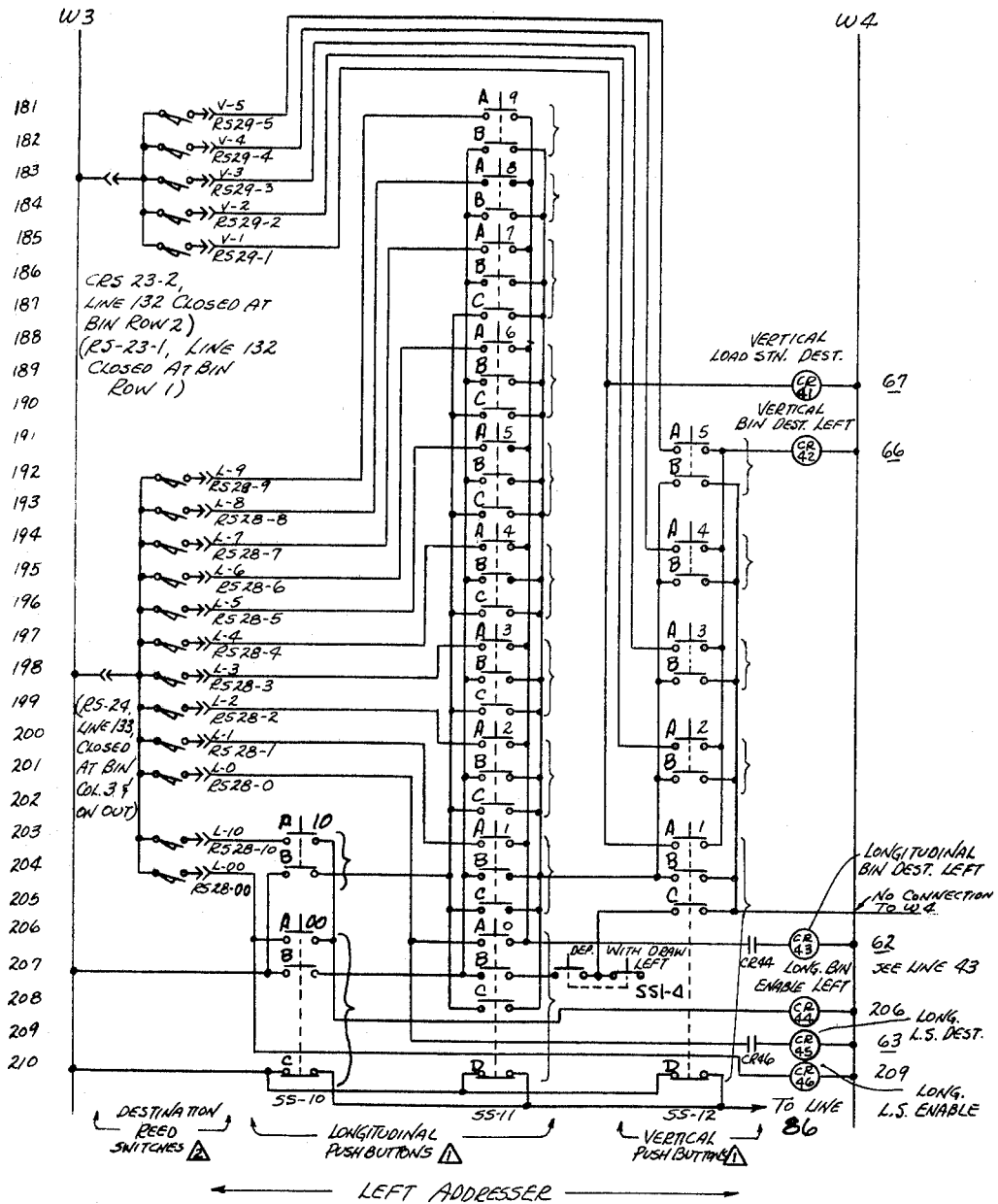
Figure 20I:
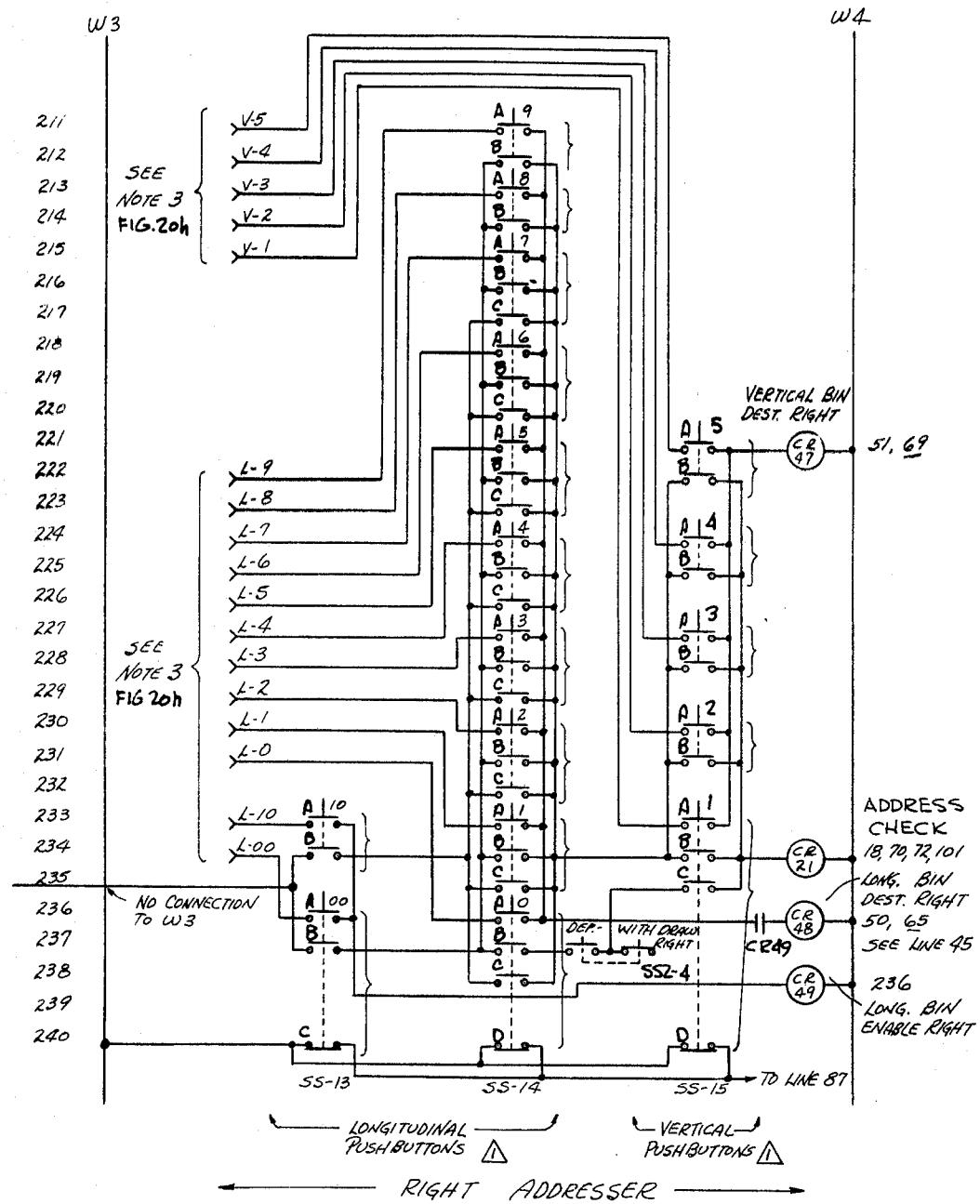

In FIGS. 20h and 20i, all of the power connections are made between wires W3 and W4 and the operation of both figures will be described at the same time. The five vertical reed switches RS29-1, RS29-2, RS29-3, RS29-4, and RS29-5 all have one of their terminals connected to wire W3 at line 183. The other terminal of reed switch RS29-1 is connected to section A of vertical push button switch SS12-1 (line 203) and to section A of vertical push button switch SS15-1. The other terminal of reed switch RS29-1 is also connected to a vertical load station destination control relay CR-41 which is terminated on wire W4. The other terminal of reed switch RS29-2 is connected to section A of switch SS12-2 (line 200) and is also connected to section A of switch SS15-2, (line 230). In a similar manner, the other terminal of reed switch RS29-3 is connected to section A of vertical push button switch SS12-3 (line 197) and to section A of switch SS15-3 (line 227). Reed switch RS29-4 has its other terminal connected to section A of switch SS12-4 (line 194) and to section A of switch SS15-4 (line 224). Reed switch RS29—5 has its other terminal connected to section A of switch SS12-5 (line 191) and is also connected to section A of switch SS15-5 (line 221). The terminals of switch section A of switch SS-12 are all interconnected and in turn are connected to a left vertical bin destination control relay CR-42 which is connected to wire W4 (line 191). In a similar manner, all of the other terminals of section A of switch SS-15 are interconnected and are connected to a right vertical bin destination control relay CR-47 which is also connected to wire W4 (line 221). Switches RS28-00, RS28-10, RS28-0, RS28-1, RS28-2, RS28-3, RS28-4, RS28-5, RS28-6, RS28-7, RS28-8, and RS28-9 all have one terminal connected to wire W3 at line 198. The other terminal of reed switch RS28-00 is connected to section A of longitudinal push button switch SS10-00 (line 206) and is also connected to a longitudinal load station enable control relay CR-46 which is connected to wire W4 (line 210). The other terminal of reed switch RS28-00 is also connected to section A of push button switch SS13-00 (line 236). The other terminal of reed switch RS28-10 is connected to section A of switch SS10-10 and is also connected to section A of switch SS13-10. The other connections of section A of switches SS10-10 and SS10-00 are connected to a left enable control relay CR-44 (line 208) and the other terminals of section A of switches SS13-10 and SS13-00 are connected to a right longitudinal bin enable relay CR-49 (line 239). The other terminal of reed switch RS28-0 is connected to section A of switch SS11-0 (line 206) and to section A of switch SS14-0 (line 236) and to a pair of normally open relay contacts CR-46 which in turn are connected to a longitudinal load station destination control relay CR-45 that is terminated at wire W4 on line 209. In like manner, reed switches RS28-1 through RS28-9 are connected to section A of switches SS11-1 through SS11-9 at lines 203, 200, 197, 194, 191, 188, 185, 183 and 181 respectively. In a similar manner, reed switches RS28-1 through RS28-9 are connected to section A of switches SS14-1 through SS14-9 at lines 233, 230, 227, 224, 221, 218, 215, 213 and 211. All of the other terminals of section A of switches SS11-0 through SS11-9 are connected to each other and to a pair of normally open relay contacts CR–44 which in turn is connected to a left longitudinal bin destination control relay CR–43 that is terminated at wire W4 on line 206. In like manner, section A of each of switches SS14–0 through SS14–9 have all of their other terminals interconnected and connected to a pair of normally open relay contacts CR–49 which are connected to a right longitudinal bin destination control relay CR–48 (line 236). Section B of switch SS10–10 is connected to wire W3 and its other terminal is connected to section C of each of switches SS11–0 through SS11–7. Section B of switch SS10–00 is also connected to wire W3 on line 207 and its other terminal is connected to section B of each of switches SS11–0 through SS11–9. The other terminal of section C of switches SS11–0 through SS11–7 and all of the other terminals of section B of switches SS11–1 through SS11–9 are interconnected and are connected to a terminal of section B of each of switches SS12–1 through SS12–5. The other terminals of section B of switches SS12–1 through SS12–5 and SS12–1 section C are connected together and are connected to section B of switches SS13–00 and SS13–10 on line 235. The other terminal of switch SS13–00 is connected to a terminal of section B of switches SS14–0 through SS14–9. The other terminal of section B of switch SS13–10 is connected to a terminal of section C of each of switches SS14–0 through SS14–7. The other terminals of section C of switches SS14–0 through SS14–7 are interconnected and the other terminals of section B of switches SS14–1 through SS14–9 are interconnected with section C as just described. The interconnections just described are also made to one terminal of section B of each of switches SS15–1 through SS15–5 and the other terminals of switches SS15–1 through SS15–5 are connected to a control relay CR–21 which terminates at wire W4. Control relay CR–21 is an address checker and unless the bin addresses are complete and valid the relay will not be energized and this relay must be energized to permit actuation of the Stacker and enable the vertical and longitudinal drive systems. The other terminal of section B of switch SS11–0 is connected to a deposit section of deposit-withdrawal switch SS1–4 and the other terminal of the deposit switch section is connected to a terminal of section C of vertical push button switch SS12–1. The other terminal of section C of the same switch is connected to the common terminals of section B for switch SS–12. In a similar manner, the other terminal of section B of switch SS14–0 is connected to the deposit section of deposit-withdrawal switch SS2–4 and the other terminal of the deposit section is connected to a terminal of section C of switch SS15–1. The other terminal of section C of switch SS–15 is connected to the common connections of section B of switch SS–15. In line 210, a series circuit is formed between wire W3 and wire W4 through a section C of switch SS10–00 which is completed on line 86 by having connected in series normally open relay contacts CR–6 which are connected between normally open relay contacts CR–12 and normally closed contacts CR–26 on line 83. Another circuit which is in parallel with section C of switch SS–10, is a series circuit formed by section D of switch SS–11 and also in parallel is section D of switch SS–12. In line 240, a series circuit is completed between wire W3 and wire W4 through a section C of switch SS–13 which is completed on line 87 by connecting a normally open relay contact CR–7 between normally open relay contacts CR–12 and normally closed relay contacts CR–26 on line 83. Another circuit connected in parallel with section C of switch SS–13, is one formed by having a section D of switch SS–14 in parallel with a section D of switch SS–15. It will of course be understood that the selector push button switches which are shown in FIGS. 20h and 20i are interlocking and when one switch is depressed, all others in that column are in an inactive state but depressing a different switch will release one previously depressed.

STACKER SERVO DRIVE AND CONTROL CIRCUITS

In FIGS. 21a through 21f, the longitudinal driving circuit is shown where a summing amplifier SA–100 (line 9) has connected to its input a series circuit formed from linear position transducer LPT–102, normally closed relay contacts CRS–104, CRS–103, and CRS–102, normally open relay contacts CRS–101, and a resistor R–105. Linear position transducer LPT–102 is also connected to an electrical ground 182. Connected in parallel with linear position transducer LPT–102 and normally closed relay contacts CRS–104, is linear position transducer LPT–101 and a pair of normally open relay contacts CRS–104 (line 1). A null detector CRSN–101 is connected between ground 182 and normally closed relay contacts CRS–104 and CRS–103 in line 3. Null detector CRSN–101 has normally closed contacts which are in Stacker logic circuit line 14 and normally open relay contacts which are in Stacker logic circuit line 69. The circuit just described provides the fine longitudinal mode of control for the Stacker. Connected between ground and normally open relay contacts CRS–101 and resistor R–105 in line 9, is a resistor R–112 and a pair of normally closed relay contacts CRS–101. The output of summing amplifier SA–100 is connected to the input of a driving amplifier DA–100 through a pair of normally closed relay contacts CRS–306. A resistor R–108 is also connected from the output to the input of summing amplifier SA–100 in line 8. The output of driving amplifier DA–100 is connected to a field coil GF–100 of generator G–100 which is shown coupled to motor M–1 that is driven by power from power lines L1, L2 and L3. Generator G–100 has a pair of resistors R–109 and R–110 connected across its armature and has one armature terminal connected to ground 182. A signal is fed back to the input of summing amplifier SA–100 on line 7 through a resistor R–107 and a pair of normally closed relay contacts CRS–306 which are connected between resistor R–109 and R–110. Motors M–100 and M–300 each have one of their armature terminals connected to ground 182. Connecting the ungrounded armature terminal of generator G–100 to motor M–100 is an overload relay OL–100 and a normally open pair of relay contacts CRM–100. Also connecting the ungrounded armature terminal of generator G–100 to motor M–300 is an overload relay OL–300 and a pair of normally open relay contacts CRM–300. It will be seen that by closing relay contacts CRM–100 or CRM–300, that either the longitudinal motor M–100 or lateral motor M–300 may be energized. Once motor M–100 is energized, it drives tachometer generator TG–100 which has one terminal connected to ground and the other terminal connected to the input of summing amplifier SA–100 through a pair of resistors R–111 and R–106. Connected between resistors R–106 and R–111 is another resistor R–113 which is connected to ground 182.

In the coarse mode of operation, a power supply PS–100, line 26, supplies a positive and negative 15 volt direct current output upon being energized by alternating current between lines L3 and N. The positive 15 volt terminal with respect to ground 182 is connected to a lead 183 and the negative terminal with respect to ground 182 is applied to a lead 184. Connected between lead 183 and ground 182 on lines 7 and 8, are normally open relay contacts CRS–106, CRS–101, a resistor R–101, the resistive element of a potentiometer P–101 and a resistance R–102. Connected between normally open relay contacts CRS–101 and resistor R–101, and ground 182, is a pair of normally open relay contacts CRS–101. The wiper arm of potentiometer P–101 is connected between normally closed relay contacts CRS–103 and CRS–102 through a pair of normally open relay contacts CRS–103 (line 9). Thus there is established a direct current circuit from the power supply PS–100 to summing amplifier SA–100 for driving motor M–100 in a coarse mode of operation when the appropriate relay contacts are either opened or closed. To provide a driving signal in the opposite direction, a pair of normally closed relay contacts CRS–106 (line 8) is connected between lead 184 and normally open relay contacts CRS–106 and CRS–101.

Manual control is provided by forming another circuit between lead 183 and line 9 between normally closed relay contacts CRS–102 and normally open relay contact CRS–101 with a series circuit consisting of a pair of normally open relay contacts CRS–105, a resistor R–103, and a pair of normally open relay contacts CRS–102. Connected between resistor R–103, and relay contacts CRS–102, and ground 182, is a resistor R–104. The positive voltage provides the signal to drive the Stacker away from "HOME" position and the negative signal which is applied between normally open relay contacts CRS–105 and resistor R–103 and lead 184 through a pair of normally closed relay contacts CRS–105, causes the Stacker to move towards the "HOME" position.

Figure 21A:
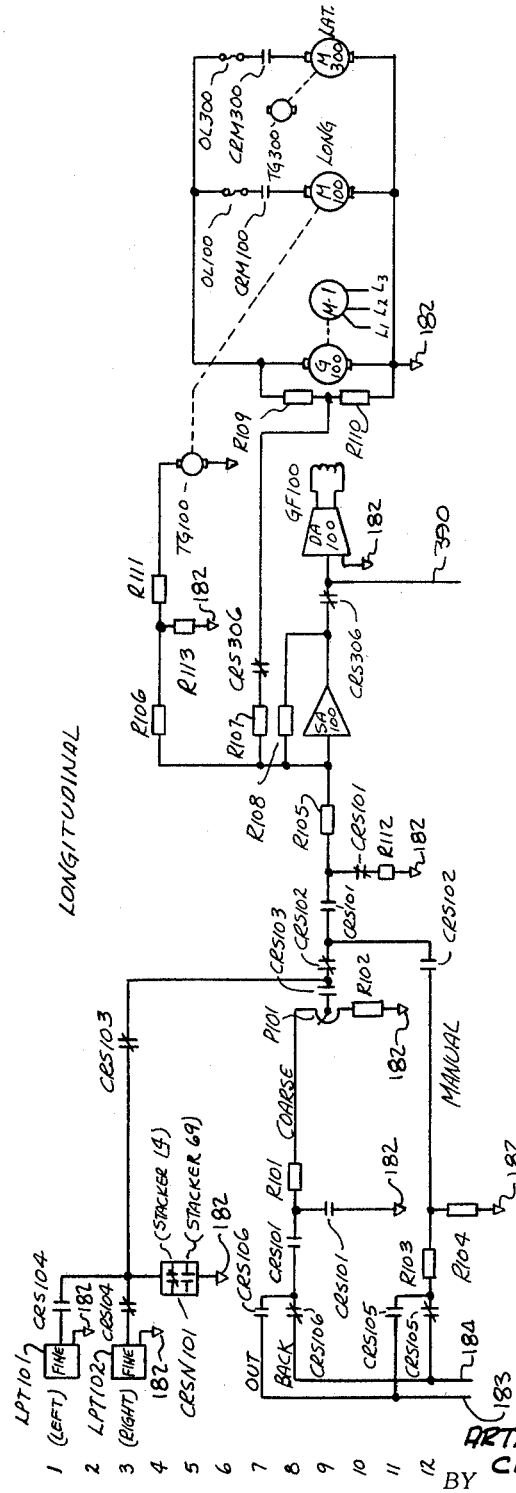
FIGS. 21a through 21f are schematic block diagrams of the stacker drive and servo control circuits.
Figure 21B:
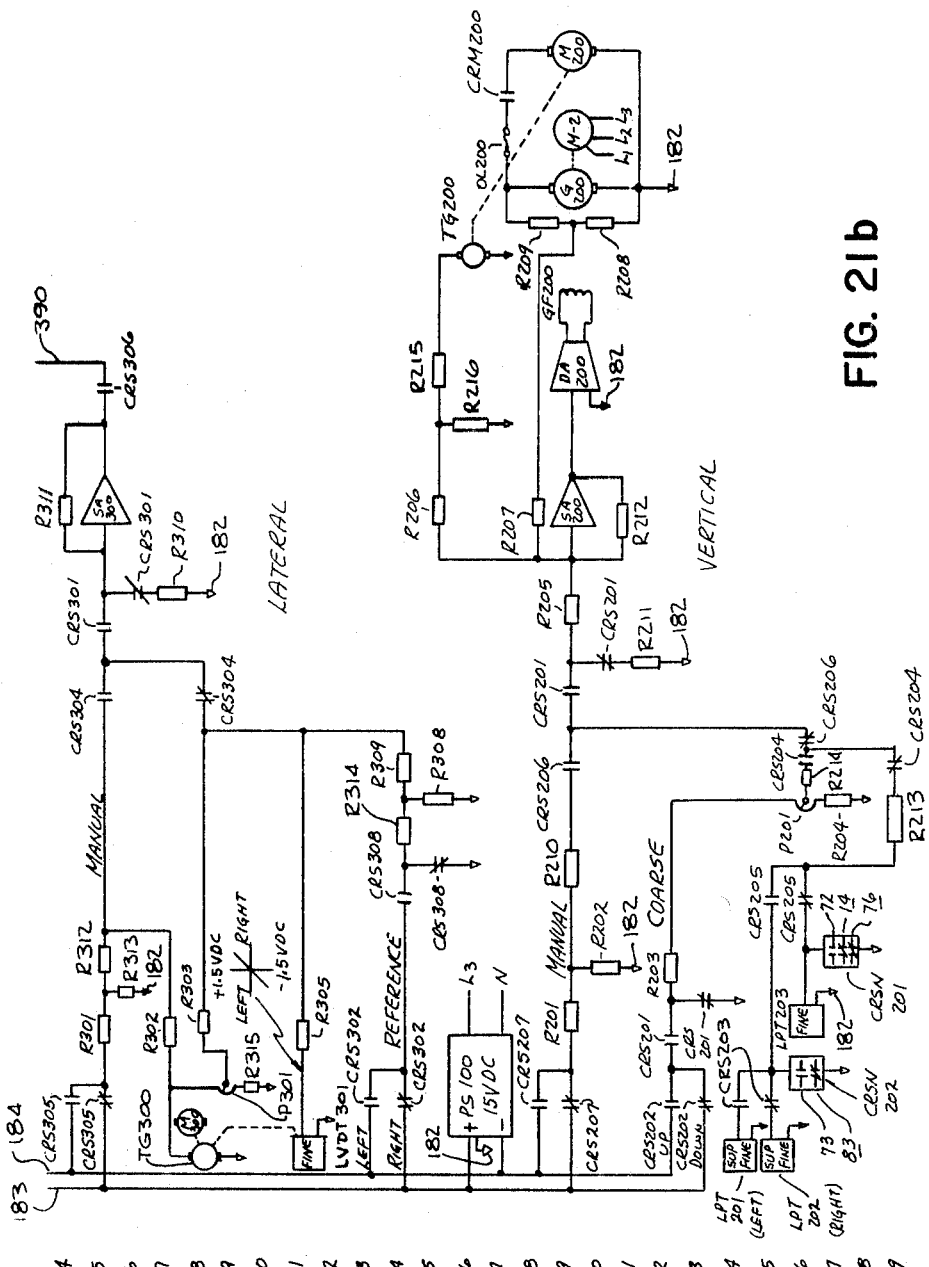

The lateral drive system does not make use of a "Coarse" mode of operation but uses only a fine mode of operation and a manual mode of operation. The fine mode of operation is accomplished by supplying a reference voltage from power supply PS–100 and developing a linear voltage which is negative for travel of the platform to the left and positive for travel of the platform to the right which is compared to the reference voltage to produce the proper position of the platform. Since the longitudinal motor M–100 is never operated while the lateral motor M–300 is operated, it is possible to use part of the longitudinal drive system for the lateral system and thus reduce the number of components, required. Generator G–100 is used to drive both longitudinal motor M–100 and lateral motor M–300 and a common driving amplifier DA–100 serves both the longitudinal and lateral driving systems. The manual circuit (line 15) in FIG. 21b is completed by a series circuit between lead 183 and the input to driving amplifier DA–100 by a series circuit in which there is connected a pair of normally closed relay contacts CRS–305, a resistor R–301, another resistor R–312, normally open relay contacts CRS–304 and CRS–301 all of which are connected to the input of a summing amplifier SA–300, the output being connected to driving amplifier DA–100 through a pair of normally open relay contacts CRS–306 and a connecting lead 390. A feedback resistor R–311 is connected between the output and input of summing amplifier SA–300 and connected between the input of summing amplifier SA–300 and ground through a resistor 9–310 and a pair of normally closed relay contacts CRS–301. Connected between ground and resistors R–301 and R–312, is a resistor R–313 and connected between lead 184 and normally closed relay contacts CRS–305 and resistor R–301, is a pair of normally open relay contacts CRS–305 (line 15). Thus the voltage supplied from either lead 183 or 184 in the manner just described for the longitudinal system, provides the direction signal to the lateral platform during manual operation. However, it is desirable to have a rate signal also applied to the driving motor to control its operation and this is accomplished by taking the output signal from tachometer generator TG–300 and applying it through a resistor R–302 to line 15 between resistor R–312 and normally open relay contacts CRS–304. The resistive element of a potentiometer P–301 and a resistor R–315 connected in series therewith, are connected between ground and the output of tachometer generator TG–300. The wiper arm of potentiometer P–301 is connected to line 15 between normally open relay contacts CRS–304 and CRS–301 through a resistor R–303 and a pair of normally closed relay contacts CRS–304. Thus a speed signal is supplied to summing amplifier SA–300 when the appropriate relay contacts are closed. In line 21 linear voltage differential transformer LVDT–301 is connected to summing amplifier SA–300 through a resistor R–305.

In line 24, a series circuit is formed between lead 183 and resistor R–303 (line 18) and normally closed relay contacts CRS–304 by a pair of normally closed relay contacts CRS–302, a pair of normally closed relay contacts CRS–308, a resistor R–314 and a resistor R–309. Connected between ground 182 and resistors R–314 and R–309, is a resistor R–308, and connected between ground 182 and normally open relay contacts CRS–308 and resistor R–314, is a pair of normally closed relay contacts CRS–308 (line 25). Connected between relay contacts CRS–302 and CRS–308 in line 24, and lead 184, is a pair of normally open relay contacts CRS–302 (line 23). Thus the reference voltage referred to previously is established to summing amplifier SA–300 to control the position and direction of the lateral platform as it is extended and retracted.

The vertical system of control is divided into one of a manual control, a coarse control, a fine control, and a superfine control. The coarse control moves the elevator vertically until the vertical position of the bin is established generally after which a magnetic strip is sensed on the mast of the Stacker and since the bins may sag somewhat or vary in their vertical heights, the superfine control is used to position the elevator opposite each of the bins vertically. In line 29, a series circuit is formed between a driving amplifier DA–200 and lead 183 supplying a positive voltage through a pair of normally closed relay contacts CRS–207, a resistor R–201, a resistor R–210, normally open relay contacts CRS–206 and CRS–201, a resistor R–205, which is connected to the input of a summing amplifier SA–200, and the output of summing amplifier SA–200 is connected to the input of driving amplifier DA–200. A feedback resistor R–212 is connected between the output and input of summing amplifier SA–200 in line 31. Connected between ground 182 and line 29 between relay contacts CRS–201 and resistor R–205, is a resistor R–211 and a pair of normally closed relay contacts CRS–201. Connected between ground 182 and resistors R–201 and R–210 is a resistor R–202 and connected between relay contacts CRS–207 and R–201 and lead 184, is a pair of normally open relay contacts CRS–207. Driving amplifier DA–200 has its output connected to a generator field GF–200 which forms the field of generator G–200. Generator G–200 is driven by motor M–2 which is excited through power lines L1, L2, and L3. One terminal of the armatures of generator G–200 and motor M–200 are connected to ground 182. Connected in series across the armature terminals of generator G–200, are a pair of resistors R–208 and R–209. A feedback circuit is formed at the junction of resistors R–208 and R–209 to the input of summing amplifier SA–200, through a resistor R–207 in line 28. A rate feedback signal is supplied from tachometer generator TG–200 to the input of summing amplifier SA–200 through a pair of resistors R–125 and R–206, another resistor R–216 being connected between the two just mentioned and ground 182. The motor driving circuit is completed by connecting the ungrounded armature terminal of generator G–200 to the other armature terminal of motor M–200 through an overload relay OL–200 and a pair of normally open relay contacts CRM–200. Thus the manual control circuit, is similar to that of the others just described.

The coarse mode of operation is established by another series circuit between ground 182 and lead 184 consisting of normally open relay contacts CRS–202, CRS–201, a resistor R–203, the resistive element of a potentiometer P–201, and a resistor R–204. A pair of normally closed relay contacts CRS–201 are connected between ground and relay contacts CRS–201 and resistor R–203 in line 32. The wiper arm of potentiometer P–201 is connected to line 29 between normally open relay contacts CRS–206 and CRS–201 through a resistor R–214, a pair of normally open relay contacts CRS–204, and a pair of normally closed relay contacts CRS–206. In line 32, another pair of normally open relay contacts CRS–202 are connected between lead 184 and the junction of normally closed relay contacts CRS–202 (line 33) and normally open relay contacts CRS–201 (line 32). This circuit thus provides the direction control that is needed to drive the vertical motor in the coarse mode of operation by opening or closing the appropriate relays in the circuit.

The fine mode of operation is controlled by a series circuit between ground 182 and the junction of relay contacts CRS–204 and CRS–206 which is formed by linear position transducer LPT–203, a pair of normally closed relay contacts CRS–205, a resistor R–213, and a pair of normally closed relay contacts CRS–204. Connected between linear position transducer LPT–203 and relay contacts CRS–205, is a null detector CRSN–201 which is also connected to ground. The null detector works in the same manner as that of CRSN–101 described in the longitudinal circuit with the exception that null detector CRSN–201 has a pair of normally open relay contacts connected in Stacker logic line 72 and normally closed contacts in Stacker logic line 14 and 76. Linear position transducer LPT–203 senses the magnetic strips which are on the Stacker mast and provides a fine mode of alignment for the elevator.

Because the bins may not be properly aligned with the magnetic elements on the Stacker, a superfine mode of control is desirable for both the left and right bin structures. In line 35, there is a series circuit between ground 182 and the junction of relay contacts 205 and resistor R–213 in line 36, formed by linear position transducer LPT–202, a pair of normally closed relay contacts CRS–203, and a pair of normally open relay contacts CRS–205. Connected in parallel with transducer LPT–202 and relay contacts CRS–203, is another linear position transducer LPT–201 which is connected to a pair of normally open relay contacts CRS–203. Transducer LPT–201 senses the left bin structure and LPT–202 senses the right bin structure magnetic elements. Connected between ground 182 and relay contacts CRS–203 and CRS–205 in line 35, is another null detector CRSN–202. Null detector CRSN–202 has a pair of normally open contacts which are located in Stacker logic circuit line 73 and a pair of normally closed contacts located in Stacker logic circuit line 83. Transducer LPT–201 and LPT–202 work in the same manner as the fine transducer LPT–203 with the exception of sensing a different magnetic element.

STACKER SERVO AND DRIVING CIRCUIT CONTROLS

Figure 21C:
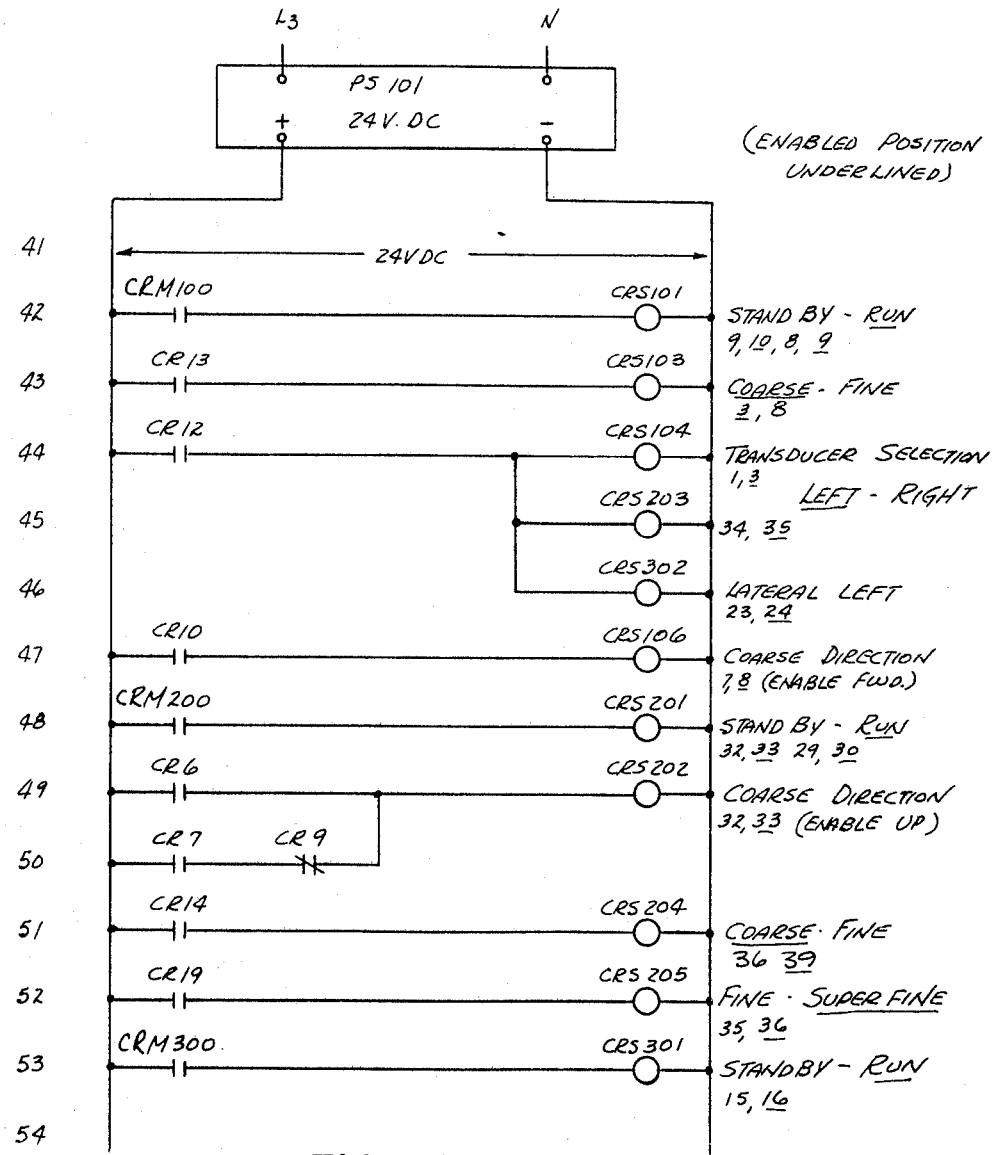
Figure 21D:
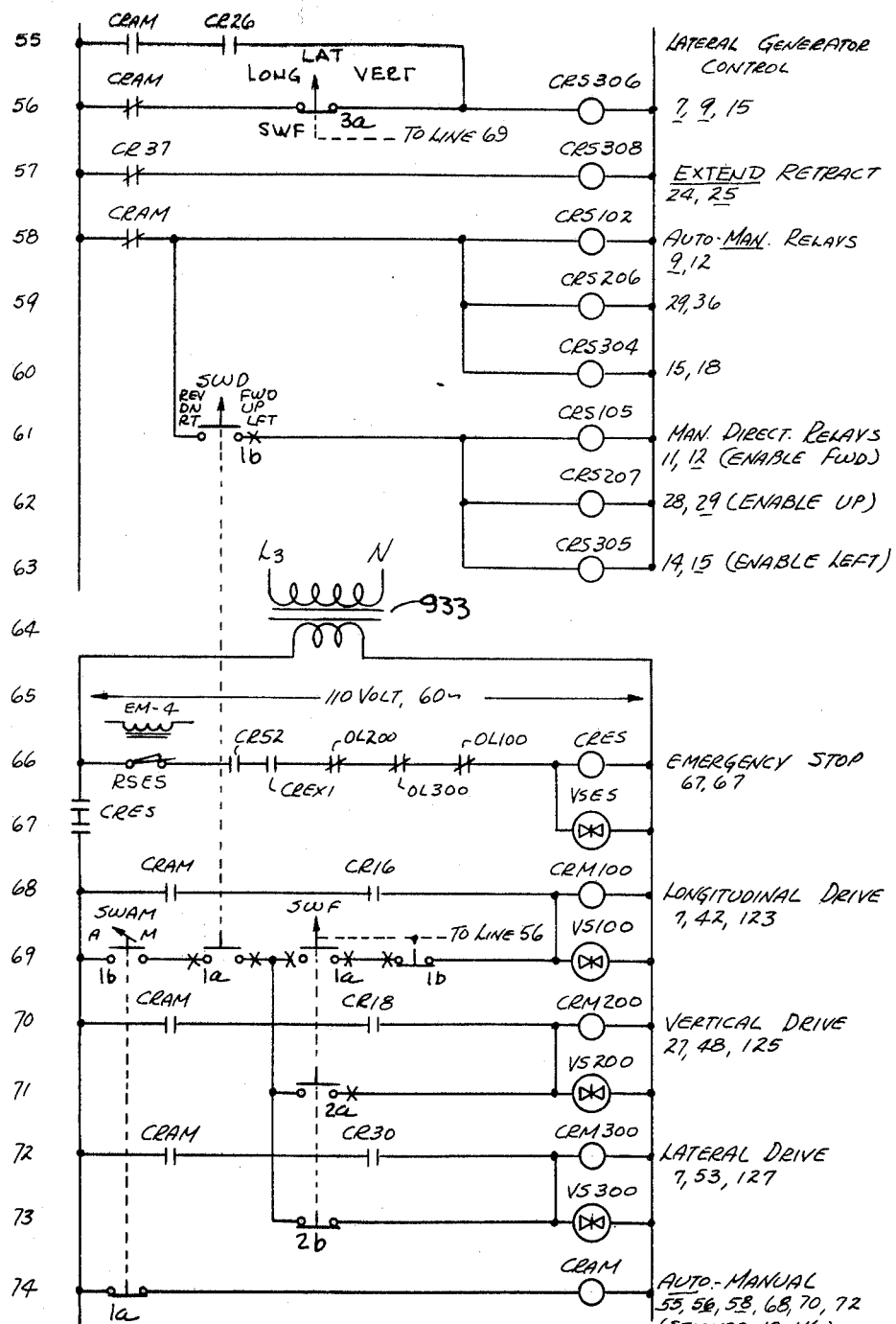

In FIGS. 21c and 21d, there is shown a direct current power supply PS–101 which is excited by alternating current from lines L3 and N. A 24 volt output is obtained from power supply PS–101 and each of the circuits to be described, is connected between the positive and negative voltage terminals of power supply PS–101. In line 42, there is connected a pair of normally open relay contacts CRM–100 and a control relay CRS–101. Control relay CRS–101 causes the longitudinal drive system to be switched from a standby to a run mode of operation. In line 43, normally open relay contacts CR–13 are connected to a control relay CRS–103 which controls the coarse-fine mode of operation, the system being in a coarse mode of operation when relay CRS–103 is energized. In line 44, normally open relay contacts CR–12 are connected to a control relay CRS–104 which when energized causes linear position transducer LPT–101 to be in the circuit, otherwise the transducer LPT–102 is in the circuit. Connected in parallel with control relay CRS–104, is another control relay CRS–203 which when energized puts linear position transducer LPT–201 in the circuit and when de-energized, places transducer LPT–202 in the circuit for the vertical superfine control. Also connected in parallel with control relay CRS–104, is another control relay CRS–302 which shifts the reference voltage to a reference voltage representative of lateral platform movement to the left when the relay is energized, and causes the platform to shift to the right when the relay is de-energized. In line 47, control relay CR–10 has a pair of normally open contacts connected to a control relay CRS–106 which changes the longitudinal direction of the circuit to be forward or down the aisle when in coarse control. Line 48 contains a pair of normally open relay contacts CRM–200 connected to a control relay CRS–201 which also shifts the mode of operation of the circuit from a standby to a run condition. In line 49, a pair of normally open relay contacts CR–6 is connected to a control relay CRS–202 which shifts the reference voltage in the coarse mode of operation and when enabled, the direction of movement of the elevator is vertically upward. Connected in parallel with control relay contacts CR–6 in line 49, is a pair of normally open relay contacts CR–7 and a pair of normally closed relay contacts CR–9 which are connected in series with each other (line 50). In line 51, a pair of normally open relay contacts CR–14 are connected to a control relay CRS–204 which switches the mode of operation to a vertically coarse mode of operation when energized, otherwise the system is operated in a fine mode of operation unless changed to a superfine mode of control. In line 52, normally open relay contacts CR–19 are connected to a control relay CRS–205 which shifts the mode of operation to a superfine control when the relay is energized, otherwise the mode of operation for the vertical drive system is in fine control when control relay CRS–204 is de-energized. Line 53 has a pair of normally open relay contacts CRM–300 connected to a control relay CRS–301 which causes the lateral driving circuit to go from a standby to a run condition when control relay CRS–301 is energized. Line 56 contains a pair of normally closed relay contacts CRAM connected in series with a section 3a of a function switch SW–F, and a control relay CRS–306 which determines whether generator G–100 is being controlled for lateral or longitudinal drive. Switch SW–F has three positions for controlling the functions of drive for Longitudinal, Lateral and Vertical. The position shown is one in which the switch is closed for the lateral position and when it moves to longitudinal or vertical, switch section 3a remains open. Connected in parallel with relay contacts CRAM and switch section 3a in line 56, is a series circuit in line 55 formed from normally open relay contacts CRAM and CR–26. In line 57, a pair of normally closed relay contacts CR–37 is connected to a lateral control relay CRS–308 which when energized causes the lateral platform to be extended. In line 58, normally closed relay contacts CRAM are connected to three control relays CRS–102 (line 58), CRS–206 (line 59), and CRS–304 (line 60). These relays are designated the auto-manual relays and are enabled for operation in the manual mode of operation. Since relay contacts CRAM in line 58 are closed when in the manual mode of operation, connected in parallel with the last three relays just mentioned, is a section 1b of the direction switch SW–D which is a three position switch and which is connected to a longitudinal forward control relay CRS–105 (line 61), a vertical up control relay CRS–207 (line 62) and to a lateral left control relay CRS–305 (line 63). Switch SW–D if rotated counterclockwise indicates a longitudinal direction of reverse, a vertical direction of down and a lateral position to the right while rotating the switch clockwise determines a longitudinal direction which is forward, a vertical direction which is upward, and a lateral direction which is to the left.

The lower part of FIG. 21d shows a transformer 933 which is connected to lines L3 and N to provide an alternating current output and all of the circuits to be described in this figure are connected between the two output lines. In line 66, there is an emergency series circuit having connected therein, reed switch RSES which is controlled by electromagnet EM–4 on the Transfer Cart, normally open relay contacts CR–52 and CREX–1, three normally closed overload contacts OL-200, OL-300 and OL-100, and emergency stop control relay CRES. Connected in parallel with control relay CRES is a pair of back to back diodes VSES to prevent surges across the relay windings. Connected in one of the 110 volt 60 cycle lines are two pair of normally open relay contacts CRES to insure that in the event one of the contacts should arc or remain closed, double protection is provided to the driving circuits. In line 68, normally open relay contacts CRAM and CR-16 are connected to a longitudinal drive control relay CRM-100. Connected in parallel with control relay CRM-100 is a pair of back to back diodes VS-100 used in the same manner just described for VSES. In line 69, there is connected in parallel with relay contacts CRAM and CR-16 of line 68, a series circuit comprising a switch section 1b of an auto-manual switch SW-AM, a section 1a of direction switch SW-D and a section 1a of function switch SW-F, and another section 1b of function switch SW-F. As shown, switch SW-AM is shown in the automatic mode of operation and when switched to the manual mode of operation, the contacts close. Switch section 1a of direction switch SW-D is closed for all of the directional conditions. Section 1a of switch SW-F is closed for both longitudinal and vertical conditions of operation and section 1b of the same switch is closed for the longitudinal and lateral positions of the switch. In line 70, normally open relay contacts CR-AM and CR-18 are connected to a vertical drive control relay CRM-200 which has a pair of back to back diodes VS-200 connected in parallel therewith. In line 71, a switch section 2a of function switch SW-F is connected to line 70 between relay contacts CR-18 and control relay CRM-200 and between section 1a of direction switch SW-D and section 1a of function switch SW-F on line 69. Section 2a of switch SW-F in line 71 is closed when in the vertical mode of operation and in all other modes is open. In line 72, normally open relay contacts CR-AM and CR-30 are connected to a lateral drive control relay CRM-300 which controls the lateral motor and has a pair of back to back diodes VS-300 connected in parallel with the relay. In line 73, a section 2b of function switch SW-F is connected between relay contacts CR-30 and control relay CRM-300 in line 72 and section 1a of direction switch SW-D and section 1a of function switch SW-F on line 69. Section 2b (line 73) is closed only in the lateral position. In line 74, section 1a of automatic-manual switch SW-AM is connected to auto-manual control relay CR-AM. As stated before, switch SW-AM has section 1b closed in the manual position and section 1a (line 74) is open in the manual position. All of the switches used for manual control such as the reset switch, PB-2, the auto-manual switch SW-AM the function switch SW-F and the direction switch SW-D are contained in a manual control box 185 found in FIG. 35. For a more thorough understanding of the switches and switch functions described herein, reference is made to the Joint Industry Conference, Electrical Standards For Industrial Equipment, Mar. 20–22, 1957, Appendix A.

Figure 21E:
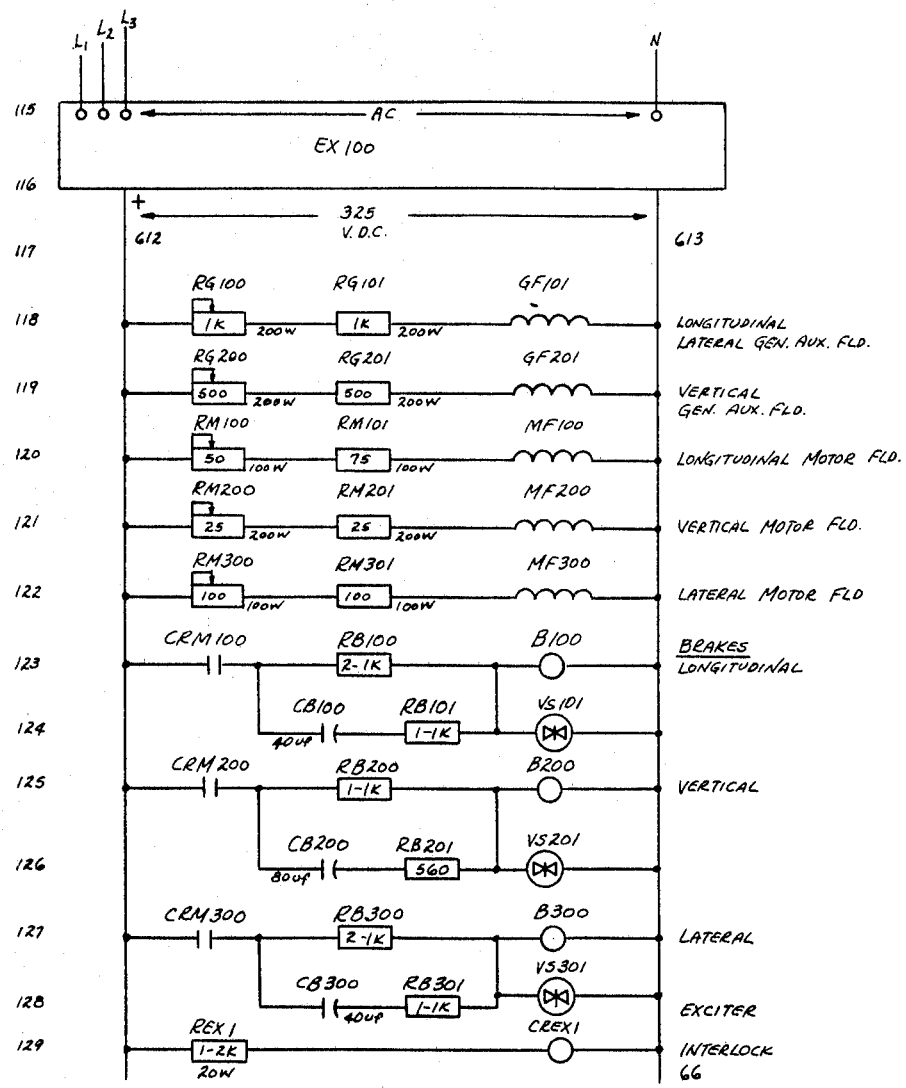

FIG. 21e shows an exciter EX-100 which produces a high voltage direct current for control of the different motor fields and generator aux. fields as well as the brakes associated with each motor. Exciter EX-100 produces a 325 volt direct current output which is applied to a pair of lines between which all of the circuits to be described are connected. The exciter is energized through lines L1, L2, L3 and N. In line 118, a variable resistor RG-100 is connected to a second resistor RG-101 which is in turn connected to a field GF-101 of the longitudinal-lateral generator G-100. In line 119, a variable resistor RG-200 is connected to another resistor RG-201 which is connected to vertical generator field GF-201. In line 120, a variable resistor RM-100 is connected to another resistor RM-101 which in turn is connected to longitudinal motor field MF-100. Line 121 contains a variable resistor RM-200 connected to a resistor RM-201 and a vertical motor field MF-200. Line 122 contains a variable resistor RM-300 connected to another resistor RM-301 which in turn is connected to a lateral motor field MF-300. Line 123 has normally open relay contacts CRM-100 connected to a brake resistor RB-100 and brake B-100. Brake B-100 is energized to release the brakes and anytime power is not applied, the brakes are set thus providing a fail-safe system. Connected in parallel with resistor RB-100, is a capacitor CB-100 and another resistor RB-101 (line 124). Connected in parallel with brake B-100 is a pair of back to back diodes VS-101 which are used for the same purpose as described previously. Line 125 contains normally open relay contacts CRM-200, resistor RB-200 and brake B-200 which controls the vertical drive system. A capacitor CB-200 and resistor RB-201 are connected in parallel with RB-200 and a pair of back to back diodes VS-201 are connected in parallel with brake B-200 (line 126). In line 127, a pair of normally open relay contacts CRM-300 are connected to a resistor RB-300 which is connected to brake B-300 that has a pair of back to back diodes VS-301 connected in parallel therewith (line 128). Line 128 also contains a capacitor CB-300 which is connected in series with a resistor RB-301, the combination being connected in parallel with resistor RB-300. In line 129, a resistor REX-1 is connected to the exciter interlock control relay CREX-1.

Figure 21F:
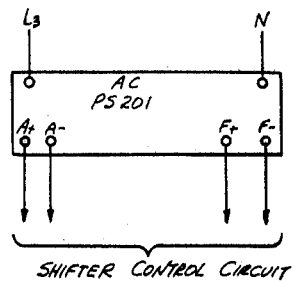

FIG. 21f shows a power supply PS-201 which has lines L3 and N connected at its input. The output provides excitation for the armature circuit and field circuits of the transducer shifter motor 201.

For a more thorough understanding of the operation of the Transfer Cart and the Stacker, different modes of operation will now be set forth along with the initial conditions required for each condition of operation.

TRANSFER CART OPERATION

Initial conditions

A certain set of initial conditions must be assumed before the operation of the Transfer Cart can be described. It will be assumed that the Stacker 100 is in a position of just having performed a Deposit mode of operation, and that the Transfer Cart 400 is "locked" to the bins at Aisle No. 1 location as found in FIG. 1, and that the load stations are empty on both sides of the Transfer Cart. In other words, both pallet dollies are "In" and unloaded. The Transfer Cart brake is locked to prevent movement and the Stacker has both the left addresser switch S-1 and right addresser switch S-2 in the "Off" condition. The lateral shift mechanism or platform is centered and de-energized, and both the longitudinal and vertical drive assemblies are in "fine" control, at a null position with the brakes set. The elevator is in the "Down" position, with no load aboard, and the present location of the Stacker is at "HOME" position. It will also be necessary to have the source of compressed air operating and applied to the compressed air line.

An example will now be given where it is desirable to have a load deposited on the Left Pallet Dolly 407, transfer the Stacker from Aisle No. 1 to Aisle No. 2, and deposit the load in a bin located in bin column 12 and row 2 (H-12, V-2). Reference is now made to FIGS. 11a through 11d, 12a through 12c, wherein the Transfer Cart Logic and Servo Schematics are found, and to the Relay Chart in FIGS. 23a through 23f showing the condition of the different control elements. With the above conditions just described, and with power applied to the Transfer Cart, through power lines L1, L2, L3 and N, the following elements are energized or in the condition as will be described when the Auto-Manual Switch SW-400 is in Auto. With power applied to the Transfer Cart and logic circuit, Air Stop Solenoid L.SOL-8 (line 43L) is energized. When the Stacker is centered and at the "HOME" position on the Transfer Cart with the lateral shift mechanism centered, it will be seen that reed switch RS–1 is closed (line 16.4) by stacker actuate electromagnet S.EM–1, which energizes control relay CR–13. Upon the closing of limit switch L.LS–1 (line 39L), control relay L.CR–11 is energized, which in turn energizes LEFT PALLET DOLLY HOME ELECTROMAGNET L.EM–2 (line 35L) and LEFT PALLET DOLLY "IN" light L.LT–7 (line 39.5L) is energized as well as RIGHT PALLET DOLLY "IN" light R.LT–7. It will be recognized that there are control elements between lines 26 and 46 of the left and right dolly control circuits (FIGS. 11c and 11d) which are identical, and, therefore, in this particular example, only the left pallet dolly circuit (FIG. 11c) will be explained, it being understood that the right pallet dolly circuit is identical. It will also be seen that limit switch R.LS–1 is closed (line 39R), and consequently the contacts of control relay R.CR–11 (line 1) are closed. It will also be observed that reed switch L.RS–7 and limit switch L.LS–12 are closed (line 41L) thus energizing control relay L.CR–12. When energized, control relay L.CR–12 allows the dolly to move outward as long as limit switch L.LS–12 is not tripped, which occurs whenever the Stacker lateral platform is extended from the Stacker. In other words, as long as the lateral shift mechanism of the Stacker is centered and the Stacker is not programmed to enter that load station, the dolly may move out from its load station position. It will also be observed that the Transfer Cart 400 will be "LOCKED" to the bin aisle 907 from the last aisle-to-aisle transfer, and in such condition, the Transfer Cart "LOCKED" light LT–2 (line 16.6) will be energized indicating the Transfer Cart will not move. It should also be mentioned that the Transfer Cart TRANSFER switch PB–1 will most likely be in the "Transfer" position having remained at that position from the last mode of operation.

Dolly-out mode of operation

The left pallet dolly switch L.PB–2 is turned to the "OUT" position and depressed, and LEFT OUT-SOLENOID L.SOL–5 (line 28L) is energized which mechanically controls three-way valve 462 which receives compressed air at its input from the compressed air source 402 and supplies compressed air at its output to cylinder 457 and plunger 461 which causes the pallet dolly to be extended outwardly as long as the left pallet dolly switch L.PB–2 is maintained in the "OUT" condition. Once the left pallet dolly starts to move outwardly towards its most extended position, limit switch L.LS–1 is opened (line 39L), and control relay L.CR–11 again resumes a de-energized state, de-energizing the LEFT PALLET DOLLY HOME ELECTROMAGNET L.EM–2 (line 35L) and the "IN" light L.LT–7 is de-energized (line 39.5L). Upon the dolly reaching the most extended position, limit switch L.LS–11(A) is closed (line 45L), and the left pallet dolly "OUT" light L.LT–8 is energized.

LOAD POSITIONED ON LEFT PALLET DOLLY

"Dolly-in" mode of operation

Once the pallet is aboard the dolly, limit switch L.LS–7 is closed (line 31L) and limit switch L.LS–7(A) is opened (line 40L) and these switches remain in this position as long as the pallet is aboard the dolly.

After the load is positioned on left pallet dolly 407, it is then desirable to retract the pallet dolly or cause it to move to its "IN" position. This is done by moving the LEFT PALLET DOLLY SWITCH L.PB–2 to the "IN" position, and depresing the switch (line 26L) which causes control relay L.CR–7 to be energized, which in turn enrgizes LEFT IN-SOLENOID L.SOL–6 (line 30L). The LEFT IN-SOLENOID L.SOL–6 actuates three-way valve 462 to cause the compressed air to be applied against the opposite end of the piston through compressed air line 464 in the pallet dolly drive cylinder, and the dolly is moved inwardly (towards the Stacker). As the dolly is retracted from its extended position, the LEFT PALLET DOLLY "OUT" light L.LT–8 is de-energized (line 45L). At this point in the operation, once the dolly starts to move inwardly, if the load on the pallet is too high, the load is stopped and the dolly is reversed (this mode of operation will be described at the finish of the "Dolly In" mode of operation).

As the left dolly continues to move inwardly, it eventually reaches the "HOME" position where limit switch L.LS–1 is again closed by channel member 473 (line 39L), and control relay L.CR–11 is again energized. Upon control relay L.CR–11 being energized, it in turn energizes the LEFT PALLET DOLLY HOME ELECTROMAGNET L.EM–2 (line 35L) and simultaneously energizes LEFT POSITION SOLENOID L.SOL–7 (line 31L). The LEFT PALLET DOLLY "IN" light L.LT–7 is also energized (line 39.5L). LEFT POSITION SOLENOID L.SOL–7 is mechanically coupled to valve 800 which is used to control the compressed air from line 439 to cylinder 802 and plunger 805 which is coupled to the positioning arm 807 to square up the pallet in one direction only. As position arm 807 moves the pallet, limit switch L.LS–13 (line 44) is closed, which energizes LEFT POSITION SOLENOID L.SOL–9. This solenoid is mechanically coupled to valve 810 which is used to control the compressed air in line 811 to another cylinder 812 and plunger 815 which is located 90 degrees or perpendicular to cylinder 802, and position arm 817 then centers the pallet at load station 409. That is, the pallet is "squared up" at the load station so that it may be in a position to be lifted from the load station by the lateral shift platform 386 of the Stacker.

Once the pallet has been positioned on the load station, that is, centered so that the Stacker may pick up the pallet, limit switches L.LS–8, L.LS–9 and L.LS–10 are closed which causes control relay L.CR–22 to be energized (line 32L). It will be observed that the limit switches are located at three different positions on the pallet dolly as seen in FIGS. 5 and 6. Upon control relay L.CR–22 being energized, control relay L.CR–7 is de-energized (line 27L). Also, the LEFT POSITION SOLENOID L.SOL–6 is de-energized (line 31L), stopping the movement of position arm 807 (FIG. 6a), and the LEFT POSITION SOLENOID L.SOL–9 is de-energized (line 44L), thus allowing both position arms to retract to their normal de-energized positions. The LEFT IN-SOLENOID L.SOL–6 is de-energized (line 30L) because the pallet has been retracted to its innermost position, and at this time the LEFT PALLET POSITION ELECTROMAGNET L.EM–1 is energized (line 34L), which supplies a magnetic field to close reed switch RS–17 (FIG. 30a) in the Stacker logic circuit (line 83) (FIG. 20f). At the same time, the LEFT PALLET "READY' light L.LT–5 is energized (line 33L) to indicate that the pallet is ready to be picked up by the Stacker.

LOAD TOO HIGH

In certain cases, the load which is positioned on the pallet may be too high to be accepted by the bins, and therefore, provision is made to reject the load under such conditions. After the load has been placed upon LEFT PALLET DOLLY 409, and the LEFT PALLET DOLLY "IN" switch L.PB–2 has been pressed and released, control relay L.CR–7 is energized (line 26L), which in turn energizes the LEFT IN-SOLENOID L.SOL–6 (line 30L), which starts the pallet dolly towards the "in" position. If the light beam is broken from lamp L.LT–9 to the LEFT HIGH LOAD P.E.C., which happens when the load is too high, control relay L.CR–20 is energized (line 38.5L), which in turn energizes control relay L.CR–9 (line 36L). Control relay L.CR–9 prevents the pallet dolly from moving further by de-energizing control relay L.CR–7 (line 26L), which in turn de-energizes the LEFT IN-SOLENOID L.SOL–6 (line 30L). At the same time the LEFT OUT-SOLENOID L.SOL–5 is energized (line 29L), which starts the pallet dolly moving outwardly rather than inwardly, and the LEFT "HIGH LOAD" light L.LT–6 is energized indicating that the load is too high and will be returned to the "out" position. As the dolly reaches its outermost position, limit switch L.LS–11 is opened by rack 485 (line 36L), thus de-energizing control relay L.CR–9 which extinguishes the LEFT "HIGH LOAD" light L.LT–6, and de-energizes the LEFT OUT-SOLENOID L.SOL–5 (line 29L). Another limit switch L.LS–11(A) is closed by rack 485 (line 45L), which energizes the LEFT "DOLLY-OUT" light L.LT–8 and because the load has returned to its outward-most position, the LEFT PHOTOELECTRIC CELL L.PEC is opened thus de-enerizing control relay L.CR–20 (line 38.5L).

NO LOAD, DOLLY-IN

Under certain circumstances, after the operator has caused the left pallet dolly to be extended outwardly to receive a pallet, it may be desirable to cause the pallet dolly to return to its "HOME" position. In this case, the LEFT PALLET DOLLY "IN" switch L.PB–2 is depressed, which energizes control relay L.CR–7 (line 26L), which in turn energizes the LEFT IN-SOLENOID L.SOL–6 (line 30L) causing valve 462 controlling the compressed air to force the plunger 461 in cylinder 457 to move the pallet dolly towards a "HOME" position. The LEFT PALLET DOLLY "IN" switch L.PB–2 may be released as the pallet starts its return to the inner most position and limit switch L.LS–1(A) is opened (line 45L), which de-energizes the LEFT PALLET DOLLY "OUT" light L.LT–8. As the pallet dolly reaches the "IN" position, limit switch L.LS–1 is closed (line 39L), which energizes control relay L.CR–11 which in turn energizes control relay L.CR–10, while at the same time, the LEFT PALLET DOLLY "IN" light L.LT–7 is de-energized (line 39.5L). Control relay L.CR–10 causes control relay L.CR–7 to be de-energized (line 26L), which in turn de-energizes the LEFT IN-SOLENOID L.SOL–6 (line 30L). Control relay L.CR–10 is then de-energized through a pair of open contacts of control relay L.CR–7 (line 40L). It will be apparent that the positioning solenoids causing position arms 807 and 817 to move were not energized since there was no need to do so with no pallet aboard.

LEFT RECYCLE

The occasion may also arise where the Stacker has deposited a load on the left pallet dolly, and it may be desirable to replace the load in the bins, but in a different location. In this condition, obviously there is no need to send the pallet dolly out and have it brought back to be re-positioned. However, because the pallet may be off center or turned to one side, it is necessary to re-position the pallet so that the Stacker may pick up the load. This is accomplished by pressing the LEFT PALLET DOLLY "IN" switch L.PB–2 and releasing the same, which energizes control relay L.CR–7 (line 26L), which in turn energizes the LEFT IN-SOLENOID L.SOL–6 (line 30L), but of course the pallet dolly is already at its "HOME" position, where limit switch L.LS–1 is closed, thus energizing control relay L.CR–11 (line 39L). Control relay L.CR–11 in turn energizes the LEFT DOLLY HOME ELECTROMAGNET L.EM–2 (line 35L) and the LEFT POSITION-SOLENOID L.SOL–7 (line 31L). The fact that limit switch L.LS–1 is closed, also keeps the LEFT DOLLY "IN" light L.LT–7 energized. Once the position arm 807 which is controlled by cylinder 802 engages and closes limit switch L.LS–13, the LEFT POSITION SOLENOID L.SOL–9 is energized (line 44L). Of course, if the pallet were correctly positioned, the following event would take place immediately upon control relay L.CR–11 being energized, and if the pallet was not formerly in proper position, upon being so positioned, limit switches L.LS–8, L.LS–9 and L.LS–10 (line 32L) are closed and control relay L.CR–22 is energized, which in turn de-energizes control relay L.CR–7 (line 27L) thus stopping the "IN" mode of operation. At the same time the LEFT POSITION SOLENOID L.SOL–7 is de-energized (line 31L) and the LEFT POSITION SOLENOID L.SOL–9 is also de-energized (line 44L). The LEFT IN-SOLENOID L.SOL–6 is also de-energized (line 30L) by control relay L.CR–22 while energizing the LEFT PALLET POSITIONED ELECTROMAGNET L.EM–1 (line 34L), which supplies a magnetic field to close reed switch RS–16 in the Stacker logic circuit (line 83), and energizing the LEFT PALLET DOLLY "READY" light L.LT–5 (line 33L). Therefore, the pallet is again in a position to be picked up by the Stacker.

LEFT PALLET DOLLY EMERGENCY STOP

In some cases, it may be desirable to stop the pallet dolly at a particular position due to an obstruction in the line of movement of the pallet dolly, and this may be accomplished by pressing the "STOP" switch L.S–1 on Control Panel 411, which de-energizes air stop solenoid L.SOL–8 (line 43L). The LEFT AIR STOP SOLENOID L.SOL–8 is a solenoid which actuates valve 437 in compressed air line 405 at a point immediately downstream of compressed air source 402 so that the compressed air is shut off to all of the control cylinders. Thus the cylinders would be held in their respective positions upon energizing the STOP switch L.S–1.

SELECT AISLE LOCATION

Since the Transfer Cart is now located at Aisle No. 1, it may be assumed that the Aisle Selector Switch SS1–1 was pressed, and in so doing, it will be observed that reed switch RS–8 is closed, and that switch No. 1 (FIG. 32) is depressed (line 17.1), which at this instant produces no particular result. It will be observed however, that reed switch RS–3 is also closed (line 22) which energizes control relay CR–8. Control relay CR–8 is used to further determine the mode of operation of the Transfer Cart longitudinal motor and causes control relay CRS–403 (FIG. 12) in the Transfer Cart servo-circuit (servo line 20) to be energized and assume a "fine" mode of operation. This then is the state of the transfer logic circuit with respect to aisle selection prior to selecting a new aisle location. Aisle Selector Switch SS2–2 is depressed, and in such condition, reed switch RS–8 remains closed (line 17.1), and reed switch RS–3 also remains closed (line 22). However, at this time, the Selector Switch SS–1 causes aisle switch No. 1 to assume its undepressed position, and aisle switch No. 2 is then depressed. Under such a condition, it will be seen that reed switch RS–9 will remain open (line 17.2), since magnetic strip 832 (FIG. 32) associated with reed switch RS–9 has not yet been reached (located at aisle No. 2), and reed switch RS–4 (line 23) also remains open since magnetic strip 832 closes both reed switches RS–9 and RS–4 when the Transfer Cart approaches aisle No. 2. It will be observed that voltage is applied through switch section c to reed switch RS–4 (line 23), and that sections b and d of switch No. 2 of the Aisle Selector Switch SS–1 are in an open condition. Since there is no longer an electrical path through Switch No. 1 of the Aisle Selector Switch SS–1, control relay CR–8 is de-energized (line 23). De-energizing control relay CR–8 is de-energized (line 23). D-energizing control relay CR–8 causes control relay CRS–403 of the Transfer Cart servo-circuit (FIG. 12b) to also be de-energized (servo line 20), thus placing the motor circuit in a position to receive a "COARSE" signal. Once the aisle has been selected, the Transfer Cart must then be unlocked from the bin before transferring to the next aisle.

UNLOCKED TRANSFER CART

The TRANSFER SWITCH PB–1 is then rotated from the "TRANSFER" position to the "UNLOCK" position and depressed and held, which energizes control relay CR–1 (line 1). Control relay CR–1 energizes BACK SOLENOID SOL-1 (line 5) which controls three-way valve 441 that is connected to the compressed air line so that cylinders 451 and 434 withdraw plungers 454 and 436 at both the top and bottom respectively of the Transfer Cart which is locked to the bin structure 900. In order to prevent the operator from changing the aisle selection to a different aisle, a PUSH BUTTON LOCK SOLENOID SOL-4 is energized (line 18.5) which physically locks the Aisle Selector Switch SS-1, to prevent a change of aisle positions while the Transfer Cart is actually moving. Once the locking plungers 454 and 436 have been withdrawn from the bins, limit switches LS-2 and LS-3 close, which energize control relay CR-4 (line 7) and limit switches LS-14 and/or LS-15 close and energize interlock electromagnet EM-4 (line 7.5). Control relay CR-4 energizes the Transfer "UNLOCK" light LT-1 indicating the Transfer Cart is disconnected from the bins and de-energizes the BACK SOLENOID SOL-1 (line 5). Control relay CR-4 also de-energizes the transfer "LOCKED" light LT-2 (line 16.6). At this point the TRANSFER SWITCH PB-1 may be released from the "UNLOCK" mode of operation. Energizing interlock electromagnet EM-4 opens reed switch RSES in the Stacker servo circuit (stacker servo line 66) to prevent the Stacker from moving in any direction during transfer.

TRANSFER FROM AISLE 1 TO AISLE 2

The TRANSFER SWITCH PB-1 is turned to the "TRANSFER" position and depressed and held in the depressed condition where control relay CR-2 is energized (line 8), which in turn energizes the "TRANSFER" light LT-3 (line 9). Control relay CR-2 also energizes control relay (of the latching type) CR-3L (line 10) which in turn energizes "WARNING" light LT-4 (line 16) which is of the emergency rotating type indicating that the heavy machinery is about to be set in motion. Because the Transfer Cart is initially at Aisle No. 1, reed switch RS-8 is closed by magnetic strip 830 (line 17.1), and upon the energizing of control relay CR-2, control relay CR-6L (the "L" indicates a latching relay) is energized which is used to determine the Transfer Cart direction of motion. In the energized state, control relay CR-6 causes the Transfer Cart to move from left to right where the aisle designations are numbered from left to right, that is, 1 through 4. Control relay CR-6 energizes Transfer Cart servo-relay (FIG. 12b) CRS-402 (servo line 19). Control relay CR-2 also energizes Transfer Cart servo-relay CRS-M400 (servo line 27), which in turn energizes motor M-400 (servo line 5). In addition thereto, control relay CRS-M400 also energizes control relay CRS-401 (servo line 18).

At this point, a brief look at the Transfer Cart servo circuit will disclose the operation of the driving mechanism for the Transfer Cart. Since control relay CRS-403 is de-energized (servo line 20), it will be seen that the signal for the driving mechanism is obtained from power supply PS-400 and the fine transducer signal is blocked by the open relay contacts (servo line 12). Switch SW-400 designated AUTOMATIC-MANUAL is set in the "AUTOMATIC" mode of operation in which the switch contacts are closed (servo lines 21 and 27), and are open for the contacts normally used with the "MANUAL" mode of operation (servo lines 22 and 26). When control relay CR-2 is energized, motor control relay CRS-M400 is energized (servo line 26) which closes the circuit to motor M-400 (servo line 5), and removes the dynamic braking from the motor (servo line 6). At the same time, control relay CRS-M400 energizes control relay CRS-401 (servo line 18). Control relay CRS-401 controls the input to control amplifier 931, and when energized removes the ground from the amplifier (servo line 8) and applies a direct current signal from power supply PS-400 (servo line 7). Control relay CRS-401 also removes the ground from the input of summing amplifier SA-400 (servo line 8), and applies the output from control amplifier 931 to summing amplifier SA-400 (servo line 7). Since control relay CRS-402 was energized by control relay CR-6L, a positive 15 volts is applied to the input of control amplifier 931 (servo line 7) to cause movement of the Transfer Cart to the right. The motor will then drive the Transfer Cart in this condition until such time as the Transfer Cart reaches magnetic strip 832 adjacent to aisle No. 2, at which time the Transfer Cart logic circuit is again affected.

Returning now to the Transfer Cart logic circuit, reed switch RS-9 will now be closed by magnetic strip 832 adjacent to aisle No. 2, and in so doing, control relay CR-6L is again energized through its latching coil. Reed switch RS-8 and reed switch RS-3 are now both in an open condition, but reed switch RS-4 is closed which energizes control relay CR-8 (line 23) which in turn energizes servo-control relay CRS-403 (servo line 20). Upon energizing control relay CRS-403, the mode of operation for the servo is shifted from one of a "COARSE" drive in which the signal is taken from power supply PS-400, to one of a "FINE" drive where the signal is taken from transducer LPT-401 which is controlled by the magnetic strips adjacent to the aisle such as magnetic strip 497 (FIGS. 12a and 29) as the Transfer Cart moves to aisle No. 2. This is accomplished by opening the output circuit of control amplifier 931 (servo line 7) and closing the circuit from transducer LPT-401 to summing amplifier SA-400 (servo line 12). It should be observed that tachometer TG-400 is also supplying a feed-back or speed signal to the input of the summing amplifier to provide a positive control over motor M-400. As the Transfer Cart approaches the aisle and becomes aligned with the aisle, the permanent magnet PM-1 (FIG. 29) located on the bin structure closes reed switch RS-2 (line 13) which energizes control relay CR-5. Control relay CR-5 de-energizes the transfer "UNLOCK" light LT-1 (line 3) and de-energizes control relay CR-1 (line 1). At the same time, FORWARD SOLENOID SOL-2 (line 6) is energized which is mechanically coupled to three-way valve mechanism 441 for causing the cylinders to again move the plungers 454 and 436 into engagement with the lock structures 455 and 444 on the bins (FIGS. 9a and 9b), and unlatch control relay CR-3UNL (line 14) is energized but since control relay CR-3L is still energized, there is no effect upon control relay CR-3L, and it remains in the energized state. However, upon control relay CR-1 being de-energized (line 1), it will be seen that control relay CR-6L is electrically de-energized (line 17.8), but remains mechanically latched because unlatch control relay CR-6UNL has not as yet been electrically energized (line 18). Upon the contacts of control relay CR-5 closing and energizing unlatch control relay CR-6UNL (line 18), control relay CR-6L is mechanically unlatched and de-energized (line 17.8) which in turn de-energizes servo-control relay CRS-402 (servo line 19). It will also be observed that upon de-energizing control relay CR-1, that the PUSH BUTTON LOCK SOLENOID SOL-4 is de-energized (line 18.5).

TRANSFER CART LOCKS

Once the Transfer Cart 400 is locked to the bin structure 900, limit switches LS-2, LS-3, LS-14, and LS-15 are opened which de-energize control relay CR-4 (line 7) which in turn de-energizes control relay CR-2 (line 8) and the interlock electromagnet EM-4 restoring the stacker servo circuit. Control relay CR-2 in turn de-energizes servo-control relay CRSM-400 (servo-line 27). Servo-control relay CRSM-400 de-energizes motor M-400 (servo line 5) and de-energizes control relay CRS-401 (servo line 18). Control relay CR-2 also de-energizes the "TRANSFER" light LT-3 (line 9) at which time the TRANSFER switch PB-1 may be released from its depressed state. Also, control relay CR-2 de-energizes control relay CR-3L (line 10) since unlatch control relay CR-3UNL is still energized at this point, and control relay CR-3L extinguishes the "WARNING" light LT-4 (line 16). In addition thereto, control relay CR-2 de-energizes the BRAKE SOLENOID SOL-3 (line 15) and locks the Transfer Cart from movement. Control relay CR-4 also de-energizes control relay CR-5 (line 13) which in turn de-energizes the FORWARD SOLENOID SOL-2 (line 6), thus shutting off the compressed air to cylinders 451 and 434 for locking the Transfer Cart to the bin structure and also de-energizes unlatch control relay CR-3UNL (line 14), and de-energizes unlatch control relay CR-6UNL (line 18). Control relay CR-4 also energizes the transfer "LOCKED" light LT-2 (line 16.6). It will now be observed that the Transfer Cart is in the same condition as it was at the beginning of the transfer mode of operation with the pallet on the left pallet dolly at the "HOME" position.

ALL AISLE SWITCHES NON-DEPRESSED

If at any time during the selection of the aisle with the Aisle Selector Switch SS-1, the push buttons should assume a condition where none of the switches are pressed or energized, there would not be an intelligent signal transmitted to the motor drive circuits, and, therefore, such a condition should not be allowed to exist. For this reason, control relay CR-21 is energized whenever all the Selector Switch buttons of SS-1 are raised or non-energized (line 17), and this will be seen by tracing the circuit through contacts d of each of the switch sections. Upon being energized, control relay CR-21 de-energizes control relay CR-2 (line 8) so that the transfer function can never be completed since control relay CR-2 controls the energization of motor M-400. Upon selecting any of the buttons of the Aisle Selector Switch SS-1 and depressing any one of them, control relay CR-21 is de-energized (line 17) by breaking the circuit just described.

All of the possible modes of operation or variations thereof have been described for the Transfer Cart. It will now be necessary to describe the operation of the Stacker in taking the pallet load from the Transfer Cart and depositing it in the appropriate bin, and where the reverse mode is completed by withdrawing a pallet from a bin and depositing it at a load station.

STACKER OPERATION FOR DEPOSIT MODE

Initial conditions

Certain initial conditions must be assumed before the operation of the stacker can be fully set forth. It will be assumed that the following conditions and modes of operation have taken place or exist:

(1) Switch SW-400 on the Transfer Cart is set to "Automatic" and the SW-AM switch on the Stacker is set to "Auto."

(2) Power is applied from the Transfer Cart (line 11) in FIG. 11a.

(3) The load is aboard the Left Pallet Dolly and positioned at the load station ready for a Deposit mode of operation with the dolly in HOME position.

(4) The Transfer from Aisle No. 1 to Aisle No. 2 has been completed.

The Transfer Cart is locked in place in front of Aisle No. 2 and the Stacker had previously made a Deposit using the left addresser where the address was H-10, V-2 and is ready to be set in motion with the following Transfer Cart and Stacker conditions existing:

TRANSFER CART COMPONENTS ENERGIZED

Control Relay L.CR-11—Control Relay CR-13
Dolly Home Electromagnet L.EM-2—Control Relay L.CR-11
Control Relay L.CR-22—Transfer Cart-Locked Light LT-2
Left Pallet Positioned Electromagnet L.EM-1—Control Relay R.CR-11
Left Pallet Ready Light L.LT-5—Right Dolly Home Electromagnet R.EM-2
Left Dolly-In Light L.LT-7—Control Relay R.CR-22
Right Dolly-In Light R.LT-7.

It is desirable to pick-up the pallet at the left load station 409 on the Transfer Cart and deposit the load in a left bin twelve columns longitudinally away and two rows high (H-12, V-2).

STACKER SWITCHES ACTUATED

| Switch Name | Left Addresser | Right Addresser |
|---|---|---|
| Work Mode Sw. | SS-1 "Deposit" | SS-2 "Withdraw" |
| Load Station Selector Sw. | SS-4 "Left" | SS-6 "Right" |
| Bin Selector Sw. | SS-3 "Left" | SS-5 "Right" |
| Long. Bin No. Sw. | SS10-10, SS11-2 | SS13-00, SS14-9 |
| Vert. Bin No. Sw. | SS12-2 | SS15-4 |
| Left Addresser | S-1 "Off" | |
| Right Addresser | | S-2 "Off" |

STACKER PRE-STANDBY MODE

| Item: | Status |
|---|---|
| Actuate Switch PB-1 | OFF. |
| Lateral Platform | Centered and OFF. |
| Longitudinal Servo | Fine Control, At Null, Brake Set. |
| Vertical Servo | Fine Control, At Null, Brake Set. |
| Elevator | Down. |
| Load | Empty. |
| Location | Home Position. |

Reference is now made to the Stacker Logic and Servo and to Relay Chart FIGS. 24a through 24-1, showing the and to Relay Chart FIGS. 24a through 24-1, showing the conditions of the different control elements (see FIG. 34a). The Auto-Manual switch SW-AM (FIG. 35) is set in the Auto position which immediately energizes control relay CR-AM in the Stacker servo circuit (FIGS. 21a through 21f, servo line 74) which in turn de-energizes control relays CRS-102, CRS-206, and CRS-304 (servo lines 58, 59 and 60). Also control relay CRS-306 is energized (servo line 56). Since power is received from the Transfer Cart (line 11, FIG. 11) control relay CR-52 is energized (line 2) which in turn energizes control relay CR-53 (line 7). Control relay CR-53 in turn energizes unlatch control relay CR-12UNL (line 60), unlatch control relays CR-8UNL and CR-9UNL (line 52). Also, the "Power On" light LT-1 is energized (line 15) as well as unlatch control relays CR-26UNL (line 98) and CR-33UNL and CR-34UNL (line 105). At this point it will also be observed that the Power Supplies for all of the Stacker Servos are energized, as well as the logic direct current supply.

After the last mode of operation, the transducer shifter bar 263 was moved to an UP position (the elevator is DOWN) and limit switch LS21-2 is closed thus energizing control relay CR-36 (line 112). At the same time, because the elevator is in a "safe quandrant" reed switch RS23-1 (line 132) is also closed by magnetic strip 244 which energizes control relay CR-50 (line 130). With the elevator platform 386 centered, limit switch LS-22 is closed which energizes control relay CR-39 (lines 115) and with the elevator platform 386 empty, limit switches LS-13, LS-14 and LS-15 are closed thus energizing control relay CR-20 (line 77). Upon energizing control relay CR-20, control relay CR-1 is energized (line 14) which in turn de-energizes the "ACTUATE" light LT-2 (line 16) and energizes Transfer Cart Electromagnet S-EM1 (line 31). Since the Stacker is at the "HOME" position, magnetic strip 165 will cause reed switch RS28-00 to be closed which energizes control relay CR-46 (line 210). Because the Right Addresser Longitudinal Selector Switch SS13-00 is closed, control relay CR-49 is also energized (line 238). It will also be observed that because the Stacker is at "HOME" position, reed switch RS28-0 is also closed by magnetic strip 155 to energize control relay CR–45 (line 209). Since the elevator platform is at its lowest position, indicating a bin elevation position of No. 1, reed switch RS29–1 is also closed by magnetic strip 245 which energizes control relay CR–41 (line 189). The fact that each of the Selector Switches SS–10 through SS–15 is closed or actuated, causes control relay CR–21 to also be energized (line 234). This then completes the conditions that exist when the Stacker is in an initial condition ready to be placed in a STANDBY mode of operation.

STANDBY MODE OF OPERATION

In a "Standby" mode of operation, the Left Addresser "ON" condition, and the Left Addresser "ON" light LT–3 (line 17) is energized through switch S1–1. With switch S1–2 closed and the Left Deposit-Withdrawal switch SS–1 in the "Deposit" position, a "DEPOSIT" mode of operation is indicated where the load will be taken from a load station and sent to a bin thus energizing indicators LT9–1 and LT10–1 (line 47).

Since it is desired to pick up the load from the left load station, the left Load Station Selector Switch SS–4 (line 58) is closed in the "LEFT" position and the left Bin Selector Switch SS–3 is also closed, in the "LEFT" position (line 57).

The load on the left pallet dolly is to be deposited in a bin on the left side in the twelfth column and second row, and therefore the Right Addresser is not used in any manner. The Longitudinal Bin Number Selector Switch SS10–10 (FIG. 10) has been depressed, as well as switch SS11–2 to designate a bin in the twelfth column and Vertical Bin Number Selector Switch SS12–2 has been depressed indicating the bin is at a second level. Since all of the required information is now set into Stacker panel 106, the sequence of operation will now begin.

LEFT ADDRESSER ACTUATED

The operator presses the Actuate switch button PB–1 and releases it, thereby energizing control relay CR–2L (line 18) which in turn energizes control relay CR–3L (line 21). As explained earlier, those relays identified with a suffix letter "L" indicate the relays are of the latching type. Control relay CR–3L immediately breaks the circuit to control relay CR–2L (line 18) but because control relay CR–2L is a latching type relay, it remains mechanically latched and its contacts are kept in an actuated condition. Control relay CR–3L also de-energizes control relay CR–1 (line 14) which in turn energizes the ACTUATE light LT–2 (line 16) and also de-energizes the Transfer Cart Enable Electromagnet S.EM–1 (line 31). Control relay CR–3L in turn energizes control relays CR–3A and CR–3B (lines 22 and 23). Once these two relays are energized, they in turn energize the Left Working Light LT–5 (line 38) and control relay CR–19 (line 75) which in turn energizes control relay CRS–205 (servo line 52) which causes the vertical drive mechanism to be operated in the superfine mode, assuming the left longitudinal transducer LPT–101 is also at a null. Control relays CR–3A and CR–3B also energize control relay CR–12L (line 57) which in turn energizes control relays CRS–104, CRS–203 and CRS–302 (servo line 44). The relays just mentioned, respectively cause left longitudinal transducer LPT–101 to be connected to the longitudinal drive circuit, the left superfine vertical transducer LPT–201 to be connected to the vertical drive circuit and a left reference voltage to be applied to the lateral drive circuit. At the same time, control relays CR–3A and CR–3B energize Left Load Station Warning Electromagnet S.EM–2 (line 29). It is assumed for convenience, that the left vertical superfine null coincides with the vertical fine null, therefore when control relay CR–19 is energized by relay CR–3A, the normally open contacts of relay CR–19 energize control relay CR–22 (line 83). Control relay CR–22 de-energizes unlatch control relay CR–12UNL (line 60) and energizes control relay CR–26L (line 93). Control relay CR–26L attempts to de-energize control relay CR–12L (line 57) but since the unlatch coil of CR–12UNL is de-energized, control relay CR–12L assumes a mechanically latched state and remains actuated. Control relay CR–26L energizes control relay CRS–306 (servo line 55) which electrically connects the lateral circuit to driver amplifier DA–100 and disconnects the longitudinal control circuit. At the same time, unlatch control relays CR–33UNL and CR–34UNL are de-energized (line 105). Control relay CR–30 is also energized by control relay 26L (line 101) which in turn energizes control relay CRM–300 (servo line 72). Control relay CRM–300 sets in motion the lateral drive mechanism by in turn energizing control relay CRS–301 (servo line 53) which connects the reference voltage to summing amplifier SA–300 and removes its grounded connection at its input. Control relay CRM–300 also energizes brake B–300 (servo line 127) which is the solenoid that releases the brakes on the lateral drive motor. Control relay CRM–300 also energizes the lateral motor M–300 by connecting the armature circuit. Control relay CR–26L also de-energizes control relay CR–22 (line 83) which in turn de-energizes the coil to control relay CR–26L thus leaving control relay CR–26L in a mechanically latched state (line 93). Control relay CR–26L also energizes control relay 33L (line 103). Thus the lateral platform mechanism, in its lowermost position, is moved outwardly and under the pallet at the left load station. Control relay CR–33L arms the armature circuit for Transducer Shifter Motor M–201 to drive the shifter bar downwardly. As the lateral platform moves outwardly, from its center position, limit switch LS22 (line 115) is opened and control relay CR–39 is de-energized.

PALLET PICK-UP

Lateral platform out

As the lateral platform moves to its fully extended position, limit switch LS12–3 is closed which energizes transducer shifter motor M–201 (line 106). At the same time, limit switch LS12–2 is opened (line 101) which de-energizes control relay CR–30 which in turn de-energizes control relay CRM–300, which in turn de-energizes control relay CRS–301, brake B–300, and motor M–300. In other words, the lateral platform stops moving and the lateral platform motor and its associated driving circuits are de-energized. At the same time, limit switch LS12–1 is closed (line 74) which energizes control relay CR–18 which in turn energizes control relay CRM–200 (servo line 70) which in turn energizes control relay CRS–201 (servo line 48), brake B–200 (servo line 125) and motor M–200 (servo line 27). It will thus be noted that the armature circuit to motor M–200 is completed. Under such conditions, the elevator platform is rising as the transducer shifter motor M–201 moves the shifter bar 263 downwardly causing limit switch LS21–2 to open and thus de-energize control relay CR–36 (line 112). In turn, control relay CR–33L is de-energized which assumes a mechanically latched condition and control relay CR–20 is de-energized (line 77).

Lateral platform raised

As the Lateral Platform 386 moves upwardly to pick-up the pallet, reed switch RS–17 (line 83) opens because the reed switch is controlled by Transfer Cart Electromagnet L.EM–1 which became de-energized the moment the pallet was lifted from the Load Station. Limit switch LS20–1 is also opened (line 110) upon the Transducer Shifter Motor shifting the transducers to the lowermost position which then de-energizes the transducer shifter motor M–201. Limit switch LS20–2 is also closed at the same time which energizes control relay CR–35 (line 111).

Lateral platform retract

Upon control relay CR–35 being energized, and control relay CR–33L being mechanically latched, control relay CR–37 (line 113) is energized which de-energizes control relay CRS–308 (servo line 57). Control relay CRS–308 disconnects resistor R–314 (servo line 24) from the reference voltage and connects it to ground, thus preparing the circuits for retracting the lateral platform to the center of the elevator. Control relay CR–37 also energizes control relay CR–30 (line 102) which in turn energizes control relay CRM–300 (servo line 72) and it in turn energizes control relay CRS–301 (servo line 53), brake B–300 (servo line 127) and lateral motor M–300 (servo line 7) to start the platform moving inwardly towards the center of the Stacker. At the moment the platform starts to move inwardly, limit switch LS12–1 is opened (line 74) which then de-energizes control relay CR–18 which in turn de-energizes control relay CRM–200 (servo line 70). Control relay CRM–200 in turn de-energizes control relay CRS–201 (servo line 48), brake B–200 (servo line 125) and also de-energizes the vertical drive motor M–200 (servo line 29). Thus the vertical drive system is locked by the brake as the platform is retracted.

Lateral platform centered

As the lateral platform moves inwardly, and it reaches its center position, limit switch LS15 is opened because there is a load aboard the elevator platform. At the same time, limit switch LS22 is closed which in turn energizes control relay CR–39 (line 115) which in turn energizes control relay CR–38 (line 114). It will be well to note at this point, that the driving circuits should reach a condition in which the lateral platform driving mechanism is centered is de-energized and the vertical and longitudinal driving mechanism are in a coarse mode of operation. Control relay CR–38 energizes unlatch control relay CR–2UNL (line 32) which de-energizes control relay CR–2L since the relay was in a mechanically latched state previously. Upon control relay CR–2L being de-energized (line 18), control relay CR–3L assumes a mechanically latched state (line 21) since unlatch control relay CR–3UNL is de-energized. Control relay CR–38 also energizes unlatch control relay CR–26UNL which in turn de-energizes control relay CR–26L. Upon control relay CR–26L being de-energized, control relay CRS–306 is de-energized (servo line 55) which restores control to the longitudinal servo driving circuit. Control relay CR–2L upon being de-energized, also energizes control relay CR–6 (line 43) which in turn energizes control relay CR–10. Control relay CR–10 in turn energizes control relay CRS–106 (servo line 47) which establishes a forward direction for the longitudinal servo drive circuit. At the same time, control relay CR–6 energizes control relay CRS–202 (servo line 49) which also establishes an upward direction for the vertical driving circuit. Upon de-energizing control relay CR–26L unlatch control relay CR–12UNL is de-energized (line 60). Control relay CR–6 also energizes control relay CR–12L and therefore the moment unlatch control relay CR–12UNL is energized, control relay CR–12L is picked up so that control relay CR–12L remains energized (line 57), since the next destination is also to the left. Control relay CR–6 also energizes control relay CR–14 which de-energizes the Left Load Station Warning Electromagnet S.EM–2 (line 29) and energizes control relay CRS–204 (servo line 51). Upon control relay CRS–204 being energized, the fine control for the vertical drive circuit is disabled and the coarse control is enabled.

At the same time, control relay CR–26L energizes unlatch control relays CR–33UNL and CR–34UNL (line 105), which de-energizes control relay CR–33L which was mechanically latched. Control relay CR–34L is de-energized at this time and therefore there is no effect upon this relay. Control relay CR–14 also de-energizes control relay CR–19 (line 75) which in turn de-energizes control relay CRS–205 (servo line 52) thus allowing the vertical drive circuit to revert to the "fine" mode of operation when CRS–204 is de-energized. At the same time, control relay CR–37, which was de-energized by control relay CR–33L, de-energizes control relay CR–30 (line 101) which in turn de-energizes the lateral control relay CRM–300 (servo line 72). Control relay CRM–300 in turn de-energizes control relay CRS–301 (servo line 53), brake B–300 (servo line 127) and lateral motor M–300 (servo line 7). In other words, the lateral motor circuit is completely de-energized.

Control relay CR–6 also energizes control relay CR–13 (line 62) which in turn energizes control relay CRS–103 (servo line 43) which causes the longitudinal driving circuit to be operated in the coarse mode of operation. Control relay CR–2L, upon being de-energized, energizes control relay CR–20 (line 77) which in turn energizes control relay CR–16 (line 70). Control relay CR–16 in turn energizes control relay CRM–100 (servo line 68) which in turn energizes control relay CRS–101 (servo line 42), brake B–100 (servo line 123) and longitudinal drive motor M–100 (servo line 7). Upon de-energizing control relay CR–2L, control relay CR–23 is energized (line 88). Control relay CR–20 energizes control relay CR–18 (line 72) which in turn energizes control relay CRM–200 (servo line 70). Control relay CRM–200 in turn energizes control relay CRS–201 (servo line 48), brake B–200 (servo line 125), and vertical motor M–200 (servo line 27). It will now be observed that the vertical driving system is set in the coarse mode of operation with control relays CRS–205 de-energized, CRS–202 energized, CRS–204 energized, and CRS–206 de-energized. The longitudinal drive servo is operated in the coarse mode of operation with control relay CRS–101 energized, CRS–104 energized, CRS–103 energized, CRS–102 de-energized and CRS–306 de-energized, so that the Stacker may move longitudinally down the aisle away from the "HOME" position and vertically upward toward the Left Bin Location where the pallet is to be deposited.

STACKER MOVING IN COARSE CONTROL LONGITUDINALLY OUT AND VERTICALLY UP

As the Stacker moves from the "HOME" position on the Transfer Cart, reed switch RS28–0 opens and de-energizes control relay CR–45 (line 209). As the elevator starts to move upwardly, reed switch RS29–1 is opened which de-energizes control relay CR–41 (line 189) and because control relay CR–33L is de-energized and the retracting mode of operation is over, control relay CR–37 is de-energized (line 112) which in turn de-energizes control relay CR–38 (line 114) which in turn de-energizes unlatch control relay CR–2UNL (line 32). Control relay CR–37 also energizes control relay CRS–308 (servo line 57) which sets up the circuit to cause the platform to move out. As the elevator platform moves upwardly, magnetic strip 245 opposite reed switch RS29–2 causes the reed switch to be closed which energizes control relay CR–42 (line 184) which in turn de-energizes control relay CR–14 (line 66) which in turn de-energizes control relay CRS–204 (servo line 51) thus causing the vertical drive to operate in the "fine" mode of operation. The vertical drive system is still operating in this manner and let it be assumed that the Stacker has now reached the tenth bin longitudinally. Reed switch RS28–00 opens and de-energizes control relay CR–46 (line 210) and control relay CR–49 (line 238), and reed switch RS28–10 is closed by magnetic element 176 which energizes control relay CR–44 (line 208). As the Stacker moves longitudinally away, magnetic strip 176 keeps reed switch RS28–10 closed and when nearing the twelfth bin reed switch RS28–2 is closed by magnetic strip 168 in addition thereto which energizes control relay CR–43 (line 206) which in turn de-energizes control relay CR–13 which de-energizes control relay CRS–103 (servo line 43) thus putting the longitude drive circuit in the "fine" mode of operation. Control relay CR–13, at this time, also energizes Left Load Station Warning Electromagnet

STACKER LINING UP AT BIN LOCATION

Fine and superfine operation

Since the longitudinal drive is being controlled by left transducer LPT-101, when the output signal reaches a null point, null detector CRSN-101 is at a null point which opens the contact in parallel with those of control relay CR-13 and thus de-energizes control relay CR-16 (line 70) which in turn de-energizes control relay CRM-100 (servo line 68). Control relay CRM-100 in turn de-energizes control relay CRS-101 (servo line 42), longitudinal brake B-100 (line 123) and de-energizes longitudinal motor M-100 (servo line 7), aligning the Stacker longitudinally in front of the bin with the brake set.

The vertical drive system is operated from the fine transducer LPT-203 (FIGS. 18 and 22) which senses magnetic strip 251 on elevator mast 255 and as a null point is reached, null detector CRSN-201 de-energizes control relay CR-18 (line 72) which in turn momentarily de-energizes control relay CRM-200 (servo line 70) which in turn de-energizes control relay CRS-201 (servo line 48), brake B-200 (servo line 125), and de-energizes vertical drive motor M-200 (servo line 27). Upon null detector CRSN-201 reaching its null point, it also energizes control relay CR-19 (line 75) which in turn energizes control relay CRS-205 (servo line 52) which at that point switches the servo system from "fine" to "superfine" operation. Control relay CR-19 in turn de-energizes unlatch control relay CR-26UNL which has no effect on control relay CR-26L since it is already de-energized. Because the left superfine transducer LPT-201 will most likely not be at a null position, a signal will be present at null detector CRSN-202 and a superfine signal will again energize control relay CR-18 which in turn energizes control relay CRM-200 (servo line 70). This relay energizes control relay CRS-201 (servo line 48), brake B-200, (servo line 125), and vertical drive motor M-200 (servo line 27). Thus the vertical drive system is again set in motion and moves the elevator until the left superfine transducer LPT-201 detects the magnetic material creating a null at which point the null detector CRSN-202 is at a null position which again de-energizes control relay CR-18 and de-energizes control relay CRM-200 (servo line 70) which in turn de-energizes control relay CRS-201 (servo line 48), brake B-200, (servo line 125), and vertical drive motor M-200 (servo line 27). The vertical drive system as well as the longitudinal drive system, are now locked at the bin location. Upon null detector CRSN-202 reaching a null, control relay CR-22 is energized (line 83) which in turn de-energizes unlatch control relay CR-12UNL (line 60) and energizes control relay CR-24. Control relay CR-24 is a pilot relay which directs the operation of the left flipper 300 to check the status of the bin to determine if it is empty or obstructed before attempting to deposit the pallet in the bin.

Left flipper out

As control relay CR-24 is energized, it in turn energizes Left Bin Solenoid SOL-1 which causes arm 312 and leaf spring 313 on the flipper to move outwardly and upon moving into the bin area where there is no obstruction, solenoid switch SOL1-S1 is closed (line 93) which in turn energizes control relay CR-26L. Upon energizing control relay CR-26L, control relay CR-12L is de-energized but because there is no voltage applied to the coil of unlatch control relay CR-12UNL, control relay CR-12L assumes a mechanically latched condition, and therefore keeps its contacts in the same state as when it is electrically energized. It also causes control relay CR-24 to be de-energized (line 59) which in turn de-energizes Left Bin Solenoid SOL-1 (line 91). At the same time, control relay CR-26L de-energizes unlatch control relays CR-33L and CR-34L (lines 105 and 106) which has no effect on either control relay CR-33L and CR-34L as both are de-energized. Control relay CR-26L also de-energizes control relay CR-22 (line 83) which in turn de-energizes the coil on control relay CR-26L and since unlatch control relay CR-26UNL is de-energized, control relay CR-26L remains in a mechanically latched condition such as described previously (line 93). Control relay CR-26L also energizes control relay CR-30 (line 101) which in turn energizes control relay CRM-300 (servo line 72) and this relay in turn energizes control relay CRS-301 (servo line 53), brake B-300 (servo line 127), and lateral drive motor M-300 (servo line 7). Control relay CR-26L also energizes control relay CR-34L (line 103) and also energizes control relay CRS-306 (servo line 55) which cuts out the longitudinal drive servo and causes the lateral drive servo to be energized only.

Lateral platform out

As the lateral platform moves outwardly to its fully extended position, limit switch LS12-2 is opened which causes control relay CR-30 to be de-energized (line 101) which in turn de-energizes control relay CRM-300 (servo line 72) which in turn de-energizes control relay CRS-301 (servo line 53), brake B-300 (servo line 127), and de-energizes the lateral drive motor M-300 (servo line 7). Thus the lateral platform is stopped at its outward position of travel and is vertically positioned above the bin structure into which a load is to be deposited. At the same time, limit switch LS12-1 is closed which energizes control relay CR-18 (line 74) which energizes control relay CRM-200 (servo line 70) which in turn energizes control relay CRS-201 (servo line 48), brake B-200 (servo line 125), and energizes vertical drive motor M-200 (servo line 27). At the same time, limit switch LS12-3 is closed which energizes transducer shifter motor M-201 (line 106). It should also be remembered that as the platform moves outwardly from its center position, limit switch LS22 is opened which de-energizes control relay CR-39 (line 115). Thus with both the vertical drive mechanism and the transducer shifter motor being energized, as the transducer shifter motor moves upwardly, the elevator moves downwardly to deposit the pallet in the bin.

Lateral platform lowered

As the lateral platform is lowered and the transducer shifter bar 263 is moved upwardly, limit switch LS21-1 is opened which de-energizes transducer shifter motor M-201 (line 110) and at the same time limit switch LS21-2 is closed which energizes control relay CR-36 (line 112). It will also be apparent that limit switch LS20-2 is opened which de-energizes control relay CR-35 (line 111) which in turn de-energizes the voltage to the coil of control relay CR-34L (line 104) but since unlatch control relay CR-34UNL is de-energized, control relay CR-34L remains in the mechanically latched position. It will also be observed that upon control relay CR-36 being energized, control relay CR-37 (line 113) is energized which in turn de-energizes control relay CRS-308 (servo line 57) which causes the lateral drive mechanism to start the platform moving in a retracting mode of operation since at the same time, control relay CR-30 is energized (line 102) by control relay CR-37 which in turn energizes control relay CRM-300 (servo line 72) which in turn energizes control relay CRS-301 (servo line 53), brake B-300 (servo line 127) and lateral drive motor M-300 (servo line 7). De-energizing control relay CR-35 also de-energizes control relay CR-20 (line 80). As the platform starts to retract, limit switch LS12-1 is opened which de-energizes control relay CR-18 (line 74) which in turn de-energizes control relay CRM-200 (servo line 70) and this relay in turn de-energizes control relay CRS-201 (servo line 48), brake B-200 (servo line 125), and de-energizes the vertical drive motor M-200 (servo line 29). Under these conditions, the platform is locked vertically as it is being retracted.

Lateral platform centered

As the lateral platform is retracted, and reaches the center position on the elevator, limit switch LS-22 is closed which energizes control relay CR-39 (line 115) which in turn energizes control relay CR-38 (line 114). Control relay CR-38 energizes unlatch control relay CR-3UNL (line 32) and unlatch control relay CR-5UNL (line 36). Upon unlatch control relay CR-3UNL being energized, it de-energizes control relay CR-3L which has been in a mechanically latched condition (line 21). Control relay CR-38 also energizes unlatch control relay CR-26UNL (line 98) which in turn de-energizes control relay CR-26L which was mechanically latched (line 93). De-energizing control relay CR-26L de-energizes control relay CRS-306 (servo line 55) which cuts out the lateral drive servo and allows the longitudinal drive servo to be energized. De-energizing control relay CR-3L also de-energizes control relays CR-3A and CR-3B (line 22). De-energizing control relay CR-3L causes control relay CR-20 to be energized (line 77) and energizes control relay CR-1 (line 14) which in turn de-energizes the ACTUATE light LT-2 (line 16) and energizes the Transfer Cart Enable Electromagnet S.EM-1 (line 31). Upon de-energizing control relays CR-3A and CR-3B, the Left Load Station Warning Electromagnet S.EM-2 is also de-energized (line 29). Upon de-energizing control relay CR-3A and CR-3B, the Left WORKING light LT-5 is also de-energized (line 38) and control relay CR-6 is also de-energized (line 43) which in turn de-energizes control relay CRS-202 (servo line 49) which reverses the coarse direction of travel for the vertical drive system and sets it up for downward travel. At the same time, control relay CR-6 de-energizes control relay CR-10 which in turn de-energizes control relay CRS-106 (servo line 47) which reverses the direction of travel for the longitudinal system under coarse control and sets up the driving mechanism to cause the longitudinal motor to drive the Stacker towards the "HOME" station. Also, control relay CR-6 upon being de-energized energizes control relay CR-13 which in turn energizes control relay CRS-103 (servo line 43) which sets the Stacker in the coarse mode of operation. Energizing control relay CR-13 causes control relay CR-1 to be de-energized (line 14) which in turn energizes the actuate light LT-2 (line 16) and de-energizes the Transfer Cart Enable Electromagnet S.EM-1 (line 31). De-energizing control relay CR-26L also causes control relay CR-30 to be de-energized which in turn de-energizes control relay CRM-300 (servo line 72) and this relay in turn de-energizes control relay CRS-301 (servo line 53), brake B-300 (servo line 127), and de-energizes the lateral drive motor M-300 (servo line 7). All of the driving circuits for the Stacker motors are now de-energized. Since control relay CR-13 is energized, it causes control relay CR-16 to be energized (line 70) which in turn energizes control relay CRM-100 (servo line 68) and in turn this relay energizes control relay CRS-101 (servo line 42), releases brake B-100 (servo line 123) and energizes the longitudinal drive motor M-100 (servo line 7), thereby supplying power to move the Stacker towards the "HOME" position. When control relay CR-6 was de-energized previously, it energized control relay CR-14 (line 67) which in turn energized control relay CRS-204 (servo line 51) to set the vertical drive circuits in coarse operation. At the same time, control relay CR-14 energizes control relay 18 (line 71) which in turn energizes control relay CRM-200 (servo line 70) and this relay in turn energizes control relay CRS-201 (servo line 48), which releases brake B-200 (servo line 125), and energizes vertical drive motor M-200 (servo line 27). Both the vertical and longitudinal driving motors are now energized and set in motion to cause the Stacker to move downwardly and longitudinally towards the "HOME" position. Also, control relays CR-3A and CR-3B upon being de-energized, de-energize control relay CR-23 (line 87) and energizes unlatch control relay CR-12UNL (line 57) which in turn de-energizes control relay CR-12L since it was in a mechanically latched condition previously. Upon de-energizing control relay CR-12L, control relay CRS-104, CRS-203 and CRS-302 are de-energized (servo line 44) which allows the transducer circuit to revert back to sensing a "RIGHT" condition. Also, de-energizing control relay CR-26L energizes unlatch control relays CR-33UNL and CR-34UNL and since control relay CR-33L was previously de-energized, there is no effect on this relay but control relay CR-34L is de-energized from a mechanically latched condition (line 103). Also, control relays CR-3A and CR-3B de-energize control relay CR-19 (line 75) which in turn de-energizes control relay CRS-205 (servo line 52) to cause the vertical system to be operated in the "fine" mode of operation. Since control relay CR-34L is de-energized, it also de-energizes control relay CR-37 (line 113) and in turn energizes control relay CRS-308 (servo line 57) which sets up the lateral circuit to be moved outwardly. Control relay CR-37 also de-energizes control relay CR-38 (line 114) which in turn de-energizes unlatch control relay CR-3UNL (line 32) and unlatch control relay CR-5UNL (line 32). To complete the sequence of relay operations, unlatch control relay CR-26UNL is de-energized (line 98).

STACKER MOVING IN COARSE CONTROL LONGITUDINALLY AND VERTICALLY TOWARD HOME POSITION

Moving away from bin area

As the Stacker moves longitudinally away from the bin in which the pallet is deposited, reed switch RS28-2 is opened which causes control relay CR-43 to be de-energized (line 206) and opening reed switch RS28-10 de-energizes control relay CR-44 (line 203). As the elevator platform moves vertically downward, reed switch RS29-2 is opened which de-energizes control relay CR-42 (line 184). Since the platform has only to move the height of one bin to reach the Stacker "HOME" position, the platform will reach its lowermost position ahead of the Stacker arriving longitudinally at the Transfer Cart.

Stacker approaching home position

As the platform moves downwardly, reed switch RS29-1 is closed by magnetic strip 245 which again energizes control relay CR-41 (line 185) which in turn de-energizes control relay CR-14 which directly controls and de-energizes control relay CRS-204 (servo line 51). Control relay CRS-204 causes the vertical servo system to be set in the "fine" mode of operation. As transducer LPT-203 is being used to control the position of the platform, upon the transducer sensing a null from magnetic material 250 on the mast, null detector CRSN-201 is at a null condition which de-energizes control relay CR-18 which in turn de-energizes control relay CRM-200 (servo line 70). This relay in turn de-energizes control relay CRS-201 (servo line 48), sets brake B-200 (servo line 125), and de-energizes the vertical drive motor M-200 (servo line 27). Therefore, the elevator is at its lowermost position with the driving circuit de-energized and the brakes locked.

Platform down

As the Stacker moved past bin column number 10, reed switch RS28-00 was closed which energized control relay CR-46 (line 210) and control relay CR-49 (line 238). With reed switch RS28-0 closed at the "HOME" station, control relay CR-45 (line 201) is energized which in turn de-energizes control relay CR-13. Control relay CR-13 de-energizes control relay CRS-103 (servo line 43) which shifts the longitudinal servo control from one of coarse operation to a "fine" condition wherein the right fine transducer LPT–102 senses magnetic strip 177 and supplies the signals to the null detector CRSN–101. As the null detector CRSN–101 reaches a fine null, control relay CR–16 is de-energized (line 69) which in turn de-energizes control relay CRM–100 (servo line 68). This relay in turn de-energizes control relay CRS–101 (servo line 42), sets the brake by de-energizing brake B–100 (servo line 123), and de-energizes the longitudinal drive motor M–100 (servo line 7). Therefore, the Stacker has now returned to its "HOME" position, on the Transfer Cart. Upon the longitudinal null detectors CRSN–101 detecting a null condition, control relay CR–1 is again energized (line 14) which in turn de-energizes the ACTUATE light LT–2 (line 16) and re-energizes the Transfer Cart Enable Electromagnet S.EM–1 (line 31). Thus the Stackler is again in a STANDBY condition.

STACKER OPERATION FOR DEPOSIT-REJECT MODE

It will be recognized that occasionally a mistake may be made in addressing a particular bin for which it is desired to deposit a pallet with its load. This can occur by improperly addressing the bin column or row. It is obvious that protection of the equipment is desirable as well as completing the particular mode of operation, and in the present inevntion, upon improperly addressing a bin, the Stacker proceeds to the bin and if a pallet is located in the bin, another pallet may not be deposited in that particular bin location and the Stacker is then sent back to the "HOME" position for re-addressing. It is this particular mode of operation which will now be described where it will be assumed that the left bin located in column 12 and row 2 contains a pallet and that the correct address should be row 3 in column 12. The relay chart arrangement for this mode of operation is shown in FIG. 34b.

The Stacker moves through the same operational modes in picking up the pallet and retracting the pallet to the center of the elevator platform where the Stacker is then set in longitudinal and vertical coarse drive. Once the Stacker reaches the destination of row 2 and column 12, the Stacker aligns itself in front of the bin and proceeds to probe the bin to determine if it is possible to deposit a pallet with its load and it is at this point, that the logic and operational mode changes.

Left flipper out (full)

As control relay CR–24 is energized, it in turn energizes Left Bin Solenoid SOL–1 which causes arm 312 and spring 313 on flipper 300 to move outwardly and upwardly into the bin. Once spring 313 on the flipper strikes an obstruction, solenoid switch SOL1–S2 is closed (line 99) which energizes control relay CR–27L which immediately causes the re-address lamp LT–6 (line 39) to be energized. Control relay CR–27L breaks the circuit to control relay CR–6 (line 43), and at the same time de-energizes control relay CR–19 (line 75) which in turn causes control relay CRS–205 (servo line 52) to be de-energized and thus switch the vertical driving circuit from the "superfine" mode of operation to one of "fine." Upon control relay CR–27L being energized, control relay CR–24 (line 89) is de-energized which in turn de-energizes the left bin solenoid SOL–1. Upon this solenoid being de-energized, control relay CR–27L causes switch SOL1–S2 to be opened (line 99) and thus control relay CR–27L is mechanically latched in the energized position. De-energizing control relay CR–6, also causes control relay CR–10 to become de-energized (line 53) which de-energizes control relay CRS–106 (servo line 47). Thus the direction of the servo circuit is reversed so that the longitudinal servo will be driven in such a manner as to cause the Stacker to move towards the "HOME" position. De-energizing control relay CR–19 also de-energizes control relay CR–22 (line 83) which in turn energizes unlatch control relay CR–12UNL (line 60). Since control relay CR12L is energized, unlatch control relay CR–12UNL has no effect on it. De-energizing control relay CR–6, also energizes control relay CR–14 which in turn energizes control relay CRS–204 (servo line 51) setting the vertical driving system in the coarse mode of operation. De-energizing control relay CR–19 also de-energizes Stacker Electromagnet S.EM–2 (line 99) but since control relay CR–26 is de-energized at the present time the unlatching relay has no control over control relay CR–26L. Energizing control relay CR–14 also de-energizes the stacker electromagnet S.EM–2 (line 29) and of course this has not effect at this time since the Stacker is not located on the Transfer Cart. Control relay CR–14 also energizes control relay CR–18 (line 71) which in turn energizes control relay CRM–200 (servo line 70) and this relay in turn energizes control relay CRS–201 (servo line 48), brake B–200 (servo line 125), and energizes the vertical drive motor M–200 (servo line 27). De-energizing control relay CR–6 also energizes control relay CR–13 (line 63) which in turn energizes control relay CRS–103 (servo line 43) which causes the longitudinal drive circuits to be engaged in the coarse mod of operation. Control relay CR–13 in turn energizes control relay CR–16 (line 70) which energizes control relay CRM–100 (servo line 68) and this relay in turn energizes control relay CRS–101 (servo line 42), brake B–100 (servo line 123) and longitudinal drive motor M–100 (servo line 7). It should also be observed that upon de-energizing the left bin solenoid SOL–1 that control relay CR–27L is electrically de-energized (line 99) and remains in the mechanically latched state so that its contacts are closed in the same manner as when energized. It will thus be seen that the Stacker is set in motion towards "HOME" position and that both the vertical and longitudinal drive systems are operating in a coarse mode of operation.

After the Stacker reaches the "HOME" position and shuts down, the operator may then engage the proper bin location switch which in this case for the example given would require that vertical selector switch SS–12 have push button No. 3 depressed. Upon re-actuating push button PB–1, it will be seen that unlatch control relay CR–27UNL is energized as long as the push button switch PB–1 is held depressed which in turn de-energizes control relay CR–27L to return the electrical system to its Standby condition. The left re-address light LT–6 is then de-energized (line 39), control relay CR–6 is energized (line 43) and control relay CR–10 is energized (line 53). The Stacker then moves down the aisle to the proper bin location where the Deposit mode of operation may be completed and the Stacker returned to the "HOME" position as previously described.

STACKER OPERATION FOR DEPOSIT-WITHDRAWAL MODE

Initial condition

The initial conditions for describing the Deposit-Withdrawal mode of operation include all of the initial conditions which were established for the previously described Deposit mode of operation including those conditions established for the "Stacker Pre-Standby Mode." As previously described, the Right Addresser is addressed in the manner described in the Initial Conditions, that is, after the load is taken from the left load station and deposited in a bin in column 12, row 2 (H12, V2) on the left side, the Stacker then will be directed to move towards the "HOME" position longitudinally and move upwardly to withdraw a load from a bin in the ninth column and fourth row (H9, V4) on the right hand side and return the load to the "HOME" position, deposit the load at the right hand load station before shutting down, and be put in a condition to start the next mode of operation.

Standby mode of operation

In addition to the left addresser being actuated or turned "ON" the right addresser must also be addressed so as to carry out a second command for the withdrawal mode. In following the procedure for addressing the right hand addresser, the relay chart, FIG. 34c shows the relay chart arrangement (shows the condition of the different elements of the relay chart as the corresponding switches are set or controlled by the operator as shown in the left hand column under the "MODE" column). The right addresser switch S2–1 is turned "ON" and the right addresser "ON" light LT–4 is energized (line 24) through switch S2–1. With switch S2–3 closed and the right deposit-withdrawal switch SS2–2 closed, a WITHDRAWAL mode of operation is indicated where the load will be taken from the right bin and delivered to right load station 408 thus energizing indicators LT12–2 and LT11–2 (line 49).

It will also be observed that the right load station addresser switch SS–6 when set in the "Right" position, is in an open condition (line 60) and the right bin addresser switch SS–5 when set in the "Right" position is also open (line 59).

The Right Longitudinal Bin Number Selector Switch SS13–00 is depressed as well as switch SS14–9 to designate a bin in the ninth column and Vertical Bin Number Selector Switch SS15–4 is depressed indicating the bin is at a fourth level.

Right addresser actuated

When the operator presses the actuate switch button PB–1, switch PB1–2 is closed momentarily to energize unlatch control relay CR–27UNL (line 19) and upon the switch being released, the unlatch control relay is de-energized. It will also be observed that when the actuate push button switch PB1–1 is closed, that control relays CR–3A and CR–3B become energized and upon so doing, in turn energize control relay CR–4L (line 25) when the right addresser switch S2–1 is closed. Control relay CR–4L energizes control relay CR–4A (line 26) which in turn energizes control relay CR–5L (line 27) which controls and energizes control relay CR–5A (line 28). Control relay CR–5L also de-energizes control relay CR–4L leaving it in a mechanically latched condition. Upon control relay CR–5A being energized, the electrical path is broken to control relay CR–4L and it remains mechanically latched (line 25). It should also be observed that when the right addresser switch S–2 is "ON" and control relay CR–4A is energized, unlatch control relays CR–8UNL and CR–9UNL are de-energized (line 52).

From this point on, there is no change in the operation of the pallet pick-up and moving of the Stacker in the coarse mode of operation while moving towards the left bin destination except for the memory relay that is energized to form a reference point for the second command operation established by the right addresser. As the Stacker is traveling away from the "HOME" station and magnetic strip 164 closes reed switch RS28–9 (line 192), control relay CR–48 is energized (line 236) which in turn energizes control relay CR–8L (line 50). Control relay CR–8L sets up the memory function described previously to direct the Stacker towards the "HOME" position for the second command or command given by the right addresser. Upon reed switch RS28–9 being opened, control relay CR–48 is de-energized (line 236) which in turn mechanically latches control relay CR–8L (line 50) inasmuch as there is no voltage applied to unlatch control relay CR–8UNL and CR–9UNL as described previously due to control relay CR–4A being energized.

Left load deposited and platform centered

Upon centering of the platform after depositing the load in the bin, control relays CR–3A and CR–3B are de-energized which in turn energizes the right working lamp LT–7 (line 41) and energizes control relay CR–7 (line 45) which in turn energizes control relay CRS–202 (servo line 49) when the right addresser is in operation and the address for the right hand addresser or second command is vertically above that of the first command or left addresser. Otherwise, upon completion of the left deposit mode control relay CRS–202 is de-energized which causes the vertical driving circuit to be arranged to drive the elevator platform downwardly rather than upwardly.

Right withdrawal-stacker longitudinal and vertical coarse

Referring now to relay chart FIG. 24m and substituting this mode of operation in place of the Stacker moving longitudinally and vertically in coarse control for the left deposit mode only, it will be seen that as the Stacker starts to move away from the left bin (H–12, V–2) reed switch RS28–2 is opened which de-energizes control relay CR–43 (line 206), after which reed switch RS28–10 opens, de-energizing control relay CR–44 (line 203). Reed switch RS28–00 is then closed by magnetic strip 165 which energizes control relay CR–46 (line 210) and also energizes control relay CR–49 (line 238). As the Stacker continues to move, reed switch RS28–9 is closed by magnetic strip 164 which energizes control relay CR–48 (line 192) which in turn re-energizes control relay CR–8L (line 50). Control relay CR–48 in turn de-energizes control relay CR–13 (line 65) which in turn de-energizes control relay CRS–103 (servo line 43) which changes the longitudinal driving circuits from a coarse mode of operation to a fine mode of operation.

As the platform moves vertically upward, reed switch RS29–2 is opened which de-energizes control relay CR–42 (line 184) and when reed switch RS29–4 is closed by magnetic strip 245, control relay CR–47 is energized. Control relay CR–47 in turn energizes control relay CR–9L (line 51) which de-energizes control relay CRS–202 (servo line 50) which was previously energized because the second veritcal address was higher than the first. Control relay CR–47 also de-energizes control relay CR–14 (line 69) which in turn de-energizes CRS–204 (servo line 51) thus setting the vertical driving circuits in the "fine" mode of operation.

Stacker centered at right bin (H–9, V–4)

Since the longitudinal driving circuits are in the "fine" mode of operation, null detector CRSN–101 reaches a null when centered at the bin and control relay CR–16 is de-energized (line 70) which in turn de-energizes control relay CRM–100 (servo line 68). This relay in turn de-energizes control relay CRS–101 (servo line 42), sets brake B–100 (servo line 123), and de-energizes the longitudinal drive motor M–100 (servo line 7).

The vertical null detector CRSN–201 also produces a "fine" null and de-energizes control relay CR–18 (line 72) which in turn de-energizes control relay CRM–200 (servo line 70). This relay in turn de-energizes control relay CRS–201 (servo line 48), sets brake B–200 (servo line 125), and de-energizes vertical drive motor M–200 (servo line 27). At the same time, null detector CRSN–201 energizes control relay CR–19 (line 76) which in turn energizes control relay CRS–205 (servo line 52) which causes the vertical mode of operation to be shifted to the "superfine" mode. Upon the superfine mode of operation taking place, null detector CRSN–202 producers a signal which again energizes control relay CR–18 (line 73) which re-energizes control relay CRM–200 (servo line 70). This relay in turn energizes control relay CRS–201 (servo line 48), unlocks brake B–200 (servo line 125) and energizes vertical drive motor M–200 (servo line 27) thus causing the superfine right transducer LPT–202 to null out on the magnetic material contained on the bin (such as 259 on bin 904R) and thus cause the null detector to again reach a null condition. Upon null detector CRSN–202 reaching a null condition, control relay CR–18 becomes de-energized (line 73) which in turn de-energizes control relay CRM–200 (servo line 70). This relay in turn de-energizes control relay CRS–201

(servo line 48), sets brake B–200 (servo line 125) and de-energizes vertical drive motor M–200 (servo line 27) thus stopping the vertical movement of the platform. De-energizing null detector CRSN–202 also energizes control relay CR–22 (line 83) which in turn de-energizes unlatch control relay CR–12UNL (line 60).

Control relay CR–22 energizes control relay CR–26L (line 93) which in turn energizes control relay CRS–306 (servo line 55) which changes the arrangement of the servo circuitry to enable the lateral axis and disable the longitudinal axis. At the same time, control relay CR–26L de-energizes unlatch control relays CR–33UNL and CR–34UNL (line 105). Control relay CR–26l also energizes control relay CR–30 (line 101) which in turn energizes control relay CRM–300 (servo line 72). This relay in turn energizes control relay CRS–301 (servo line 53), unlocks brake B–300 (servo line 127), and energizes lateral drive motor M–300 (servo line 7). Control relay CR–26L also energizes control relay CR–33L (line 103) and de-energizes control relay CR–22 (line 83) and the latter produces a mechanically latched condition of control relay CR–26L (line 93). As the platform starts to move outwardly, limit switch LS–22 is opened which causes control relay CR–39 to be de-energized (line 115).

Lateral platform out

When the lateral plaftorm is fully extended in its outward position, limit switch LS12–3 is closed which energizes the transducer shifter motor M–201 (line 106). At the same time, limit switch LS12–2 is opened which de-energizes control relay CR–30 (line 101) which in turn de-energizes control relay CRM–300 (servo line 72). This relay in turn de-energizes control relay CRS–301 (servo line 53), sets brake B–300 (servo line 127), and de-energizes the lateral drive motor M–300 (servo line 70), thus de-energizing the driving circuits to the lateral platform. The lateral platform also closes limit switch LS12–1 which energizes control relay CR–18 (line 74) which in turn energizes control relay CRM–200 (servo line 70). This relay in turn energizes control relay CRS–201 (servo line 48), unlocks brake B–200 (servo line 125), and energizes the vertical drive motor M–200 (servo line 27) thus starting the platform to move upwardly to pick-up the pallet in the bin.

Lateral platform raised

The transducer shifter motor M–201 drives the transducer shifter bar 263 downwardly, and as it leaves its uppermost position, limit switch LS21–2 is opened (line 112) which causes control relay CR–36 to be de-energized, which in turn de-energizes control relay CR–20 (line 77) and de-energizes control relay CR–33L which remains mechanically latched. When the shifter bar reaches the down position, limit switch LS20–1 is opened which de-energizes transducer shifter motor M–201 (line 110) and limit switch LS20–2 is closed which energizes control relay CR–35 (line 111). Control relay CR–35 in turn energizes control relay CR–37 (line 112) which de-energizes control relay CRS–308 (servo line 57) which produces a different signal for driving the lateral motor in a retracted mode of operation. Control relay CR–37 also energizes control relay CR–30 (line 102) which in turn again energizes control relay CRM–300 (servo line 72). This relay in turn energizes control relay CRS–301 (servo line 53), unlocks brake B–300 (servo line 127), and energizes the lateral drive motor M–300 (servo line 7) thus starting the lateral platform to retract with the pallet aboard since the platform was raised sufficiently to clear the bin supports.

Lateral platform retract

Once the lateral platform starts to move away from its fully extended position, limit switch LS12–1 is opened which de-energizes control relay CR–18 (line 74) which in turn de-energizes control relay CRM–200 (servo line 70). This relay in turn de-energizes control relay CRS–201 (servo line 48), sets brake B–200 (servo line 125), and de-energizes the vertical drive motor M–200 (servo line 27) which prevents any vertical movement of the platform. The lateral platform then retracts to its center position.

Lateral platform centered

Upon the lateral platform reaching the center of the elevator, control relay CR–39 (line 115) is energized through the closing of limit switch LS–22. Energizing control relay CR–39 causes control relay CR–38 to be energized (line 114) which energizes unlatch control relay CR–4UNL (line 33) which in turn de-energizes control relay CR–4L (line 25). At the same time, control relay CR–38 energizes unlatch control relay CR–26UNL (line 98) which in turn de-energizes control relay CR–26L (line 93) since this relay was in a mechanically latched state. De-energizing control relay CR–26L energizes unlatch control relay CR–12UNL (line 60) but since control relay CR–12L was de-energized at the end of the left addresser mode of operation, it is not affected. De-energizing control relay CR–26L also energizes unlatch control relays CR–33UNL and CR–34UNL (line 57). Energizing unlatch control relay CR–33UNL also de-energizes control relay CR–33L (line 103) which in turn de-energizes control relay CR–37 (line 112) that energizes control relay CRS–308 (servo line 57) to produce the proper signal to drive the platform outwardly from the center position. De-energizing control relay CR–26L also de-energizes control relay CRS–306 (servo line 55) and de-energizes control relays CR–30 (line 101) which in turn de-energizes control relay CRM–300 (servo line 72). This relay in turn de-energizes control relay CRS–301 (servo line 53), sets the brake B–300 (servo line 127), and de-energizes the lateral drive motor M–300 (servo line 7). De-energizing control relay CR–37 also de-energizes control relay CR–38 (line 114).

Upon control relay CR–4L becoming de-energized, it also de-energizes control relay CR–4A (line 26) which in turn energizes control relay CR–20 (line 81). De-energizing control relay CR–4A also de-energizes control relay CR–7 (line 45) and causes control relays CR–5L (line 27) and CR–8L (line 50) to become mechanically latched. De-energizing control relay CR–4A energizes unlatch control relays CR–8UNL and CR–9UNL (line 52) which in turn de-energize control relay CR–8L (line 50). De-energizing control relay CR–4A also causes control relay CR–9L to become mechanically latched (line 51) and since unlatch control relay CR–9UNL was previously energized, control relay CR–9L then becomes de-energized (line 51). De-energizing control relay CR–4A also energizes control relay CR–23 (line 88) whose contacts by-pass the closing of reed switches RS–17 and RS–19 when the Stacker is on the Transfer Cart at "HOME" position. De-energizing control relay CR–7 causes control relay CR–13 to become energized (line 62) which in turn energizes control relay CRS–103 (line 43) to set the longitudinal drive circuits in the "coarse" mode of operation. It also de-energizes control relay CR–19 (line 75). De-energizing control relay CR–7 (line 45) also causes control relay CR–14 (line 66) to be energized which in turn energizes control relay CRS–204 (servo line 51) which energizes the "coarse" vertical driving circuits.

When the control relay CR–38 was de-energized as previously stated, it also de-energized unlatch control relay CR–4UNL (line 32). De-energizing control relay CR–38 also de-energizes unlatch control relay CR–26UNL (line 98). As control relay CR–13 was just recently energized, it causes control relay CR–16 to be energized (line 70) which in turn energizes control relay CRM–100 (servo line 68). This relay in turn energizes control relay CRS–101 (servo line 42), unlocks brake B–100 (servo line 123) and energizes longitudinal drive motor M–100 (servo line 7). Similarly, in the energizing of control relay CR-14 previously, it in turn energizes control relay CR-18 (line 71) which in turn energizes control relay CRM-200 (servo line 70). This relay in turn energizes control relay CRS-201 (servo line 48), unlocks brake B-200 (servo line 125), and energizes the vertical drive motor M-200 (servo line 27). Thus at this point both the longitudinal and vertical driving systems are in operation causing the Stacker to move downwardly and rearwardly towards the "HOME" position.

STACKER MOVING LONGITUDINALLY AND VERTICALLY IN COARSE CONTROL

As the Stacker starts to move away from the right hand bin (H-9, V-4), reed switch RS28-9 is opened, which causes control relay CR-48 to be de-energized (line 192). Upon the platform moving downwardly, reed switch RS29-4 is opened, which de-energizes control relay CR-47 (line 182). As the Stacker moves downward and reed switch RS29-1 is closed by magnetic strip 245, control relay CR-41 (line 185) is energized which in turn de-energizes control relay CR-14 (line 67) in turn de-energizing control relay CRS-204 (servo line 51) to cause the vertical servo to operate in the "fine" mode of operation. Once the null detector CRSN-201 detects a null from transducer LPT-203 caused by magnetic element 250, control relay CR-18 is de-energized (line 72) which in turn de-energizes control relay CRM-200 (servo line 70). This relay in turn de-energizes control relay CRS-201 (servo line 48), sets brake B-200 (servo line 125), and de-energizes vertical drive motor M-200 (servo line 27).

Upon null detector CRSN-201 reaching its null point, it also energizes control relay CR-19 (line 75) which in turn energizes control relay CRS-205 (servo line 52) which at that point switches the servo system "fine" to "superfine" operation. Control relay CR-19 in turn de-energizes unlatch control relay CR-26UNL which has no effect on control relay CR-26L since it is already de-energized. Because the right superfine transducer LPT-202 will most likely not be at a null position, a signal will be present at null detector CRSN-202 and a superfine signal will again energize control relay CR-18 which in turn energizes control relay CRM-200 (servo line 70). This relay energizes control relay CRS-201 (servo line 48), brake B-200 (servo line 125), and vertical drive motor M-200 (servo line 27). Thus the vertical drive system is again set in motion and moves the elevator until the right superfine transducer LPT-202 detects the magnetic material creating a null at which point the null detector CRSN-202 is at a null position which again de-energizes control relay CR-18 and de-energizes control relay CRM-200 (servo line 70) which in turn de-energizes control relay CRS-201 (servo line 48), brake B-200 (servo line 125), and vertical drive motor M-200 (servo line 27).

As the Stacker moves longitudinally to the "HOME" position, reed switch RS28-0 is closed by magnetic strip 155 which energizes control relay CR-45 (line 201) which in turn de-energizes control relay CR-13 (line 62) that in turn de-energizes control relay CRS-103 (servo line 43) causing the longitudinal drive circuits to operate in the "fine" mode of operation. Once null detector CRSN-101 detects a null signal from transducer LPT-102, produced by magnetic element 177, control relay CR-16 is de-energized (line 69) which in turn de-energizes control relay CRM-100 (servo line 68). This relay in turn de-energizes control relay CRS-101 (servo line 42), sets brake B-100 (servo line 123), and de-energizes longitudinal drive motor M-100 (servo line 7). Upon de-energizing control relay CR-13, it will be seen that right load station warning electromagnet S.EM-3 is energized (line 30).

Stacker "home"

Since the Stacker is in the "HOME" position, reed switch RS-18 (line 84) is closed by electromagnet R.EM-2 in the Transfer Cart. Thus when null detector CRSN-202 was energized it energized control relay CR-22 which in turn de-energized unlatch control relay CR-12UNL (line 60). Control relay CR-22 also energizes control relay CR-25 (line 90) which in turn energizes the right bin solenoid SOL-2 (line 92).

Flipper out (right) empty

Upon the right bin flipper 301 moving its arm and spring arrangement outwardly to determine if right load station 408 is empty, and moving to its maximum travel indicating that the load station is empty, solenoid switch SOL2-S1 is closed which causes control relay CR-26L to be energized (line 93). Control relay CR-26L in turn de-energizes control relay CR-25 (line 90) which in turn de-energizes the right bin solenoid SOL-2 (line 92). Upon control relay CR-26L being energized, control relay CRS-306 (servo line 55) is also energized which shifts the control to the lateral driving circuits. Control relay CR-26L also de-energizes unlatch control relays CR-33UNL and CR-34UNL (line 57) and de-energizes control relay CR-22 (line 101) which mechanically latches control relay CR-26L (line 93). Control relay CR-26L also energizes control relay CR-30 (line 101) which in turn energizes control relay CRM-300 (servo line 72). This relay in turn energizes control relay CRS-301 (servo line 53), unlocks brake B-300 (servo line 127) and energizes the lateral drive motor M-300 (servo line 7), to start the platform moving laterally outward. Control relay CR-26L also energizes control relay CR-34L (line 103).

Lateral platform out

As the lateral platform moves to its most extended position, limit switch LS12-2 is opened which de-energizes control relay CR-30 (line 101) which de-energizes control relay CRM-300 (servo line 72). This relay in turn de-energizes control relay CRS-301 (servo line 53), sets brake B-300 (servo line 127), and de-energizes the lateral drive motor M-300 (servo line 7) thus stopping the lateral driving mechanism. Limit switch LS-22 is opened which de-energizes control relay CR-39 (line 115) and limit switch LS12-3 is closed which energizes the transducer shifter motor M-201 (line 106). Limit switch LS12-1 is also closed which energizes control relay CR-18 (line 74) which in turn energizes control relay CRM-200 (servo line 70). This relay then energizes control relay CRS-201 (servo line 48), unlocks brake B-200 (servo line 125) and energizes the vertical drive motor M-200 (servo line 27) to cause the vertical platform to move downwardly and deposit the pallet at right load station 408.

Platform lowered

The transducer shifter bar 263 is moved upwardly causing platform 386 to move downwardly and upon transducer shifter bar 263 reaching its uppermost position, limit switch LS21-1 is opened which de-energizes the transducer shifter motor M-201 (line 110). At the same time, limit switch LS21-2 is closed which energizes control relay CR-36 (line 112) which in turn energizes control relay CR-37 (line 113) which in turn de-energizes control relay CRS-308 (servo line 57) to place the lateral driving circuits in a condition to retract the platform. Energizing control relay CR-37, causes control relay CR-30 to be energized (line 102) which then energizes control relay CRM-300 (servo line 72). This relay in turn energizes control relay CRS-301 (servo line 53), unlocks brake B-300 (servo line 127), and energizes the lateral drive motor M-300 (servo line 7) thus energizing the lateral drive circuits. As the shifter bar 263 left the down position, the limit switch LS20-2 was opened which de-energized control relay CR-35 (line 111) which in turn de-energized control relay CR-20

(line 80) and caused control relay CR-34L to be mechanically latched (line 104).

Platform retracting

As the platform starts to retract from its most extended position, limit switch LS12-1 is opened which de-energizes control relay CR-18 (line 74) which in turn de-energizes control relay CRM-200 (servo line 70). This relay in turn de-energizes control relay CRS-201 (servo line 48), sets brake B-200 (servo line 125), and de-energizes the vertical drive motor M-200 (servo line 27) thus preventing any vertical movement of the platform while it is being retracted.

Platform centered and "home"

Upon the lateral platform reaching the center position of the elevator, limit switch LS-22 is closed which energizes control relay CR-39 (line 115) which in turn energizes control relay CR-38 (line 114). Upon energizing control relay CR-38, unlatch control relay CR-5UNL is energized (line 32) which de-energizes control relay CR-5L which was previously mechanically latched (line 27). Energizing control relay CR-38 also energizes unlatch control relay CR-26UNL (line 98) which in turn de-energizes control relay CR-26L (line 93) which was previously mechanically latched. Upon de-energizing control relay CR-26L, control relay CRS-306 is de-energized (servo line 55) thus restoring control to the longitudinal portion of the drive circuits in place of the lateral drive circuits. De-energizing control relay CR-5L causes control relay CR-23 to be de-energized (line 88) and de-energizes control relay CR-5A (line 28). Upon de-energizing control relay CR-5A, the right load station warning electromagnet S.EM-3 is de-energized (line 30). At the same time, the right working lamp LT-7 is de-energized (line 41) and control relay CR-19 is de-energized (line 76). De-energizing control relay CR-19 causes control relay CRS-205 (servo line 52) to be de-energized thus shifting the vertical circuit control back to the "fine" mode of operation, Upon de-energizing control relay CR-26L, control relay CR-30 is de-energized (line 101) which in turn de-energizes control relay CRM-300 (servo line 72). This relay in turn de-energizes control relay CRS-301 servo line 53), sets brake B-300 (servo line 127), and de-energizes the lateral drive motor M-300 (servo line 7), thus preventing the platform moving from the center position.

De-energizing control relay CR-26L also energizes unlatch control relay CR-12UNL (line 57) and energizes unlatch control relays CR-33UNL and CR-34UNL (line 57). Unlatch control relay CR-34UNL de-energizes control relay CR-34L (line 104) since this relay was previously mechanically latched and upon de-energizing control relay CR-34L, control relay CR-37 is de-energized (line 113) which in turn energizes control relay CRS-308 (servo line 57) so that the lateral driving circuits are again set in the proper mode of operation to cause the platform to move outwardly. De-energizing control relay CR-37 in turn de-energizes control relay CR-38 (line 114) which in turn de-energizes unlatch control relay CR-5UNL.

De-energizing control relay CR-5L also energizes control relay CR-1 (line 14) which in turn de-energizes the actuate lamp LT-2 (line 16) and energizes the Transfer Cart Enable Electromagnet S.EM-1 (line 31). It will now be observed that the Stacker is in the "STANDBY" mode of operation and is ready to receive additional commands for either a deposit or withdrawal mode of operation.

OTHER MODES OF OPERATION

It will be obvious that other modes of operation may be initiated by the operator and these will be briefly described since they are all variations of operations which have been described previously. All single commands are made by the left addresser.

Withdrawal only

One single command mode of operation which was not described was that where a Withdrawal Mode is to be made, this mode of operation is carried out by moving the Stacker from the "HOME" position to a bin location and withdrawing a pallet and returning it to the "HOME" position, and unloading it on the load station.

Deposit (zero address)

It may also be desirable to move a load from either the left or right load station to the opposite load station, and this may be thought of as a single Deposit mode having a zero address. Under these conditions, a load would be picked up on the left load station and transferred to the right load station in the same manner as previously described, although it is most likely that the vertical and longitudinal motors will not drive because the Stacker will most likely have its vertical platform and longitudinal position at a null location and therefore there will probably be no movement although if the Stacker is off either vertical or longitudinal null, it will be re-positioned.

Withdrawal-withdrawal

The remaining modes of operation are primarily dual command modes of operation, examples of which are a Withdrawal-Withdrawal mode of operation in which the pallets are removed sequentially from the bins and brought back to the load stations by using both the left and the right addresser.

Withdrawal-deposit

Another mode is the Withdrawal-Deposit mode of operation in which a pallet may be removed from a bin and returned to a load station and another pallet picked up at a load station and deposited in another bin.

Deposit-deposit

Another mode of operation is the Deposit-Deposit mode of operation which is somewhat different from those described in that in a deposit command the first address is a load station and therefore after making the first deposit, the Stacker must return to the home station to pick up the second pallet to be deposited.

Manual

It will also be obvious that the Stacker may be controlled by manual operation and details of the Manual operation are easily seen by following the switching arrangement of the driving servos for the Stacker and Transfer Cart which are controlled by the switches on control panels 185 and 932 respectively (FIGS. 35 and 19).

Reset

It will also be observed that it may be desirable on occasion to reset the entire stacker logic to that of the PRE-STANDBY mode of operation and this is accomplished by actuating the Reset push button switch PB-2 (line 116) which actuates reset relays CR-40 and CR-40A. It will be observed that each of the control relays to be reset must receive its voltage through a set of contacts belonging to control relay CR-40 and therefore all of the control relays may be set to the Pre-standby mode of operation.

Emergency stop

Under certain conditions it may be desirable to stop the movement of the Stacker after it has left the "HOME" position. For this reason the emergency stop push button switch ESPB (FIGS. 1 and 3) is located at the operators location on the Transfer Cart 400 so that it may be actuated at any time regardless of the location of the Stacker and regardless of the mode of operation it happens to be in at that time. Pressing the emergency stop push button switch ESPB breaks the 115 volt alternating current line to the overhead fifth rail W7 and thus interrupts the power to the stacker logic circuits (line 1, FIG. 20a) which de-energizes control relay CR–52 (line 2). De-energizing control relay CR–52 de-energizes control relay CR–ES (servo line 66) which opens its contacts to all the motor control relays, CRM–100, CRM–200 and CRM–300 (line 67).

Once control relay CR–52 is de-energized, and emergency stop push button switch ESPB released and again closed, it will be seen that control relay CR–52 remains de-energized and may be energized only through depressing the reset push button switch PB2 (line 116) to close its contact (line 1) or by cutting off the power to transformer T101 and reapplying it.

Safety quadrants for vertical and horizontal travel

In FIGURE 20g, there are found in lines 132 and 133, three reed switches RS23–2, RS23–1 and RS24. These reed switches form a safety circuit by providing power to energize control relay CR–50 which has contacts in line 62 controlling the longitudinal coarse-fine control relay CR–13 and in line 70 controlling the longitudinal motor control relay CR–16. The purpose of these reed switches and their magnetic controlling elements are to insure that the Stacker is not driven towards the "HOME" position with the elevator elevated at a height higher than bin level No. 2 in the coarse mode of operation, at a time when the Stacker is longitudinally between the "HOME" position and the bins located in column No. 3. It will be observed by reference to the chart in FIGURE 24k that control relay CR–6 is de-energized after the platform has been retracted and centered after an extension into the bin structure, or is de-energized where the bin flipper has found the bin full and the Stacker is actuated for travel towards the "HOME" position (FIGURE 24s). In a similar manner, control relay CR–7 is de-energized after the platform has been retracted and centered from an extension into the bin structure as found in FIGURE 24x or where the bin has been found full and the Stacker is actuated for travel towards the "HOME" position as shown in FIGURE 24y. In other words, once the Stacker is put in the coarse mode of operation and directed towards the "HOME" position, control relay CR–50 is controlled by reed switches RS23–2, RS23–1 and RS24 rather than relay contacts CR–6 or CR–7 in lines 130 or 131. The Stacker will be allowed to operate in the coarse mode of operation longitudinally regardless of the vertical position of the elevator until the Stacker comes abreast of the bins in column 2. At this position in the aisle, reed switch RS24 opens and if the elevator is above vertical level No. 2, with all the reed switches open, the longitudinal driving control is shifted to the fine mode of operation by control relay CR–13 (line 62). The longitudinal drive and servo circuits are then operated in the fine mode of operation, unless the Stacker has reached the Transfer Car, at which time limit switch LS–10 is opened and the longitudinal drive and servo control circuits are de-energized by control relay CR–16 (line 70). The elevator is allowed to continue downwardly and once magnetic strip 244 closes reed switch RS23–2, the longitudinal system is again shifted back to coarse control. Of course, it is necessary to keep the vertical driving system in operation and as the elevator moves magnetic strip 244 past reed switches RS23–1 and RS23–2, magnetic strip 244 closes these reed switches to keep control relay CR–50 energized. Thus a safe means is provided to insure that the Stacker does not return to the Transfer Cart with a load elevated any higher than the second bin level.

The foregoing description of the automatic material handling equipment has set forth an embodiment of the invention pointing up important features of the invention. Obviously, a definite advantage exists in being able to transfer the Stacker between aisles by the use of a Transfer Cart and thus eliminate a Stacker in each aisle. However, the Stacker may be used separately from the Transfer Cart if desired. It will also be appreciated that in the present invention, the Stacker is allowed to proceed at maximum speed to the bin locations both horizontally and vertically, being controlled through coincidence circuits without resort to counting bins or measuring the distance the Stacker has travelled both longitudinally and vertically. It has also been contemplated that there may be some bin sag and therefore the invention is directed to a vertical control system in which the bin sag may be compensated for through the vertical sensing devices. Provisions have also been made to insure the proper operation of the two vehicles while the transfer process takes place and during the method of moving the Stacker down the aisles from the Transfer Cart. To aid in loading the Stacker, pallet dollies have been provided on the Transfer Cart for both loading and retrieving the pallet loads and safety precautions have been taken to insure improper loads are rejected.

What is claimed is:

1. A transfer means for use in a material handling system having a load supporting bin structure with aisles comprising:
   a mobile craft movable across the ends of the aisles of the bin structure and adapted to receive and carry a vehicle movable within said aisles in a direction generally normal to the direction of movement of said mobile craft;
   drive means for driving said mobile craft to a selected destination;
   control means operatively connected to said drive means for controlling said drive means; and
   a load station means on said mobile craft for receiving into said system or discharging from said system material-units delivered thereto whereby material-units may be transferred between the load station means and the vehicle when the latter is on the mobile craft.

2. The transfer means as set forth in claim 1 also comprising material-unit dimension detection means on said mobile craft adjacent said load station means for producing a signal when a material-unit received exceeds a predetermined dimension.

3. The transfer means as set forth in claim 1 wherein said load station means comprises at least one pallet dolly operatively secured to said mobile craft, movable between an extended position and a retracted position, and adapted to receive material-units into and discharge material-units out of the system.

4. The transfer means as set forth in claim 3 wherein said load station means also comprises a first positioning device on said mobile craft adjacent said pallet dolly when said dolly is in a retracted position, and movable between a first and second position to selectively position a material-unit; and a positioning control means operatively connected to said first positioning device and said pallet dolly and adapted to be responsive to placement of said pallet dolly in the retracted position for energizing said positioning device.

5. A material handling system comprising:
   a load supporting structure forming aisles with a plurality of columns and rows of bins for holding material-units on each side of the aisles;
   a mobile craft horizontally movable across the ends of the aisles of the supporting structure and adapted to receive and carry a material handling vehicle movable within the aisles and adapted to pick up, carry and deposit material-units to each side of said vehicle;
   driving means for moving the mobile craft;
   control means for controlling the driving means to move the mobile craft across the ends of the aisles and to stop and selectively position said mobile craft at the ends of said aisles; and
   a load station means on the mobile craft for receiving and discharging material-units into and out of the system whereby material-units may be transferred between the load sttaion means and the vehicle when the latter is on the mobile craft.

6. A system according to claim 5 also comprising guide means located adjacent the ends of the aisles for guiding the movement of the mobile craft.

7. A system according to claim 6 wherein said guide means comprises rails and the mobile craft comprises wheels engaging said rails.

8. A system according to claim 7 wherein said rails are on a ground surface and said mobile craft rises above said rails.

9. A system according to claim 5 wherein said load station means comprises a driven member operatively secured to the mobile craft, movably operable between an extended position and a retracted position, and adapted to receive and discharge material-units.

10. A system according to claim 9 wherein said load station means also comprises means for selectively positioning material-units at a selected location on said mobile craft.

11. A system according to claim 5 also comprising a detection means for producing a signal when a material-unit received exceeds a selected maximum dimension.

12. A system according to claim 11 also comprising a rejection means responsive to the detection means signal for rejecting a material-unit being received when said material-unit has at least one dimension exceeding a preselected limit.

13. A system according to claim 5 wherein said load station means comprises two receiving and discharging stations each in a position and location adapted to enable pick up and deposit of material-units by the vehicle when said vehicle is on the mobile craft with each station having movable elements operatively movable between a first and a second position and adapted to receive and discharge material-units delivered thereto.

References Cited

UNITED STATES PATENTS

| | | | |
|---|---|---|---|
| 1,919,269 | 7/1933 | Becker | 214—16.14 |
| 2,670,859 | 3/1954 | Zenkendorf et al. | |
| 2,923,421 | 2/1960 | De Roumefort. | |
| 3,219,207 | 11/1965 | Chasar. | |
| 3,323,661 | 6/1967 | Chasar. | |
| 3,049,247 | 8/1962 | Lemelson | 214—11 |
| 3,206,041 | 9/1965 | McGrath. | |
| 3,294,260 | 12/1966 | Frangos. | |
| 3,279,626 | 10/1966 | De Roumefort | 214—16.14 |

FOREIGN PATENTS

| | | |
|---|---|---|
| 967,451 | 8/1964 | Great Britain. |
| 230,283 | 11/1963 | Austria. |

GERALD M. FORLENZA, Primary Examiner

RAYMOND B. JOHNSON, Assistant Examiner

PO-1050
(5/69)

UNITED STATES PATENT OFFICE
CERTIFICATE OF CORRECTION

Patent No. 3,503,530   Dated   March 31, 1970

Inventor(s)   Arthur R. Burch and Charles E. Bates   PAGE- 1

It is certified that error appears in the above-identified patent and that said Letters Patent are hereby corrected as shown below:

Column 4, lines 36 and 37, delete "of the transfer cart electrical servo and driving mechanism" and insert -- upper and lower transfer cart and bin locking mechanisms;--; line 53, delete "drive control panel;" and insert --ical drive mechanism;--; line 56, delete "plane" and insert --panel--.

Column 5, line 29, delete "oporation" and insert --operation--; line 32, delete "opearation" and insert --operation--; line 52, delete "compressor" and insert --compressed--; line 60, delete "which" and insert --while--.

Column 6, line 22, after "aisles," insert --the voltage must pass through a pair of switches LS4 and--; line 48, delete "lead" and insert --load--; line 53, delete "asile" and insert --aisle--.

Column 8, line 52, delete "468", second occurrence, and substitute --469--.

Column 9, line 68, after "engaging" insert --the pallet, --.

Column 11, line 4, delete "connection" and substitute --connect--.

Column 13, line 45, delete "contract" and substitute --contact--.

Column 14, line 5, delete "which" and substitute --switch--; line 24, delete "connested" and substitute --connected--; line 49, delete "lines (3 and 4)" and substitute --(lines 3 and 4)--.

Column 15, line 34, delete "of", first occurrence, and insert -- by --.

Column 17, line 73, delete "read" and substitute --reed--.

PO-1050
(5/69)

UNITED STATES PATENT OFFICE
CERTIFICATE OF CORRECTION

Patent No. 3,503,530  Dated March 31, 1970

Inventor(s) Arthur R. Burch and Charles E. Bates   PAGE - 2

It is certified that error appears in the above-identified patent and that said Letters Patent are hereby corrected as shown below:

(Continued)

Column 26, line 23, delete "addressed" and substitute --addresser--.

Column 29, line 14, delete "GR-7" and substitute --CR-7--.

Column 35, line 49, delete "9-310" and substitute --R-310--.

Column 36, line 55, delete "R-125" and substitute --R-215--.

Column 41, line 69, delete "enrgizes" and substitute --energizes--.

Column 42, line 53, delete "READY' and substitute --"READY"--.

Column 44, lines 62 and 63, delete "De-energizing control relay CR-8 is de-energized (line 23)."

Column 48, line 33, between "Servo" and "and to Relay" add --Schematics Figs. 20a through 20f and 21a through 21f--; delete line 34.

Column 49, line 12, after "Addresser" add --Switch S-1 is turned to the--.

Column 52, line 41, after "moves" add --away--.

Column 54, lines 14 and 15, after "con-", add --trol--.

Column 58, line 7, after "CR-19", delete "also de-energizes Stacker Electromagnet S.EM-2" and add --also energizes unlatch control relay CR-26UNL--; line 13, delete "not" and substitute --no--; line 24, delete "mod" and substitute --mode--.

PO-1050
(5/69)

UNITED STATES PATENT OFFICE
CERTIFICATE OF CORRECTION

Patent No. 3,503,530     Dated    March 31, 1970

Inventor(s)   Arthur R. Burch and Charles E. Bates    PAGE - 3

It is certified that error appears in the above-identified patent and that said Letters Patent are hereby corrected as shown below:
(Continued)

Column 60, lines 62 and 63, delete "producers" and substitute --produces--.

Column 61, line 12, delete "CR-261" and substitute --CR-26L--.

Column 61, line 26, delete "plaftorm" and substitute --platform--.

Column 63, line 36, between "servo system" and "fine" insert --from--.

Column 65, line 44, before "servo line 5$)" insert --(--.

Column 67, line 56, delete "Car" and substitute --Cart--.

Column 69, line 10, delete "sttation" and substitute --station--; delete "rises" and substitute --rides--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents